US012695563B2

(12) United States Patent
Murakami

(10) Patent No.: US 12,695,563 B2
(45) Date of Patent: Jul. 28, 2026

(54) RADIO COMMUNICATION SYSTEM, RADIO COMMUNICATION DEVICE, AND RADIO COMMUNICATION METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 444 days.

(21) Appl. No.: 17/629,296

(22) PCT Filed: Jul. 17, 2020

(86) PCT No.: PCT/JP2020/027945
§ 371 (c)(1),
(2) Date: Jan. 21, 2022

(87) PCT Pub. No.: WO2021/020186
PCT Pub. Date: Feb. 4, 2021

(65) Prior Publication Data
US 2022/0255695 A1    Aug. 11, 2022

(30) Foreign Application Priority Data

Jul. 26, 2019    (JP) ................................. 2019-137745
Nov. 8, 2019    (JP) ................................. 2019-203407
Feb. 13, 2020    (JP) ................................. 2020-022295

(51) Int. Cl.
*H04L 5/00*        (2006.01)
*H04B 7/06*        (2006.01)
(Continued)

(52) U.S. Cl.
CPC ....... *H04L 5/0048* (2013.01); *H04B 7/06956* (2023.05); *H04W 72/0446* (2013.01)

(58) Field of Classification Search
CPC ... H04L 5/0048; H04L 5/1469; H04L 5/0094; H04W 72/0446; H04W 16/28; H04B 7/0695; H04B 7/088
See application file for complete search history.

(56) References Cited

U.S. PATENT DOCUMENTS 10,291,309 B2 *    5/2019  Chakraborty ....... H04W 52/146
10,560,851 B2 *    2/2020  Guo ..................... H04B 7/0695
(Continued)

FOREIGN PATENT DOCUMENTS

JP        2010171734 A      8/2010
JP        2017-169127 A      9/2017
(Continued)

OTHER PUBLICATIONS

Extended European Search Report, dated Jul. 15, 2022, for European Application No. 20848127.5/4007340, 8 pages.
(Continued)

*Primary Examiner* — Abdullahi E Salad
(74) *Attorney, Agent, or Firm* — Seed Intellectual Property Law Group LLP

(57)        ABSTRACT
This communication system comprises: a first radio-communication device that transmits a plurality of first reference signals with controlled directivity in a time-sharing manner in a first period; and a second radio-communication device that transmits a plurality of second reference signals with controlled directivity to the first radio-communication device in a time-sharing manner in a second period, the second reference signal including information on directivity corresponding to any one of the first reference signals received from the first radio-communication device.

10 Claims, 95 Drawing Sheets

(51) Int. Cl.
H04W 72/04 (2023.01)
H04W 72/0446 (2023.01)

(56) References Cited

U.S. PATENT DOCUMENTS

| | | | | |
|---|---|---|---|---|
| 10,893,431 B2* | 1/2021 | Liou | | H04W 16/28 |
| 11,265,829 B2* | 3/2022 | Chou | | H04W 74/0833 |
| 11,509,569 B2* | 11/2022 | Luo | | H03M 13/09 |
| 11,601,903 B2* | 3/2023 | Matsumura | | H04B 7/0626 |
| 2011/0281600 A1 | 11/2011 | Tanaka | | |
| 2016/0065287 A1* | 3/2016 | Kim | | H04B 7/088 |
| | | | | 342/367 |
| 2016/0323755 A1 | 11/2016 | Cordeiro et al. | | |
| 2017/0347391 A1* | 11/2017 | Tenny | | H04B 7/0617 |
| 2018/0054348 A1* | 2/2018 | Luo | | H04W 52/50 |
| 2018/0054832 A1* | 2/2018 | Luo | | H04B 7/0691 |
| 2018/0206132 A1 | 7/2018 | Guo et al. | | |
| 2018/0278318 A1* | 9/2018 | Chakraborty | | H04W 52/367 |
| 2018/0288755 A1* | 10/2018 | Liu | | H04W 56/0015 |
| 2018/0375558 A1 | 12/2018 | Takahashi et al. | | |
| 2020/0304177 A1 | 9/2020 | Song et al. | | |
| 2020/0359404 A1* | 11/2020 | Nilsson | | H04W 72/23 |
| 2021/0036759 A1* | 2/2021 | Kim | | H04B 7/0695 |
| 2022/0140882 A1* | 5/2022 | Matsumura | | H04L 5/001 |
| | | | | 370/329 |

FOREIGN PATENT DOCUMENTS

| | | | |
|---|---|---|---|
| JP | 2018-518855 A | 7/2018 | |
| WO | WO 2018038863 A1 | 3/2018 | |
| WO | 2018/078126 A1 | 5/2018 | |
| WO | 2019/101152 A1 | 5/2019 | |

OTHER PUBLICATIONS

International Search Report, mailed Oct. 20, 2020, for International Application No. PCT/JP2020/027945, 5 pages (with English translation).

Kedem et al., "Resolution of TDD BF Related CIDs," doc.: IEEE 802.11-18/1837rl, Nov. 7, 2018, 35 pages.

Samsung, "Remaining details on UE group based beam reporting," R1-1720301, Agenda Item: 7.2.2.6, 3GPP TSG RAN WG1 Meeting #90bis, Reno, USA, Nov. 27-Dec. 1, 2017. (4 pages).

* cited by examiner

501 Constellation mapper

502 Tone mapping

503 IFFT

504 CP insertion

505 Tx FE processing

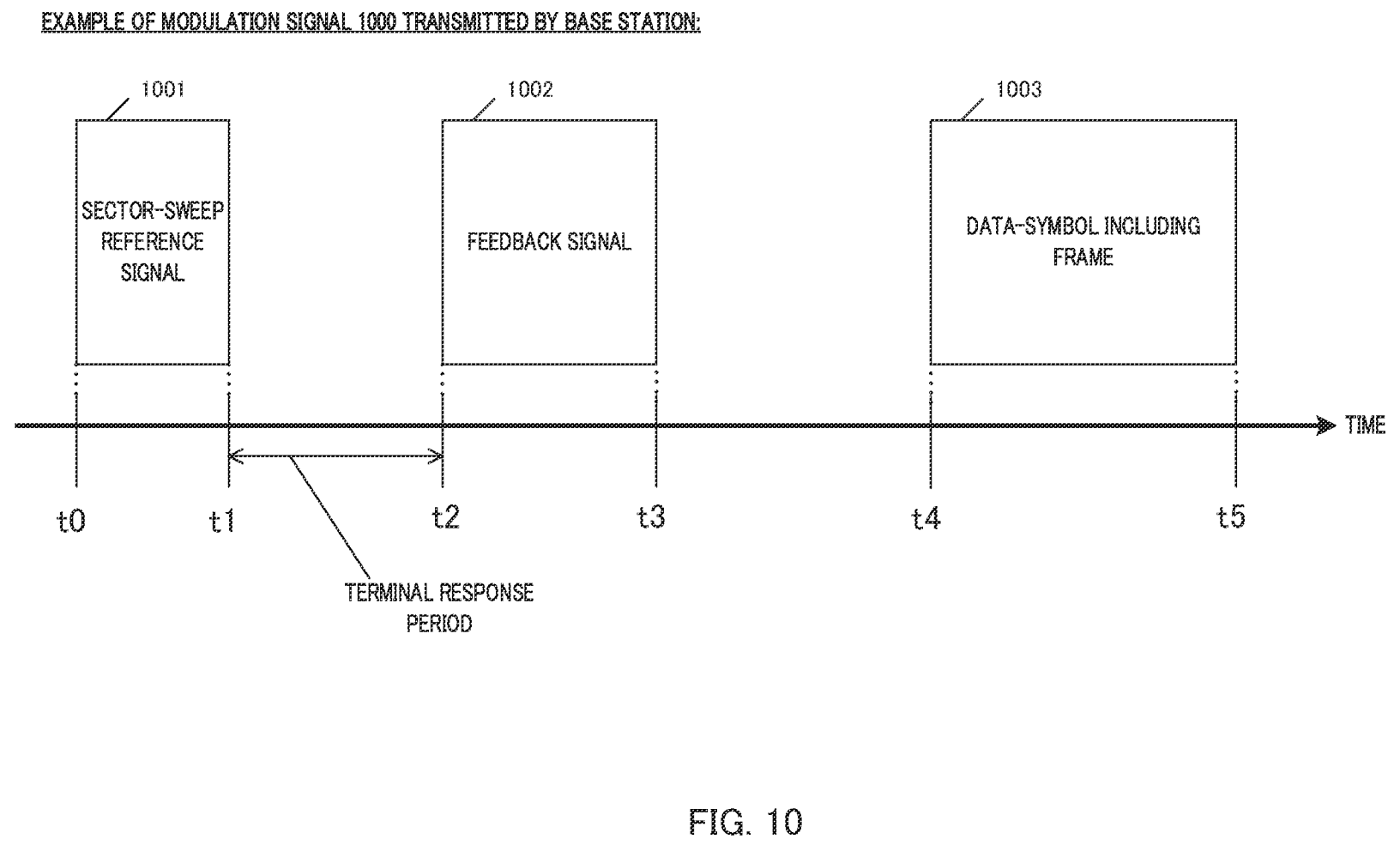

EXAMPLE OF MODULATION SIGNAL 1000 TRANSMITTED BY BASE STATION:

1001 SECTOR-SWEEP REFERENCE SIGNAL

1002 FEEDBACK SIGNAL

1003 DATA-SYMBOL INCLUDING FRAME

TERMINAL RESPONSE PERIOD t0 t1 t2 t3 t4 t5

TIME

FIG. 10

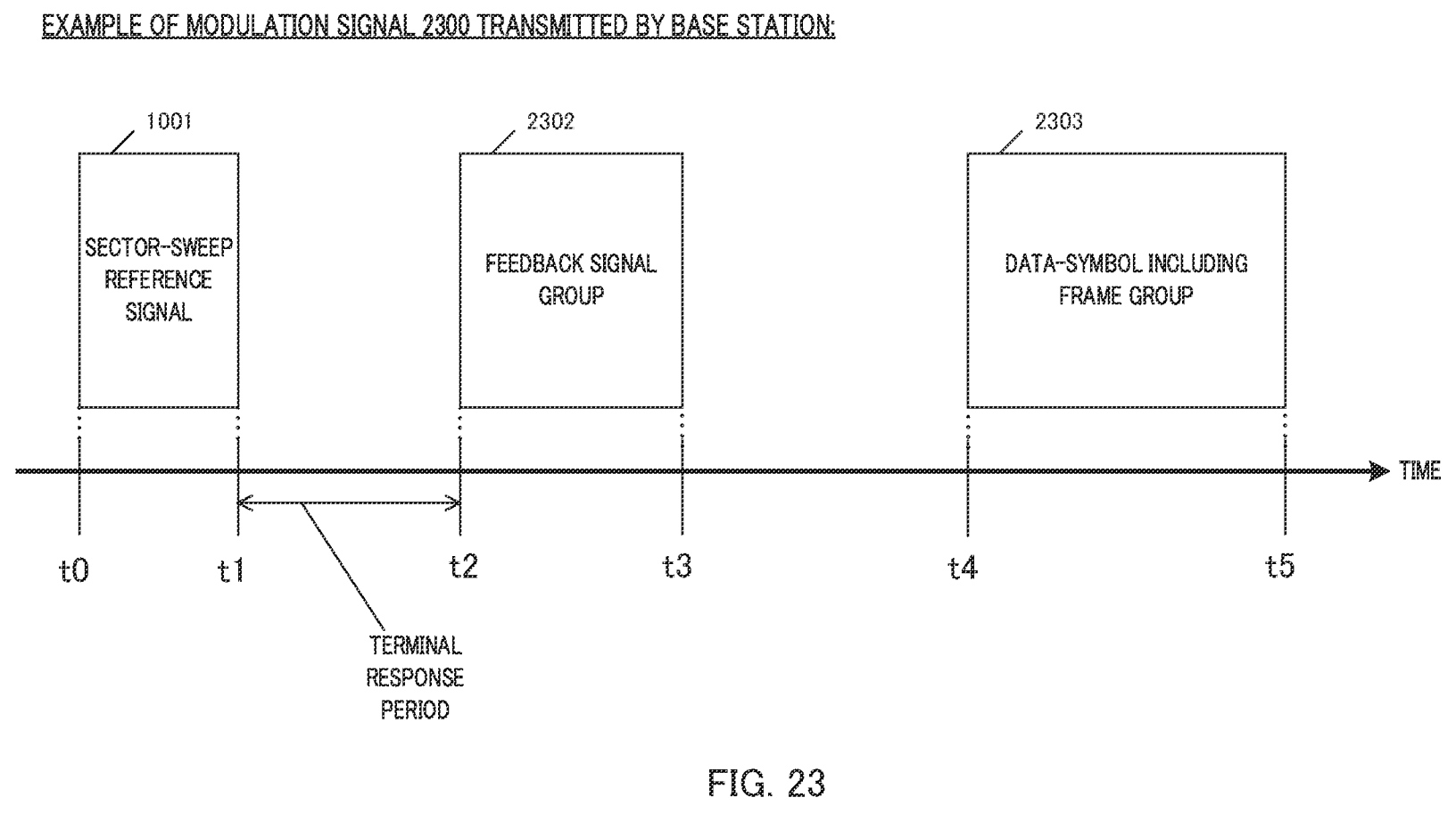

EXAMPLE OF MODULATION SIGNAL 2300 TRANSMITTED BY BASE STATION

TIME

1001

SECTOR-SWEEP REFERENCE SIGNAL

2302

FEEDBACK SIGNAL GROUP

2303

DATA-SYMBOL INCLUDING FRAME GROUP t0    t1    t2    t3    t4    t5

TERMINAL RESPONSE PERIOD

FIG. 23

Figure 30:
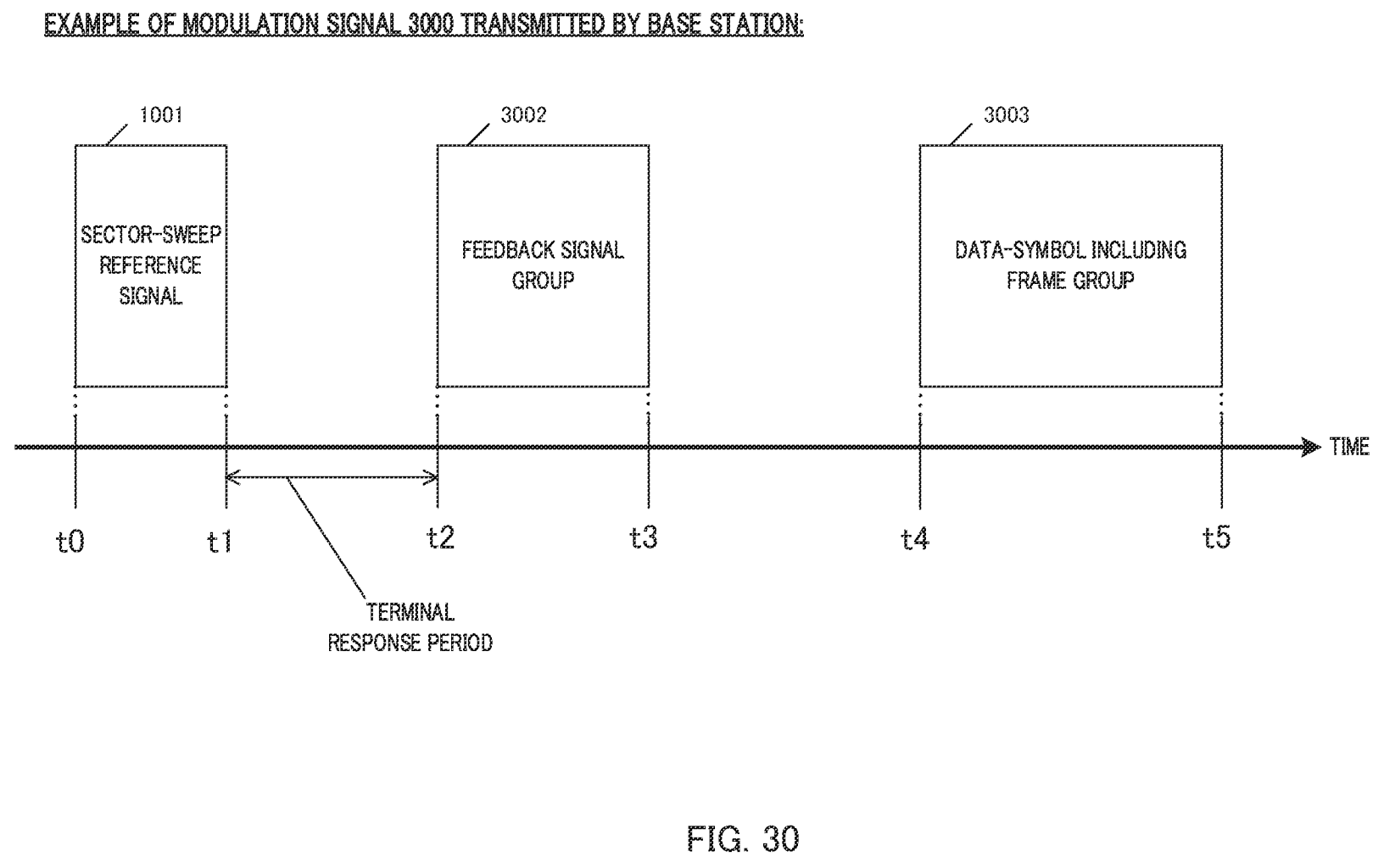

EXAMPLE OF MODULATION SIGNAL 3000 TRANSMITTED BY BASE STATION:

1001 — SECTOR-SWEEP REFERENCE SIGNAL

3002 — FEEDBACK SIGNAL GROUP

3003 — DATA-SYMBOL INCLUDING FRAME GROUP

TERMINAL RESPONSE PERIOD t0 t1 t2 t3 t4 t5

TIME

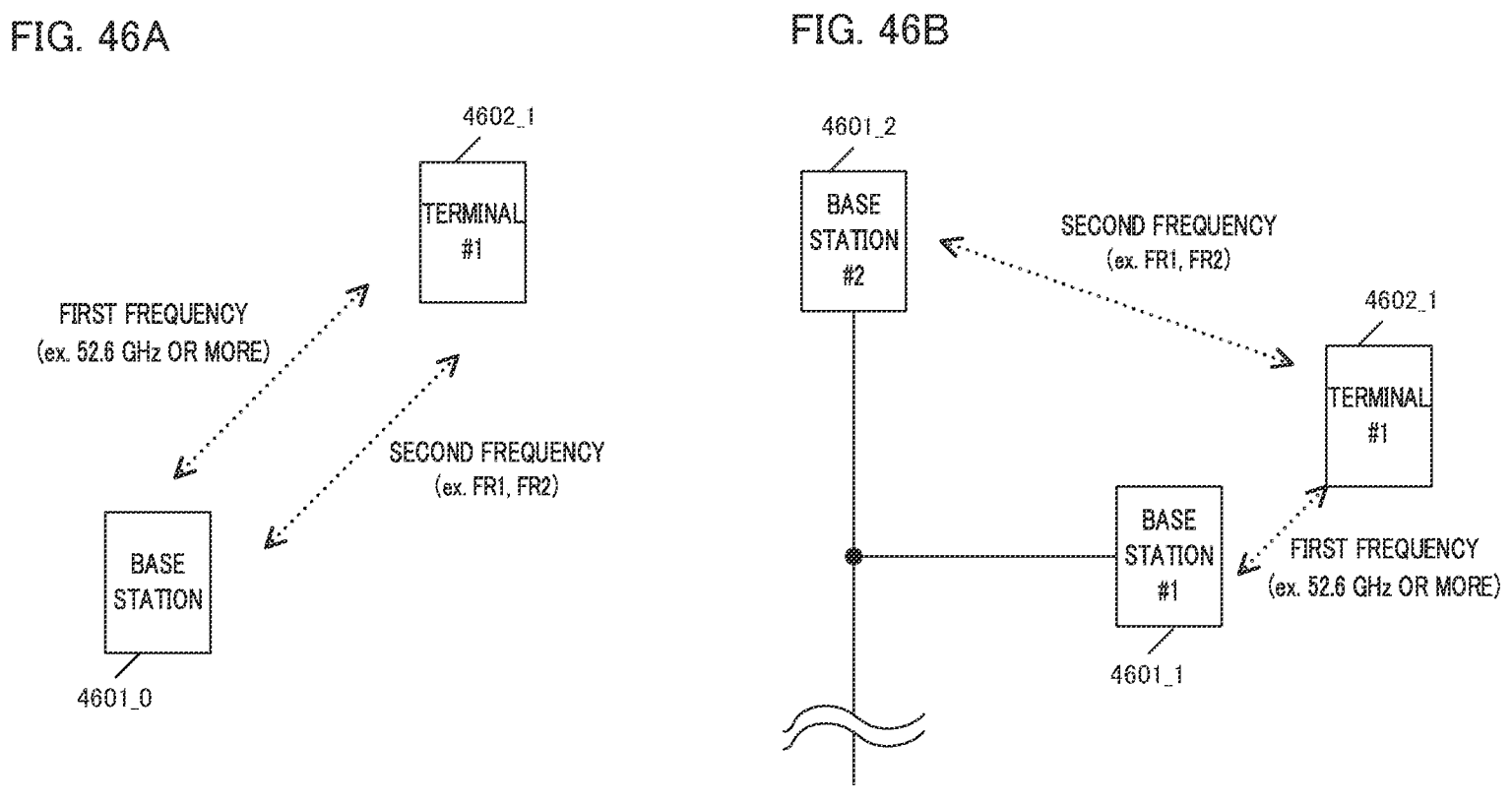

BASE STATION #2
4601_2

SECOND FREQUENCY (ex. FR1, FR2)

TERMINAL #1
4602_1

FIRST FREQUENCY (ex. 52.6 GHz OR MORE)

BASE STATION #1
4601_1

FIG. 46A

TERMINAL #1
4602_1

FIRST FREQUENCY (ex. 52.6 GHz OR MORE)

SECOND FREQUENCY (ex. FR1, FR2)

BASE STATION
4601_0

FIG. 50A    EXAMPLE OF MODULATION SIGNAL TRANSMITTED AT FIRST FREQUENCY BY BASE STATION (BASE STATION #1):
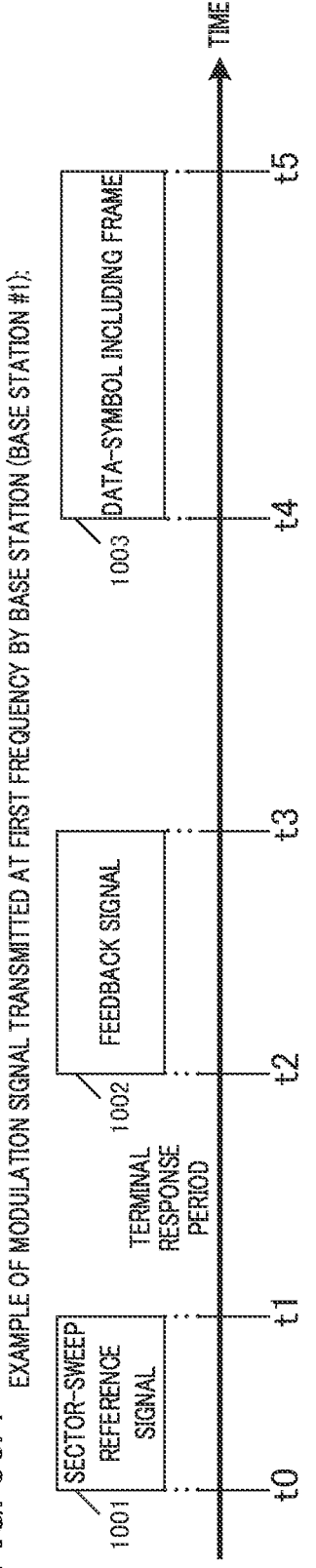
FIG. 50B    EXAMPLE OF MODULATION SIGNAL TRANSMITTED AT SECOND FREQUENCY BY TERMINAL (TERMINAL #1):
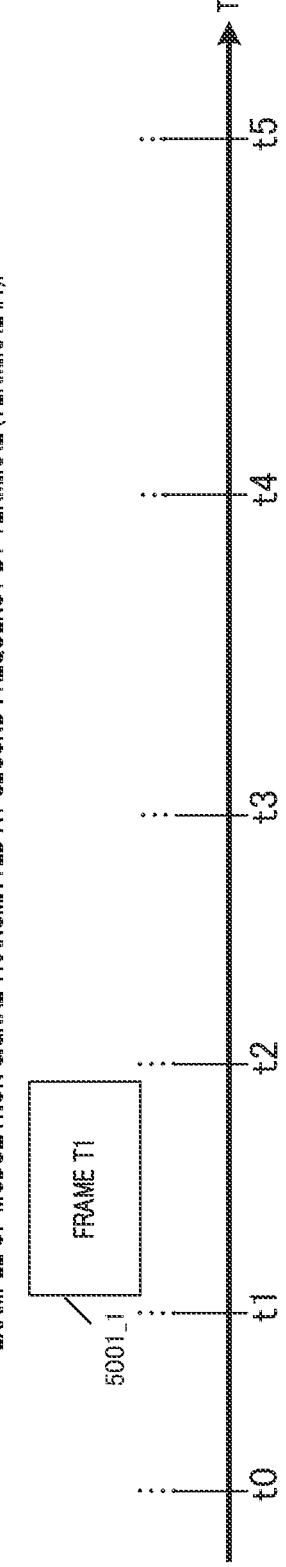
FIG. 50C    EXAMPLE OF MODULATION SIGNAL TRANSMITTED AT SECOND FREQUENCY BY BASE STATION (BASE STATION #1):
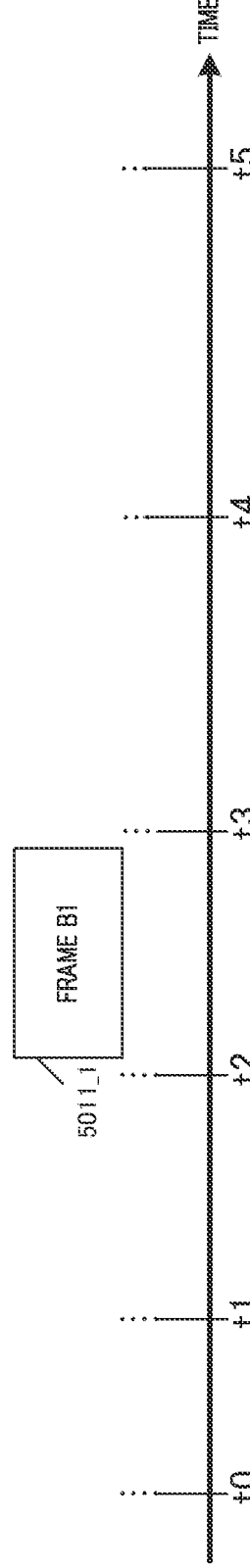

5201

INFORMATION ON FIRST-FREQUENCY SECTOR SWEEP

5202

REQUEST INFORMATION ON TERMINAL TO PERFORM OR NOT TO PERFORM FIRST-FREQUENCY TRANSMISSION

FIG. 55

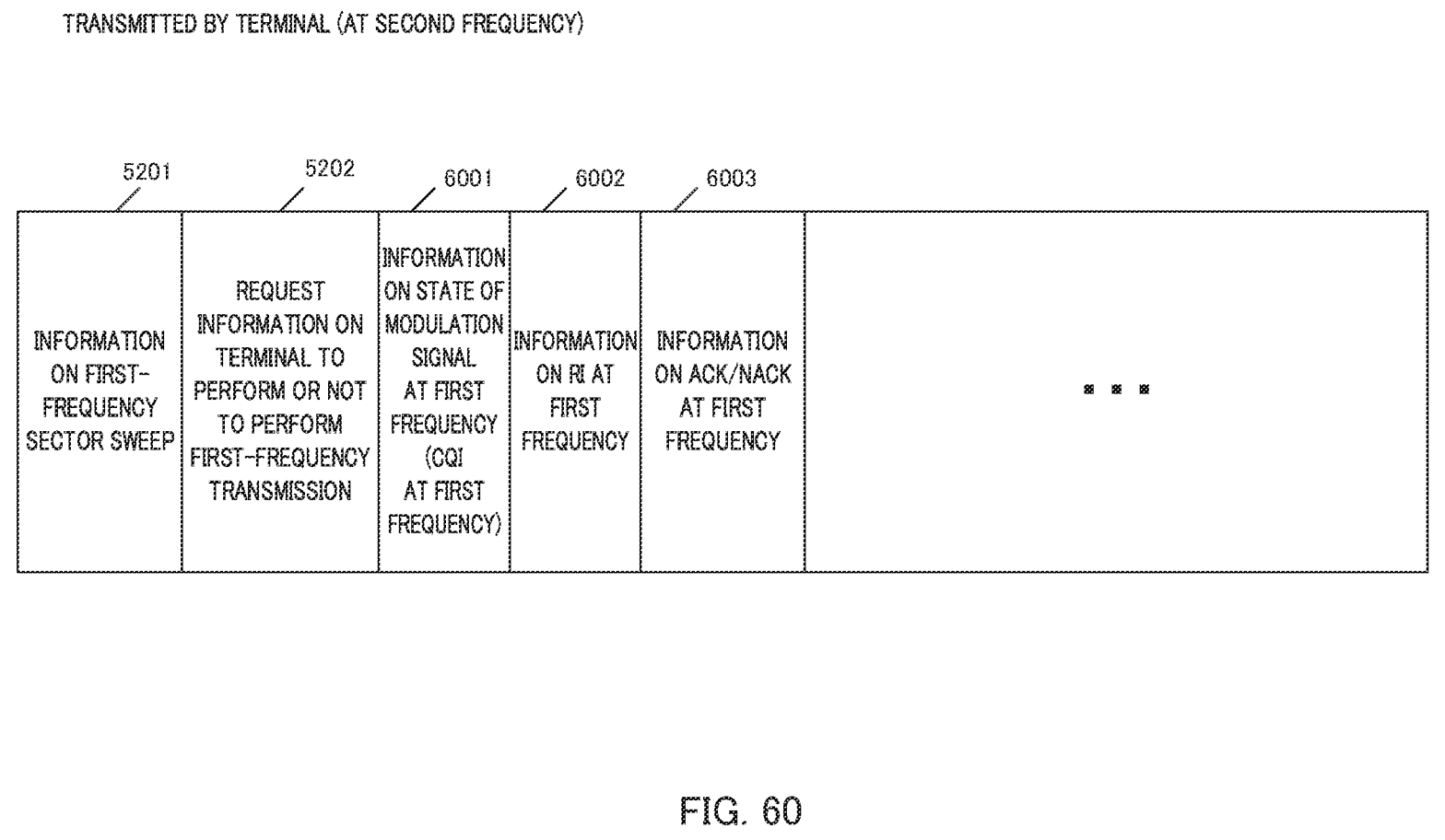

TRANSMITTED BY TERMINAL (AT SECOND FREQUENCY)

| 5201 | 5202 | 6001 | 6002 | 6003 |
|---|---|---|---|---|
| INFORMATION ON FIRST-FREQUENCY SECTOR SWEEP | REQUEST INFORMATION ON TERMINAL TO PERFORM OR NOT TO PERFORM FIRST-FREQUENCY TRANSMISSION | INFORMATION ON STATE OF MODULATION SIGNAL AT FIRST FREQUENCY (CQI AT FIRST FREQUENCY) | INFORMATION ON RI AT FIRST FREQUENCY | INFORMATION ON ACK/NACK AT FIRST FREQUENCY | |

FIG. 60

051
RADIO
COMMUNICATION
DEVICE
001
RADIO
COMMUNICATION
DEVICE
FIG. 66

RADIO COMMUNICATION SYSTEM, RADIO COMMUNICATION DEVICE, AND RADIO COMMUNICATION METHOD

TECHNICAL FIELD

The present disclosure relates to a radio communication system, a radio communication apparatus, and a radio communication method.

BACKGROUND ART

As a system using a frequency of 52.6 GHz or more, a communication system using the 60 GHz band is used, for example.

As a communication method for increasing a communication distance, a method described in Patent Literature (hereinafter referred to as "PTL") 1 is used. FIG. 66 illustrates an example of a communication state of a radio communication device described in PTL 1.

For example, radio communication device 001 transmits a sector sweep signal. Radio communication device 051 then transmits a sector sweep signal. Radio communication device 051 transmits a signal including feedback information on the sector sweep to radio communication device 001, accordingly.

With such procedures, radio communication device 001 determines a method of "transmission beamforming and/or reception beamforming," and radio communication device 051 also determines the method of "transmission beamforming and/or reception beamforming." As a result, a communicable distance between radio communication device 001 and radio communication device 051 can be increased; however, a problem remains in improving the data transmission efficiency of the entire system of a communication system composed of a plurality of radio communication devices in an environment where the plurality of radio communication devices is present.

CITATION LIST

Patent Literature

PTL 1: Japanese Unexamined Patent Application Publication (Translation of PCT Application) No. 2018-518855

SUMMARY OF INVENTION

Technical Problem

One non-limiting and exemplary embodiment facilitates providing technology for improving a data transmission rate in the presence of a plurality of radio communication devices.

Solution to Problem

A radio communication system according to an aspect of the present disclosure includes: a first radio communication apparatus that transmits, in a time-division manner, a plurality of first reference signals in a first period, the plurality of first reference signals having controlled directivities; and a second radio communication apparatus that transmits, in a time-division manner, a plurality of second reference signals to the first radio communication apparatus in a second period, the plurality of second reference signals having controlled directivities and including information on a directivity corresponding to any one of the plurality of first reference signals that have been received from the first radio communication apparatus.

A radio communication apparatus according to an aspect of the present disclosure includes: a reception processor that receives a plurality of first reference signals in a first period, the plurality of first reference signals having directivities controlled by another radio communication apparatus; and a transmission processor that transmits, in a time-division manner, a plurality of second reference signals to the other radio communication apparatus in a second period, the plurality of second reference signals having controlled directivities and including information on a directivity corresponding to any one of the plurality of first reference signals.

A radio communication apparatus according to an aspect of the present disclosure includes: a transmission processor that transmits, in a time-division manner, a plurality of first reference signals in a first period, the plurality of first reference signals having controlled directivities; and a reception processor that receives at least one of a plurality of second reference signals in a second period, the plurality of second reference signals including information on a directivity corresponding to any one of the plurality of first reference signals, and having directivities controlled by another radio communication apparatus that has received the first reference signal.

A radio communication method according to an aspect of the present disclosure includes: transmitting, by a first radio communication apparatus, in a time-division manner, a plurality of first reference signals in a first period, the plurality of first reference signals having controlled directivities; and transmitting, by a second radio communication apparatus, in a time-division manner, a plurality of second reference signals to the first radio communication apparatus in a second period, the plurality of second reference signals having controlled directivities and including information on a directivity corresponding to any one of the plurality of first reference signals that has been received from the first radio communication apparatus.

It should be noted that general or specific embodiments may be implemented as a system, a method, an integrated circuit, a computer program, a storage medium, or any selective combination thereof.

Advantageous Effects of Invention

According to the present disclosure, it is possible to improve a data transmission rate in the presence of a plurality of radio communication devices.

Additional benefits and advantages of the disclosed aspect will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 10 illustrates an example of a modulation signal transmitted by a base station according to Embodiment 1;

FIG. 23 illustrates an example of a modulation signal transmitted by a base station according to Embodiment 2;

FIG. 30 illustrates an example of a modulation signal transmitted by a base station according to Embodiment 3;

FIG. 46A illustrates a configuration example of a communication system according to Embodiment 6;

FIG. 46B illustrates another configuration example of a communication system that is different from that of FIG. 46A according to Embodiment 6;

FIG. 50A illustrates an example of a transmission situation from time t0 to time t5 according to Embodiment 6;

FIG. 50B illustrates another example of a transmission situation from time t0 to time t5 according to Embodiment 6;

FIG. 50C illustrates yet another example of a transmission situation from time t0 to time t5 according to Embodiment 6;

FIG. 55 describes an example of a modulation signal transmitted at the first frequency by the terminal according to Embodiment 6;

FIG. 60 illustrates an example of data included in a modulation signal transmitted using the second frequency (band) according to Embodiment 6;

FIG. 66 illustrates an example of a communication state of a radio communication device according to the conventional technique.

DESCRIPTION OF EMBODIMENTS

Hereinafter, embodiments of the present invention will be described in detail with reference to the accompanying drawings.

Embodiment 1

A detailed description will be given of a communication system, a communication apparatus, and a communication method of the present embodiment.

Figure 1A:
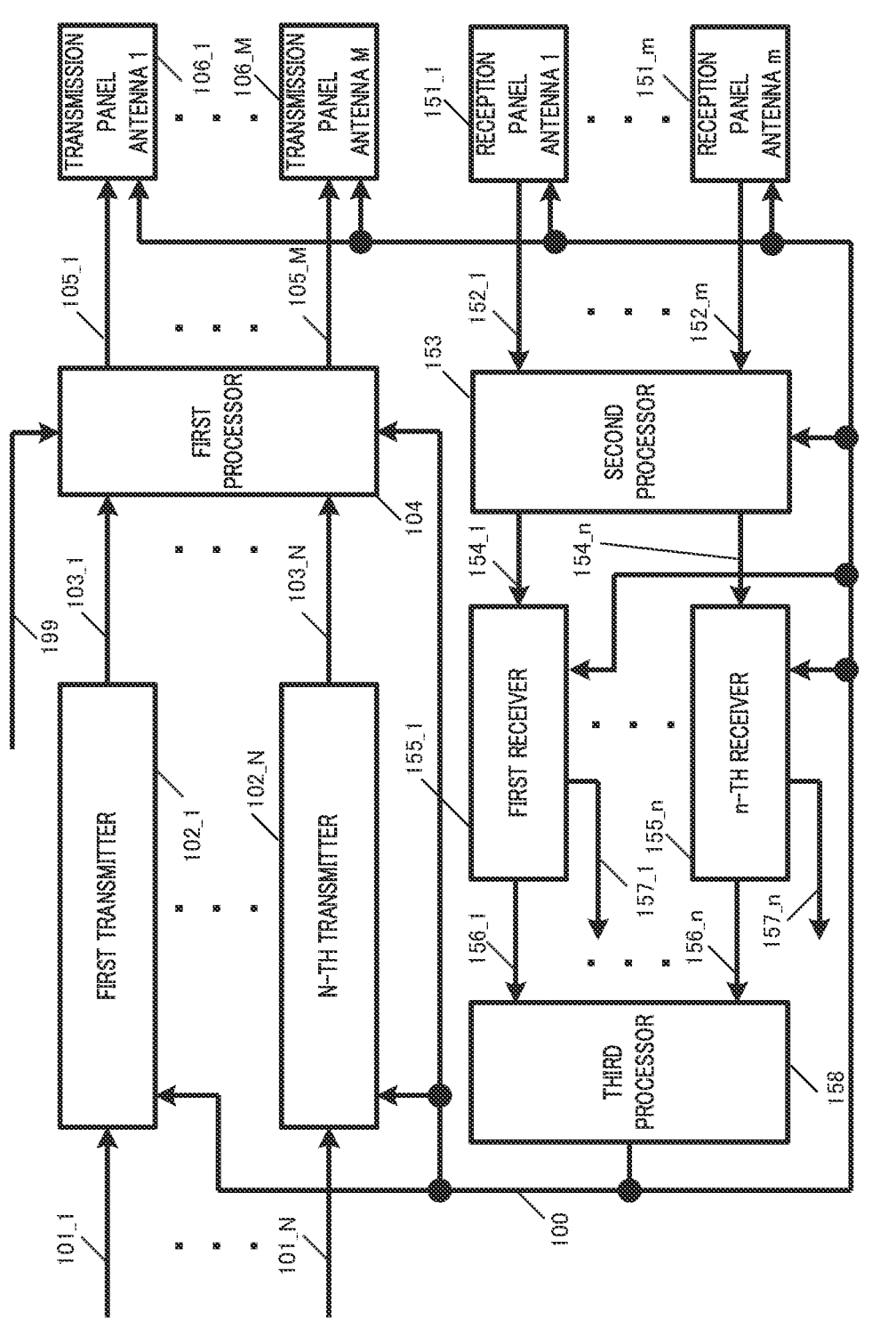
FIG. 1A illustrates the first configuration example of a communication apparatus according to Embodiment 1.

FIG. 1A illustrates the first configuration example of a communication apparatus such as a base station, an access point, a terminal, or a repeater in the present embodiment.

The communication apparatus of FIG. 1A is assumed to include N transmitters of "first transmitter $102\_1$ to N-th transmitter $102\_N$." Note that, N is assumed to bean integer equal to or greater than 1 or 2.

The communication apparatus of FIG. 1A is also assumed to include M transmission panel antennae of "transmission panel antennae 1 labeled $106\_1$ to transmission panel antenna M labeled $106\_M$. Note that, M is assumed to be an integer equal to or greater than one or two.

The communication apparatus of FIG. 1A is assumed to include n receivers of "first receiver $155\_1$ to n-th receiver $155\_n$." Note that, n is assumed to be an integer equal to or greater than 1 or 2.

The communication apparatus of FIG. 1A is assumed to include m reception panel antennae of "reception panel antenna 1 labeled $151\_1$ to reception panel antenna m labeled $151\_m$" for reception. Note that, m is assumed to be an integer equal to or greater than 1 or 2.

The i-th transmitter $102\_i$ receives control signal 100 and i-th data $101\_i$ as input, performs processing such as error correction encoding and mappings based on a modulation system, and outputs i-th modulation signal $103\_i$. Note that, i is assumed to be an integer from 1 to N (both inclusive).

First processor 104 receives i-th modulation signal $103\_i$ (i is an integer from 1 to N (both inclusive)), control signal 100, and reference signal 199 as input and outputs j-th transmission signal $105\_j$ (j is an integer from 1 to M (both inclusive)) based on frame structure information included in control signal 100. Note that, some i-th modulation signals $103\_i$ may not include a signal, and some j-th transmission signals $105\_j$ may not include a signal.

The j-th transmission signal $105\_j$ is then output as a radio wave from transmission panel antenna j labeled $106\_j$. Note that, transmission panel antenna j labeled $106\_j$ may receive control signal 100 as input, perform beamforming, and change transmission directivity. In addition, transmission panel antenna j labeled $106\_j$ may be switched when control signal 100 transmits a modulation signal to a communication counterpart. This point will be described later.

The i-th received signal $152\_i$ is received at reception panel antenna i labeled $151\_i$. Reception panel antenna i labeled $151\_i$ may receive control signal 100 as input, perform beamforming, and change reception directivity. This point will be described later.

Second processor 153 receives i-th received signal $152\_i$ and control signal 100 as input, performs processing such as frequency-conversion, and outputs j-th-signal-processing subjected signal (i.e., signal that has been subjected to the j-th signal processing) $154\_j$. Note that, some received signals $152\_i$ may not include a signal, and some j-th-signal-processing subjected signals $154\_j$ may not include a signal.

The j-th receiver $155\_j$ receives j-th-signal-processing subjected signal $154\_j$ and control signal 100 as input, performs, based on control signal 100, processing such as demodulation and error correction decoding on j-th-signal-processing subjected signal 154, and outputs j-th control data $156\_j$ and j-th data $157\_j$.

Third processor 158 receives j-th control data $156\_j$ as input, generates control signal 100 based on information obtained from the communication counterpart and outputs control signal 100 that has been generated.

Incidentally, first processor 104 of the communication apparatus of FIG. 1A may perform processing for transmission beamforming (transmission directivity control), for example, processing of precoding. Meanwhile, second processor 153 may perform processing for reception directivity control. As another example, for example, first processor 104 may perform processing of modulating, respectively, first transmission signal $105\_1$ into first modulation signal $103\_1$, second transmission signal $105\_2$ into second modulation signal $103\_2$, and third transmission signal $105\_3$ into third modulation signal $103\_3$ and outputting them. Alternatively, first processor 104 may perform processing of modulating first transmission signal $105\_1$ into second modulation signal $103\_2$ and outputting the modulation signal. In addition, second processor 153 may perform processing of modulating, respectively, first-signal-processing subjected signal $154\_1$ into first received signal $152\_1$, second-signal-processing subjected signal $154\_2$ into second received signal $152\_2$, and Third-signal-processing subjected signal $154\_3$ into third received signal $152\_3$ and outputting the received signals. Alternatively, the second processor may perform processing of modulating signal $154\_2$ after the second signal processing into first received signal $152\_1$ and outputting it.

The configuration in FIG. 1A may include a processor not illustrated in FIG. 1A. For example, an interleaver for sorting symbols and/or data, a padder for padding, and the like may be included in the communication apparatus. Moreover, the communication apparatus of FIG. 1A may perform transmission and/or reception corresponding to Multiple Input Multiple Output (MIMO) transmission that transmits a plurality of modulation signals (a plurality of streams), using a plurality of antennae.

Figure 1B:
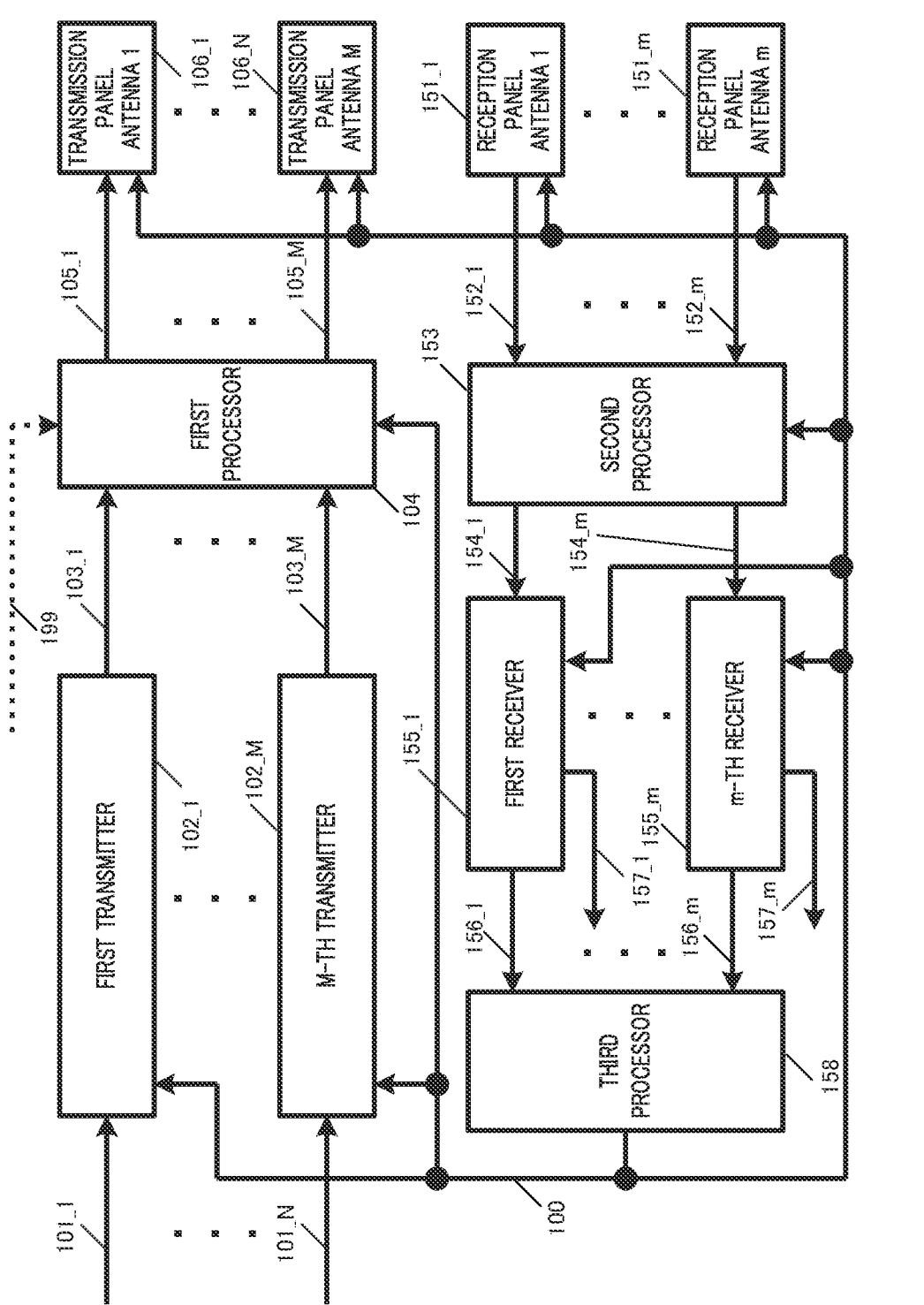
FIG. 1B illustrates the second configuration example of the communication apparatus according to Embodiment 1.

FIG. 1B illustrates another configuration example that is different from that of FIG. 1A of the communication apparatus such as a base station, an access point, a terminal, or a repeater in the present embodiment. In FIG. 1B, the components that operate in the same manner as in FIG. 1A are denoted by the same reference numerals, and detailed descriptions thereof will be omitted.

The configuration in FIG. 1B is characterized in that the number of transmitters and the number of transmission panel antennae are the same. At this time, first processor 104 may perform processing for transmission beamforming (transmission directivity control), for example, processing of precoding. First processor 104 may modulate x-th transmission signal $105\_x$ into y-th modulation signal $103\_y$ and output it. Note that, x is assumed to be an integer from 1 to M (both inclusive), and y is assumed to be an integer from 1 to M (both inclusive).

In addition, it is assumed that the number of receivers and the number of reception panel antennae are the same. At this time, second processor 153 may perform processing for reception directivity control. Second processor 153 may modulate x-th-signal-processing subjected signal $154\_x$ as y-th received signal 152_y and output it. Note that, x is assumed to be an integer from 1 to m (both inclusive), and y is assumed to be an integer from 1 to m (both inclusive).

Figure 1C:
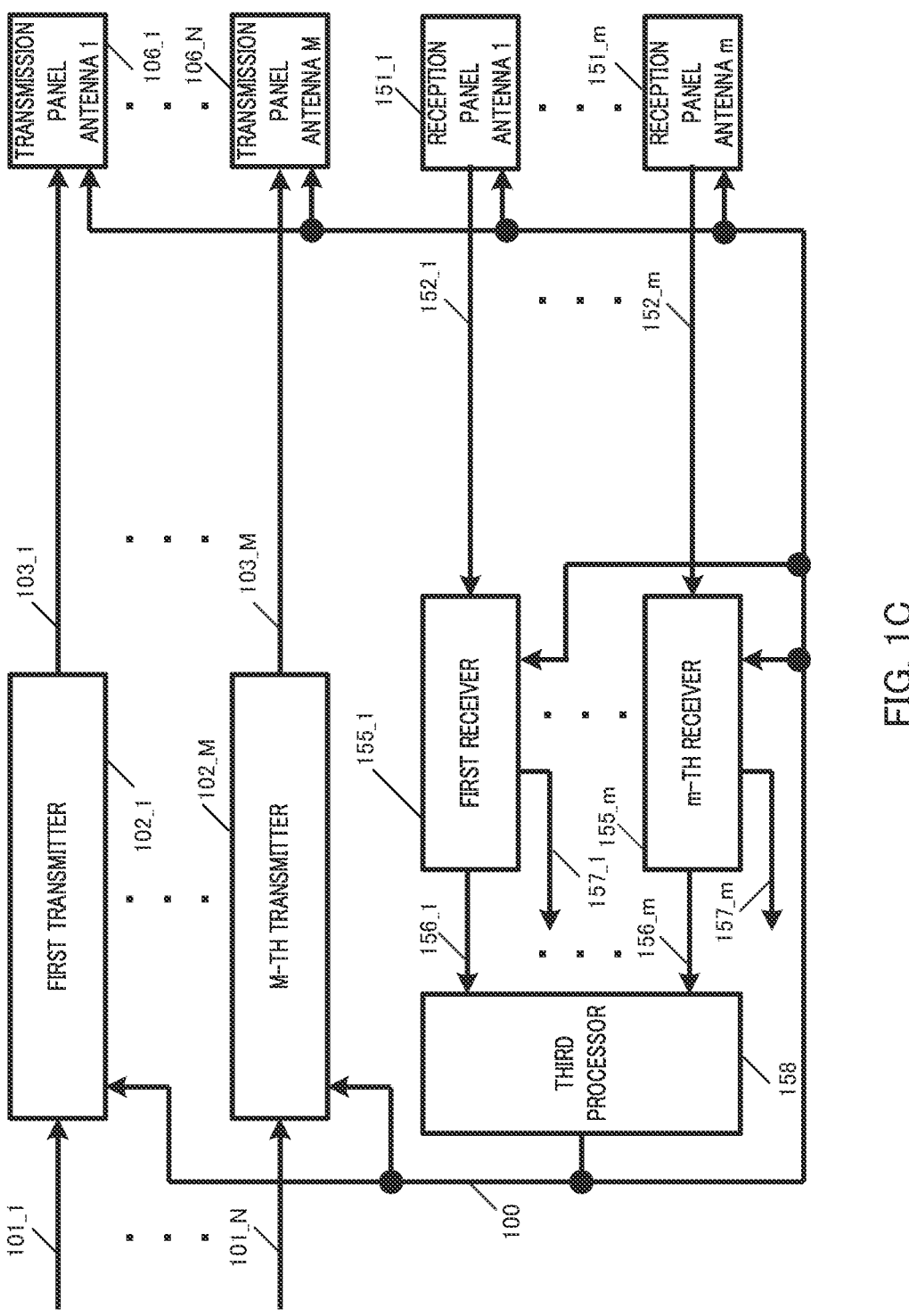
FIG. 1C illustrates the third configuration example of the communication apparatus according to Embodiment 1.

FIG. 1C illustrates yet another configuration example that is different from that of FIG. 1A or 1B of the communication apparatus such as a base station, an access point, a terminal, or a repeater in the present embodiment. In FIG. 1C, the components that operate in the same manner as in FIG. 1A are denoted by the same reference numerals, and detailed descriptions thereof will be thus omitted.

The configuration in FIG. 1C is characterized in that the number of transmitters and the number of transmission panel antennae are the same and the first processor is not present. Moreover, the number of receivers and the number of reception panel antennae are the same, and the second processor is not present.

Figure 2:
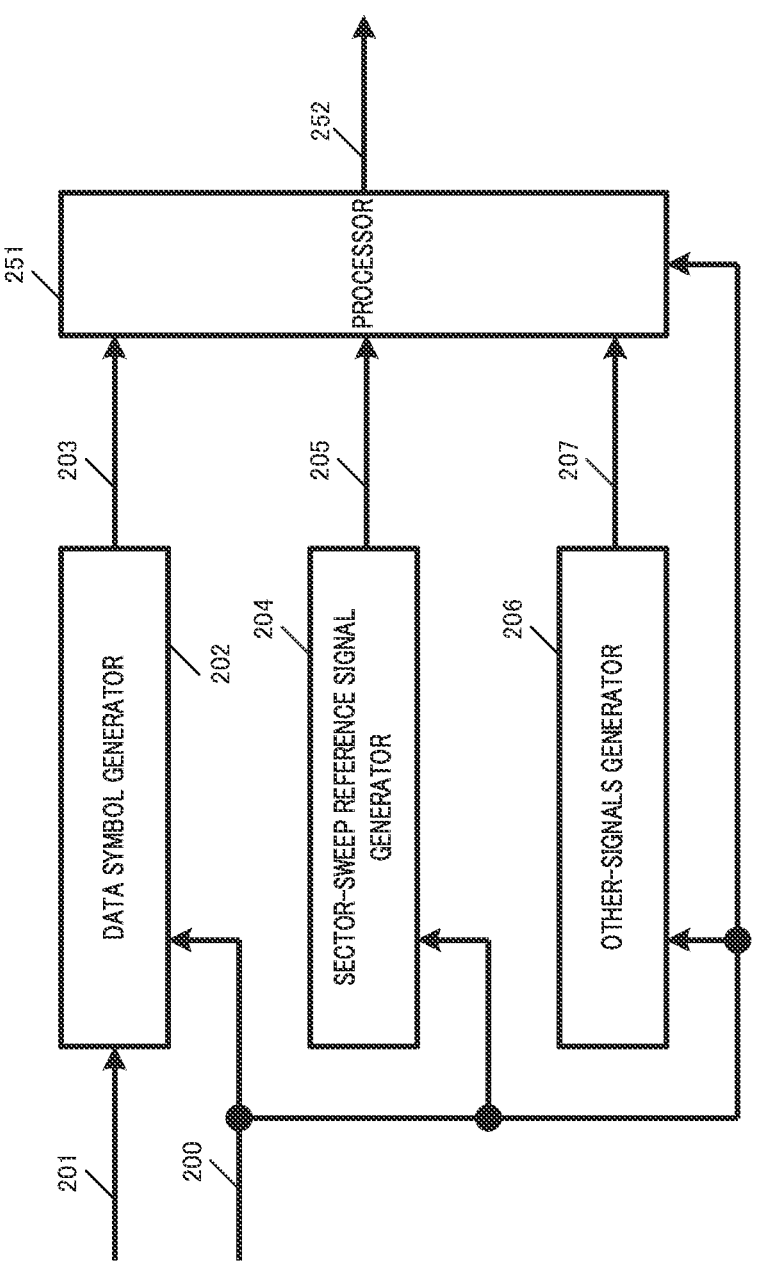
FIG. 2 illustrates a configuration example of the i-th transmitter according to Embodiment 1.

FIG. 2 illustrates a configuration example of i-th transmitter 102_i. Incidentally, i is assumed to be "an integer from 1 to N (both inclusive)" or "an integer from 1 to M (both inclusive)."

Data symbol generator 202 receives data 201 and control signal 200 as input, performs error correction encoding, mapping, signal processing for transmission, and the like on the basis of information on an error correction encoding method, information on a modulation system, information on a transmission method, a frame configuration method, and the like included in control signal 200, and outputs data symbol modulation signal 203. Note that, data 201 corresponds to i-th data 101_i, and control signal 200 corresponds to control signal 100.

Sector-sweep reference signal (reference signal for sector sweep) generator 204 receives control signal 200 as input, generates sector-sweep reference signal 205 based on the frame configuration information included in control signal 200, and outputs it.

Other-signals generator 206 receives control signal 200 as input, generates other-signals 207 based on the control signal, and outputs it.

Processor 251 receives data-symbol modulation signal 203, sector-sweep reference signal 205, other-signals 207, and control signal 200 as input, generates, based on the frame configuration information included in control signal 200, frame-configuration following modulation signal (modulation signal in accordance with frame configuration) 252, and outputs the frame-configuration following modulation signal. Note that, frame-configuration following modulation signal 252 corresponds to i-th modulation signal 103_i.

Figure 3:
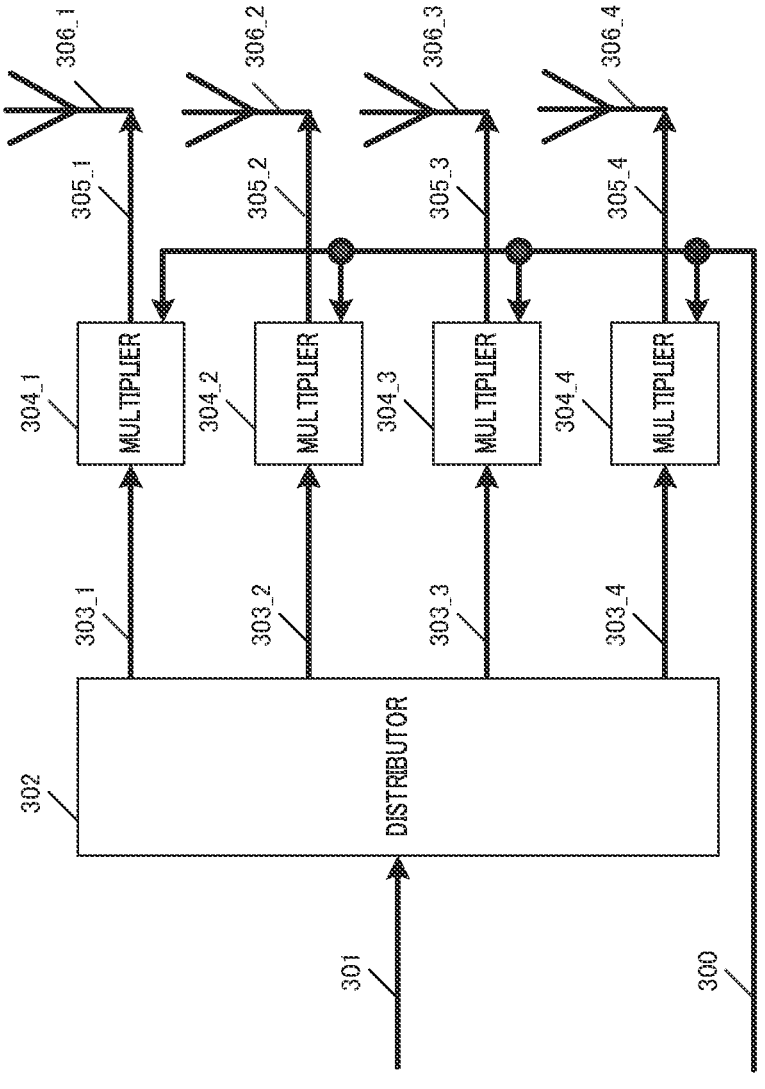
FIG. 3 illustrates a configuration example of transmission panel antenna i according to Embodiment 1.

FIG. 3 illustrates a configuration example of transmission-panel antenna i labeled 106_i in FIGS. 1A, 1B, and 1C. Incidentally, i is assumed to be "an integer from 1 to M (both inclusive)." Distributor 302 receives transmission signal 301 as input, performs distribution, and outputs first transmission signal 303_1, second transmission signal 303_2, third transmission signal 303_3, and fourth transmission signal 303_4. Note that, transmission signal 301 corresponds to "i-th transmission signal 105_i of FIGS. 1A and 1B" or "i-th modulation signal 103_i of FIG. 1C."

Multiplier 304_1 receives first transmission signal 303_1 and control signal 300 as input, multiplies first transmission signal 303_1 by a multiplication coefficient based on control signal 300, generates and outputs coefficient-multiplication subjected first transmission signal (i.e., transmission signal that has been subjected to the coefficient multiplication) 305_1. Coefficient-multiplication subjected first transmission signal 305_1 is output from antenna 306_1 as a radio wave. Note that, control signal 300 corresponds to control signal 100.

A concrete description will be given. First transmission signal 303_1 is assumed to be denoted as tx1(t). Note that, t is assumed to be time. When the multiplication coefficient is w1, coefficient-multiplication subjected first transmission signal 305_1 can be expressed as tx1(t)×w1. Note that, tx1(t) can be expressed as a complex number, and thus, it may be a real number. Similarly, w1 can be expressed as a complex number, and thus, it may be a real number.

Multiplier 304_2 receives second transmission signal 303_2 and control signal 300 as input, multiplies second transmission signal 303_2 by a multiplication coefficient based on control signal 300, generates and outputs coefficient-multiplication subjected second transmission signal 305_2. Coefficient-multiplication subjected second transmission signal 305_2 is output from antenna 306_2 as a radio wave.

A concrete description will be given. Second transmission signal 303_2 is assumed to be denoted as tx2(t). Note that, t is assumed to be time. When the multiplication coefficient is w2, coefficient-multiplication subjected second transmission signal 305_2 can be expressed as tx2(t)×w2. Note that, tx2(t) can be expressed as a complex number, and thus, it may be a real number. Similarly, w2 can be expressed as a complex number, and thus, it may be a real number.

Multiplier 304_3 receives third transmission signal 303_3 and control signal 300 as input, multiplies third transmission signal 303_3 by a multiplication coefficient based on control signal 300, generates and outputs coefficient-multiplication subjected third transmission signal 305_3. Coefficient-multiplication subjected third transmission signal 305_3 is output from antenna 306_3 as a radio wave.

A concrete description will be given. Third transmission signal 303_3 is assumed to be denoted as tx3(t). Note that, t is assumed to be time. When the multiplication coefficient is w3, coefficient-multiplication subjected third transmission signal 305_3 can be expressed as tx3(t)−w3. Note that, tx3(t) can be expressed as a complex number, and thus, it may be a real number. Similarly, w3 can be expressed as a complex number, and thus, it may be a real number.

Multiplier 304_4 receives fourth transmission signal 303_4 and control signal 300 as input, multiplies fourth transmission signal 303_4 by a multiplication coefficient based on control signal 300, generates and outputs coefficient-multiplication subjected fourth transmission signal 305_4. Coefficient-multiplication subjected fourth transmission signal 305_4 is output from antenna 306_4 as a radio wave.

A concrete description will be given. Fourth transmission signal 303_4 is assumed to be denoted as tx4(t). Note that, t is assumed to be time. When the multiplication coefficient is w4, coefficient-multiplication subjected fourth transmission signal 305_4 can be expressed as tx4(t)×w4. Note that, tx4(t) can be expressed as a complex number, and thus, it may be a real number. Similarly, w4 can be expressed as a complex number, and thus, it may be a real number.

Incidentally. "an absolute value of w1, an absolute value of w2, an absolute value of w3, and an absolute value of w4 may be equal to each other." This corresponds to a case where a phase change has been performed. It is needless to say that the absolute value of w1, the absolute value of w2, the absolute value of w3, and the absolute value of w4 may not be equal to each other.

The respective values of w1, w2, w3, and w4 may be switched for each frame, each slot, each mini-slot, each multiple-symbol, or each symbol. The switching timing for each value of w1, w2, w3, and w4 is not limited to the above example.

Further, the transmission panel antenna of FIG. 3 is described with an example composed of four antennae (and four multipliers), but the number of antennae is not limited to 4, it is sufficient to be composed of two or more antennae.

Note that, transmission panel antenna i labeled 106_$i$ in FIGS. 1A, 1B, and 1C may perform directivity control by changing the characteristics of the antenna itself, and at this time, transmission panel antenna i labeled 106_$i$ may be composed of one or more antennae.

Figure 4:
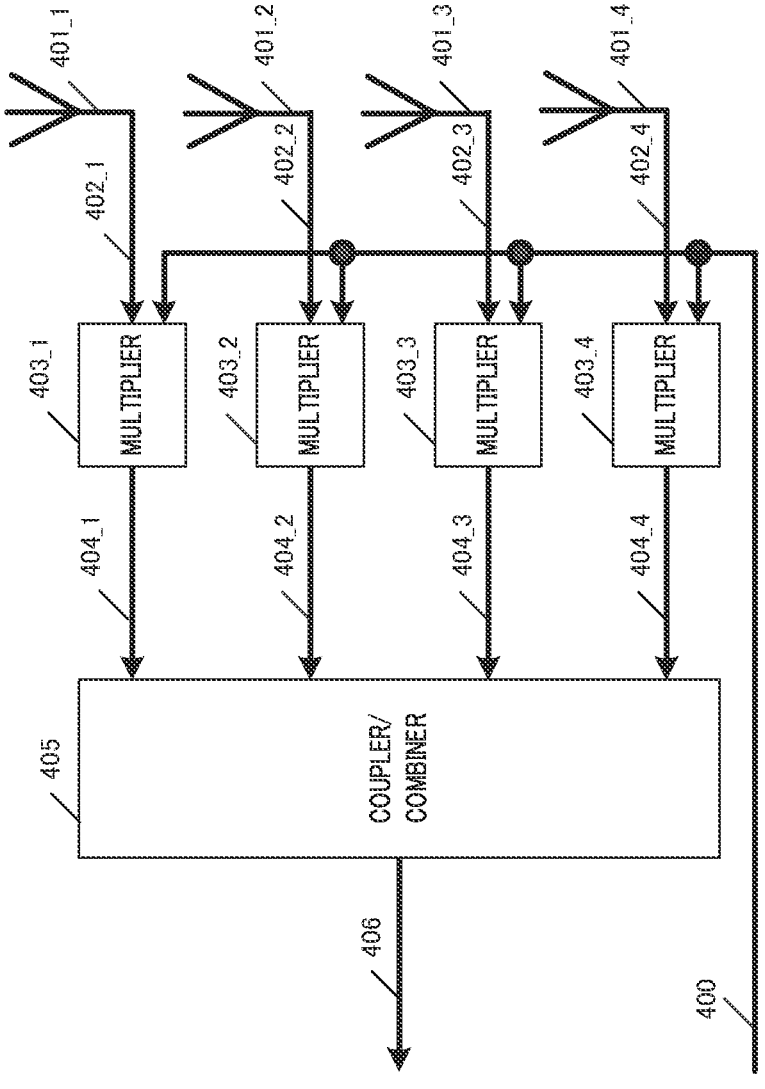
FIG. 4 illustrates a configuration example of reception panel antenna i according to Embodiment 1.

FIG. 4 illustrates a configuration of reception panel antenna i labeled 151_$i$ in FIGS. 1A, 1B, and 1C. Incidentally, i is assumed to be "an integer from 1 to m (both inclusive)."

Multiplier 403_1 receives first received signal 402_1 received by antenna 401_1 and control signal 400 as input, multiplies first received signal 402_1 by a multiplication coefficient based on control signal 400, and outputs coefficient-multiplication subjected first received signal (i.e., received signal that has been subjected to the coefficient multiplication) 404_1.

A concrete description will be given. First received signal 402_1 is assumed to be denoted as rx1(t). Note that, t is assumed to be time. When the multiplication coefficient is d1, coefficient-multiplication subjected first received signal 404_1 can be expressed as rx1(t)×d1. Note that, rx1(t) can be expressed as a complex number, and thus, it may be a real number. Similarly, d1 can be expressed as a complex number, and thus, it may be a real number.

Multiplier 403_2 receives second received signal 402_2 received by antenna 401_2 and control signal 400 as input, multiplies second received signal 402_2 by a multiplication coefficient based on control signal 400, and outputs coefficient-multiplication subjected second received signal 404_2.

A concrete description will be given. Second received signal 402_2 is assumed to be denoted as rx2(t). Note that, t is assumed to be time. When the multiplication coefficient is d2, coefficient-multiplication subjected second received signal 404_2 can be expressed as rx2(t)×d2. Note that, rx2(t) can be expressed as a complex number, and thus, it may be a real number. Similarly, d2 can be expressed as a complex number, and thus, it may be a real number.

Multiplier 403_3 receives third received signal 402_3 received by antenna 401_3 and control signal 400 as input, multiplies third received signal 402_3 by a multiplication coefficient based on control signal 400, and outputs coefficient-multiplication subjected third received signal 404_3.

A concrete description will be given. Third received signal 402_3 is assumed to be denoted as rx3(t). Note that, t is assumed to be time. When the multiplication coefficient is d3, coefficient-multiplication subjected third received signal 404_3 can be expressed as rx3(t)−d3. Note that, rx3(t) can be expressed as a complex number, and thus, it may be a real number. Similarly, d3 can be expressed as a complex number, and thus, it may be a real number.

Multiplier 403_4 receives fourth received signal 402_4 received by antenna 401_4 and control signal 400 as input, multiplies fourth received signal 402_4 by a multiplication coefficient based on control signal 400, and outputs coefficient-multiplication subjected fourth received signal 404_4.

A concrete description will be given. Fourth received signal 402_4 is assumed to be denoted as rx4(t). Note that, t is assumed to be time. When the multiplication coefficient is d4, coefficient-multiplication subjected fourth received signal 404_4 can be expressed as rx4(t)×d4. Note that, rx4(t)

can be expressed as a complex number, and thus, it may be a real number. Similarly, d4 can be expressed as a complex number, and thus, it may be a real number.

Coupler/combiner 405 receives coefficient-multiplication subjected first received signal 404_1, coefficient-multiplication subjected second received signal 404_2, coefficient-multiplication subjected third received signal 404_3, and coefficient-multiplication subjected fourth received signal 404_4 as input, combines coefficient-multiplication subjected first received signal 404_1, coefficient-multiplication subjected second received signal 404_2, coefficient-multiplication subjected third received signal 404_3, and coefficient-multiplication subjected fourth received signal 404_4, and outputs modulation signal 406. Note that, modulation signal 406 is expressed as rx1(t)−d1+rx2(t)×d2+rx3(t)d3+rx4(t)×d4.

Incidentally, control signal 400 corresponds to control signal 100. Modulation signal 406 corresponds to i-th received signal 152_$i$.

Incidentally, an absolute value of d1, an absolute value of d2, an absolute value of d3, and an absolute value of d4 may be equal to each other. This corresponds to a case where a phase change has been performed. It is needless to say that the absolute value of d1, the absolute value of d2, the absolute value of d3, and the absolute value of d4 may not be equal to each other.

The respective values of d1, d2, d3, and d4 may be switched for each frame, each slot, each mini-slot, each multiple-symbol, or each symbol. The switching timing for each value of d1, d2, d3, and d4 is not limited to the above example.

Further, the reception panel antenna of FIG. 4 is described with an example composed of four antennae (and four multipliers), but the number of antennae is not limited to four, it is sufficient to be composed of two or more antennae.

Note that, reception panel antenna i labeled 151_$i$ in FIGS. 1A, 1B, and 1C may perform directivity control by changing the characteristics of the antenna itself, and at this time, reception panel antenna i labeled 151_$i$ may be composed of one or more antennae.

In the present embodiment, communication apparatuses of FIGS. 1A, 1B, and 1C are assumed to correspond to transmission and reception of the single-carrier transmission system.

Figure 5:
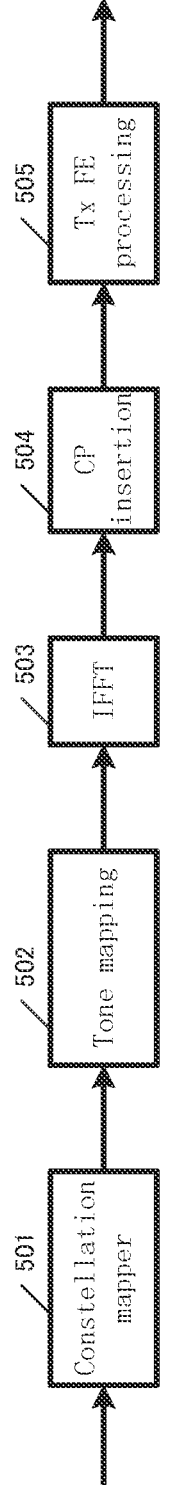
FIG. 5 illustrates a configuration example of a transmission apparatus in a case where a single-carrier system based on Discrete Fourier Transform (DFT) is used according to Embodiment 1.

FIG. 5 illustrates a configuration example of a transmission apparatus in a case where a single-carrier system based on Discrete Fourier Transform (DFT) is used. As illustrated in FIG. 5, the transmission apparatus is composed of Constellation mapper 501, tone mapping 502, Inverse Fast Fourier Transform (IFFT) 503, Cyclic Prefix (CP) insertion 504, Transmitter (Tx) Front End (FE) processing 505. Note that, other processors may be included in the transmission apparatus.

Figure 6:
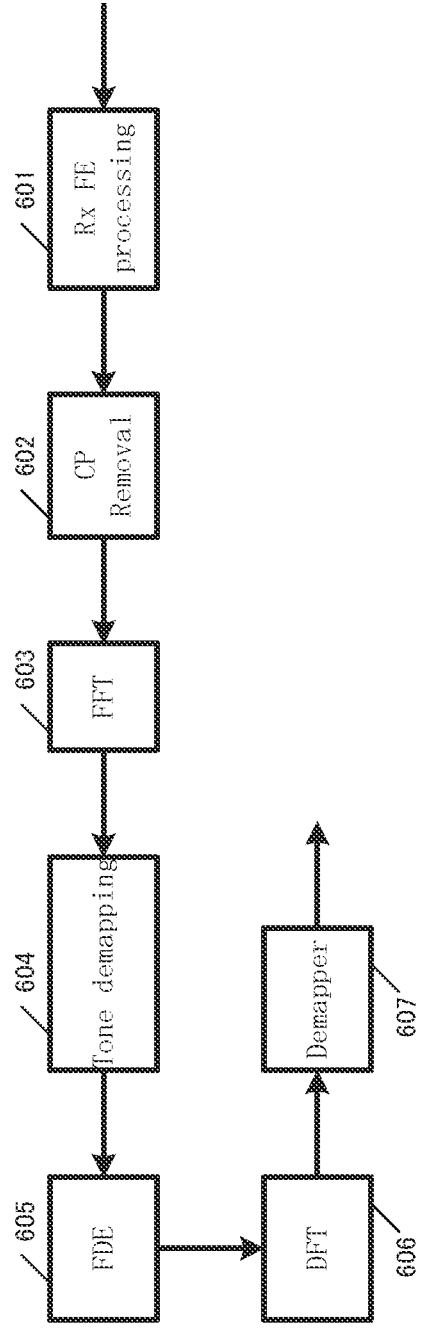
FIG. 6 illustrates a configuration example of a reception apparatus in a case where the single-carrier system based on the DFT is used according to Embodiment 1.

FIG. 6 illustrates a configuration example of a reception apparatus in a case where the single-carrier system based on DFT is used. As illustrated in FIG. 6, the reception apparatus is composed of Receiver (Rx) FE processing 601, CP Removal 602, Fast Fourier Transform (FFT) 603, Tone demapping 604, Frequency Domain Equalization (FDE) 605, DFT 606, and Demapper 607. Note that, other processors may be included in the reception apparatus.

Figure 7:
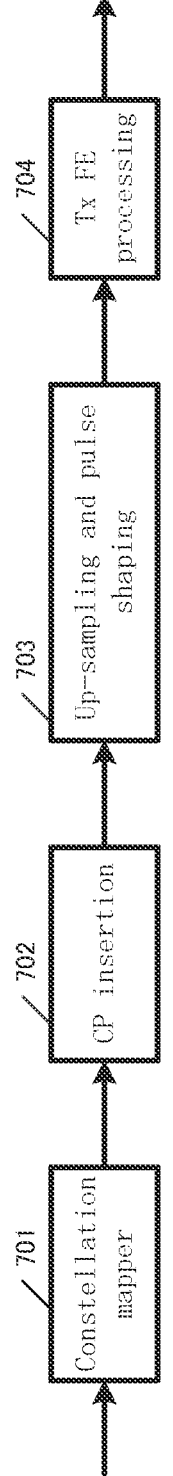
FIG. 7 illustrates a configuration example of the transmission apparatus in a case where a single-carrier system based on time domain is used according to Embodiment 1.

FIG. 7 illustrates a configuration example of a transmission apparatus in a case where a single-carrier system based on time domain is used. As illustrated in FIG. 7, the transmission apparatus is composed of Constellation mapper 701, CP insertion 702, Up-sampling and pulse shaping 703, and Tx FE processing 704. Note that, other processors may be included in the transmission apparatus.

Figure 8:
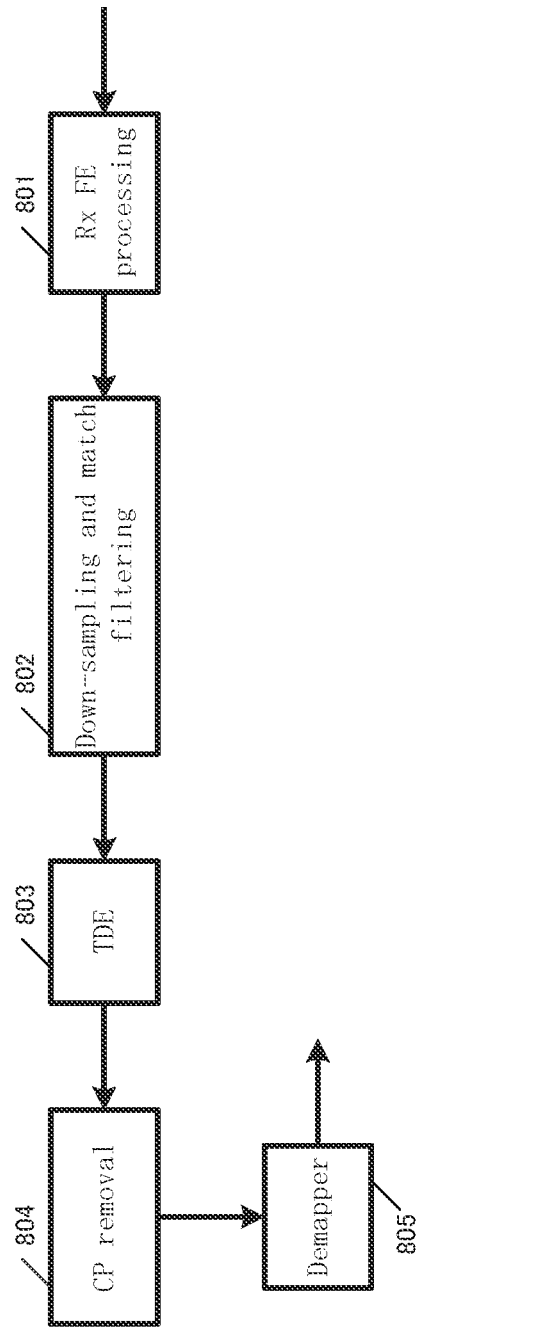
FIG. 8 illustrates a configuration example of a reception apparatus in a case where the single-carrier system based on the time domain is used according to Embodiment.

FIG. 8 illustrates a configuration example of a reception apparatus in a case where the single-carrier system based on the time domain is used. As illustrated in FIG. 8, the reception apparatus is composed of Rx FE processing 801, Down-sampling and match filtering 802, Time Domain Equalization (TDE) 803, CP Removal 804, and Demapper 805. Note that, other processors may be included in the reception apparatus.

In the above, the description has been given of the configuration examples of the transmission method, the reception method, the transmission apparatus, and the reception apparatus which are using the single carrier system, but examples of the transmission method, the reception method, the transmission apparatus, and the reception apparatus of the single carrier system are not limited to these. Examples of the single carrier system include, "Discrete Fourier Transform (DFT)-Spread Orthogonal Frequency Division Multiplexing (OFDM)" (DFT-S OFDM), "Trajectory Constrained DFT-Spread OFDM," "Constrained DFT-Spread OFDM" (Constrained DFT-S OFDM), "OFDM based Single Carrier (SC)," "SC-Frequency Division Multiple Access (FDMA)," "Guard interval DFT-Spread OFDM," time-domain implementation single-carrier system (e.g., SC-QAM), and the like.

Figure 9:
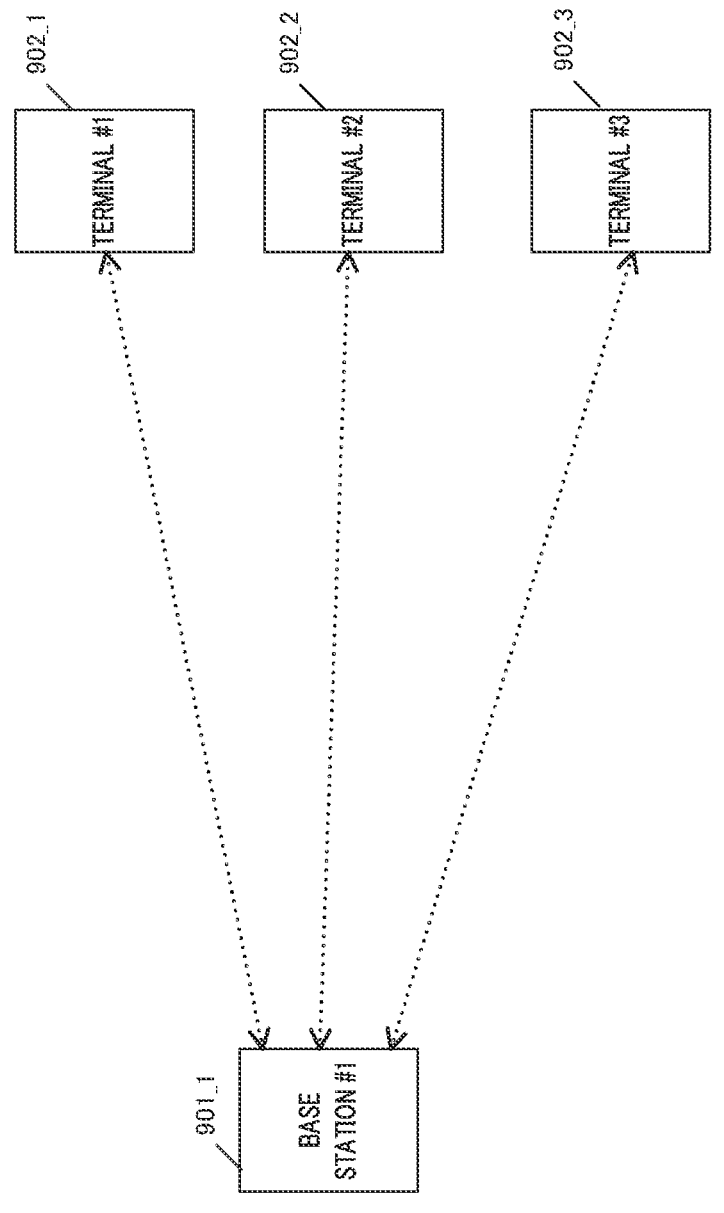
FIG. 9 illustrates an example of a communication state according to Embodiment 1.

FIG. 9 illustrates an example of a communication state in the present embodiment. As illustrated in FIG. 9, a case is assumed where base station #1 labeled 901_1 communicates with terminal #1 labeled 902_1, terminal #2 labeled 902_2 and terminal #3 labeled 902_3. However, a relationship between a base station and a terminal is not limited to this example, and, for example, the base station may communicate with one or more terminals.

In the following, a description will be given, as an example, of a case where the base station and the terminal perform Time Division Duplex (TDD) (time division duplexing), Time Division Multiple Access (TDMA), and Time Division Multiplexing (TDM) (time division multiplex).

FIG. 10 illustrates an example of modulation signal 1000 transmitted by base station #1 labeled 901_1 in FIG. 9. In FIG. 10, a horizontal axis represents time. In the time period from time t0 to time t1, sector-sweep reference signal 1001 is present. Sector-sweep reference signal 1001 will be described later.

The time period from time t1 to time t2 is a terminal response period. The response of the terminal will be described later.

In the time period from time t2 to time t3, feedback signal 1002 is present. Feedback signal 1002 will be described later.

The time period from time t4 to time t5, data-symbol including frame 1003 is present. Data-symbol including frame 1003 will be described later.

Although the reference signal for sector sweep is referred to as "sector-sweep reference signal 1001" in FIG. 10, but it is not limited thereto, and may be referred to as a reference signal, a reference symbol, a training signal, a training symbol, a reference signal, a reference symbol, or the like. The signal denoted by reference numeral 1002 is referred to as "feedback signal 1002," but it is not limited thereto), and may be referred to as a feedback symbol, a signal addressed to a terminal, a symbol addressed to a terminal, a control signal, a control symbol or the like. Further, the frame denoted by reference numeral 1003 is referred to as data-symbol including frame 1003, but it is not limited thereto, and may be referred to as a frame, a slot, a mini-slot, a unit, or the like.

Figure 11:
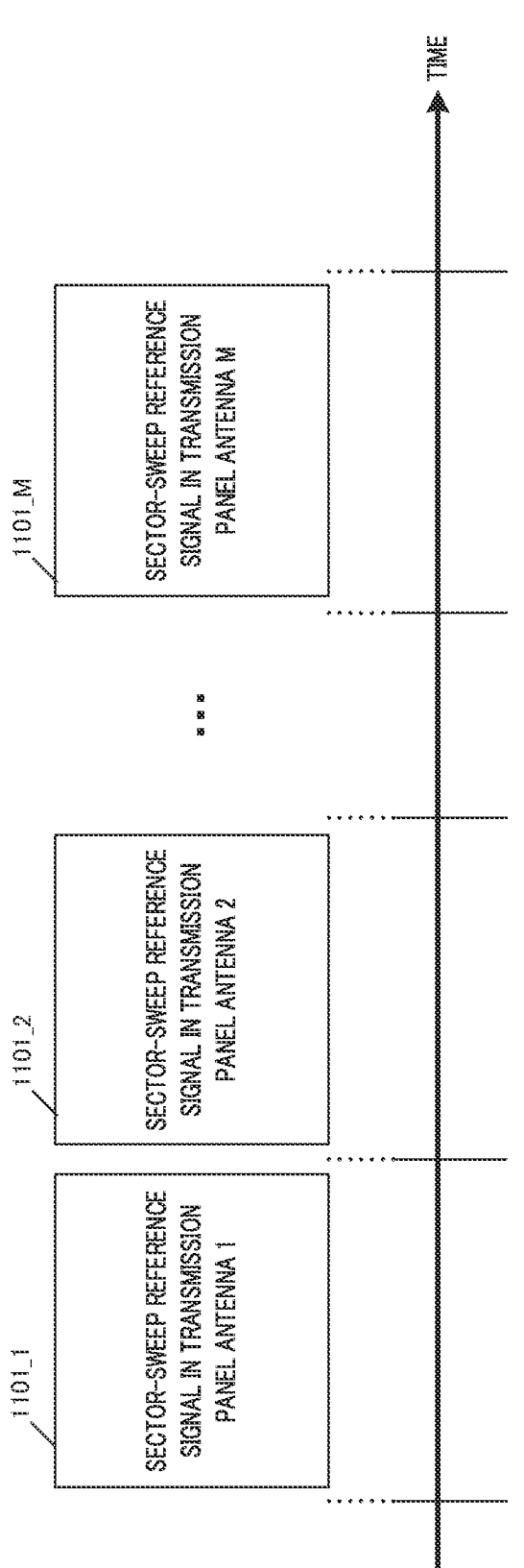
FIG. 11 illustrates an example of a sector-sweep reference signal transmitted by the base station according to Embodiment 1.

FIG. 11 illustrates an example of sector-sweep reference signal 1001 of FIG. 10 transmitted by base station #1 labeled 901_1 of FIG. 9. Incidentally, in FIG. 11, a horizontal axis represents time.

For example, base station #1 labeled 901_1 having the configuration of FIG. 1A, 1B, or 1C transmits, sector-sweep reference signal 1101_1 in transmission panel antenna 1 from transmission panel antenna 1 labeled 106_1.

Thus, as illustrated in FIG. 11, base station #1 labeled 901_1 having the configuration of FIG. 1A, 1B, or 1C transmits, sector-sweep reference signal 1101_*i* in transmission panel antenna i from transmission panel antenna i labeled 106_*i*. Incidentally, i is assumed to be an integer from 1 to M (both inclusive).

Figure 12:
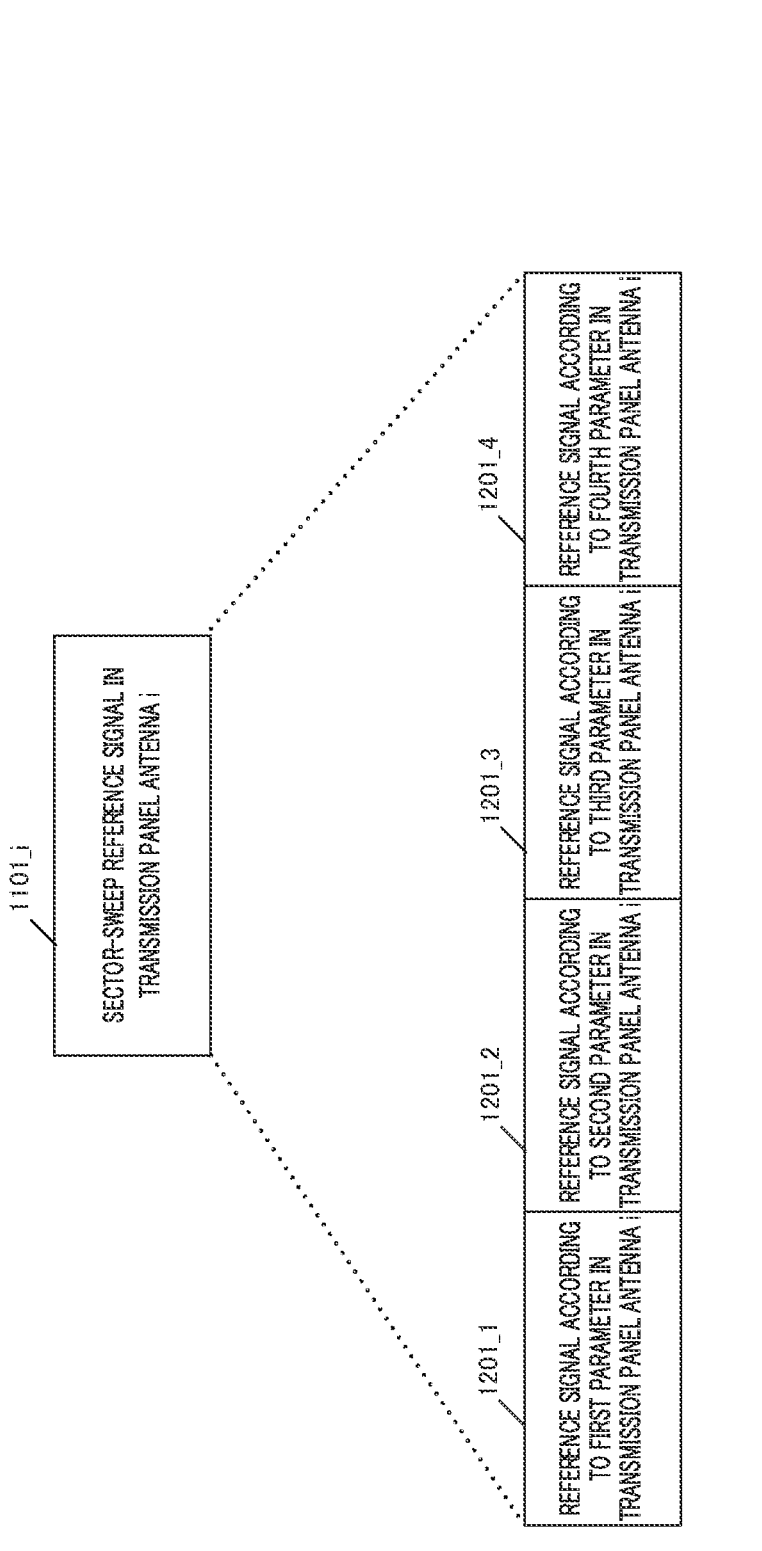
FIG. 12 illustrates a configuration example of a "sector-sweep reference signal in transmission panel antenna i" according to Embodiment 1.

FIG. 12 illustrates a configuration example of "sector-sweep reference signal 1101_*i* in transmission panel antenna i" of FIG. 11. Incidentally, in FIG. 12, a horizontal axis represents time.

For example, it is assumed that base station #1 labeled 901_1 having the configuration of FIG. 1A, 1B, or 1C has the configuration of FIG. 3 as transmission panel antenna i labeled 106_*i*.

"Reference signal 1201_1 according to first parameter in transmission panel antenna i" will be described.

When base station #1 labeled 901_1 transmits "reference signal 1201_1 according to first parameter in transmission panel antenna i" illustrated in FIG. 12, base station #1 labeled 901_1 configures a multiplication coefficient in multiplier 304_1 in transmission panel antenna i labeled 106_*i* to w1(i, 1). Assuming that first transmission signal 303_1 in "reference signal 1201_1 according to first parameter in transmission panel antenna i" is tx1ref1(t), multiplier 304_1 obtains tx1ref1(t)×w1(i, 1). Base station #1 labeled 901_1 then transmits tx1ref1(t)×w1(i, 1) from antenna 306_1 of FIG. 3. Note that, t represents time.

When base station #1 labeled 901_1 transmits "reference signal 1201_1 according to first parameter in transmission panel antenna i" illustrated in FIG. 12, base station #1 labeled 901_1 configures a multiplication coefficient in multiplier 304_2 in transmission panel antenna i labeled 106_*i* to w2(i, 1). Assuming that second transmission signal 303_2 in "reference signal 1201_1 according to first parameter in transmission panel antenna i" is tx2ref1(t), multiplier 304_2 obtains tx2ref1(t)×w2(i, 1). Base station #1 labeled 901_1 then transmits tx2ref1(t)×w2(i, 1) from antenna 306_2 of FIG. 3.

When base station #1 labeled 901_1 transmits "reference signal 1201_1 according to first parameter in transmission panel antenna i" illustrated in FIG. 12, base station #1 labeled 901_1 configures a multiplication coefficient in multiplier 304_3 in transmission panel antenna i labeled 106_*i* to w3(i, 1). Assuming that third transmission signal 303_3 in "reference signal 1201_1 according to first parameter in transmission panel antenna i" is tx3ref1(t), multiplier 304_3 obtains tx3ref1(t)×w3(i, 1). Base station #1 labeled 901_1 then transmits tx3ref1(t)×w3(i, 1) from antenna 306_3 of FIG. 3.

When base station #1 labeled 901_1 transmits "reference signal 1201_1 according to first parameter in transmission panel antenna i" illustrated in FIG. 12, base station #1 labeled 901_1 configures a multiplication coefficient in multiplier 304_4 transmission panel antenna i labeled 106_*i* to w4(i, 1). Assuming that fourth transmission signal 303_4 in "reference signal 1201_1 according to first parameter in transmission panel antenna i" is tx4ref1(t), multiplier 304_4 obtains tx4ref1(t)×w4(i, 1). Base station #1 labeled 901_1 then transmits tx4ref1(t)×w4(i, 1) from antenna 306_4 of FIG. 3.

"Reference signal 1201_j according to j-th parameter in transmission panel antenna i" will be described.

When base station #1 labeled 901_1 transmits "reference signal 1201_j according to j-th parameter in transmission panel antenna i" illustrated in FIG. 12, base station #1 labeled 901_1 configures a multiplication coefficient in multiplier 304_1 in transmission panel antenna i labeled 106_i to w1(i, j). Assuming that first transmission signal 303_1 in "reference signal 1201_j according to j-th parameter in transmission panel antenna i" is tx1refj(t), multiplier 304_1 obtains tx1refj(t)×w1(i, j). Base station #1 labeled 901_1 then transmits tx1refj(t)×w1(i, j) from antenna 306_1 of FIG. 3. Note that, t represents time.

When base station #1 labeled 901_1 transmits "reference signal 1201_j according to j-th parameter in transmission panel antenna i" illustrated in FIG. 12, base station #1 labeled 901_1 configures a multiplication coefficient in multiplier 304_2 in transmission panel antenna i labeled 106_i to w2(i, j). Assuming that second transmission signal 303_2 in "reference signal 1201_j according to j-th parameter in transmission panel antenna i" is tx2refj(t), multiplier 304_2 obtains tx2refj(t)×w2(i, j). Base station #1 labeled 901_1 then transmits tx2refj(t)×w2(i, j) from antenna 306_2 of FIG. 3.

When base station #1 labeled 901_1 transmits "reference signal 1201_j according to j-th parameter in transmission panel antenna i" illustrated in FIG. 12, base station #1 labeled 901_1 configures a multiplication coefficient in multiplier 304_3 in transmission panel antenna i labeled 106_i to w3(i, j). Assuming that third transmission signal 303_3 in "reference signal 1201_j according to j-th parameter in transmission panel antenna i" is tx3refj(t), multiplier 304_3 obtains tx3refj(t)×w3(i, j). Base station #1 labeled 901_1 then transmits tx3refj(t)×w3(i, j) from antenna 306_3 of FIG. 3.

When base station #1 labeled 901_1 transmits "reference signal 1201_j according to j-th parameter in transmission panel antenna i" illustrated in FIG. 12, base station #1 labeled 901_1 configures a multiplication coefficient in multiplier 304_4 in transmission panel antenna i labeled 106_i to w4(i, j). Assuming that fourth transmission signal 303_4 in "reference signal 1201_j according to j-th parameter in transmission panel antenna i" is tx4refj(t), multiplier 304_4 obtains tx4refj(t)×w4(i, j). Base station #1 labeled 901_1 then transmits tx4refj(t)×w4(i, j) from antenna 306_4 of FIG. 3.

In the case of FIG. 12, j is an integer from 1 to 4 (both inclusive). In FIG. 12, the number of parameter changes Z is set to Z=4, but the number of parameter changes Z is not limited to 4, and the same implementation is also possible as long as Z is an integer of 1 or more or an integer of 2 or more. At this time, j is an integer from 1 to Z (both inclusive).

As illustrated in FIGS. 11 and 12, when base station #1 labeled 901_1 transmits "sector-sweep reference signal 1101_i in transmission panel antenna i," it is assumed that "reference signal 1201_j according to j-th parameter in transmission panel antenna i" includes, for example, the following information.

Identification (ID) of the transmission panel antenna (identification number) (here, it corresponds to, for example, i)

Identification number (ID) of the parameter used in beamforming (directivity control) (here, it corresponds to, for example, j)

The number of slots that can transmit the sector-sweep reference signal when the terminal transmits the sector-sweep reference signal (the number of terminals that can transmit the sector-sweep reference signal) (it will be described later).

When base station #1 labeled 901_1 transmits the "identification (ID) (identification number) of the transmission panel antenna" and the "identification number (ID) of the parameter used in beamforming (directivity control), the terminal can know "identification (ID) of the transmission panel antenna (identification number)" and the "identification number (ID) of the parameter used in beamforming (directivity control)" which have been received; thus, base station #1 labeled 901_1 and the terminal can execute appropriate control, and thereby reception quality of data can be improved.

Note that, "the number of slots that can transmit the sector-sweep reference signal when the terminal transmits the sector-sweep reference signal (the number of terminals that can transmit the sector-sweep reference signal)" may be changed for, for example, each frame and/or time. This can achieve an effect of improving data transmission efficiency in the communication system.

Next, a description will be given of an operation from the time period from time t1 to time t2 that is the terminal response period in FIG. 10.

Figure 13:
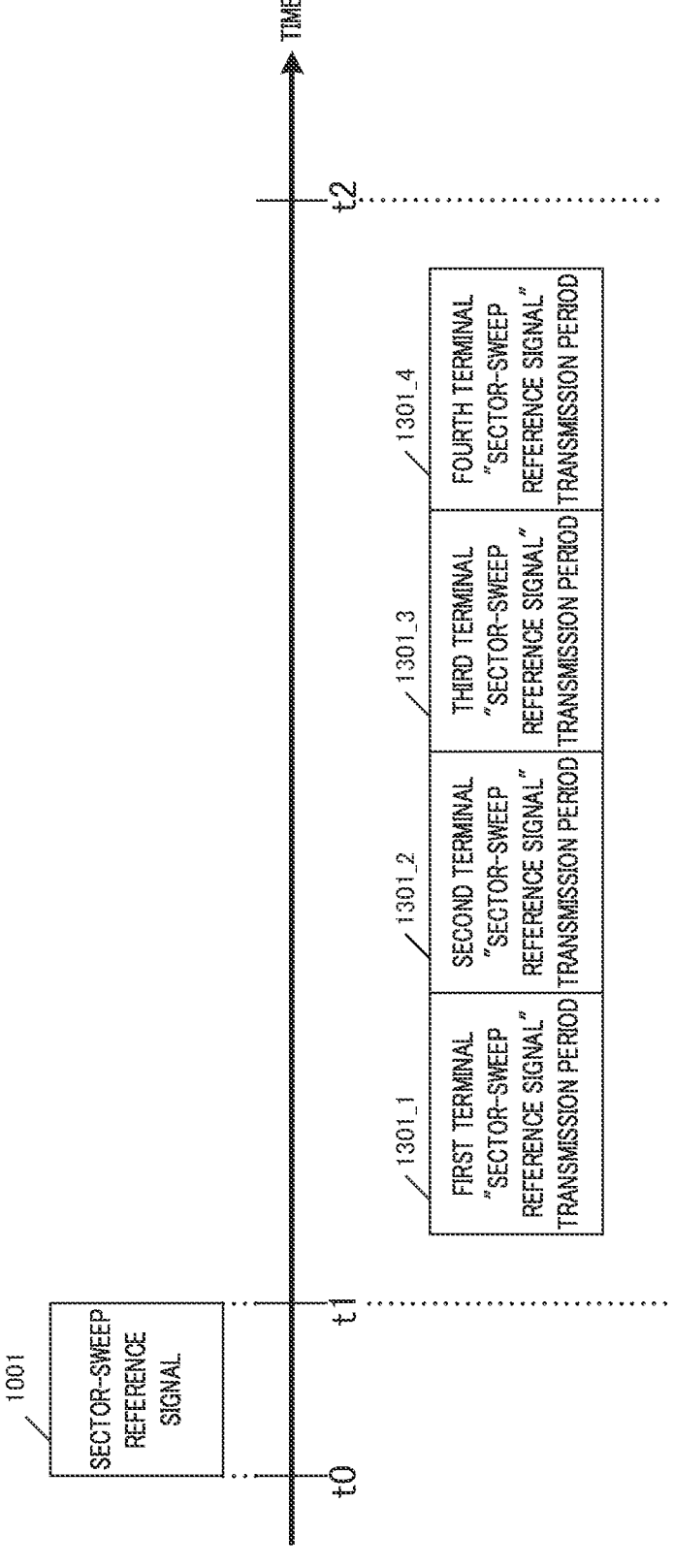
FIG. 13 illustrates an operational example in a terminal response period according to Embodiment 1.

FIG. 13 illustrates an operational example in the time period from time t1 to time t2 that is the terminal response period. Incidentally, in FIG. 13, a horizontal axis represents time.

As illustrated in FIGS. 10 and 13, for example, base station #1 labeled 901_1 is assumed to transmit the sector-sweep reference signal in the time period from time t0 to time t1. Thereafter, as illustrated in FIG. 13, it is assumed that, in the terminal response period that is the time period from time t1 to time t2, first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4 are present.

Thus, in the case of FIG. 13, base station #1 labeled 901_1 configures "the number of slots that can transmit the sector-sweep reference signal when the terminal transmits the sector-sweep reference signal (the number of terminals that can transmit the sector-sweep reference signal)" to 4.

Figure 14:
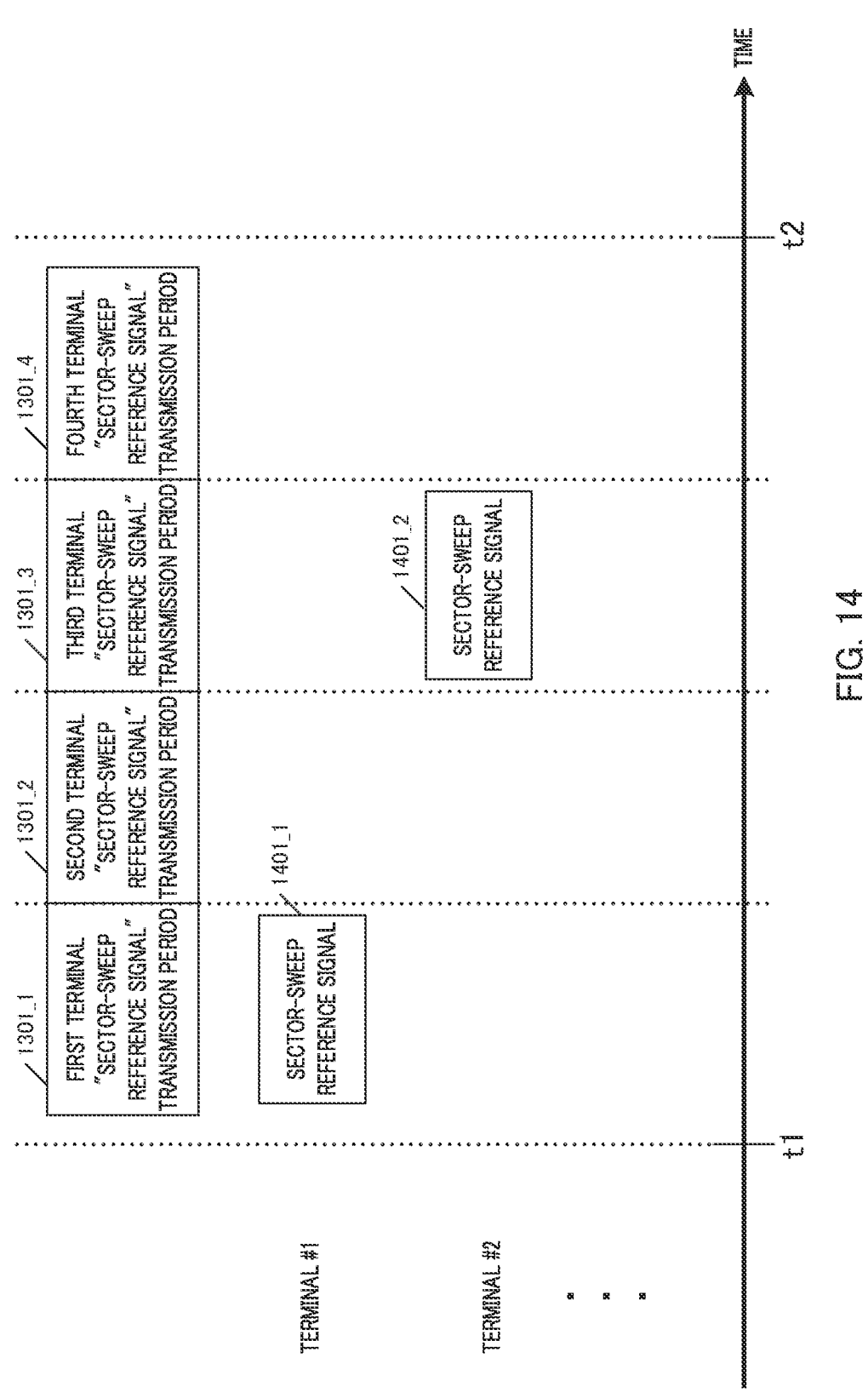
FIG. 14 illustrates the first example related to occupation by terminals for transmission periods for "sector-sweep reference signal" for terminals according to Embodiment 1.

FIG. 14 illustrates an example related to occupation by the terminals for first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4 illustrated in FIG. 13. Note that, in FIG. 14, a horizontal axis represents time.

Terminal #1 labeled 902_1 of FIG. 9 receives sector-sweep reference signal 1001 transmitted by base station #1 labeled 901_1 and estimates the "transmission panel antenna and parameter number" with high reception quality in transmission panel antennae for base station #1 labeled 901_1. This estimation can be performed by obtaining sector-sweep reference signal 1001 and the "identification (ID) of the transmission panel antenna (identification number)" and the "identification number (ID) of the parameter used in beam-forming (directivity control)" which are included the sector-sweep reference signal.

Terminal #1 labeled 902_1 is assumed to estimate, for example, "transmission panel antenna a1 and parameter b1" as the "transmission panel antenna and parameter" with high reception quality.

In addition, while estimating the "transmission panel antenna and parameter" with high reception quality, terminal #1 labeled 902_1, at the same time, obtains information on the "the number of slots that can transmit the sector-sweep reference signal when the terminal transmits the sector-sweep reference signal (the number of terminals that can transmit the sector-sweep reference signal)." In the case of FIG. 14, terminal #1 labeled 902_1 obtains information indicating that "the number of slots that can transmit the sector-sweep reference signal when the terminal transmits the sector-sweep reference signal (the number of terminals that can transmit the sector-sweep reference signal)" is 4.

In this case, terminal #1 labeled 902_1 obtains, using a random number, for example, any one of the values of "0," "1," "2," and "3." For example, it is assumed that terminal #1 labeled 902_1 obtains "0," using the random number. In this case, since "0"+1=1, terminal #1 labeled 902_1 transmits sector-sweep reference signal 1401_1, using first (="0"+1) terminal "sector-sweep reference signal" transmission period 1301_1 of FIG. 14. Here, the transmission period of the sector-sweep reference signal is configured using the random number, but the transmission period of the sector-sweep reference signal may be configured using, instead of the random number, for example, a random number of an integer or a natural number, an irregular integer or natural number, a regular integer or natural number, an integer or a natural number held uniquely by the terminal, or the like. Hence, the configuration of the transmission period of the sector-sweep reference signal is not limited to the above example, and the transmission period of the sector-sweep reference signal is configured for each terminal. This point is also applicable to the following similar description.

It is assumed that sector-sweep reference signal 1401_1 includes information on the "transmission panel antenna and parameter" with high reception quality obtained by terminal #1 labeled 902_1, that is, information on the "transmission panel antenna a1 and parameter b1." This point will be described later.

Similarly, terminal #2 labeled 902_2 of FIG. 9 receives sector-sweep reference signal 1001 transmitted by base station #1 labeled 901_1 and estimates the "transmission panel antenna and parameter number" with high reception quality in transmission panel antennae for base station #1 labeled 901_1. This estimation can be performed by obtaining sector-sweep reference signal 1001 and the "identification (ID) of the transmission panel antenna (identification number)" and the "identification number (ID) of the parameter used in beamforming (directivity control)" which are included the sector-sweep reference signal.

Terminal #2 labeled 902_2 is assumed to estimate, for example, "transmission panel antenna a2 and parameter b2" as the "transmission panel antenna and parameter" with high reception quality.

In addition, while estimating the "transmission panel antenna and parameter" with high reception quality, terminal #2 labeled 902_2, at the same time, obtains information on the "the number of slots that can transmit the sector-sweep reference signal when the terminal transmits the sector-sweep reference signal (the number of terminals that can transmit the sector-sweep reference signal)." In the case of FIG. 14, terminal #2 labeled 902_2 obtains information indicating that "the number of slots that can transmit the sector-sweep reference signal when the terminal transmits the sector-sweep reference signal (the number of terminals that can transmit the sector-sweep reference signal)" is 4.

In this case, terminal #2 labeled 902_2 obtains, using a random number, for example, any one of the values of "0," "1," "2," and "3." For example, it is assumed that terminal #2 labeled 902_2 obtains "2," using the random number. In this case, since "2"+1=3, terminal #2 labeled 902_2 transmits sector-sweep reference signal 1401_2, using third (="2"+1) terminal "sector-sweep reference signal" transmission period 1301_3 of FIG. 14.

It is assumed that sector-sweep reference signal 1401_2 includes information on the "transmission panel antenna and parameter" with high reception quality obtained by terminal #2 labeled 902_2, that is, information on the "transmission panel antenna a2 and parameter b2." This point will be described later.

Accordingly, terminal #i labeled 902_i of FIG. 9 receives sector-sweep reference signal 1001 transmitted by base station #1 labeled 901_1 and estimates the "transmission panel antenna and parameter number" with high reception quality in transmission panel antennae for base station #1 labeled 901_1. This estimation can be performed by obtaining sector-sweep reference signal 1001 and the "identification (ID) of the transmission panel antenna (identification number)" and the "identification number (ID) of the parameter used in beamforming (directivity control)" which are included the sector-sweep reference signal. Note that, i is assumed to be an integer of 1 or more.

Terminal #i labeled 902_i is assumed to estimate, for example, "transmission panel antenna ai and parameter bi" as the "transmission panel antenna and parameter" with high reception quality.

In addition, while estimating the "transmission panel antenna and parameter" with high reception quality, terminal #i labeled 902_i, at the same time, obtains information on the "the number of slots that can transmit the sector-sweep reference signal when the terminal transmits the sector-sweep reference signal (the number of terminals that can transmit the sector-sweep reference signal)." In the case of FIG. 14, terminal #i labeled 902_i obtains information indicating that "the number of slots that can transmit the sector-sweep reference signal when the terminal transmits the sector-sweep reference signal (the number of terminals that can transmit the sector-sweep reference signal)" is 4.

In this case, terminal #i labeled 902_i obtains, using a random number, for example, any one of the values of "0," "1," "2," and "3." For example, it is assumed that terminal #i labeled 902_i obtains "j," using the random number. Note that, "j" is any one of "0" "1," "2," and "3." In this case, terminal #i labeled 902_i transmits sector-sweep reference signal 1401_i, using "sector-sweep reference signal" transmission period 1301_("j"+1) of FIG. 14.

It is assumed that sector-sweep reference signal 1401_1 includes information on the "transmission panel antenna and parameter" with high reception quality obtained by terminal #i labeled 902_i, that is, information on the "transmission panel antenna ai and parameter bi." This point will be described later.

In the manner described above, the following effects can be brought about. A collision of the sector-sweep reference signals transmitted from the respective terminals can be reduced, and the number of sector-sweep reference signals that the base station can receive can be increased, and thereby the number of terminals with which the base station performs communication can be increased.

A description will be given of a configuration of sector-sweep reference signal $1401\_i$ transmitted by terminal #i labeled $902\_i$ described with reference to FIG. 14. For simplicity of description, it is assumed that terminal #i labeled $902\_i$ has the configuration of FIG. 1A, 1B, or 1C. It is also assumed that terminal #i labeled $902\_i$ having the configuration of FIG. 1A, 1B, or 1C has the configuration of FIG. 3 as transmission panel antenna xi labeled $106\_xi$. However, the configuration of terminal #i labeled $902\_i$ is not limited to the configuration of FIG. 1A, 1B, or 1C, and the configuration that terminal #i labeled $902\_i$ having the configuration of FIG. 1A, 1B, or 1C has as transmission panel antenna xi labeled $106\_xi$ is not limited to the configuration of FIG. 3.

FIG. 11 illustrates an example of sector-sweep reference signal $1401\_i$ transmitted by terminal #i labeled $902\_i$. Incidentally, in FIG. 11, the horizontal axis represents time.

For example, terminal #i labeled $902\_i$ having the configuration of FIG. A, 11B, or 1C transmits sector-sweep reference signal $1101\_1$ in transmission panel antenna 1 from transmission panel antenna 1 labeled $106\_1$.

Thus, as illustrated in FIG. 11, terminal #i labeled $902\_i$ having the configuration of FIG. 1A, 1B, or 1C transmits, sector-sweep reference signal $1101\_xi$ in transmission panel antenna xi from transmission panel antenna xi labeled $106\_xi$. Incidentally, xi is assumed to be an integer from 1 to M (both inclusive).

Figure 15:
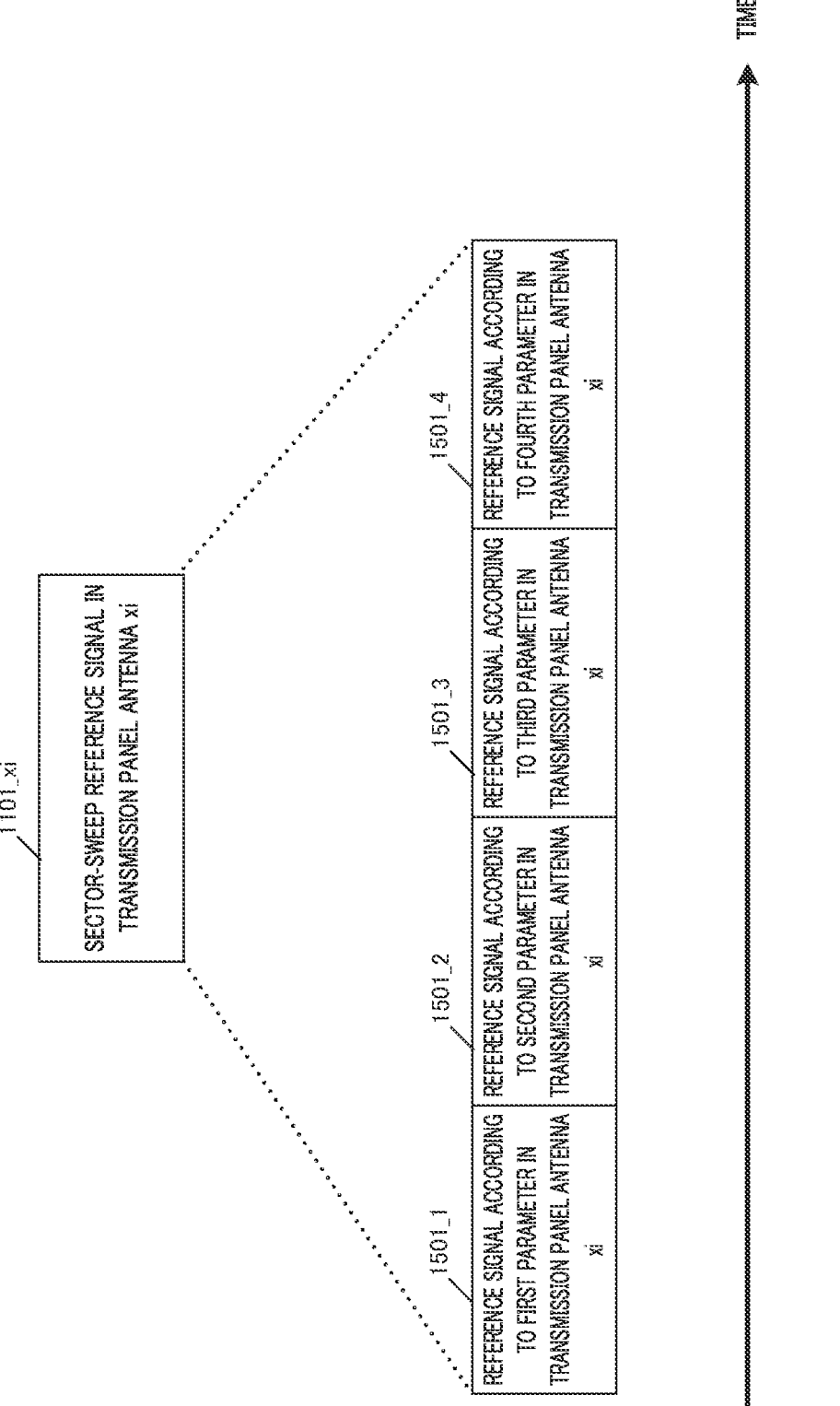
FIG. 15 illustrates a configuration example of a "sector-sweep reference signal in transmission panel antenna xi" according to Embodiment 1.

FIG. 15 illustrates a configuration example of "sector-sweep reference signal $1101\_xi$ in transmission panel antenna xi" of FIG. 11. Incidentally, in FIG. 15, a horizontal axis represents time.

For example, it is assumed that terminal #i labeled $902\_i$ having the configuration of FIG. 1A, 1B, or 1C has the configuration of FIG. 3 as transmission panel antenna xi labeled $106\_xi$.

"Reference signal $1501\_1$ according to first parameter in transmission panel antenna xi" will be described.

When terminal #i labeled $902\_i$ transmits "reference signal $1501\_1$ according to first parameter in transmission panel antenna xi" illustrated in FIG. 15, terminal #i labeled $902\_i$ configures a multiplication coefficient in multiplier $304\_1$ in transmission panel antenna xi labeled $106\_xi$ to w1(xi, 1). Assuming that first transmission signal $303\_1$ in "reference signal $1501\_1$ according to first parameter in transmission panel antenna xi" is tx1ref1(t), multiplier $304\_1$ obtains tx1ref1(t)×w1(xi, 1). Terminal #i labeled $902\_i$ then transmits tx1ref1(t) w1(xi, 1) from antenna $306\_1$ of FIG. 3. Note that, t represents time.

When terminal #i labeled $902\_i$ transmits "reference signal $1501\_1$ according to first parameter in transmission panel antenna xi" illustrated in FIG. 15, terminal #i labeled $902\_i$ configures a multiplication coefficient in multiplier $304\_2$ in transmission panel antenna xi labeled $106\_xi$ to w2(xi, 1). Assuming that second transmission signal $303\_2$ in "reference signal $1501\_1$ according to first parameter in transmission panel antenna xi" is tx2ref1(t), multiplier $304\_2$ obtains tx2ref1(t)−w2(xi, 1). Terminal #i labeled $902\_i$ then transmits tx2ref1(t)×w2(xi, 1) from antenna $306\_2$ of FIG. 3.

When terminal #i labeled $902\_i$ transmits "reference signal $1501\_1$ according to first parameter in transmission panel antenna xi" illustrated in FIG. 15, terminal #i labeled $902\_i$ configures a multiplication coefficient in multiplier $304\_3$ in transmission panel antenna xi labeled $106\_xi$ to w3(xi, 1). Assuming that third transmission signal $303\_3$ in "reference signal $1501\_1$ according to first parameter in transmission panel antenna xi" is tx3ref1(t), multiplier $304\_3$ obtains tx3ref1(t)×w3(xi, 1). Terminal #i labeled $902\_i$ then transmits tx3ref1(t)−w3(xi, 1) from antenna $306\_3$ of FIG. 3.

When terminal #i labeled $902\_i$ transmits "reference signal $1501\_1$ according to first parameter in transmission panel antenna xi" illustrated in FIG. 15, terminal #i labeled $902\_i$ configures a multiplication coefficient in multiplier $304\_4$ in transmission panel antenna xi labeled $106\_xi$ to w4(xi, 1). Assuming that fourth transmission signal $303\_4$ in "reference signal $1501\_1$ according to first parameter in transmission panel antenna xi" is tx4ref1(t), multiplier $304\_4$ obtains tx4ref1(t)−w4(xi, 1). Terminal #i labeled $902\_i$ then transmits tx4ref1(t)×w4(xi, 1) from antenna $306\_4$ of FIG. 3.

341 "Reference signal $1501\_j$ according to j-th parameter in transmission panel antenna xi" will be described.

When terminal #i labeled $902\_i$ transmits "reference signal $1501\_j$ according to j-th parameter in transmission panel antenna xi" illustrated in FIG. 15, terminal #i labeled $902\_i$ configures a multiplication coefficient in multiplier $304\_1$ in transmission panel antenna xi labeled $106\_xi$ to w1(xi, j). Assuming that first transmission signal $303\_1$ in "reference signal $1501\_j$ according to j-th parameter in transmission panel antenna xi" is tx1refj(t), multiplier $304\_1$ obtains tx1refj(t)×w1(xi, j). Terminal #i labeled $902\_i$ then transmits tx1refj(t)×w1(xi, j) from antenna $306\_1$ of FIG. 3. Note that, t represents time.

When terminal #i labeled $902\_i$ transmits "reference signal $1501\_j$ according to j-th parameter in transmission panel antenna xi" illustrated in FIG. 15, terminal #i labeled $902\_i$ configures a multiplication coefficient in multiplier $304\_2$ in transmission panel antenna i labeled $106\_i$ to w2(xi, j). Assuming that second transmission signal $303\_2$ in "reference signal $1501\_j$ according to j-th parameter in transmission panel antenna xi" is tx2refj(t), multiplier $304\_2$ obtains tx2refj(t)−w2(xi, j). Terminal #i labeled $902\_i$ then transmits tx2refj(t)−w2(xi, j) from antenna $306\_2$ of FIG. 3.

When terminal #i labeled $902\_i$ transmits "reference signal $1501\_j$ according to j-th parameter in transmission panel antenna xi" illustrated in FIG. 15, terminal #i labeled $902\_i$ configures a multiplication coefficient in multiplier $304\_3$ in transmission panel antenna i labeled $106\_i$ to w3(xi, j). Assuming that third transmission signal $303\_3$ in "reference signal $1501\_j$ according to j-th parameter in transmission panel antenna xi" is tx3refj(t), multiplier $304\_3$ obtains tx3refj(t)×w3(xi, j). Terminal #i labeled $902\_i$ then transmits tx3refj(t)×w3(xi, j) from antenna $306\_3$ of FIG. 3.

When terminal #i labeled $902\_i$ transmits "reference signal $1501\_j$ according to j-th parameter in transmission panel antenna xi" illustrated in FIG. 15, terminal #i labeled $902\_i$ configures a multiplication coefficient in multiplier $304\_4$ in transmission panel antenna i labeled $106\_i$ to w4(xi, j). Assuming that fourth transmission signal $303\_4$ in "reference signal $1501\_j$ according to j-th parameter in transmission panel antenna xi" is tx4refj(t), multiplier $304\_4$ obtains tx4refj(t)−w4(xi, j). Terminal #i labeled $902\_i$ then transmits tx4refj(t)×w4(xi, j) from antenna $306\_4$ of FIG. 3.

In the case of FIG. 15, j is an integer from 1 to 4 (both inclusive). In FIG. 15, the number of parameter changes Z is set to Z=4, but the number of parameter changes Z is not limited to 4, and the same implementation is also possible as long as Z is an integer of 1 or more or an integer of 2 or more. At this time, j is an integer from 1 to Z (both inclusive).

As illustrated in FIGS. 11 and 15, when terminal #i labeled 902_i transmits "sector-sweep reference signal 1101_xi in transmission panel antenna xi," it is assumed that "reference signal 1501_j according to j-th parameter in transmission panel antenna xi" includes, for example, the following information:

As described above, information on the "transmission panel antenna and parameter" with high reception quality of base station #1 labeled 901_1.

Thus, terminal #i labeled 902_i transmits the "information on the "transmission panel antenna and parameter" with high reception quality of base station #1 labeled 901_1" in "sector-sweep reference signal 1101_1 in transmission panel antenna 1," "sector-sweep reference signal 1101_2 in transmission panel antenna 2," . . . "sector-sweep reference signal 1101_M in transmission panel antenna M" of FIG. 11.

In addition, terminal #i labeled 902_i transmits the "information on the "transmission panel antenna and parameter" with high reception quality of base station #1 labeled 901_1" in "reference signal 1501_1 according to first parameter in transmission panel antenna xi," "reference signal 1501_2 according to the first parameter in transmission panel antenna xi," "reference signal 1501_3 according to the first parameter in transmission panel antenna xi," and "reference signal 1501_4 according to the fourth parameter in transmission panel antenna xi," of FIG. 15 of ""sector-sweep reference signal 1101_1 in transmission panel antenna 1," "sector-sweep reference signal 1101_2 in transmission panel antenna 2," . . . "sector-sweep reference signal 1101_M in transmission panel antenna M" of FIG. 11."

In this case, even when an omni antenna is used, for example, base station #1 labeled 901_1 is more likely to be capable of receiving any of ""sector-sweep reference signal 1101_1 in transmission panel antenna 1," "sector-sweep reference signal 1101_2 in transmission panel antenna 2," . . . "sector-sweep reference signal 1101_M in transmission panel antenna M" of FIG. 11" transmitted by terminal #i labeled 902_i. This is because terminal #i labeled 902_i performs transmission beamforming (directivity control). Thus, an effect can be achieved in which base station #1 labeled 901_1 is more likely to be capable of obtaining the "information on the "transmission panel antenna and parameter" with high reception quality of base station #1 labeled 901_1" transmitted by terminal #i labeled 902_i. As a result, base station #1 labeled 901_1 can transmit a modulation signal to terminal #i labeled 902_i based on the "information on the "transmission panel antenna and parameter" with high reception quality of base station #1 labeled 901_1," and an effect can be achieved in which terminal #i labeled 902_i can receive the modulation signal with high reception quality.

Note that, as illustrated in FIG. 14, in a case where a plurality of terminals has transmitted the sector-sweep reference signal, base station #1 labeled 901_1 can obtain the "information on the "transmission panel antenna and parameter" with high reception quality of base station #1 labeled 901_1" of the plurality of terminals. Thus, base station #1 labeled 901_1 can transmit a modulation signal to the plurality of terminals based on the "information on the "transmission panel antenna and parameter" with high reception quality of base station #1 labeled 901_1" of the plurality of terminals, and an effect can be achieved in which the plurality of terminals can receive the modulation signal with high reception quality.

As illustrated in FIGS. 11 and 15, when terminal #i labeled 902_i transmits "sector-sweep reference signal 1101_xi in transmission panel antenna xi," "reference signal 1501_j according to j-th parameter in transmission panel antenna xi" may include, for example, the following information.

Identification (ID) of the transmission panel antenna (identification number) (here, it corresponds to, for example, i)

Identification number (ID) of the parameter used in beamforming (directivity control) (here, it corresponds to, for example, j)

When terminal #i labeled 902_i transmits the "identification (ID) of the transmission panel antenna (identification number)" and the "identification number (ID) of the parameter used in beamforming (directivity control), base station #1 labeled 901_1 can know "identification (ID) of the transmission panel antenna (identification number)" and the "identification number (ID) of the parameter used in beamforming (directivity control)" which have been received, thus, terminal #i labeled 902_i and base station #1 labeled 901_1 can execute appropriate control, and thereby reception quality of data can be improved.

Figure 16:
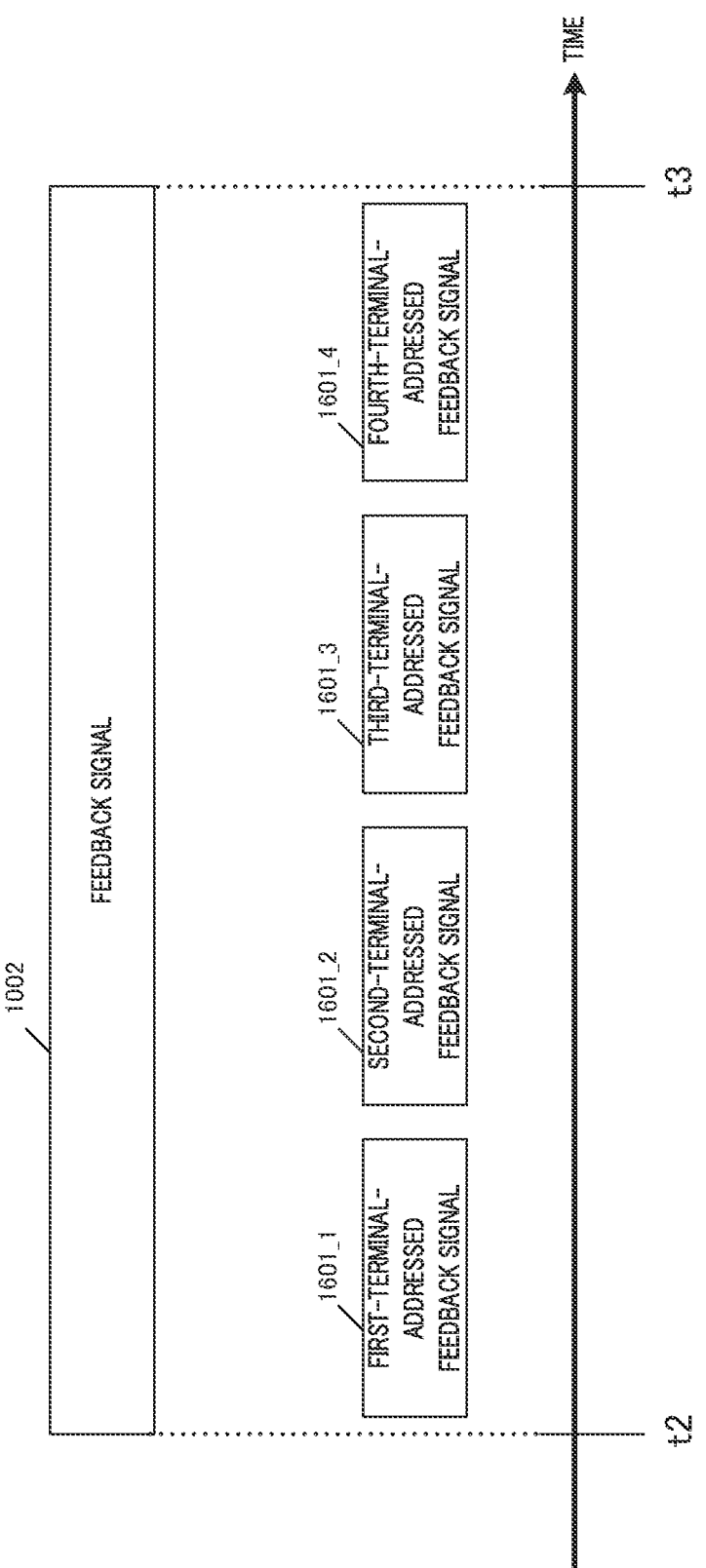
FIG. 16 illustrates a configuration example of a feedback signal present in a time period from t2 to t3 according to Embodiment 1.

FIG. 16 illustrates a configuration example of feedback signal 1002 present in the time period from t2 to t3 in FIG. 10 and transmitted by base station #1 labeled 901_1. Incidentally, in FIG. 16, a horizontal axis represents time. In this example, since "the number of slots that can transmit the sector-sweep reference signal when the terminal transmits the sector-sweep reference signal (the number of terminals that can transmit the sector-sweep reference signal)" is 4, as illustrated in FIG. 16, feedback signal 1002 includes feedback signals addressed to four terminals, such as first-terminal-addressed feedback signal 1601_1, second-terminal-addressed feedback signal 1601_2, third-terminal-addressed feedback signal 1601_3, and fourth-terminal-addressed feedback signal 1601_4. Incidentally, for example, in a case where "the number of slots that can transmit the sector-sweep reference signal when the terminal transmits the sector-sweep reference signal (the number of terminals that can transmit the sector-sweep reference signal)" is $\Omega$, feedback signal 1002 may be configured to include feedback signals addressed to $\Omega$ terminals. Provided that, $\Omega$ is an integer of 1 or more or an integer of 2 or more representing the number of terminals.

For example, as illustrated in FIG. 14, when terminal #1 labeled 902_1 transmits sector-sweep reference signal 1401_1 and terminal #2 labeled 902_2 transmits sector-sweep reference signal 1401_2, base station #1 labeled 901_1 transmits a feedback signal to terminal #1 labeled 902_1, using first-terminal-addressed feedback signal 1601_1 and transmits a feedback signal to terminal #2 labeled 902_2, using third-terminal-addressed feedback signal 1601_3.

At this time, it is assumed that first-terminal-addressed feedback signal 1601_1 includes, for example, information that it can communicate with terminal #1 labeled 902_1 (or that a symbol addressed to terminal #1 labeled 902_1 is included in data-symbol including frame 1003 of FIG. 10).

Moreover, it is assumed that third-terminal-addressed feedback signal 1601_3 includes, for example, information that it can communicate with terminal #2 labeled 902_2 (or, it includes a symbol addressed to terminal #2 labeled 902_2 in data-symbol including frame 1003 of FIG. 10).

Incidentally, base station #1 labeled 901_1 selects the transmission panel antenna, configures a beamforming parameter, and transmits first-terminal-addressed feedback signal 1601_1 based on the "information on the "transmission panel antenna and parameter" with high reception quality of base station #1 labeled 901_1" transmitted by terminal #1 labeled 902_1.

Similarly, base station #2 labeled 901_2 selects the transmission panel antenna, configures a beamforming parameter, and transmits third-terminal-addressed feedback signal 1601_3 based on the "information on the "transmission panel antenna and parameter" with high reception quality of base station #1 labeled 901_1" transmitted by terminal #2 labeled 902_2.

Figure 17:
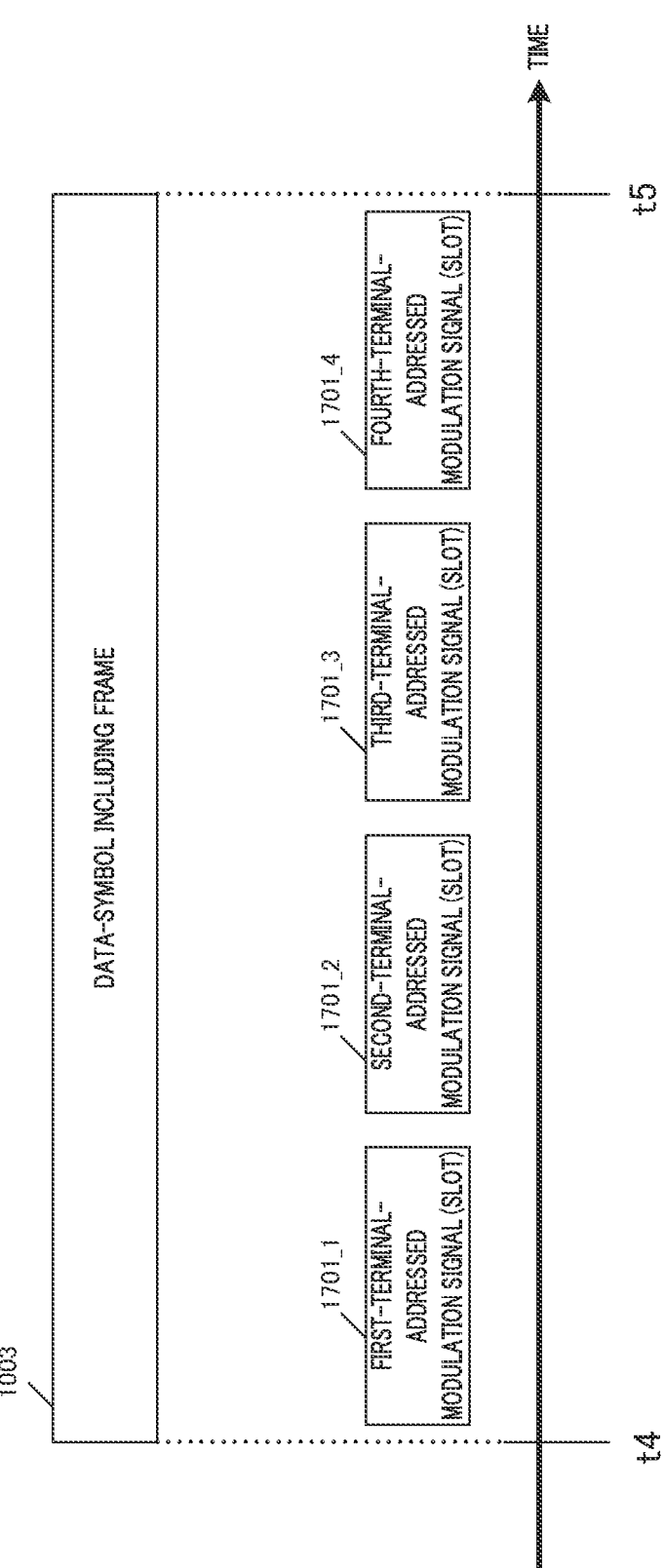
FIG. 17 illustrates a configuration example of a data-symbol including frame present in a time period from t4 to t5 according to Embodiment 1.

FIG. 17 illustrates a configuration example of data-symbol including frame 1003 present in the time period from t4 to t5 in FIG. 10 and transmitted by base station #1 labeled 901_1. Incidentally, in FIG. 17, a horizontal axis represents time. In this example, since "the number of slots that can transmit the sector-sweep reference signal when the terminal transmits the sector-sweep reference signal (the number of terminals that can transmit the sector-sweep reference signal)" is 4, as illustrated in FIG. 17, data-symbol including frame 1003 includes modulation signals (slots) addressed to four terminals, such as first-terminal-addressed modulation signal (first-terminal-addressed slot) 1701_1, second-terminal-addressed modulation signal (second-terminal-addressed slot) 1701_2, third-terminal-addressed modulation signal (third-terminal-addressed slot) 1701_3, and fourth-terminal-addressed modulation signal (fourth-terminal-addressed slot) 1701_4. Incidentally, for example, in a case where "the number of slots that can transmit the sector-sweep reference signal when the terminal transmits the sector-sweep reference signal (the number of terminals that can transmit the sector-sweep reference signal)" is $\Omega$, data-symbol including frame 1003 may be configured to include modulation signals (slots) addressed to $\Omega$ terminals. Provided that, $\Omega$ is an integer of 1 or more or an integer of 2 or more representing the number of terminals.

For example, as illustrated in FIG. 14, when terminal #1 labeled 902_1 transmits sector-sweep reference signal 1401_1 and terminal #2 labeled 902_2 transmits sector-sweep reference signal 1401_2, base station #1 labeled 901_1 transmits a modulation signal (slot) to terminal #1 labeled 902_1, using first-terminal-addressed modulation signal (first-terminal-addressed slot) 1701_1 and transmits a modulation signal (slot) to terminal #2 labeled 902_2, using third-terminal-addressed modulation signal (third-terminal-addressed slot) 1701_3.

At this time, it is assumed that first-terminal-addressed modulation signal (first-terminal-addressed slot) 1701_1 includes, for example, a data symbol (data, information) addressed to terminal #1 labeled 902_1.

Moreover, it is assumed that third-terminal-addressed modulation signal (third-terminal-addressed slot) 1701_3 includes, for example, a data symbol (data, information) addressed to terminal #2 labeled 902_2.

Base station #1 labeled 901_1 selects the transmission panel antenna, configures a beamforming parameter, and transmits first-terminal-addressed modulation signal (first-terminal-addressed slot) 1701_1 based on the "information on the "transmission panel antenna and parameter" with high reception quality of base station #1 labeled 901_1" transmitted by terminal #1 labeled 902_1.

Similarly, base station #2 labeled 901_2 selects the transmission panel antenna, configures a beamforming parameter, and transmits third-terminal-addressed modulation signal (third-terminal-addressed slot) 1701_3 based on the "information on the "transmission panel antenna and parameter" with high reception quality of base station #1 labeled 901_1" transmitted by terminal #2 labeled 902_2.

In FIG. 16, base station #1 labeled 901_1 receives "sector-sweep reference signal 1401_1 transmitted by terminal #1 labeled 902_1" and estimates the "transmission panel antenna and parameter" with high reception quality of terminal #1 labeled 902_1, and first-terminal-addressed feedback signal 1601_1 may include "the estimated information."

Thus, terminal #1 labeled 902_1 selects the transmission panel antenna based on the information on the "transmission panel antenna and parameter" of terminal #1 labeled 902_1 with high reception quality obtained from base station #1 labeled 901_1, determines the beamforming method, and transmits the symbol, the frame, and/or the modulation signal to base station #1 labeled 901_1, and thereby reception quality of data can be improved in base station #1 labeled 901_1.

In FIG. 16, base station #1 labeled 901_1 receives "sector-sweep reference signal 1401_2 transmitted by terminal #2 labeled 902_2" and estimates the "transmission panel antenna and parameter" with high reception quality of terminal #2 labeled 902_2, and third-terminal-addressed feedback signal 1601_3 may include "this information."

Thus, terminal #2 labeled 902_2 selects the transmission panel antenna based on the information on the "transmission panel antenna and parameter" of terminal #2 labeled 902_2 with high reception quality obtained from base station #2 labeled 901_1, determines the beamforming method, and transmits the symbol, the frame, and/or the modulation signal to base station #1 labeled 901_1, and thereby reception quality of data can be improved in base station #1 labeled 901_1.

Further, in the time period from t3 to t4, in the terminal, that is, in the above description, terminal #1 labeled 902_1 and terminal #2 labeled 902_2 may transmit, to base station #1 labeled 901_1, a modulation signal including information such as acknowledgement (ACK) indicating that the signal of base station #1 labeled 901_1 is received.

Note that, first-terminal-addressed modulation signal (first-terminal-addressed slot) 1701_1 in FIG. 17 may include, for example, a "reference signal such as demodulation reference signal (DMRS), phase tracking reference signal (PTRS), or sounding reference signal (SRS)," a pilot symbol, a pilot signal, a preamble, a symbol including control information, and the like in addition to the data symbol. Incidentally, examples of the symbol including the control information may include information on a terminal serving as a destination (ID for identifying the terminal), a transmission method of the modulation signal, information on the modulation system, information on an error correction encoding scheme (e.g., code length, coding rate), information on Modulation and Coding Scheme (MCS), and the like.

Similarly, second-terminal-addressed modulation signal (second-terminal-addressed slot) 1701_2, third-terminal-addressed modulation signal (third-terminal-addressed slot) 1701_3, and fourth-terminal-addressed modulation signal (fourth-terminal-addressed slot) 1701_4 may include, for example, a "reference signal such as DMRS, PTRS, or SRS," a pilot symbol, a pilot signal, a preamble, a symbol including control information, and the like in addition to the data symbol. Incidentally, examples of the symbol including the control information may include information on a terminal serving as a destination (ID for identifying the terminal), a transmission method of the modulation signal, information on the modulation system, information on an error correction encoding scheme (e.g., code length, coding rate), information on MCS, and the like.

Figure 18:
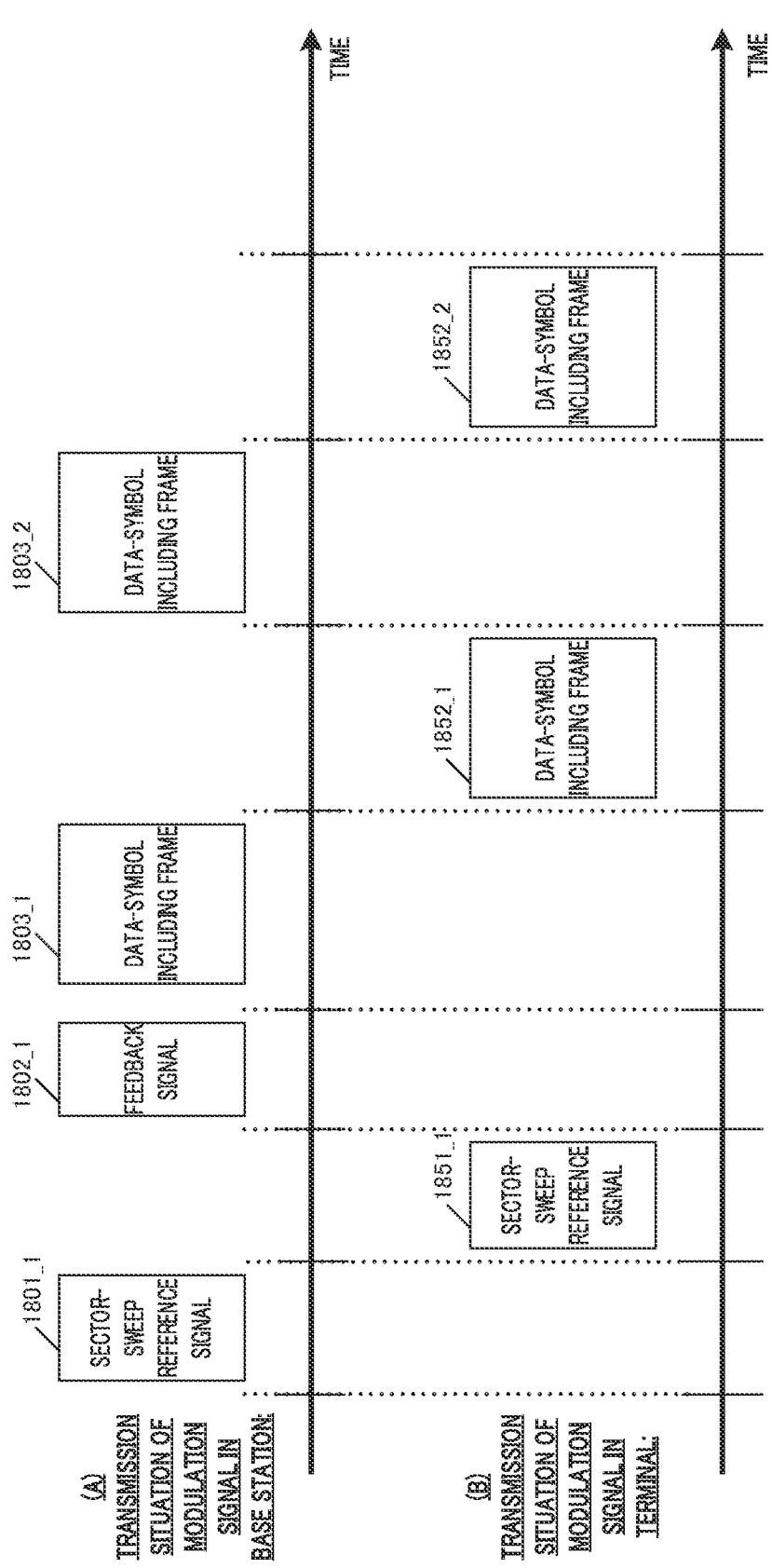
FIG. 18 illustrates an example of a situation where the base station and the terminal communicate with each other according to Embodiment 1.

FIG. 18 illustrates an example of a situation where base station #1 labeled 901_1 and "terminal #1 labeled 902_1, terminal #2 labeled 902_2, and terminal #3 labeled 902_3" communicate with each other as illustrated in FIG. 9. FIG. 18 illustrates in (A) an example of a transmission situation of the modulation signal of base station #1 labeled 901_1, and FIG. 18 illustrates in (B) an example of a transmission situation of the modulation signal of "terminal #1 labeled 902_1, terminal #2 labeled 902_2, and terminal #3 labeled 902_3." Incidentally, in FIG. 18, horizontal axes represent time in (A) and (B).

First, base station #1 labeled 901_1 transmits sector-sweep reference signal 1801_1. Note that, this point has already been described with reference to FIG. 10, and a description thereof will be thus omitted.

Then, terminals such as "terminal #1 labeled 902_1, terminal #2 labeled 902_2, and terminal #3 labeled 902_3" transmit sector-sweep reference signal 1851_1. Note that, this point has already been described with reference to, for example, FIGS. 13 and 14, and a description thereof will be thus omitted.

Base station #1 labeled 901_1 transmits feedback signal 1802_1. Note that, this point has already been described with reference to FIG. 16, and a description thereof will be thus omitted.

Then, base station #1 labeled 901_1 transmits "data-symbol including frame 1803_1." Note that, this point has already been described with reference to FIG. 17, and a description thereof will be thus omitted (Thus, "data-symbol including frame 1803_1" is considered to be a frame for downlink, for example).

The terminals such as "terminal #1 labeled 902_1, terminal #2 labeled 902_2, and terminal #3 labeled 902_3" transmit "data-symbol including frame 1852_1." Note that, a configuration of the frame will be described later with reference to FIG. 20 (Thus, "data-symbol including frame 1852_1" is considered to be a frame for uplink, for example).

Next, base station #1 labeled 901_1 transmits "data-symbol including frame 1803_2." A configuration method of "data-symbol including frame 1803_2" is as described with reference to FIG. 17.

The terminals such as "terminal #1 labeled 902_1, terminal #2 labeled 902_2, and terminal #3 labeled 902_3" transmit "data-symbol including frame 1852_2." Note that, a configuration of the frame will be described later with reference to FIG. 20.

Figure 19:
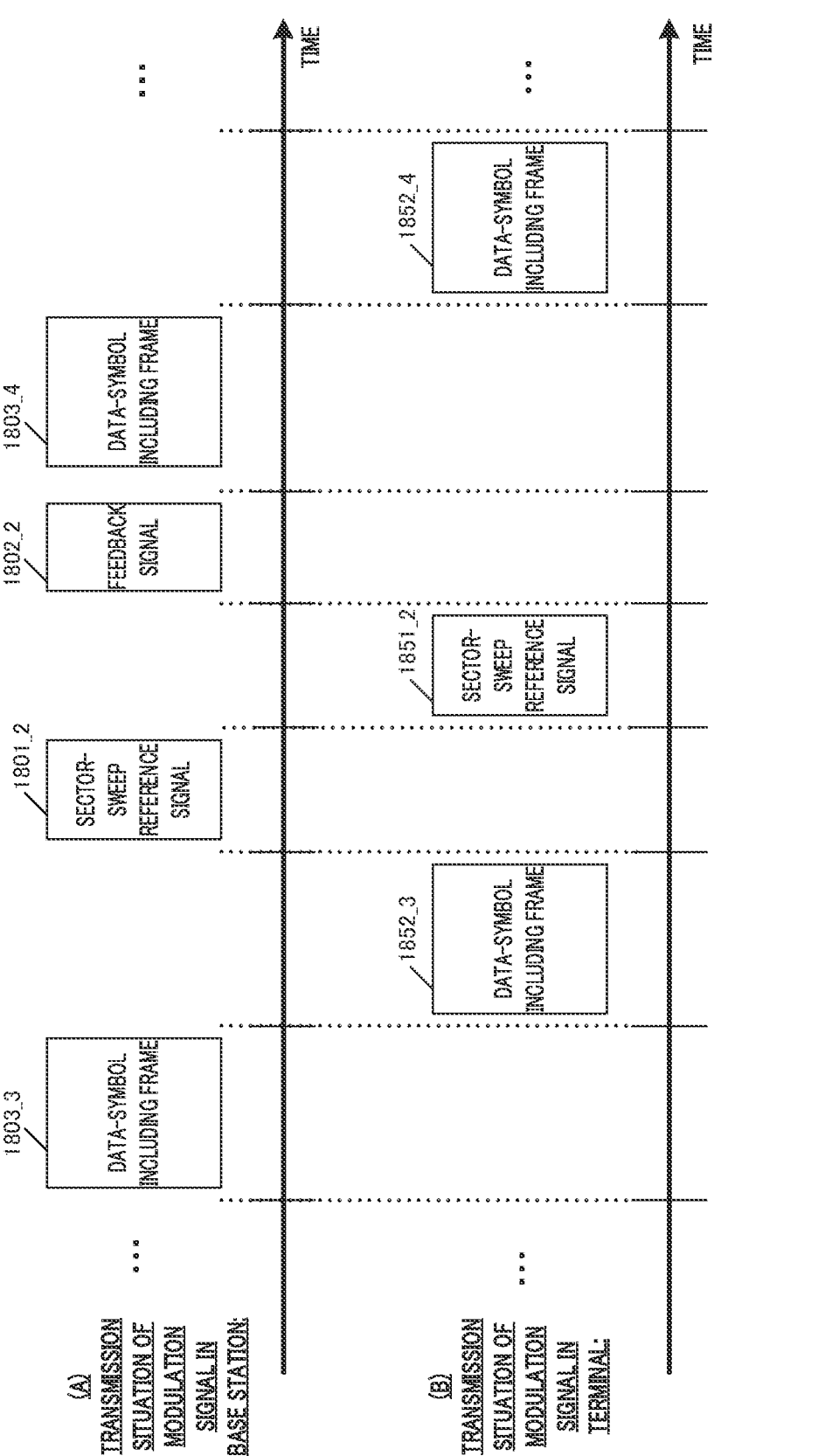
FIG. 19 an example of a situation where the base station and the terminal communicate with each other according to Embodiment 1 after FIG. 18.

FIG. 19 illustrates an example of a transmission situation of the modulation signal of base station #1 labeled 901_1 and a transmission situation of the modulation signal of the terminals such as "terminal #1 labeled 902_1, terminal #2 labeled 902_2, and terminal #3 labeled 902_3" after FIG. 18.

FIG. 19 illustrates in (A) an example of the transmission situation of the modulation signal in base station #1 labeled 901_1, and illustrates a temporal continuation of the transmission situation of the modulation signal in base station #1 labeled 901_1 in (A) of FIG. 18.

FIG. 19 illustrates in (B) an example of the transmission situation of the modulation signal of "terminal #1 labeled 902_1, terminal #2 labeled 902_2, and terminal #3 labeled 902_3," and is a temporal continuation of the transmission situation of the modulation signal of "terminal #1 labeled 902_1, terminal #2 labeled 902_2, and terminal #3 labeled 902_3" in (B) of FIG. 18.

Incidentally, in FIG. 19, horizontal axes represent time in (A) and (B).

After FIG. 18 in (A) and (B), base station #1 labeled 901_1 transmits "data-symbol including frame 1803_3." A configuration method of "data-symbol including frame 1803_2" is as described with reference to FIG. 17.

The terminals such as "terminal #1 labeled 902_1, terminal #2 labeled 902_2, and terminal #3 labeled 902_3" transmit "data-symbol including frame 1852_3." Note that, a configuration of the frame will be described later with reference to FIG. 20.

Next, base station #1 labeled 901_1 transmits sector-sweep reference signal 1801_2. Note that, this point has already been described with reference to FIG. 10, and a description thereof will be thus omitted.

Then, terminals such as "terminal #1 labeled 902_1, terminal #2 labeled 902_2, and terminal #3 labeled 902_3" transmit sector-sweep reference signal 1851_2. Note that, this point has already been described with reference to, for example, FIGS. 13 and 14, and a description thereof will be thus omitted.

Base station #1 labeled 901_1 transmits feedback signal 1802_2. Note that, this point has already been described with reference to FIG. 16, and a description thereof will be thus omitted.

Then, base station #1 labeled 901_1 transmits "data-symbol including frame 1803_4." Note that, this point has already been described with reference to FIG. 17, and a description thereof will be thus omitted.

The terminals such as "terminal #1 labeled 902_1, terminal #2 labeled 902_2, and terminal #3 labeled 902_3" transmit "data-symbol including frame 1852_4." Note that, a configuration of the frame will be described later with reference to FIG. 20.

In the manner described above, base station #1 labeled 901_1 and the terminals transmit the sector-sweep reference signal before the "transmission of the "data-symbol including frame" by base station #1 labeled 901_1 and/or the transmission of the "data-symbol including frame" by terminals such as "terminal #1 labeled 902_1, terminal #2 labeled 902_2, and terminal #3 labeled 902_3,"" and again transmit the sector-sweep reference signal after the "transmission of the "data-symbol including frame" by base station #1 labeled 901_1 and/or the transmission of the "data-symbol including frame" by terminals such as "terminal #1 labeled 902_1, terminal #2 labeled 902_2, and terminal #3 labeled 902_3."" Base station #1 labeled 901_1 and the terminals thus perform selection of the transmission panel antenna to be used, perform configuration of transmission beamforming, and thereby can achieve the effect of obtaining high data reception quality.

Next, with reference to FIG. 20, a description will be given of a configuration example of "data-symbol including frame 1852_i" transmitted by the terminals such as "terminal #1 labeled 902_1, terminal #2 labeled 902_2, and terminal #3 labeled 902_3." Incidentally, for example, i is an integer of 1 or more, and in FIG. 20, a horizontal axis represents time.

Figure 20:
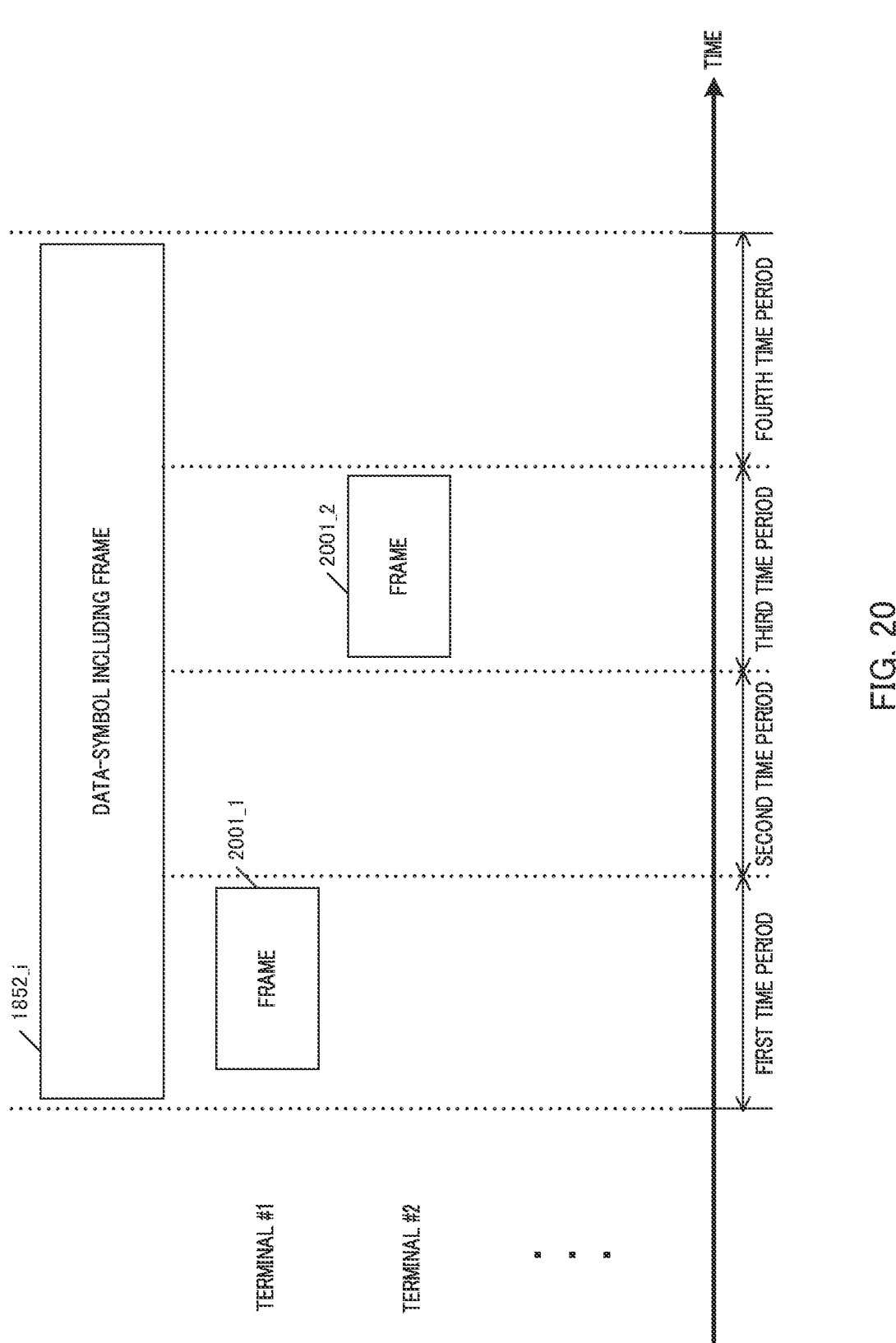
FIG. 20 illustrates a configuration example of a "data-symbol including frame" transmitted by the terminal according to Embodiment 1.

As illustrated in FIG. 20, "data-symbol including frame 1852_i" is assumed to be composed of the first time period, the second time period, the third time period, and the fourth time period.

For example, terminal #1 labeled 902_1 transmits (data-symbol including) frame 2001_1, using the first time period. Terminal #2 labeled 902_2 transmits (data-symbol including) frame 2001_2, using the third time period.

As described above, "data-symbol including frame 1852_i" transmitted by the terminals such as "terminal #1 labeled 902_1, terminal #2 labeled 902_2, and terminal #3 labeled 902_3" performs, for example, time division; each terminal transmits a frame; and base station #1 labeled 901_1 receives the frame transmitted by the terminal; thus, interference can be suppressed, and high data reception quality can be obtained.

Note that, frame 2001_1 of FIG. 20 may include, for example, a "reference signal such as DMRS, PTRS, or SRS," a pilot symbol, a pilot signal, a preamble, a symbol including control information, and the like in addition to the data symbol.

Similarly, frames present in the first time period, second time period, third time period, and fourth time period, such as frame 2001_1 and frame 2001_2, may include, for example, a "reference signal such as DMRS, PTRS, or SRS," a pilot symbol, a pilot signal, a preamble, a symbol including control information, and the like in addition to the data symbol.

Although in FIG. 20 a description has been given with a case in which the frame transmitted by the terminal is time-divided, the frame transmitted by the terminal may be frequency-divided and/or may be spatial-divided using Multi User-Multiple-Input Multiple-Output (MU-MIMO).

Although FIG. 14 has illustrated the example related to occupation by the terminals for "first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4" illustrated in FIG. 13, a description will be given with FIG. 21, of an example which is different from that of FIG. 14, and which relates to occupation by the terminals for "first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4" illustrated in FIG. 13.

Figure 21:
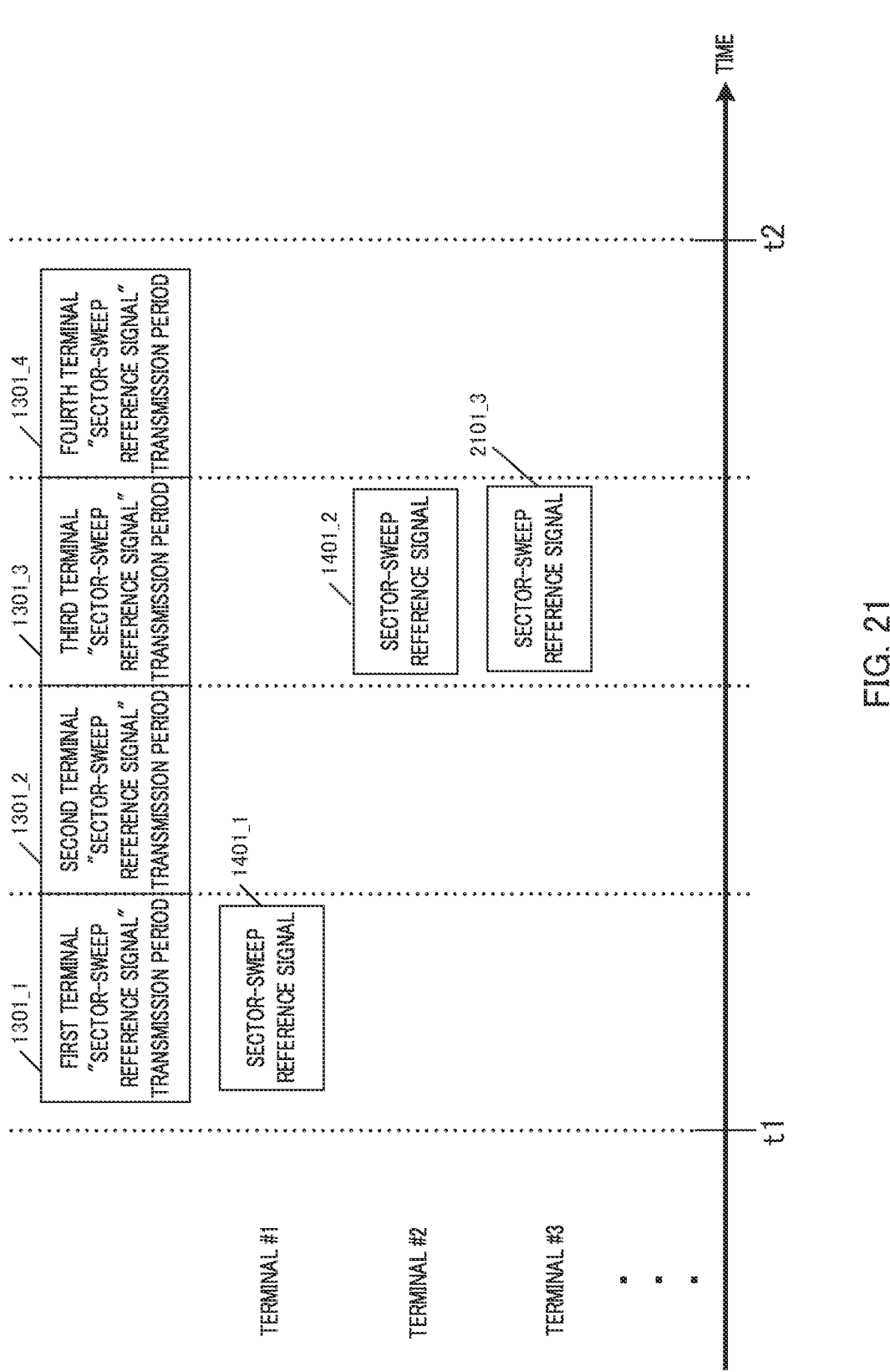
FIG. 21 illustrates the second example related to the occupation by the terminals for the transmission periods for "sector-sweep reference signal" for the terminals according to Embodiment 1.

In FIG. 21, the components that operate in the same manner as in FIGS. 13 and 14 are denoted by the same reference numerals, and descriptions thereof will be thus omitted. In the following, difference from the description in FIG. 14 will be described.

Terminal #3 labeled 902_3 of FIG. 9 receives sector-sweep reference signal 1001 transmitted by base station #1 labeled 901_1, obtains "identification (ID) of the transmission panel antenna (identification number)" and the "identification number (ID) of the parameter used in beamforming (directivity control) with high reception quality," and thereby can perform communication with base station #1 labeled 901_1.

Terminal #3 labeled 902_3 is assumed to estimate, for example, "transmission panel antenna a3 and parameter b3" as the "transmission panel antenna and parameter" with high reception quality.

In addition, while estimating the "transmission panel antenna and parameter" with high reception quality, terminal #3 labeled 902_3, at the same time, obtains information on the "the number of slots that can transmit the sector-sweep reference signal when the terminal transmits the sector-sweep reference signal (the number of terminals that can transmit the sector-sweep reference signal)." In the case of FIG. 21, terminal #3 labeled 902_3 obtains information indicating that "the number of slots that can transmit the sector-sweep reference signal when the terminal transmits the sector-sweep reference signal (the number of terminals that can transmit the sector-sweep reference signal)" is 4.

In this case, terminal #3 labeled 902_3 obtains, using a random number, for example, any one of the values of "0," "1," "2," and "3." For example, it is assumed that terminal #3 labeled 902_3 obtains "2," using the random number. In this case, since "2"+1=3, terminal #3 labeled 902_3 transmits sector-sweep reference signal 2101_3, using third (="2"+1) terminal "sector-sweep reference signal" transmission period 1301_3 of FIG. 21.

It is assumed that sector-sweep reference signal 2101_3 includes information on the "transmission panel antenna and parameter" with high reception quality obtained by terminal #3 labeled 902_3, that is, information on the "transmission panel antenna a3 and parameter b3."

At this time, as illustrated in FIG. 21, the time periods of "sector-sweep reference signal 1401_2 transmitted by terminal #2 labeled 902_2" and "sector-sweep reference signal 2101_3 transmitted by the terminal #3 labeled 902_3" overlap with each other.

Hence, base station #1 labeled 901_1 may simultaneously receive "sector-sweep reference signal 1401_2 transmitted by terminal #2 labeled 902_2" and "sector-sweep reference signal 2101_3 transmitted by terminal #3 labeled 902_3."

In this case, the following two cases are conceivable.

<Case 1>

Both "sector-sweep reference signal 1401_2 transmitted by terminal #2 labeled 902_2" and "sector-sweep reference signal 2101_3 transmitted by terminal #3 labeled 902_3" include the configuration in FIG. 15.

At this time, ""the transmission panel antenna and the beamforming parameter of terminal #2 labeled 902_2" with high reception quality when base station #1 labeled 901_1 receives "sector-sweep reference signal 1401_2 transmitted by terminal #2 labeled 902_2"" is different from ""the transmission panel antenna and the beamforming parameter of terminal #3 labeled 902_3" with high reception quality when base station #1 labeled 901_1 receives "sector-sweep reference signal 1401_3 transmitted by terminal #3 labeled 902_3."" Thus, base station #1 labeled 901_1 can obtain information included in "sector-sweep reference signal 1401_2 transmitted by terminal #2 labeled 902_2" and information included in "sector-sweep reference signal 2101_3 transmitted by terminal #3 labeled 902_3."

In this case, for example, it is assumed that "first-terminal-addressed feedback signal 1601_1 of FIG. 16 is a signal addressed to terminal #1 labeled 902_1," "second-terminal-addressed feedback signal 1601_2 is a signal addressed to terminal #3 labeled 902_3," and "third-terminal-addressed feedback signal 1601_3 is a signal addressed to terminal #2 labeled 902_2."

In addition, for example, it is assumed that first-terminal-addressed modulation signal (slot) 1701_1 of FIG. 17 is a signal addressed to terminal #1 labeled 902_1, second-terminal-addressed modulation signal (slot) 1701_2 is a signal addressed to terminal #3 labeled 902_3, and third-terminal-addressed modulation signal (slot) 1701_3 is a signal addressed to terminal #2 labeled 902_2.

In the manner described above, base station #1 labeled 901_1 can communicate with (terminal #1 labeled 902_1), terminal #2 labeled 902_2, and terminal #3 labeled 902_3.

<Case 2>

Both "sector-sweep reference signal 1401_2 transmitted by terminal #2 labeled 902_2" and "sector-sweep reference signal 2101_3 transmitted by terminal #3 labeled 902_3" include the configuration in FIG. 15.

At this time, interference is assumed to be caused between ""the transmission panel antenna and the beamforming parameter of terminal #2 labeled 902_2" with high reception quality when base station #1 labeled 901_1 receives "sector-sweep reference signal 1401_2 transmitted by terminal #2 labeled 902_2"" and ""the transmission panel antenna and the beamforming parameter of terminal #3 labeled 902_3" with high reception quality when base station #1 labeled 901_1 receives "sector-sweep reference signal 1401_3 transmitted by terminal #3 labeled 902_3."""

<Case 2-1>

Base station #1 labeled 901_1 may obtain any one of the information included in "sector-sweep reference signal 1401_2 transmitted by terminal #2 labeled 902_2" and the information included in "sector-sweep reference signal 2101_3 transmitted by terminal #3 labeled 902_3."

For example, it is assumed that base station #1 labeled 901_1 receives the information included in "sector-sweep reference signal 1401_2 transmitted by terminal #2 labeled 902_2."

In this case, for example, it is assumed that "first-terminal-addressed feedback signal 1601_1 of FIG. 16 is a signal addressed to terminal #1 labeled 902_1," and "third-terminal-addressed feedback signal 1601_3 is a signal addressed to terminal #2 labeled 902_2."

In addition, for example, it is assumed that "first-terminal-addressed modulation signal (slot) 1701_1 of FIG. 17 is a signal addressed to terminal #1 labeled 902_1," and "third-terminal-addressed modulation signal (slot) 1701_3 is a signal addressed to terminal #2 labeled 902_2.

In the manner described above, base station #1 labeled 901_1 can communicate with (terminal #1 labeled 902_1) and terminal #2 labeled 902_2.

An operation of terminal #3 labeled 902_3 will be described.

It is assumed that sector-sweep reference signal 1851_1 of FIG. 18 is in the state as illustrated in FIG. 21. Hence, in data-symbol including frames 1803_1, 1803_2, and 1803_3 of FIG. 18, frame (slot) addressed to terminal #3 labeled 902_3 is not present.

In this case, terminal #3 labeled 902_3 in FIG. 9 receives sector-sweep reference signal 1801_2 of FIG. 19 transmitted by base station #1 labeled 901_1, obtains "identification (ID) of the transmission panel antenna (identification number)" and the "identification number (ID) of the parameter used in beamforming (directivity control) with high reception quality," and thereby can perform communication with base station #1 labeled 901_1.

Terminal #3 labeled 902_3 is assumed to estimate, for example, "transmission panel antenna a3 and parameter b3" as the "transmission panel antenna and parameter" with high reception quality.

In addition, while estimating the "transmission panel antenna and parameter" with high reception quality, terminal #3 labeled 902_3, at the same time, obtains information on the "the number of slots that can transmit the sector-sweep reference signal when the terminal transmits the sector-sweep reference signal (the number of terminals that can transmit the sector-sweep reference signal)." Terminal #3 labeled 902_3 obtains information indicating that "the number of slots that can transmit the sector-sweep reference signal when the terminal transmits the sector-sweep reference signal (the number of terminals that can transmit the sector-sweep reference signal)" is 4.

Figure 22:
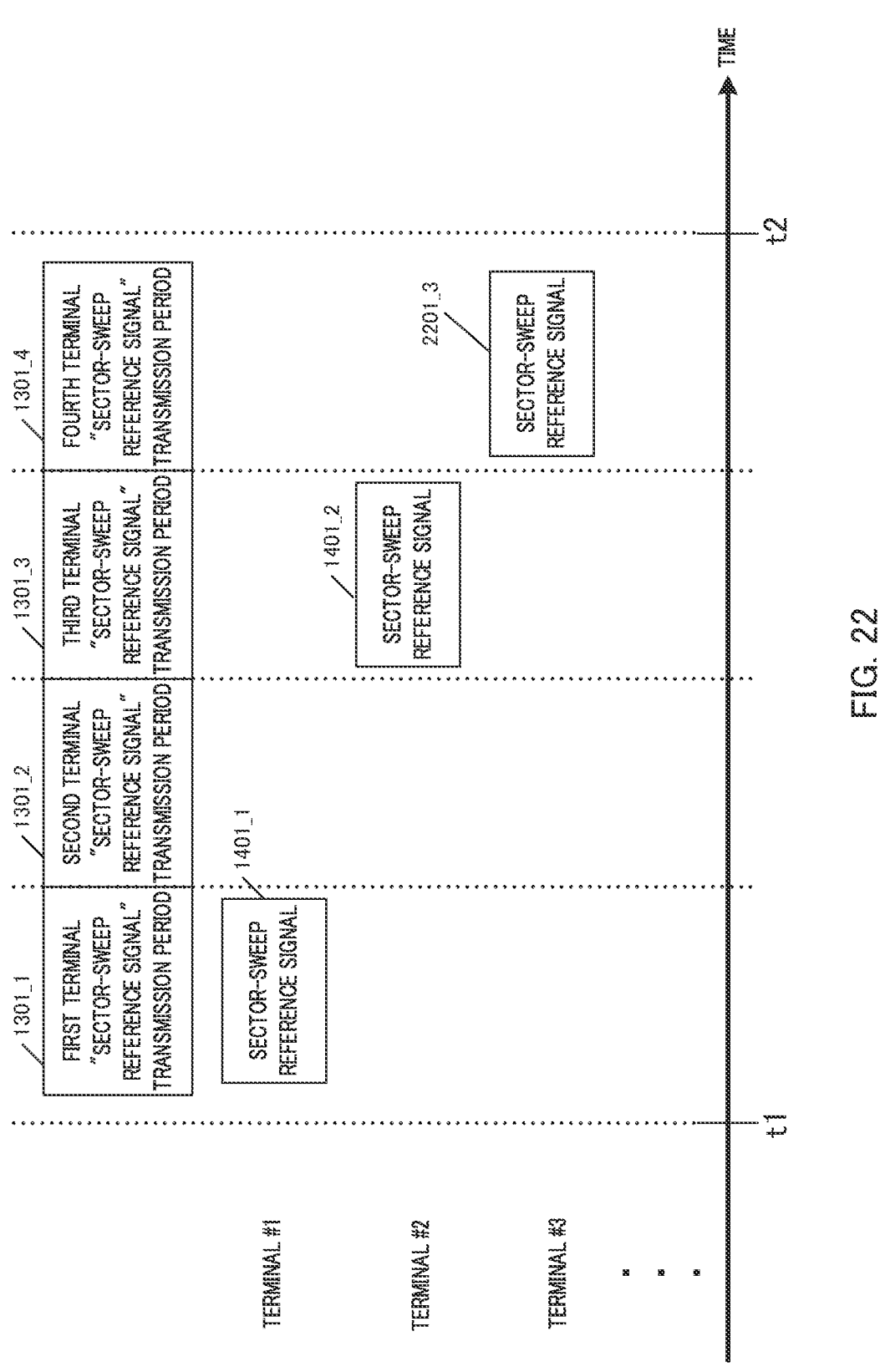
FIG. 22 illustrates the third example related to the occupation by the terminals for the transmission periods for "sector-sweep reference signal" for the terminals according to Embodiment 1.

In this case, terminal #3 labeled 902_3 obtains, using a random number, for example, any one of the values of "0," "1," "2," and "3." For example, it is assumed that terminal #3 labeled 902_3 generates a random number by using a seed different from the previous one and obtains "3." In this case, since "3"+1=4, terminal #3 labeled 902_3 transmits sector-sweep reference signal 2201_3, using third (="3"+1) terminal "sector-sweep reference signal" transmission period 1301_4 of FIG. 22.

It is assumed that sector-sweep reference signal 2201_3 includes information on the "transmission panel antenna and parameter" with high reception quality obtained by terminal #3 labeled 902_3, that is, information on the "transmission panel antenna a3 and parameter b3."

At this time, as illustrated in FIG. 22, base station #1 labeled 901_1 receives "sector-sweep reference signal 2201_3 transmitted by terminal #3 labeled 902_3," and thereafter, base station #1 labeled 901_1 and terminal #3 labeled 902_3 communicate with each other while performing the above-described predetermined procedures.

<Case 2-2>

Base station #1 labeled 901_1 may obtain neither of the information included in "sector-sweep reference signal 1401_2 transmitted by terminal #2 labeled 902_2" and the information included in "sector-sweep reference signal 2101_3 transmitted by terminal #3 labeled 902_3."

It is assumed that sector-sweep reference signal 1851_1 of FIG. 18 is in the state as illustrated in FIG. 21 and base station #1 labeled 901_1 can obtain neither of the information included in "sector-sweep reference signal 1401_2 transmitted by terminal #2 labeled 902_2" and the information included in "sector-sweep reference signal 2101_3 transmitted by terminal #3 labeled 902_3." In this case, in data-symbol including frames 1803_1, 1803_2, and 1803_3 of FIG. 18, frame (slot) addressed to terminal #2 labeled 902_2 and frame (slot) addressed to terminal #3 labeled 902_3 are not present.

In this case, terminal #2 labeled 902_2 in FIG. 9 receives sector-sweep reference signal 1801_2 of FIG. 19 transmitted by base station #1 labeled 901_1, obtains "identification (ID) of the transmission panel antenna (identification number)" and the "identification number (ID) of the parameter used in beamforming (directivity control) with high reception quality," and thereby can perform communication with base station #1 labeled 901_1.

Terminal #2 labeled 902_2 is assumed to estimate, for example, "transmission panel antenna a2 and parameter b2" as the "transmission panel antenna and parameter" with high reception quality.

In addition, while estimating the "transmission panel antenna and parameter" with high reception quality, terminal #2 labeled 902_2, at the same time, obtains information on the "the number of slots that can transmit the sector-sweep reference signal when the terminal transmits the sector-sweep reference signal (the number of terminals that can transmit the sector-sweep reference signal)." Terminal #2 labeled 902_2 obtains information indicating that "the number of slots that can transmit the sector-sweep reference signal when the terminal transmits the sector-sweep reference signal (the number of terminals that can transmit the sector-sweep reference signal)" is 4.

In this case, terminal #2 labeled 902_2 obtains, using a random number, for example, any one of the values of "0," "1," "2," and "3." For example, it is assumed that terminal #2 labeled 902_2 generates a random number by using a seed different from the previous one and obtains "2." In this case, since "2"+1=3, terminal #2 labeled 902_2 transmits sector-sweep reference signal 1401_2, using third (="2"+1) terminal "sector-sweep reference signal" transmission period 1301_3 of FIG. 22.

It is assumed that sector-sweep reference signal 1401_2 includes information on the "transmission panel antenna and parameter" with high reception quality obtained by terminal

2 labeled 902_2, that is, information on the "transmission panel antenna a2 and parameter b3."

At this time, as illustrated in FIG. 22, base station #1 labeled 901_1 receives "sector-sweep reference signal 1401_2 transmitted by terminal #2 labeled 902_2," and thereafter, base station #1 labeled 901_1 and terminal #2 labeled 902_2 communicate with each other while performing the-above-described predetermined procedures.

Similarly, terminal #3 labeled 902_3 in FIG. 9 receives sector-sweep reference signal 1801_2 of FIG. 19 transmitted by base station #1 labeled 901_1, obtains "identification (ID) of the transmission panel antenna (identification number)" and the "identification number (ID) of the parameter used in beamforming (directivity control) with high reception quality," and thereby can perform communication with base station #1 labeled 901_1.

Terminal #3 labeled 902_3 is assumed to estimate, for example, "transmission panel antenna a3 and parameter b3" as the "transmission panel antenna and parameter" with high reception quality.

In addition, while estimating the "transmission panel antenna and parameter" with high reception quality, terminal #3 labeled 902_3, at the same time, obtains information on the "the number of slots that can transmit the sector-sweep reference signal when the terminal transmits the sector-sweep reference signal (the number of terminals that can transmit the sector-sweep reference signal)." Terminal #3 labeled 902_3 obtains information indicating that "the number of slots that can transmit the sector-sweep reference signal when the terminal transmits the sector-sweep reference signal (the number of terminals that can transmit the sector-sweep reference signal)" is 4.

In this case, terminal #3 labeled 902_3 obtains, using a random number, for example, any one of the values of "0," "1," "2," and "3." For example, it is assumed that terminal #3 labeled 902_3 generates a random number by using a seed different from the previous one and obtains "3." In this case, since "3"+1=4, terminal #3 labeled 902_3 transmits sector-sweep reference signal 2201_3, using fourth (="3"+1) terminal "sector-sweep reference signal" transmission period 1301_4 of FIG. 22.

It is assumed that sector-sweep reference signal 2201_3 includes information on the "transmission panel antenna and parameter" with high reception quality obtained by terminal #3 labeled 902_3, that is, information on the "transmission panel antenna a3 and parameter b3."

At this time, as illustrated in FIG. 22, base station #1 labeled 901_1 receives "sector-sweep reference signal 2201_3 transmitted by terminal #3 labeled 902_3," and thereafter, base station #1 labeled 901_1 and terminal #3 labeled 902_3 communicate with each other while performing the above-described predetermined procedures.

In the manner described above, the following effects can be brought about. A collision of the sector-sweep reference signals transmitted from the respective terminals can be more reduced, and the number of sector-sweep reference signals that the base station can receive can be increased, and thereby the number of terminals with which the base station performs communication can be increased.

As described in the present embodiment, the terminal transmits the sector-sweep reference signal so as to reduce the occurrence number of collisions, and thereby, an effect can be obtained in which a communication capacity in the system configured of the base station and the terminal is improved. Incidentally, the configurations of the terminal and the base station are not limited to the configuration of FIG. 1A, 1B, or 1C. Moreover, the configurations of the transmission panel antenna and the reception panel antenna are not limited to the configurations of FIGS. 3 and 4, and may be, for example, a configuration of an antenna that can generate one or more, or a plurality of transmission directivities and reception directivities. In addition, signals, frames and the like are present in FIG. 10, FIG. 11, FIG. 12, FIG. 13, FIG. 14, FIG. 15, FIG. 16, FIG. 17, FIG. 18, FIG. 19, FIG. 20, FIG. 21, and FIG. 22, but how they are referred to is not limited to these, the functions of the signals themselves to be transmitted are important.

Embodiment 2

In the present embodiment, as a variation of Embodiment 1, an embodiment in which a base station transmits a plurality of modulation signals (a plurality of streams) to a terminal will be described (That is, an embodiment in a case of performing Multiple-Input Multiple-Output (MIMO)).

FIG. 9 illustrates an example of a communication state in the present embodiment. Note that, a description will be omitted because the details have already been described.

FIG. 23 illustrates an example of modulation signal 2300 transmitted by base station #1 labeled 901_1 in FIG. 9. Incidentally, the components that operate in the same manner as in FIG. 10 are denoted by the same reference numerals, and descriptions thereof will be thus omitted.

In the time period from time t0 to time t1, sector-sweep reference signal 1001 is present.

The time period from time t1 to time t2 is a terminal response period.

In the time period from time t2 to time t3, feedback signal group 2302 is present. Feedback signal group 2302 will be described later.

In the time period from time t4 to time t5, data-symbol including frame group 2303 is present. Data-symbol including frame group 2303 will be described later.

FIG. 11 illustrates an example of sector-sweep reference signal 1001 of FIG. 23 transmitted by base station #1 of FIG. 9. Note that, an operation in FIG. 11 has already been described, and a description thereof will be thus omitted.

FIG. 12 illustrates a configuration example of "sector-sweep reference signal 1101_$i$ in transmission panel antenna i" of FIG. 11. Note that, an operation in FIG. 12 has already been described, and a description thereof will be thus omitted.

FIG. 13 illustrates an operational example of the time period from time t1 to time t2 that is the terminal response period. Note that, an operation in FIG. 13 has already been described, and a description thereof will be thus omitted.

FIG. 14 illustrates an example related to occupation by the terminals for "first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4" illustrated in FIG. 13. Note that, an operation in FIG. 14 has already been described, and a description thereof will be thus omitted.

For example, terminal #1 labeled 902_1 of FIG. 9 is assumed to desire to receive a plurality of modulation signals from base station #1 labeled 901_1. Here, terminal #1 labeled 902_1 of FIG. 9 is assumed to desire to receive two modulation signals from base station #1 labeled 901_1. In this case, terminal #1 labeled 902_1 of FIG. 9 receives sector-sweep reference signal 1001 transmitted by base station #1 labeled 901_1 and estimates two "transmission panel antennae and parameter numbers" with high reception quality in transmission panel antennae for base station #1 labeled 901_1.

At this time, the two "transmission panel antennae and parameter numbers" with high reception quality are referred to respectively as the first "transmission panel antenna and parameter number" and the second "transmission panel antenna and parameter number." Further, it is assumed that a "transmission panel antenna of the first "transmission panel antenna and parameter number"" is different from a "transmission panel antenna of the second "transmission panel antenna and parameter number.""

Note that, this estimation can be performed by obtaining sector-sweep reference signal 1001 and the "identification (ID) of the transmission panel antenna (identification number)" and the "identification number (ID) of the parameter used in beamforming (directivity control)" which are included the sector-sweep reference signal.

Terminal #1 labeled 902_1 is assumed to estimate, for example, "transmission panel antenna a1_1 and parameter b1_1" and "transmission panel antenna a1_2 and parameter b1_2" as the two "transmission panel antennae and parameter numbers" with high reception quality (in the following description with reference to FIG. 24, it is assumed that "transmission panel antenna a1_1" is transmission panel antenna 1 labeled 106_1 of FIGS. A, 11B, and 1C (base station #1 labeled 901_1), and "transmission panel antenna a1_2" is transmission panel antenna 2 labeled 106_2 of FIGS. 1A, 1B, and 1C (base station #1 labeled 901_1)).

In addition, while estimating the "transmission panel antenna and parameter" with high reception quality, terminal #1 labeled 902_1, at the same time, obtains information on the "the number of slots that can transmit the sector-sweep reference signal when the terminal transmits the sector-sweep reference signal (the number of terminals that can transmit the sector-sweep reference signal)." In the case of FIG. 14, terminal #1 labeled 902_1 obtains information indicating that "the number of slots that can transmit the sector-sweep reference signal when the terminal transmits the sector-sweep reference signal (the number of terminals that can transmit the sector-sweep reference signal)" is 4.

In this case, terminal #1 labeled 902_1 obtains, using a random number, for example, any one of the values of "0," "1," "2," and "3." For example, it is assumed that terminal #1 labeled 902_1 obtains "0," using the random number. In this case, since "0"+1=1, terminal #1 labeled 902_1 transmits sector-sweep reference signal 1401_1, using first (="0"+1) terminal "sector-sweep reference signal" transmission period 1301_1 of FIG. 14.

It is assumed that sector-sweep reference signal 1401_1 includes information on the "transmission panel antenna and parameter" with high reception quality obtained by terminal #1 labeled 902_1, that is, information on the "transmission panel antenna a1_1 and parameter b1_1" and information on the "transmission panel antenna a1_2 and parameter b1_2." Sector-sweep reference signal 1401_1 may include request information, of terminal #1 labeled 902_1, on "the number of modulation signals (streams) desired to be transmitted by base station #1 labeled 901_1" (here, "2").

Similarly, terminal #2 labeled 902_2 of FIG. 9 receives sector-sweep reference signal 1001 transmitted by base station #1 labeled 901_1 and estimates the "transmission panel antenna and parameter number" with high reception quality in transmission panel antennae for base station #1 labeled 901_1. This estimation can be performed by obtaining sector-sweep reference signal 1001 and the "identification (ID) of the transmission panel antenna (identification number)" and the "identification number (ID) of the parameter used in beamforming (directivity control)" which are included the sector-sweep reference signal.

Terminal #2 labeled 902_2 is assumed to estimate, for example, "transmission panel antenna a2_1 and parameter b2_1" as the "transmission panel antenna and parameter number" with high reception quality (in the following description with reference to FIG. 24, it is assumed that "transmission panel antenna a2_1" is transmission panel antenna 3 labeled 106_1 of FIGS. 1A, 1B, and 1C (base station #1 labeled 901_1)).

In addition, while estimating the "transmission panel antenna and parameter" with high reception quality, terminal #2 labeled 902_2, at the same time, obtains information on the "the number of slots that can transmit the sector-sweep reference signal when the terminal transmits the sector-sweep reference signal (the number of terminals that can transmit the sector-sweep reference signal)." In the case of FIG. 14, terminal #2 labeled 902_2 obtains information indicating that "the number of slots that can transmit the sector-sweep reference signal when the terminal transmits the sector-sweep reference signal (the number of terminals that can transmit the sector-sweep reference signal)" is 4.

In this case, terminal #2 labeled 902_2 obtains, using a random number, for example, any one of the values of "0," "1," "2," and "3." For example, it is assumed that terminal #2 labeled 902_2 obtains "2," using the random number. In this case, since "2"+1=3, terminal #2 labeled 902_2 transmits sector-sweep reference signal 1401_2, using third (="2"+1) terminal "sector-sweep reference signal" transmission period 1301_3 of FIG. 14.

It is assumed that sector-sweep reference signal 1401_2 includes information on the "transmission panel antenna and parameter" with high reception quality obtained by terminal #2 labeled 902_2, that is, information on the "transmission panel antenna a2 and parameter b2." This point will be described later. In other words, information on the "transmission panel antenna a2_1 and parameter b2_1" is assumed to be included. Note that, sector-sweep reference signal 1401_2 may include request information, of terminal #2 labeled 902_2, on "the number of modulation signals (streams) desired to be transmitted by base station #1 labeled 901_1" (here, "1").

Thus, a collision of the sector-sweep reference signals transmitted from the respective terminals can be reduced, and the number of sector-sweep reference signals that the base station can receive can be increased, and thereby the number of terminals with which the base station performs communication can be increased. In addition, in the manner described above, the base station can transmit one or more modulation signals (streams) to the respective terminals.

A description will be given of a configuration of sector-sweep reference signal 1401_i transmitted by terminal #i labeled 902_i described with reference to FIG. 14. For simplicity of description, it is assumed that terminal #i labeled 902_i has the configuration of FIG. 1A, 1B, or 1C. It is also assumed that terminal #i labeled 902_i having the configuration of FIG. 1A, 1B, or 1C has the configuration of FIG. 3 as transmission panel antenna xi labeled 106_xi. However, the configuration of terminal #i labeled 902_i is not limited to the configuration of FIG. 1A, 1B, or 1C, and the configuration that terminal #i labeled 902_i having the configuration of FIG. 1A, 1B, or 1C has as transmission panel antenna xi labeled 106_xi is not limited to the configuration of FIG. 3.

However, the configuration of terminal #i labeled 902_i is not limited to the configuration of FIG. 1A, 1B, or 1C, and the configuration of terminal #i labeled 902_i having the configuration of FIG. 1A, 1B, or 1C for transmission panel antenna xi labeled 106_xi is not limited to the configuration of FIG. 3.

FIG. 11 illustrates an example of sector-sweep reference signal 1401_i transmitted by terminal #i labeled 902_i. Incidentally, in FIG. 11, the horizontal axis represents time.

For example, terminal #i labeled 902_i having the configuration of FIG. 1A, 1B, or 1C transmits sector-sweep reference signal 1101_1 in transmission panel antenna 1 from transmission panel antenna 1 labeled 106_1.

Thus, as illustrated in FIG. 11, terminal #i labeled 902_i having the configuration of FIG. 1A, 1B, or 1C transmits, sector-sweep reference signal 1101_xi in transmission panel antenna xi from transmission panel antenna xi labeled 106_xi. Incidentally, xi is assumed to be an integer from 1 to M (both inclusive).

FIG. 15 illustrates a configuration example of "sector-sweep reference signal 1101_xi in transmission panel antenna xi" of FIG. 11. Note that, an operation in FIG. 15 has already been described, and a description thereof will be thus omitted.

Figure 24:
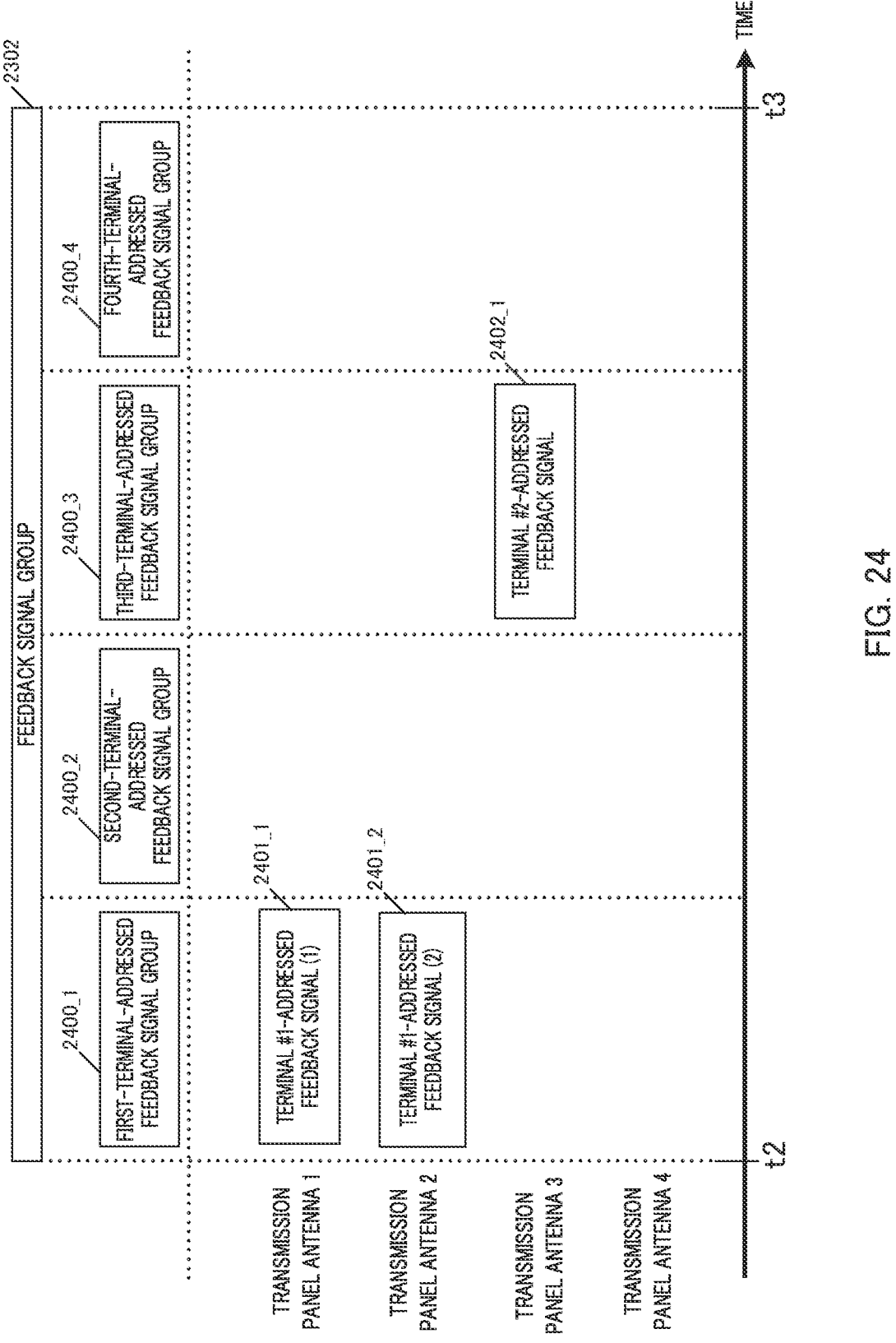
FIG. 24 illustrates a configuration example of a feedback signal group present in a time period from t2 to t3 according to Embodiment 2.

FIG. 24 illustrates a configuration example of feedback signal group 2302 present in the time period from t2 to t3 in FIG. 23 and transmitted by base station #1 labeled 901_1. Incidentally, in FIG. 24, a horizontal axis represents time. For simplicity of description, it is assumed that base station 1 labeled 901_1 includes four transmission panel antennae of transmission panel antenna 1 labeled 106_1, transmission panel antenna 2 labeled 106_2, transmission panel antenna 3 labeled 106_3, and transmission panel antenna 4 labeled 106_4.

In this example, since "the number of slots that can transmit the sector-sweep reference signal when the terminal transmits the sector-sweep reference signal (the number of terminals that can transmit the sector-sweep reference signal)" is 4, as illustrated in FIG. 24, feedback signal 2302 includes feedback signal groups addressed to four terminals, such as first-terminal-addressed feedback signal group 2400_1, second-terminal-addressed feedback signal group 2400_2, third-terminal-addressed feedback signal group 2400_3, and fourth-terminal-addressed feedback signal group 2400_4. Incidentally, for example, in a case where "the number of slots that can transmit the sector-sweep reference signal when the terminal transmits the sector-sweep reference signal (the number of terminals that can transmit the sector-sweep reference signal)" is Ω, feedback signal group 2302 may be configured to include feedback signal groups addressed to Ω terminals. Provided that, f is an integer of 1 or more or an integer of 2 or more representing the number of terminals.

A description has been given with the term "feedback signal group," This is because the feedback signal can be present in transmission panel antenna 1 labeled 106_1, the feedback signal can be present in transmission panel antenna 2 labeled 106_2, the feedback signal can be present in transmission panel antenna 3 labeled 106_3, and the feedback signal can be present in transmission panel antenna 4 labeled 106_4.

For example, as illustrated in FIG. 14, when terminal #1 labeled 902_1 transmits sector-sweep reference signal 1401_1 and terminal #2 labeled 902_2 transmits sector-sweep reference signal 1401_2, base station #1 labeled 901_1 transmits a feedback signal group to terminal #1 labeled 902_1, using first-terminal-addressed feedback signal group 2400_1 and transmits a feedback signal group to terminal #2 labeled 902_2, using third-terminal-addressed feedback signal group 2400_3.

As illustrated in FIG. 24, first-terminal-addressed feedback signal group 2400_1 is composed of "feedback signal (1) labeled 2401_1 addressed to terminal #1 labeled 902_1" transmitted from transmission panel antenna 1 labeled 106_1 for base station #1 labeled 901_1, and "feedback signal (2) labeled 2401_2 addressed to terminal #1 labeled 902_1" transmitted from transmission panel antenna 2 labeled 106_2 for base station #1 labeled 901_1.

As described above, first-terminal-addressed feedback signal group 2400_1 is composed of "feedback signal (1) labeled 2401_1 addressed to terminal #1 labeled 902_1" and "feedback signal (2) labeled 2401_2 addressed to terminal #1 labeled 902_1" because "base station #1 labeled 901_1 transmits two modulation signals (streams)" to terminal #1 labeled 902_1."

As illustrated in FIG. 24, third-terminal-addressed feedback signal group 2400_3 is composed of "feedback signal labeled 2402_1 addressed to terminal #2 labeled 902_2" transmitted from transmission panel antenna 3 labeled 106_3 for base station #1 labeled 901_1.

At this time, "feedback signal (1) addressed to terminal #1 labeled 902_1" includes, for example, information indicating that terminal #1 labeled 902_1 can perform communication (with base station #1 labeled 901_1), using transmission panel antenna 1 labeled 106_1.

In addition, "feedback signal (2) addressed to terminal #1 labeled 902_1" includes, for example, information indicating that terminal #1 labeled 902_1 can perform communication (with base station #1 labeled 901_1), using transmission panel antenna 2 labeled 106_2.

Moreover, the "feedback signal addressed to terminal #2 labeled 902_2" includes, for example, information indicating that terminal #2 labeled 902_2 (and base station #1 labeled 901_1) can perform communication using transmission panel antenna 3 labeled 106_3.

Incidentally, base station #1 labeled 901_1 selects the transmission panel antenna, configures a beamforming parameter, and transmits first-terminal-addressed feedback signal 2400_1 based on the "information on the two "transmission panel antennae and parameters" with high reception quality of base station #1 labeled 901_1" transmitted by terminal #1 labeled 902_1 (this is the reason that the two transmission panel antennae are used).

Similarly, base station #2 labeled 901_1 selects the transmission panel antenna, configures a beamforming parameter, and transmits third-terminal-addressed feedback signal 2400_3 based on the "information on the "transmission panel antenna and parameter" with high reception quality of base station #1 labeled 901_1" transmitted by terminal #2 labeled 902_2.

Figure 25:
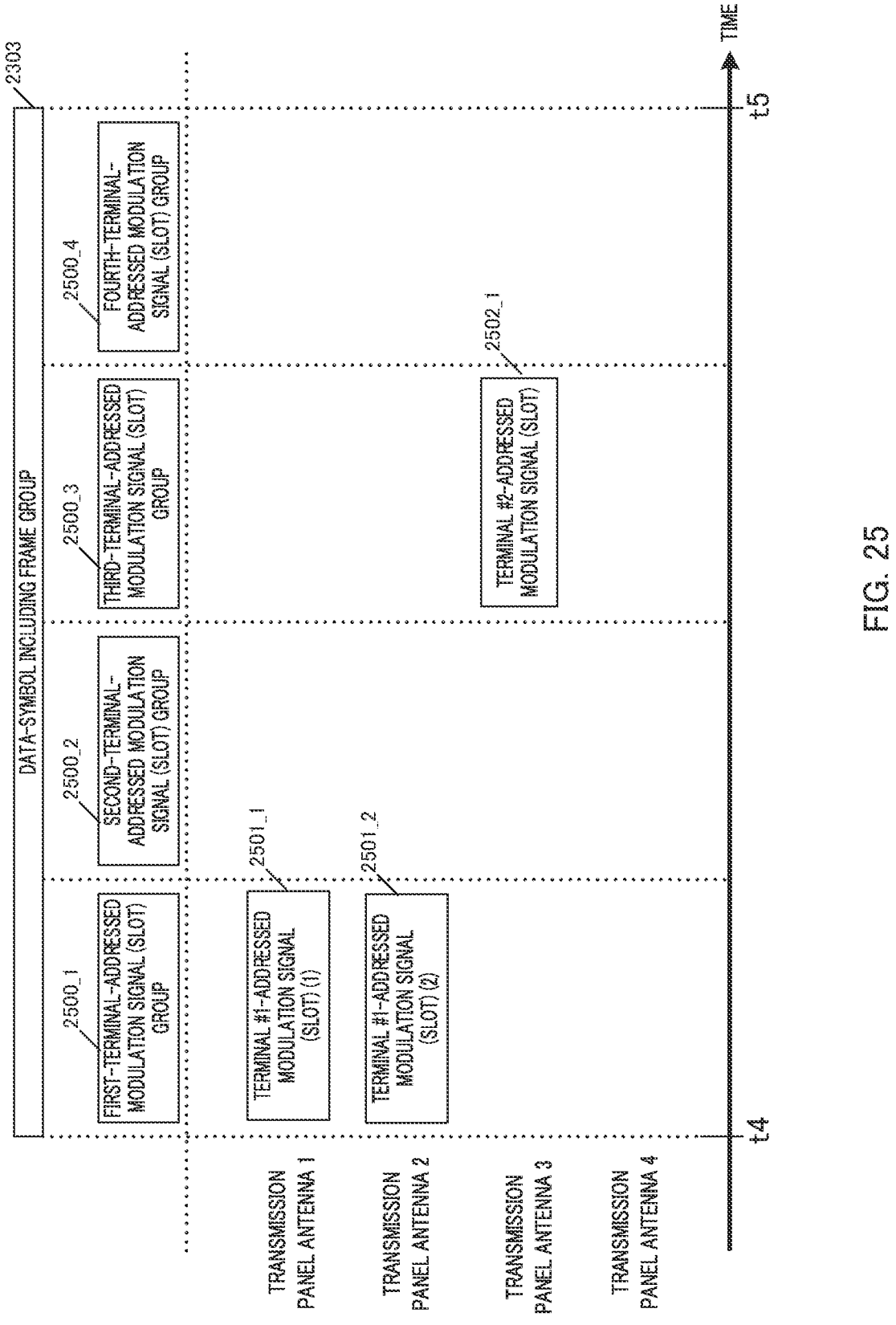
FIG. 25 illustrates a configuration example of a data-symbol including frame groups present in a time period from t4 to t5 according to Embodiment 2.

FIG. 25 illustrates a configuration example of data-symbol including frame group 2303 present in the time period from t4 to t5 in FIG. 23 and transmitted by base station #1 labeled 901_1. Incidentally, in FIG. 25, a horizontal axis represents time.

In this example, since "the number of slots that can transmit the sector-sweep reference signal when the terminal transmits the sector-sweep reference signal (the number of terminals that can transmit the sector-sweep reference signal)" is 4, as illustrated in FIG. 25, data-symbol including frame group 2303 includes modulation signals (slots) addressed to four terminals, such as first-terminal-addressed modulation signal (first-terminal-addressed slot) 2500_1, second-terminal-addressed modulation signal (second-terminal-addressed slot) 2500_2, third-terminal-addressed modulation signal (third-terminal-addressed slot) 2500_3, and fourth-terminal-addressed modulation signal (fourth-terminal-addressed slot) 2500_4. Incidentally, for example, in a case where "the number of slots that can transmit the sector-sweep reference signal when the terminal transmits the sector-sweep reference signal (the number of terminals that can transmit the sector-sweep reference signal)" is Ω, data-symbol including frame group 2303 may be configured to include modulation signals (slots) addressed to Ω terminals. Provided that, Ω is an integer of 1 or more or an integer of 2 or more representing the number of terminals.

A description has been given with the term "data-symbol including frame group," This is because the data-symbol including frame can be present in transmission panel antenna 1 labeled 106_1, the data-symbol including frame can be present in transmission panel antenna 2 labeled 106_2, the data-symbol including frame can be present in transmission panel antenna 3 labeled 106_3, and the data-symbol including frame can be present in transmission panel antenna 4 labeled 106_4.

For example, as illustrated in FIG. 14, when terminal #1 labeled 902_1 transmits sector-sweep reference signal 1401_1 and terminal #2 labeled 902_2 transmits sector-sweep reference signal 1401_2, base station #1 labeled 901_1 transmits a modulation signal (slot) to terminal #1 labeled 902_1, using first-terminal-addressed modulation signal (first-terminal-addressed slot) group 2500_1 and transmits a modulation signal (slot) to terminal #2 labeled 902_2, using third-terminal-addressed modulation signal (third-terminal-addressed slot) group 2500_3.

As illustrated in FIG. 25, first-terminal-addressed modulation signal (first-terminal-addressed slot) group 2500_1 is composed of "modulation signal (slot) (1) labeled 2501_1 addressed to terminal #1 labeled 902_1" transmitted from transmission panel antenna 1 labeled 106_1 for base station #1 labeled 901_1, and "modulation signal (slot) (2) labeled 2501_2 addressed to terminal #1 labeled 902_1" transmitted from transmission panel antenna 2 labeled 106_2 for base station #1 labeled 901_1.

As described above, first-terminal-addressed modulation signal (first-terminal-addressed slot) group 2500_1 is composed of "modulation signal (slot) (1) labeled 2501_1 addressed to terminal #1 labeled 902_1" and "modulation signal (slot) (2) labeled 2501_2 addressed to terminal #1 labeled 902_" because "base station #1 labeled 901_1 transmits two modulation signals (streams)" to terminal #1 labeled 902_1."

As illustrated in FIG. 25, third-terminal-addressed modulation signal (first-terminal-addressed slot) 2500_3 is composed of "modulation signal (slot) labeled 2502_1 addressed to terminal #2 labeled 902_2" transmitted from transmission panel antenna 3 labeled 106_3 for base station #1 labeled 901_1.

At this time, it is assumed that "modulation signal (slot) (1) addressed to terminal #1 labeled 902_1" includes, for example, a data symbol (data, information) addressed to terminal #1 labeled 902_1.

In addition, it is assumed that "modulation signal (slot) (2) addressed to terminal #1 labeled 902_1" also includes, for example, a data symbol (data, information) addressed to terminal #1 labeled 902_1.

Meanwhile, it is assumed that the "modulation signal (slot) addressed to terminal #2 labeled 902_2" includes, for example, a data symbol (data, information) addressed to terminal #2 labeled 902_2.

Incidentally, base station #1 labeled 901_1 selects the transmission panel antenna, configures a beamforming parameter, and transmits first-terminal-addressed modulation signal (first-terminal-addressed slot) group 2500_1 based on the "information on the two "transmission panel antennae and parameters" with high reception quality of base station #1 labeled 901_1" transmitted by terminal #1 labeled 902_1 (this is the reason that the two transmission panel antennae are used).

Similarly, base station #1 labeled 901_1 selects the transmission panel antenna, configures the beamforming parameter, and transmits third-terminal-addressed modulation signal (first-terminal-addressed slot) group 2500_3 based on the "information on the "transmission panel antenna and parameter" with high reception quality of base station #1 labeled 901_1" transmitted by terminal #2 labeled 902_2.

Incidentally, first-terminal-addressed modulation signal (first-terminal-addressed slot) group 2500_1 of FIG. 25 may include, for example, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

Similarly, second-terminal-addressed modulation signal (second-terminal-addressed slot) group 2500_2, third-terminal-addressed modulation signal (third-terminal-addressed slot) group 2500_3, and fourth-terminal-addressed modulation signal (fourth-terminal-addressed slot) group 2500_4 may include, for example, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

Figure 26:
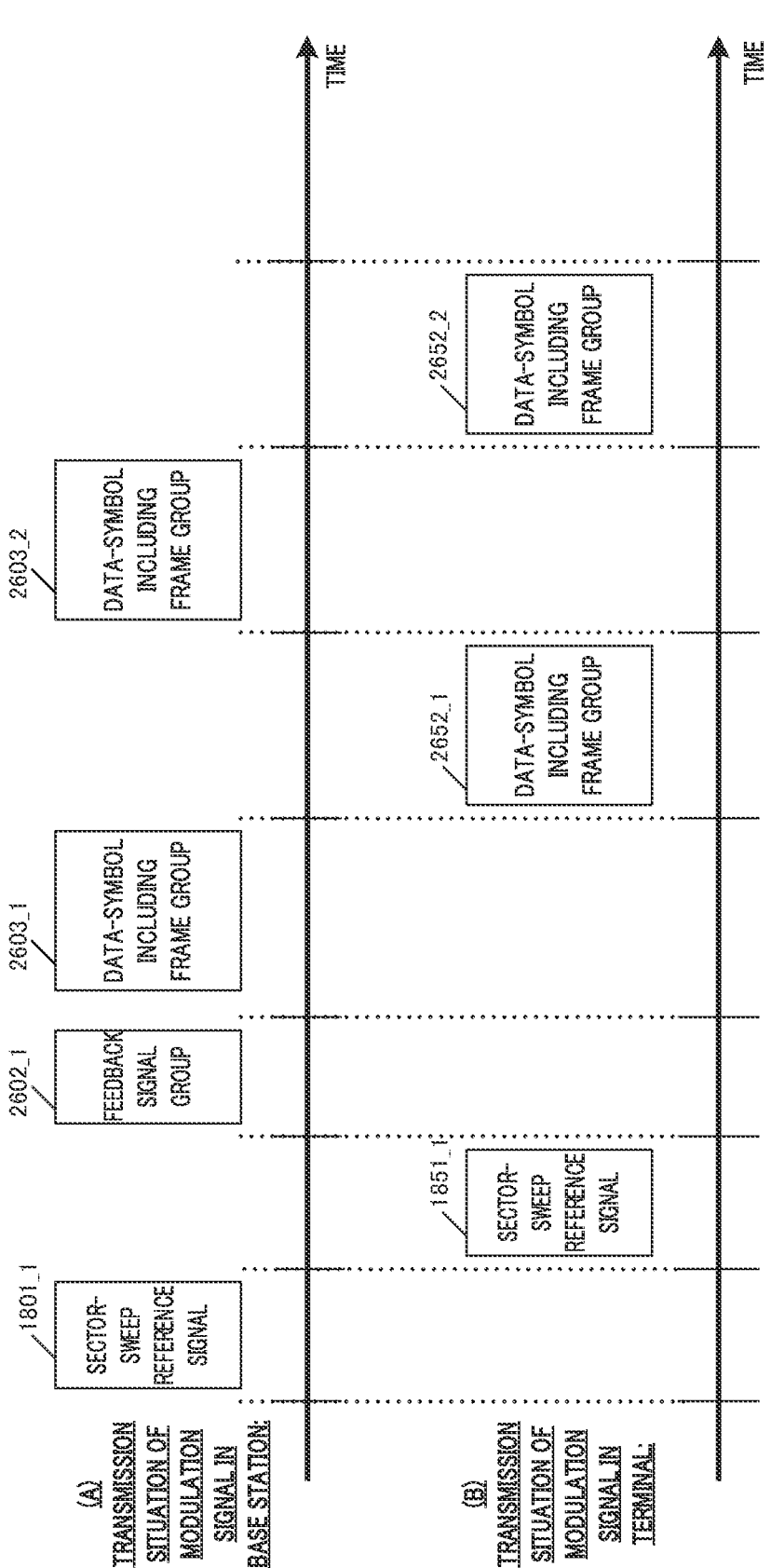
FIG. 26 illustrates an example of a situation where the base station and a terminal communicate with each other according to Embodiment 2.

FIG. 26 illustrates an example of a situation where base station #1 labeled 901_1 communicates with "terminal #1 labeled 902_1 and terminal #2 labeled 902_2" in FIG. 9. FIG. 26 illustrates in (A) an example of a transmission situation of the modulation signal of base station #1 labeled 901_1, and FIG. 26 illustrates in (B) an example of a transmission situation of the modulation signal of "terminal #1 labeled 902_1 and terminal #2 labeled 902_2." Incidentally, in FIG. 26, horizontal axes represent time in (A) and (B). Note that, in FIG. 26, the components that operate in the same manner as in FIG. 18 are denoted by the same reference numerals.

First, base station #1 labeled 901_1 transmits sector-sweep reference signal 1801_1. Note that, this point has already been described with reference to FIG. 23, and a description thereof will be thus omitted.

Then, terminals such as "terminal #1 labeled 902_1 and terminal #2 labeled 902_2" transmit sector-sweep reference signal 1851_1. Note that, this point has already been described with reference to, for example, FIGS. 13 and 14, and a description thereof will be thus omitted.

Base station #1 labeled 901_1 transmits feedback signal group 2602_1. Note that, this point has already been described with reference to FIG. 24, and a description thereof will be thus omitted.

Then, base station #1 labeled 901_1 transmits "data-symbol including frame group 2603_1." Note that, this point has already been described with reference to FIG. 25, and a description thereof will be thus omitted (Thus. "data-symbol including frame group 2603_1" is considered to be a frame for downlink, for example).

The terminals such as "terminal #1 labeled 902_1 and terminal #2 labeled 902_2" transmit "data-symbol including frame group 2652_1." Note that, a configuration of the frame will be described later with reference to FIG. 28 (Thus, "data-symbol including frame group 2652_1" is considered to be a frame for uplink, for example).

Next, base station #1 labeled 901_1 transmits "data-symbol including frame group 2603_2." A configuration method of "data-symbol including frame group 2603_2" is as described with reference to FIG. 24.

The terminals such as "terminal #1 labeled 902_1 and terminal #2 labeled 902_2" transmit "data-symbol including frame group 2652_2." Note that, a configuration of the frame will be described later with reference to FIG. 28.

Figure 27:
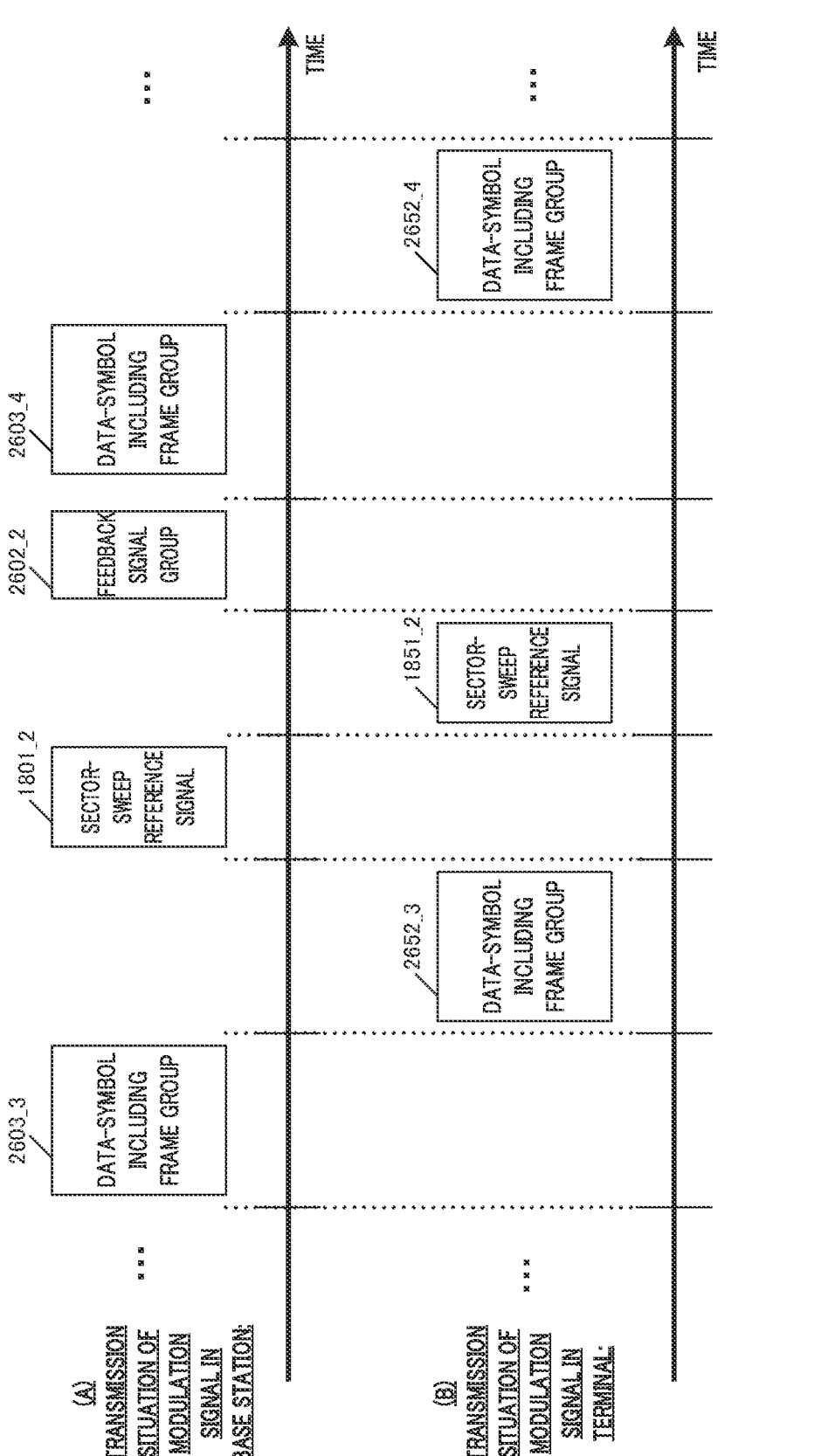
FIG. 27 an example of a situation where the base station and the terminal communicate with each other according to Embodiment 2 after FIG. 26.

FIG. 27 illustrates an example of the transmission situation in the modulation signal in base station #1 labeled 901_1 and the transmission situation of the modulation signal in the terminals such as "terminal #1 labeled 902_1 and terminal #2 labeled 902_2" after FIG. 26. Note that, in FIG. 27, the components that operate in the same manner as in FIG. 18 are denoted by the same reference numerals.

FIG. 27 illustrates in (A) an example of the transmission situation of the modulation signal in base station #1 labeled 901_1, and illustrates a temporal continuation of the transmission situation of the modulation signal in base station #1 labeled 901_1 in (A) of FIG. 26.

FIG. 27 illustrates in (B) an example of the transmission situation of the modulation signal of "terminal #1 labeled 902_1 and terminal #2 labeled 902_2," and is a temporal continuation of the transmission situation of the modulation signal of "terminal #1 labeled 902_1, terminal #2 labeled 902_2, and terminal #3 labeled 902_3" in (B) of FIG. 26.

Incidentally, in FIG. 27, horizontal axes represent time in (A) and (B).

After FIG. 26 in (A) and (B), base station #1 labeled 901_1 transmits "data-symbol including frame group 2603_3." A configuration method of "data-symbol including frame group 2603_2" is as described with reference to FIG. 25.

The terminals such as "terminal #1 labeled 902_1 and terminal #2 labeled 902_2" transmit "data-symbol including frame group 2652_3." Note that, a configuration of the frame will be described later with reference to FIG. 28.

Next, base station #1 labeled 901_1 transmits sector-sweep reference signal 1801_2. Note that, this point has already been described with reference to FIG. 23, and a description thereof will be thus omitted.

Then, terminals such as "terminal #1 labeled 902_1 and terminal #2 labeled 902_2" transmit sector-sweep reference signal 1851_2. Note that, this point has already been described with reference to, for example, FIGS. 13 and 14, and a description thereof will be thus omitted.

Base station #1 labeled 901_1 transmits feedback signal group 2602_2. Note that, this point has already been described with reference to FIG. 24, and a description thereof will be thus omitted.

Then, base station #1 labeled 901_1 transmits "data-symbol including frame group 2603_4." Note that, this point has already been described with reference to FIG. 25, and a description thereof will be thus omitted.

The terminals such as "terminal #1 labeled 902_1 and terminal #2 labeled 902_2" transmit "data-symbol including frame group 2652_4." Note that, a configuration of the frame will be described later with reference to FIG. 28.

In the manner described above, base station #1 labeled 901_1 and the terminals transmit the sector-sweep reference signal before the "transmission of the "data-symbol including frame groups" by base station #1 labeled 901_1 and/or the transmission of the "data-symbol including frame groups" by terminals such as "terminal #1 labeled 902_1 and terminal #2 labeled 902_2,"" again transmit the sector-sweep reference signal after the "transmission of the "data-symbol including frame groups" by base station #1 labeled 901_1 and/or the transmission of the "data-symbol including frame groups" by terminals such as "terminal #1 labeled 902_1 and terminal #2 labeled 902_2,"" and thus perform selection of the transmission panel antenna to be used and perform configuration of transmission beamforming. As a result, the base station and the terminals can achieve the effect of obtaining high data reception quality.

Next, with reference to FIG. 28, a description will be given of a configuration example of "data-symbol including frame group 2652_i" transmitted by the terminals such as "terminal #1 labeled 902_1 and terminal #2 labeled 902_2." Incidentally, for example, i is assumed to be an integer of 1 or more, and in FIG. 28, a horizontal axis represents time.

Figure 28:
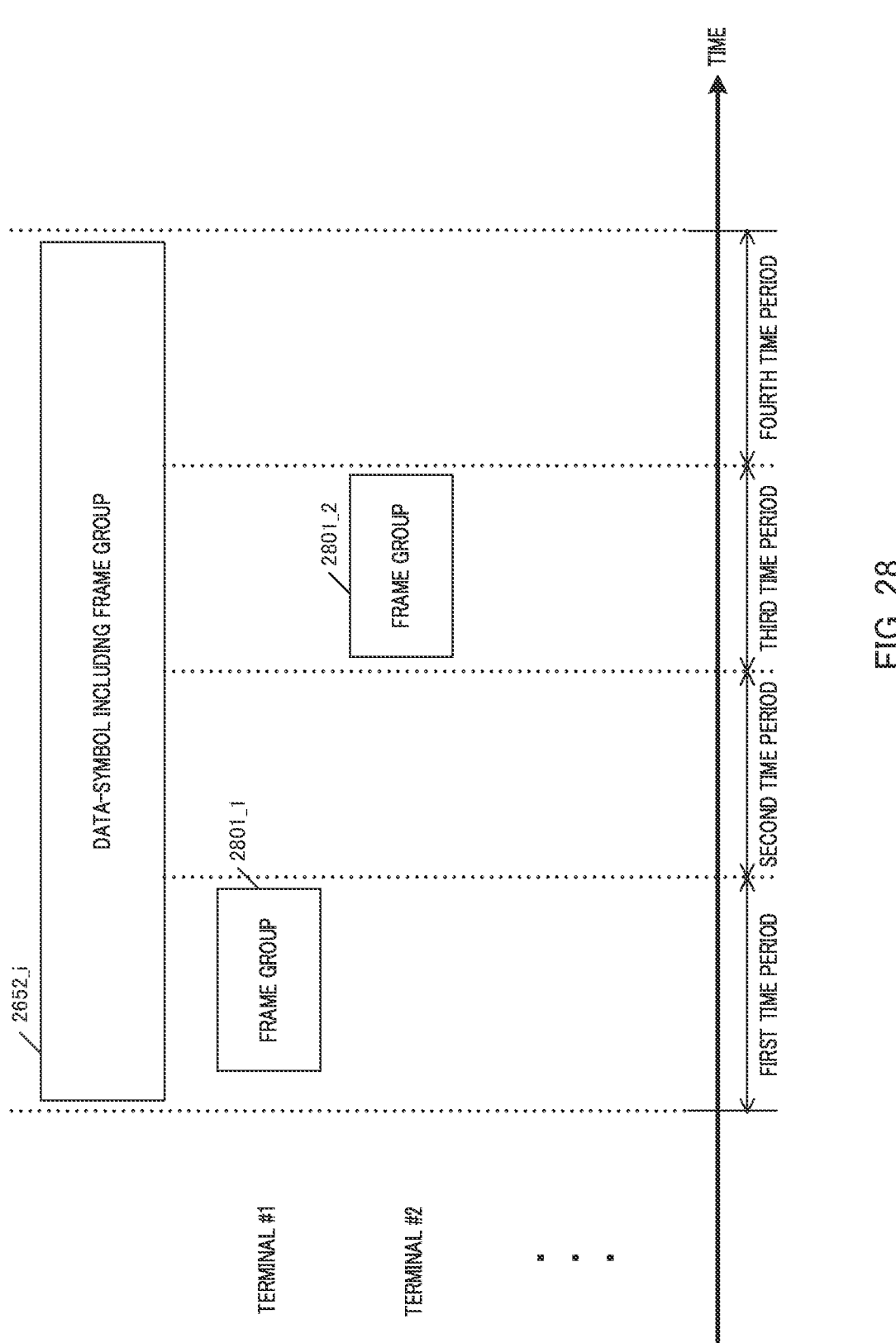
FIG. 28 illustrates a configuration example of a data-symbol including frame groups transmitted by the terminal according to Embodiment 2.

As illustrated in FIG. 28, "data-symbol including frame group 2652_i" is assumed to be composed of the first time period, the second time period, the third time period, and the fourth time period.

For example, terminal #1 labeled 902_1 transmits (data-symbol including) frame group 2801_1, using the first time period. Terminal #2 labeled 902_2 transmits (data-symbol including) frame group 2801_2, using the third time period.

As in the case where base station #1 labeled 901_1 transmits a plurality of modulation signals, using FIG. 25, for example, terminal #1 labeled 902_1 may transmit a plurality of modulation signals (slots) to base station #1 labeled 901_1, using a plurality of transmission panel antennae when terminal #1 labeled 902_1 transmits frame group 2801_1 to base station #1 labeled 901_1.

In addition, when terminal #1 labeled 902_1 transmits frame group 2801_1 to base station #1 labeled 901_1, terminal #1 labeled 902_1 may transmit one modulation signal (slot) to base station #1 labeled 901_1.

As described above, "data-symbol including frame group 2652_i" transmitted by the terminals such as "terminal #1 labeled 902_1 and terminal #2 labeled 902_2" performs, for example, time division; each terminal transmits a frame; and base station #1 labeled 901_1 receives the frame transmitted by the terminal; thus, interference can be suppressed, and high data reception quality can be obtained.

Note that, frame group 2801_1 of FIG. 28 may include, for example, a "reference signal such as DMRS, PTRS, or SRS," a pilot symbol, a pilot signal, a preamble, a symbol including control information, or the like in addition to the data symbol.

Similarly, frames present in the first time period, second time period, third time period, and fourth time period, such as frame group 2801_1 and frame group 2801_2, may include, for example, a "reference signal such as DMRS, PTRS, or SRS," a pilot symbol, a pilot signal, a preamble, a symbol including control information, and the like in addition to the data symbol.

Although, in FIG. 28, a description has been given with a case in which the frame group transmitted by the terminal is time-divided, the frame transmitted by the terminal may be frequency-divided and/or may be spatial-divided using MU-MIMO.

As described in the present embodiment, the terminal transmits the sector-sweep reference signal so as to reduce the occurrence number of collisions, and thereby, an effect can be obtained in which a communication capacity in the system configured of the base station and the terminal is improved. Incidentally, the configurations of the terminal and the base station are not limited to the configuration of FIG. 1A, 1B, or 1C. Moreover, the configurations of the transmission panel antenna and the reception panel antenna are not limited to the configurations of FIGS. 3 and 4, and may be, for example, a configuration of an antenna that can generate one or more, or a plurality of transmission directivities and reception directivities. In addition, signals, frames and the like are present in FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, and FIG. 28, but how they are referred to is not limited to these, the functions of the signals themselves to be transmitted are important.

Embodiment 3

In the present embodiment, a variation of Embodiment 1 and Embodiment 2 will be described. In the following, a description may be given of with reference to drawings illustrated in Embodiment 1 and/or Embodiment 2. In this case, a part of the description may be omitted of the drawings illustrated in Embodiment 1 and/or Embodiment 2.

Figure 29:
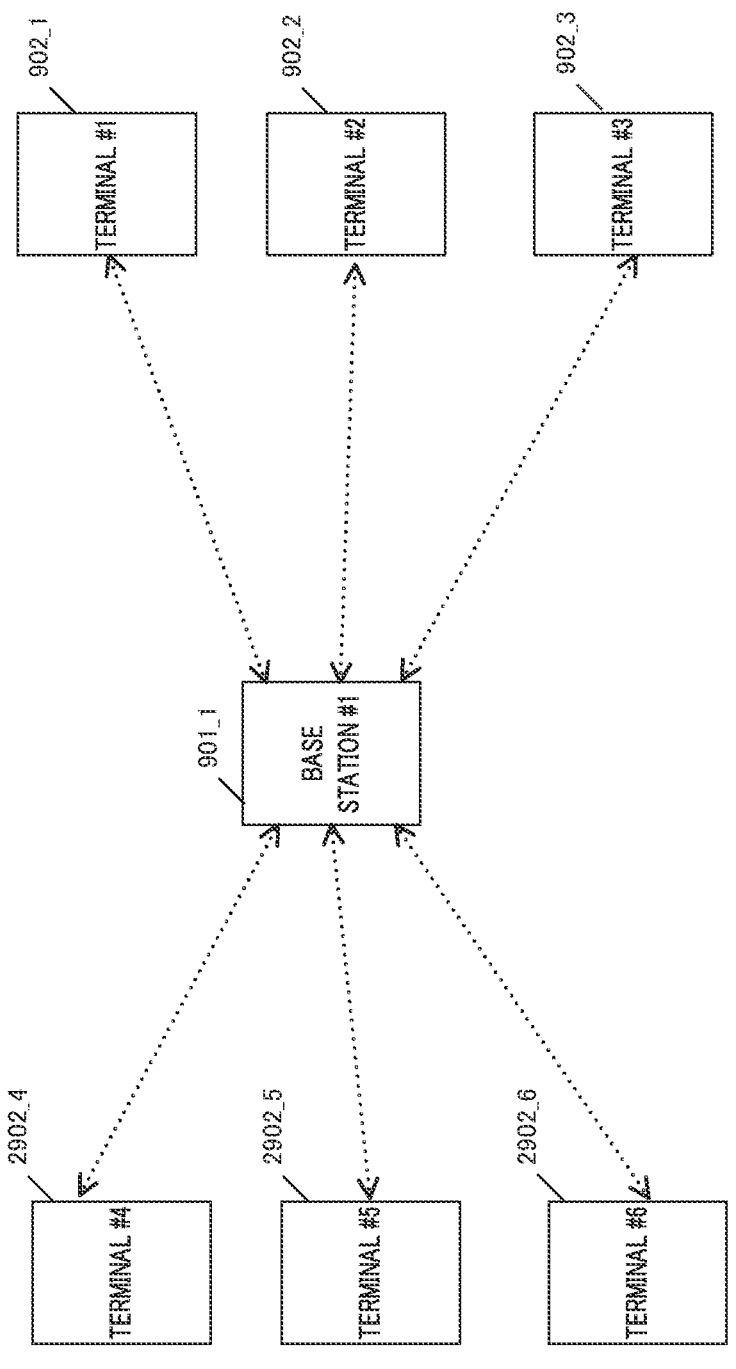
FIG. 29 illustrates an example of a communication state according to Embodiment 3.

FIG. 29 illustrates an example of a communication state in the present embodiment. In FIG. 29, the components that operate in the same manner as in FIG. 9 are denoted by the same reference numerals, and descriptions thereof will be thus omitted.

In FIG. 29, base station #1 labeled 901_1 communicates with terminal #4 labeled 2902_4, terminal #5 labeled 2902_5, and terminal #6 labeled 2902_6, in addition to terminals #1 to #3.

FIG. 30 illustrates an example of modulation signal 3000 transmitted by base station #1 labeled 901_1 in FIG. 29. Incidentally, the components that operate in the same manner as in FIG. 10 are denoted by the same reference numerals, and descriptions thereof will be thus omitted.

In the time period from time t0 to time t1, sector-sweep reference signal 1001 is present.

The time period from time t1 to time t2 is a terminal response period.

In the time period from time t2 to time t3, feedback signal group 3002 is present. Feedback signal group 3002 will be described later.

In the time period from time t4 to time t5, data-symbol including frame group 3003 is present. Data-symbol including frame group 3003 will be described later.

FIG. 11 illustrates an example of sector-sweep reference signal 1001 of FIG. 23 transmitted by base station #1 of FIG. 29. Note that, an operation in FIG. 11 has already been described, and a description thereof will be thus omitted.

FIG. 12 illustrates a configuration example of "sector-sweep reference signal 1101_i in transmission panel antenna i" of FIG. 11. Note that, an operation in FIG. 12 has already been described, and a description thereof will be thus omitted.

FIG. 13 illustrates an operational example of the time period from time t1 to time t2 that is the terminal response period. Note that, an operation in FIG. 13 has already been described, and a description thereof will be thus omitted.

FIG. 14 illustrates an example related to occupation by the terminals for first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4 illustrated in FIG. 13. Note that, an operation in FIG. 14 has been described in Embodiment 1, Embodiment 2, and/or the like, and a description thereof will be thus omitted.

FIG. 15 illustrates a configuration example of "sector-sweep reference signal 1101_xi in transmission panel antenna xi" of FIG. 11. Note that, an operation in FIG. 15 has already been described, and a description thereof will be thus omitted.

Figure 31A:
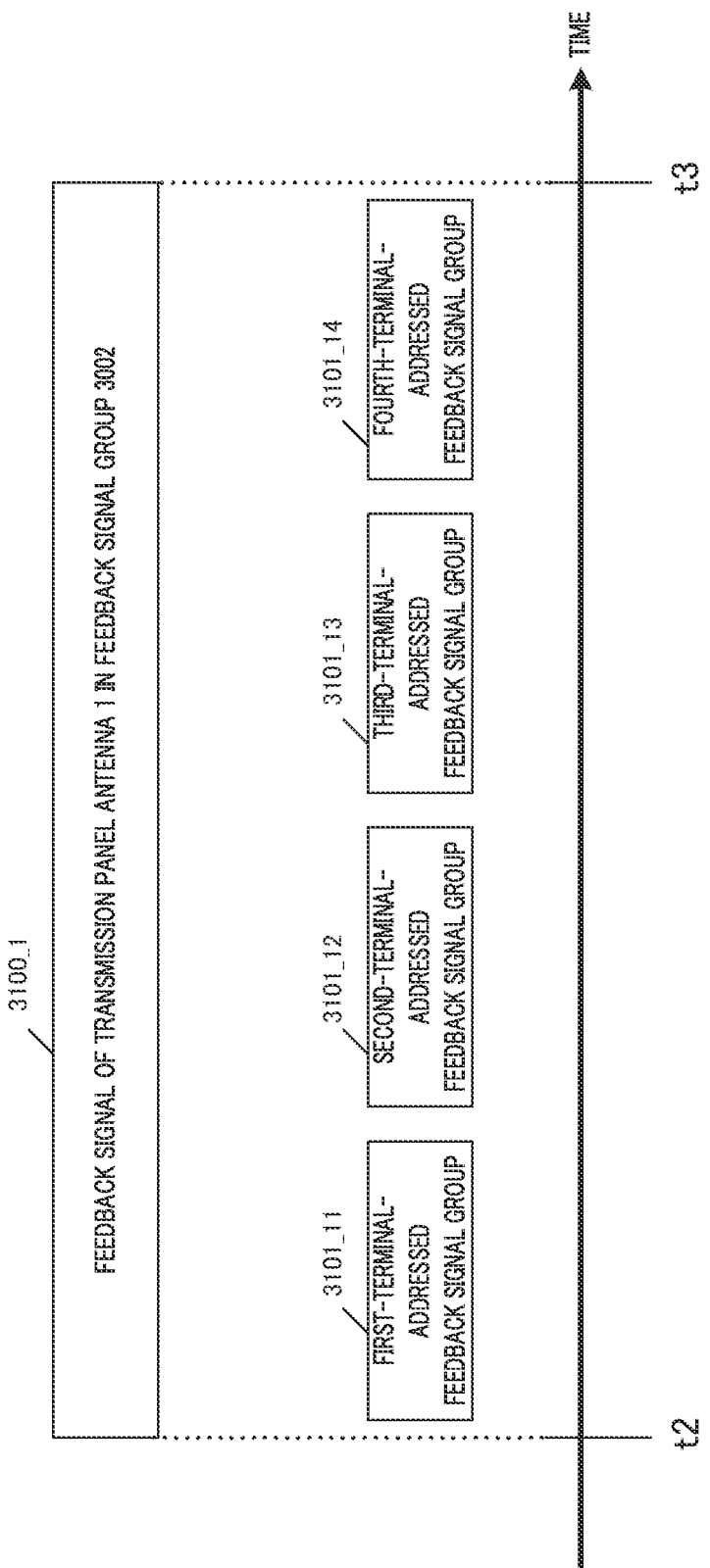
FIG. 31A illustrates a configuration example of a feedback signal group present in a time period from t2 to t3 according to Embodiment 3.
Figure 31B:
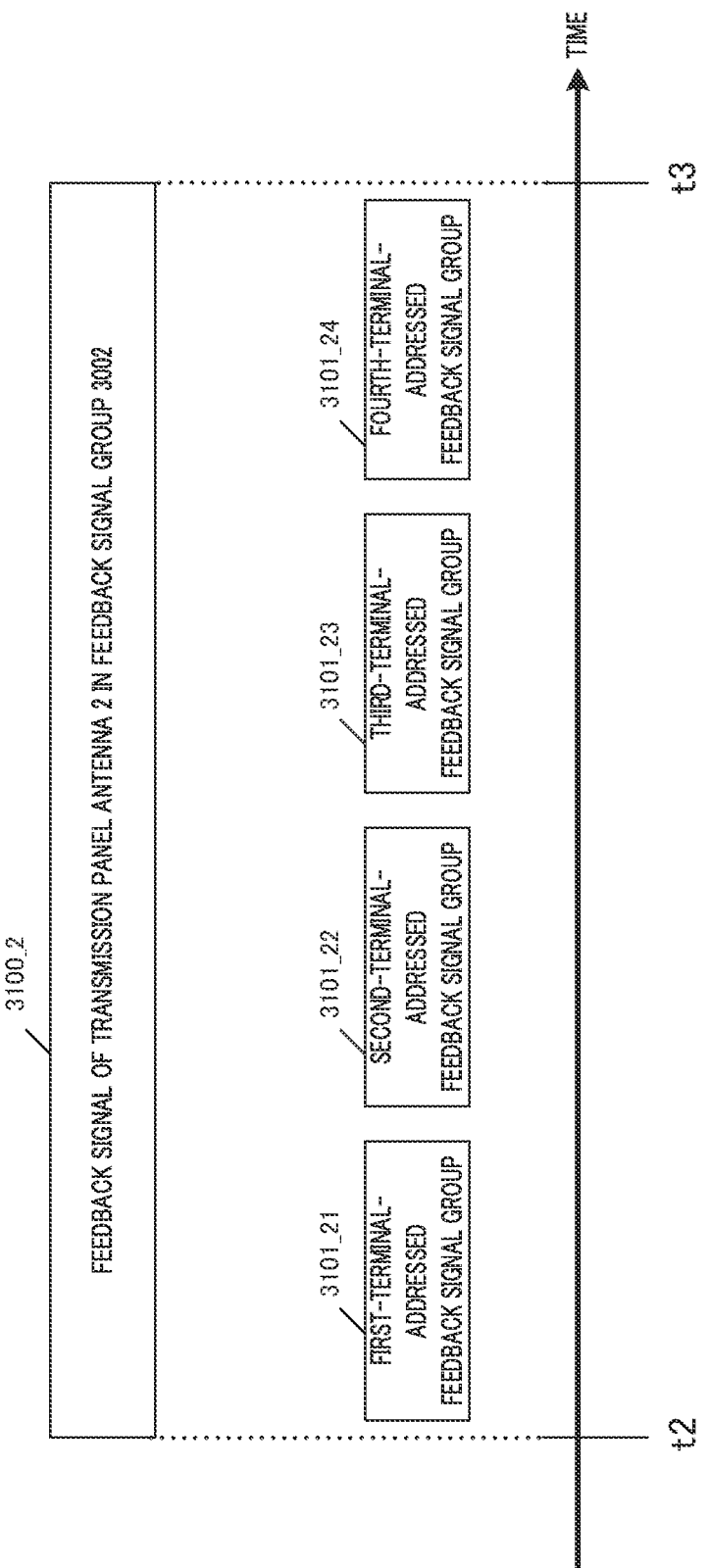
FIG. 31B illustrates the configuration example of the feedback signal group present in the time period from t2 to t3 according to Embodiment 3.

FIGS. 31A, 31B. 31C, and 31D illustrate a configuration example of feedback signal group 3002 present in the time period from t2 to t3 in FIG. 30 and transmitted by base station #1 labeled 901_1. Incidentally, in FIGS. 31A, 31B, 31C, and 31D, horizontal axes represent time. For simplicity of description, it is assumed that base station #1 labeled 901_1 includes four transmission panel antennae of transmission panel antenna 1 labeled 106_1, transmission panel antenna 2 labeled 106_2, transmission panel antenna 3 labeled 106_3, and transmission panel antenna 4 labeled 106_4.

Figure 31C:
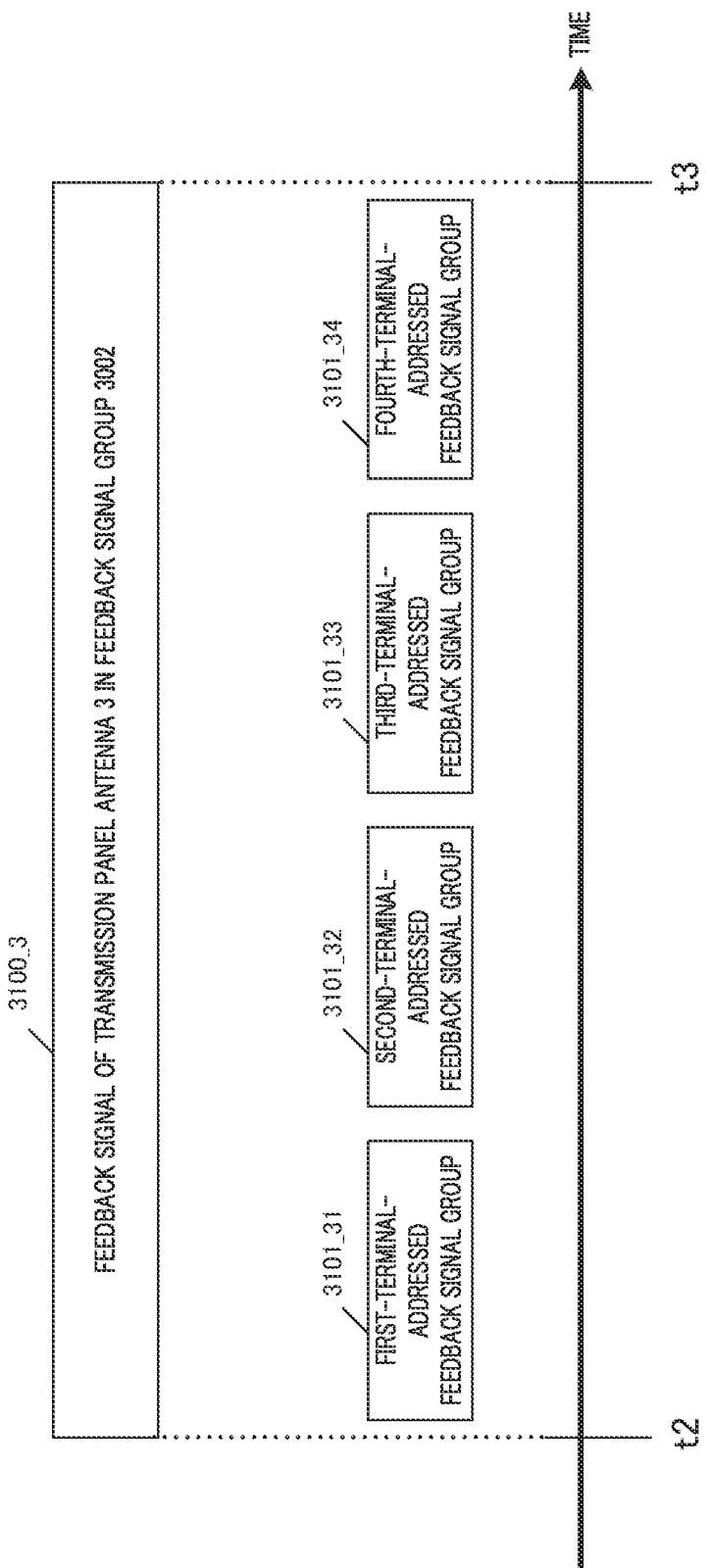
FIG. 31C illustrates the configuration example of the feedback signal group present in the time period from t2 to t3 according to Embodiment 3.
Figure 31D:
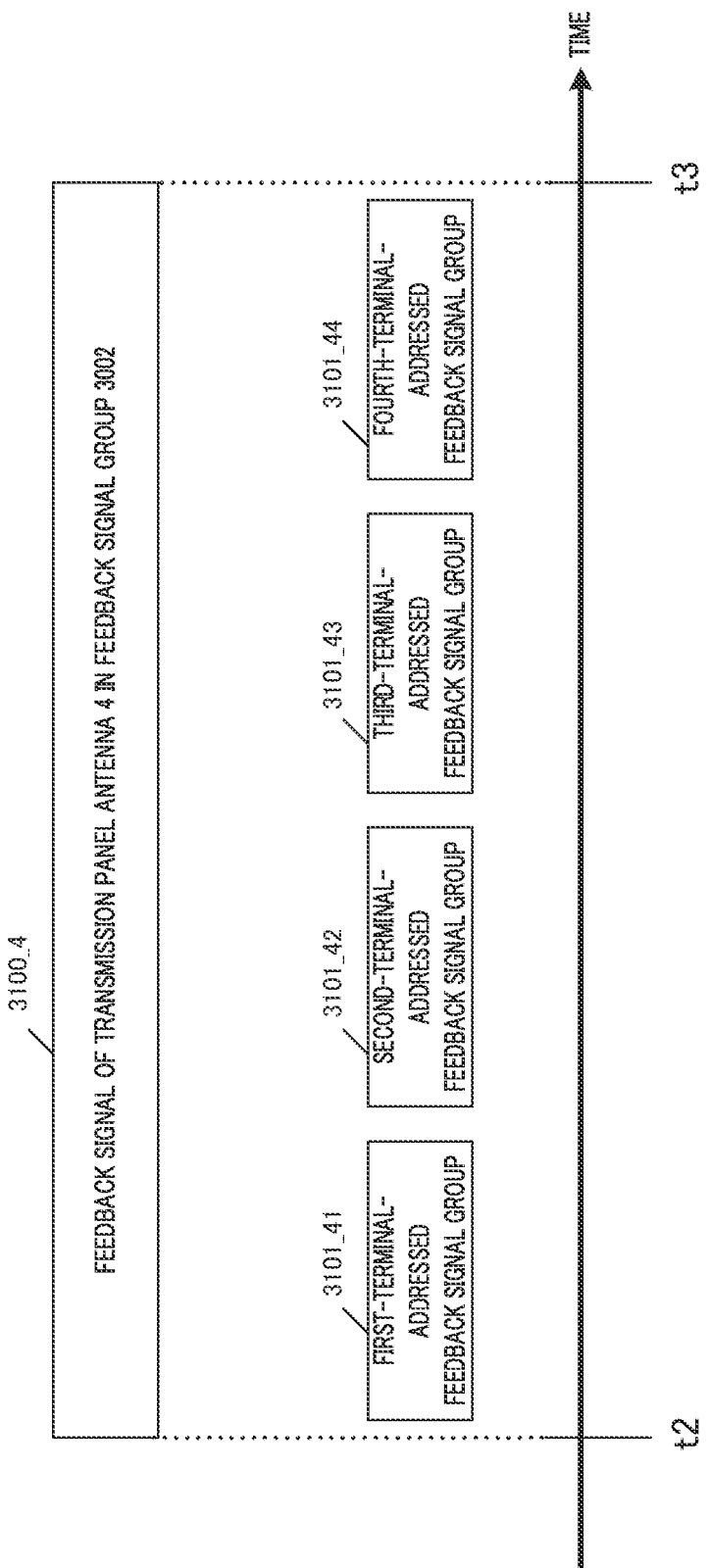
FIG. 31D illustrates the configuration example of the feedback signal group present in the time period from t2 to t3 according to Embodiment 3.

Further, FIG. 31A is related to a feedback signal of transmission panel antenna 1 labeled 106_1 in feedback signal group 3002. FIG. 31B is related to a feedback signal of transmission panel antenna 2 labeled 106_2 in feedback signal group 3002. FIG. 31C is related to a feedback signal of transmission panel antenna 3 labeled 106_3 in feedback signal group 3002. FIG. 31D is related to a feedback signal of transmission panel antenna 4 labeled 106_4 in feedback signal group 3002.

In the example of FIG. 31A, since "the number of slots that can transmit the sector-sweep reference signal when the terminal transmits the sector-sweep reference signal (the number of terminals that can transmit the sector-sweep reference signal)" is 4, as illustrated in FIG. 31A, feedback signal labeled 3100_1 of transmission panel antenna 1 in feedback signal group 3002 includes feedback signal groups addressed to four terminals, such as first-terminal-addressed feedback signal group 3101_11, second-terminal-addressed feedback signal group 3101_12, third-terminal-addressed feedback signal group 3101_13, and fourth-terminal-addressed feedback signal group 3101_14. Incidentally, for example, in a case where "the number of slots that can transmit the sector-sweep reference signal when the terminal transmits the sector-sweep reference signal (the number of terminals that can transmit the sector-sweep reference signal)" is $\Omega$, feedback signal labeled 3100_1 of transmission panel antenna 1 in feedback signal group 3002 may be configured to include feedback signal groups addressed to $\Omega$ terminals. Provided that, $\Omega$ is an integer of 1 or more or an integer of 2 or more representing the number of terminals.

A description has been given with the term "feedback signal group," This is because the feedback signal for transmission panel antenna 1 labeled 106_i can be present, the feedback signal for transmission panel antenna 2 labeled 106_2 can be present, the feedback signal for transmission panel antenna 3 labeled 106_3 can be present, and the feedback signal for transmission panel antenna 4 labeled 106_4 can be present.

In the example of FIG. 31B, since "the number of slots that can transmit the sector-sweep reference signal when the terminal transmits the sector-sweep reference signal (the number of terminals that can transmit the sector-sweep reference signal)" is 4, as illustrated in FIG. 31B, feedback signal labeled 3100_2 of transmission panel antenna 2 in feedback signal group 3002 includes feedback signal groups addressed to four terminals, such as first-terminal-addressed feedback signal group 3101_21, second-terminal-addressed feedback signal group 3101_22, third-terminal-addressed feedback signal group 3101_23, and fourth-terminal-addressed feedback signal group 3101_24. Incidentally, for example, in a case where "the number of slots that can transmit the sector-sweep reference signal when the terminal transmits the sector-sweep reference signal (the number of terminals that can transmit the sector-sweep reference signal)" is Ω, feedback signal labeled 3100_2 of transmission panel antenna 2 in feedback signal group 3002 may be configured to include feedback signal groups addressed to Ω terminals. Provided that, Ω is an integer of 1 or more or an integer of 2 or more representing the number of terminals.

In the example of FIG. 31C, since "the number of slots that can transmit the sector-sweep reference signal when the terminal transmits the sector-sweep reference signal (the number of terminals that can transmit the sector-sweep reference signal)" is 4, as illustrated in FIG. 31C, feedback signal labeled 3100_3 of transmission panel antenna 3 in feedback signal group 3002 includes feedback signal groups addressed to four terminals, such as first-terminal-addressed feedback signal group 3101_31, second-terminal-addressed feedback signal group 3101_32, third-terminal-addressed feedback signal group 3101_33, and fourth-terminal-addressed feedback signal group 3101_34. Incidentally, for example, in a case where "the number of slots that can transmit the sector-sweep reference signal when the terminal transmits the sector-sweep reference signal (the number of terminals that can transmit the sector-sweep reference signal)" is Ω, feedback signal labeled 3100_3 of transmission panel antenna 3 in feedback signal group 3002 may be configured to include feedback signal groups addressed to Ω terminals. Provided that, Ω is an integer of 1 or more or an integer of 2 or more representing the number of terminals.

In the example of FIG. 31D, since "the number of slots that can transmit the sector-sweep reference signal when the terminal transmits the sector-sweep reference signal (the number of terminals that can transmit the sector-sweep reference signal)" is 4, as illustrated in FIG. 31D, feedback signal labeled 3100_4 of transmission panel antenna 4 in feedback signal group 3002 includes feedback signal groups addressed to four terminals, such as first-terminal-addressed feedback signal group 3101_41, second-terminal-addressed feedback signal group 3101_42, third-terminal-addressed feedback signal group 3101_43, and fourth-terminal-addressed feedback signal group 3101_44. Incidentally, for example, in a case where "the number of slots that can transmit the sector-sweep reference signal when the terminal transmits the sector-sweep reference signal (the number of terminals that can transmit the sector-sweep reference signal)" is Ω, feedback signal labeled 3100_4 of transmission panel antenna 4 in feedback signal group 3002 may be configured to include feedback signal groups addressed to Ω terminals. Provided that, Ω is an integer of 1 or more or an integer of 2 or more representing the number of terminals.

FIGS. 32A, 32B, 32C, and 32D illustrate a configuration example of data-symbol including frame group 3003 present in the time period from t4 to t5 in FIG. 30 and transmitted by base station #1 labeled 901_1. Incidentally, in FIGS. 32A, 32B, 32C, and 32D, horizontal axes represent time.

Figure 32A:
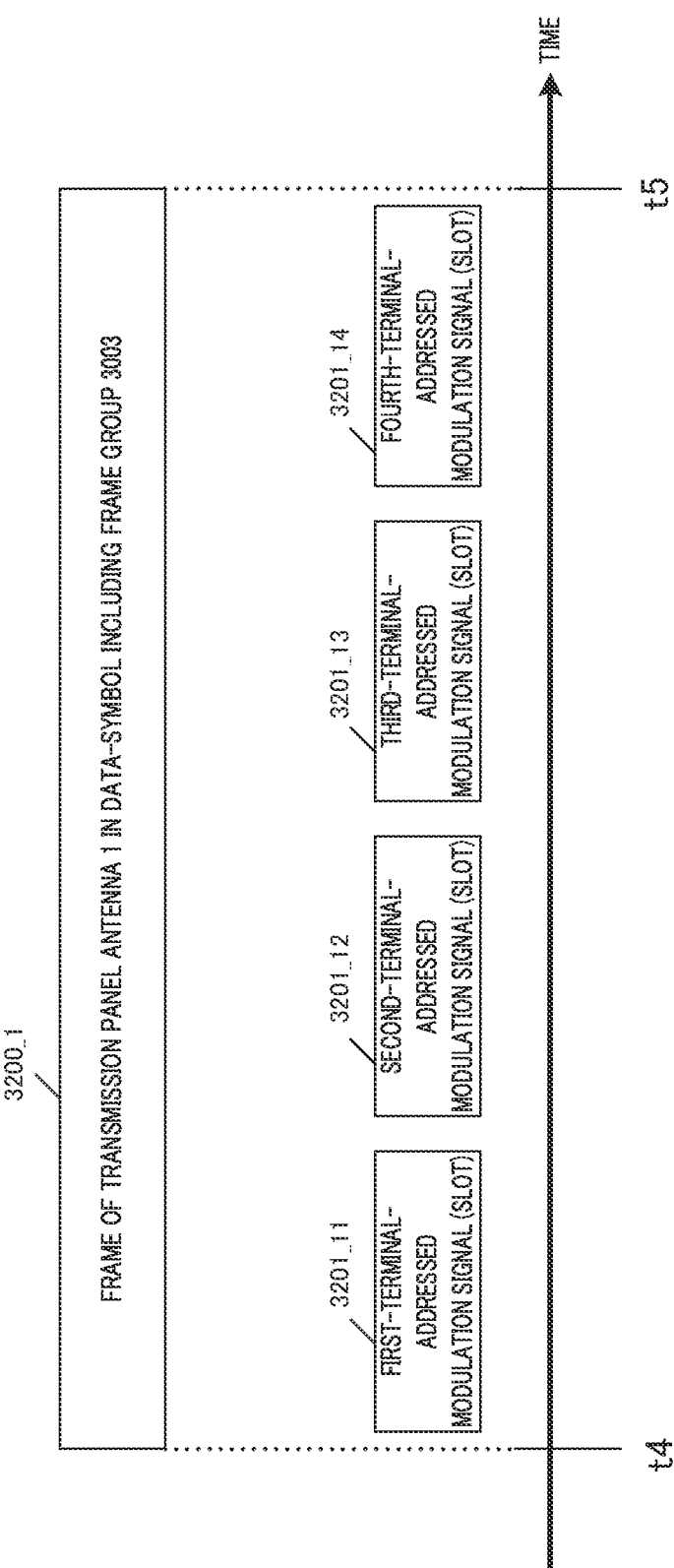
FIG. 32A illustrates a configuration example of a data-symbol including frame groups present in a time period from t4 to t5 according to Embodiment 3.
Figure 32B:
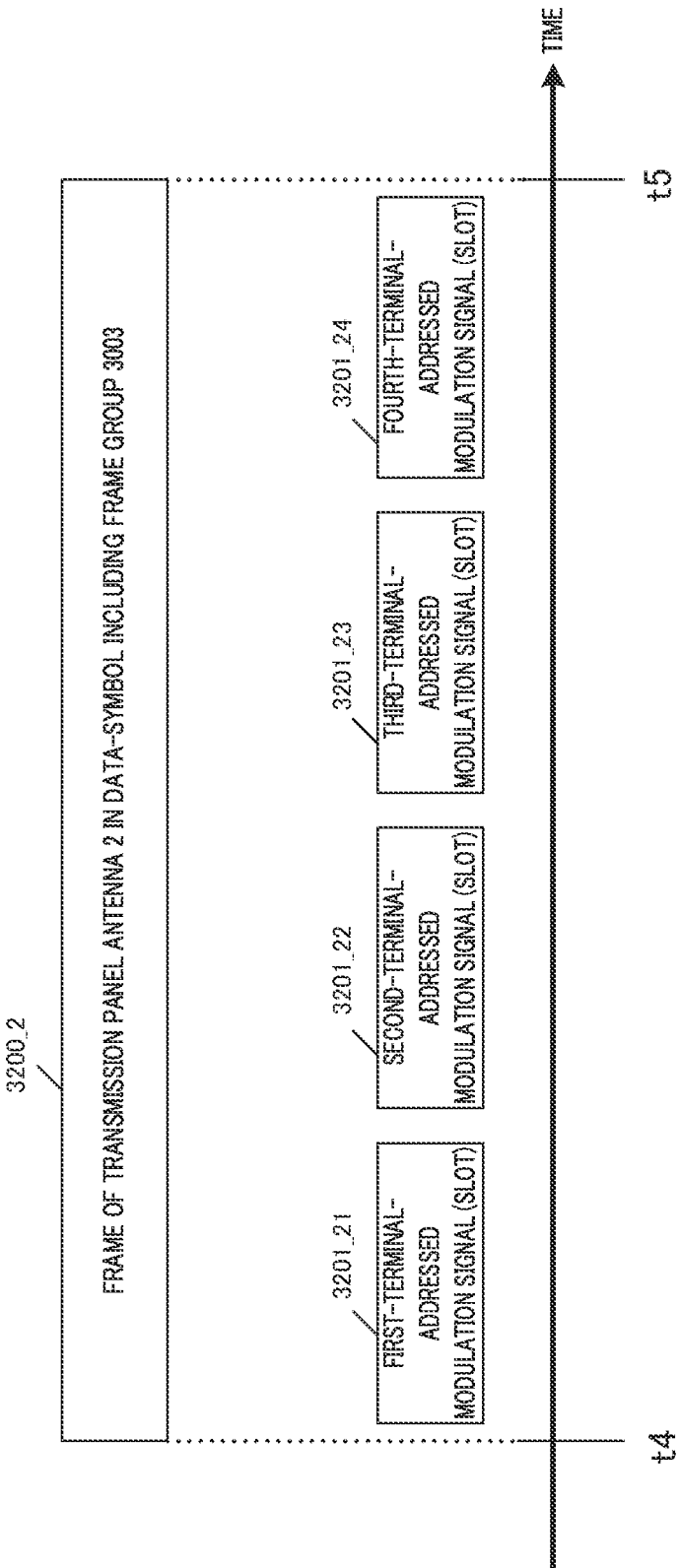
FIG. 32B illustrates the configuration example of the data-symbol including frame groups present in the time period from t4 to t5 according to Embodiment 3.
Figure 32C:
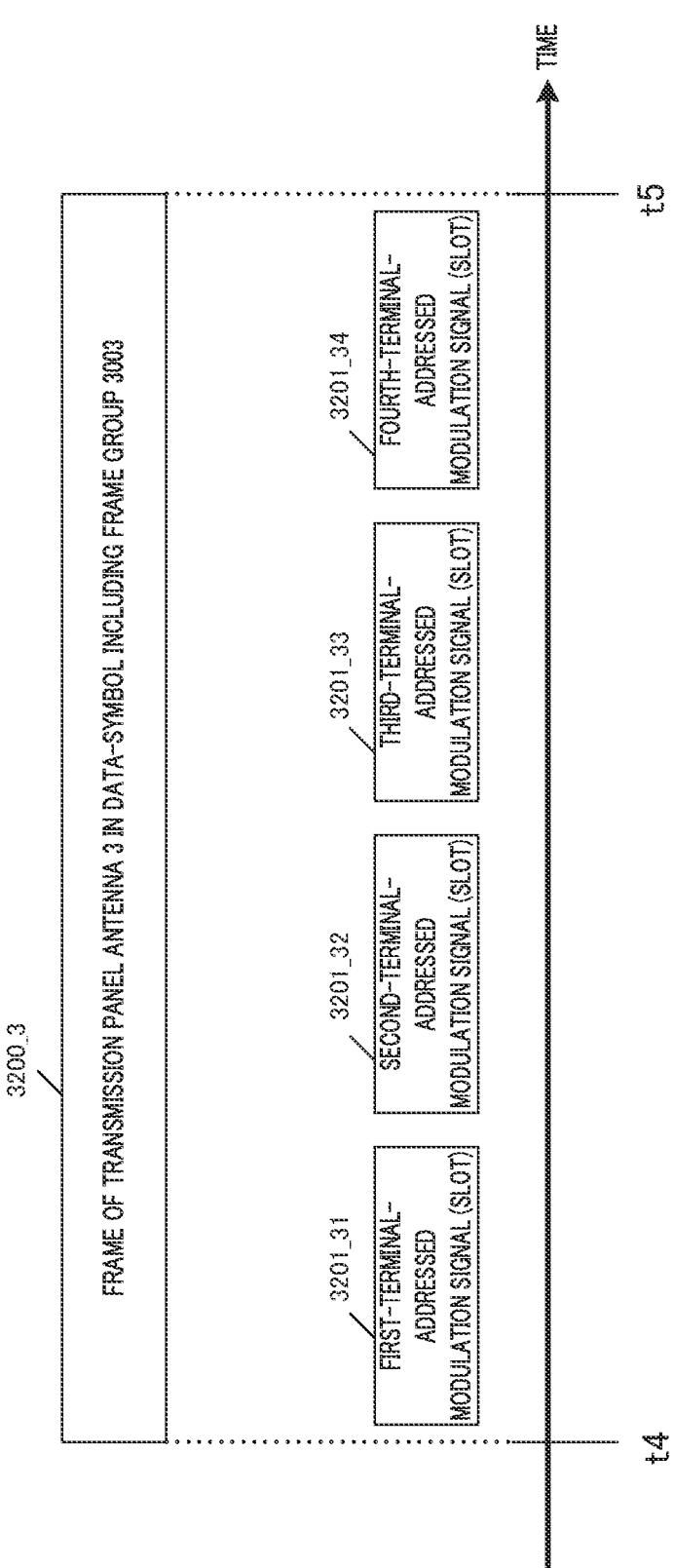
FIG. 32C illustrates the configuration example of the data-symbol including frame groups present in the time period from t4 to t5 according to Embodiment 3.
Figure 32D:
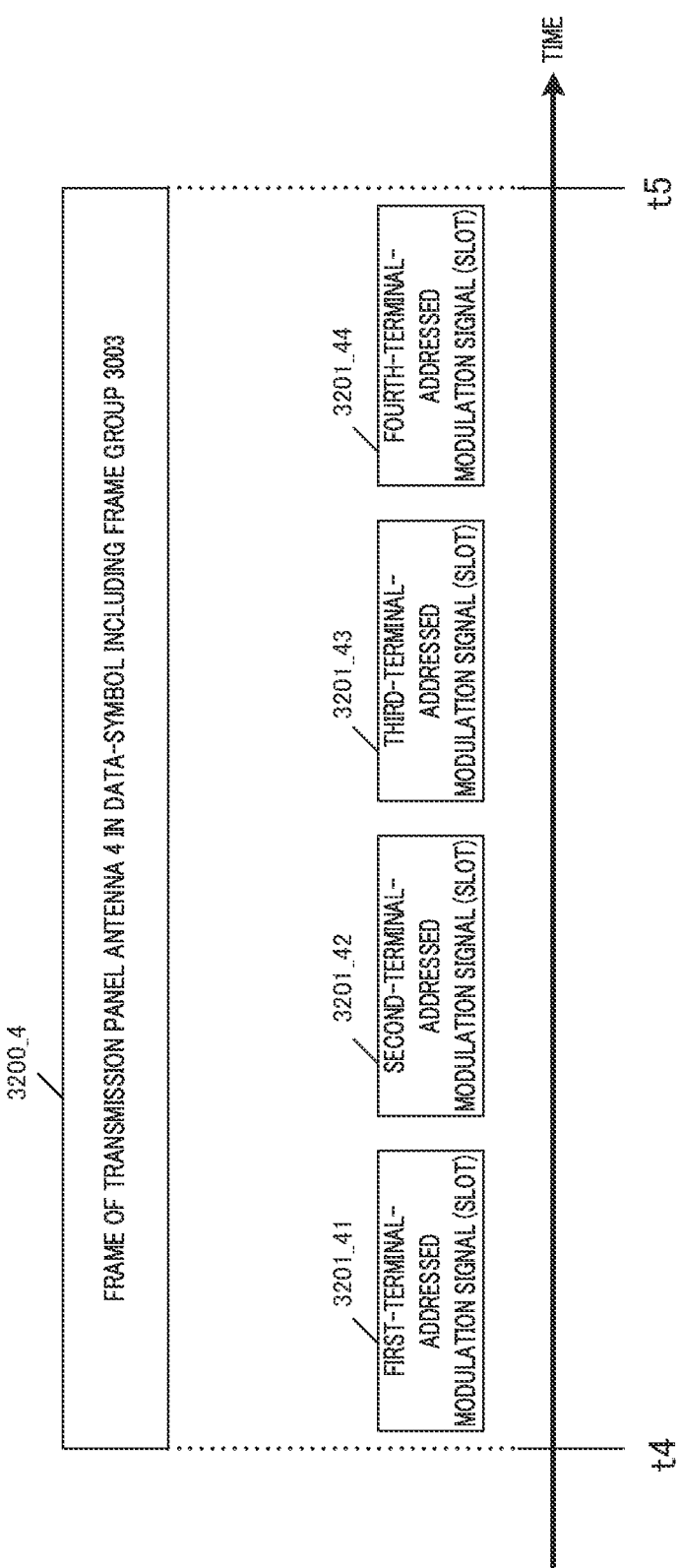
FIG. 32D illustrates the configuration example of the data-symbol including frame groups present in the time period from t4 to t5 according to Embodiment 3.

Further, FIG. 32A is related to a feedback signal of transmission panel antenna 1 labeled 106_1 in data-symbol including frame group 3003. FIG. 32B is related to a feedback signal of transmission panel antenna 2 labeled 106_2 in data-symbol including frame group 3003. FIG. 32C is related to a feedback signal of transmission panel antenna 3 labeled 106_3 in data-symbol including frame group 3003. FIG. 32D is related to a feedback signal of transmission panel antenna 4 labeled 106_4 in data-symbol including frame group 3003.

In the example of FIG. 32A, since "the number of slots that can transmit the sector-sweep reference signal when the terminal transmits the sector-sweep reference signal (the number of terminals that can transmit the sector-sweep reference signal)" is 4, as illustrated in FIG. 32A, frame labeled 3200_1 of transmission panel antenna 1 in data-symbol including frame group 3003 includes modulation signals (slots) addressed to four terminals, such as first-terminal-addressed modulation signal (first-terminal-addressed slot) 3201_11, second-terminal-addressed modulation signal (second-terminal-addressed slot) 3201_12, third-terminal-addressed modulation signal (third-terminal-addressed slot) 3201_13, and fourth-terminal-addressed modulation signal (fourth-terminal-addressed slot) 3201_14. Incidentally, for example, in a case where "the number of slots that can transmit the sector-sweep reference signal when the terminal transmits the sector-sweep reference signal (the number of terminals that can transmit the sector-sweep reference signal)" is Ω, frame labeled 3200_1 of transmission panel antenna 1 in data-symbol including frame group 3003 may be configured to include modulation signal (slot) groups addressed to Ω terminals. Provided that, Ω is an integer of 1 or more or an integer of 2 or more representing the number of terminals.

A description has been given with the term "data-symbol including frame group," This is because the data-symbol including frame for transmission panel antenna 1 labeled 106_1 can be present, the data-symbol including frame for transmission panel antenna 2 labeled 106_2 can be present, the data-symbol including frame for transmission panel antenna 3 labeled 106_3 can be present, and the data-symbol including frame for transmission panel antenna 4 labeled 106_4 can be present.

In the example of FIG. 32B, since "the number of slots that can transmit the sector-sweep reference signal when the terminal transmits the sector-sweep reference signal (the number of terminals that can transmit the sector-sweep reference signal)" is 4, as illustrated in FIG. 32B, frame labeled 3200_2 of transmission panel antenna 2 in data-symbol including frame group 3003 includes modulation signals (slots) addressed to four terminals, such as first-terminal-addressed modulation signal (first-terminal-addressed slot) 3201_21, second-terminal-addressed modulation signal (second-terminal-addressed slot) 3201_22, third-terminal-addressed modulation signal (third-terminal-addressed slot) 3201_23, and fourth-terminal-addressed modulation signal (fourth-terminal-addressed slot) 3201_24. Incidentally, for example, in a case where "the number of slots that can transmit the sector-sweep reference signal when the terminal transmits the sector-sweep reference signal (the number of terminals that can transmit the sector-sweep reference signal)" is Ω, frame labeled 3200_2 of transmission panel antenna 2 in data-symbol including frame group 3003 may be configured to include modulation signal (slot) groups addressed to Ω terminals. Provided that, $\Omega$ is an integer of 1 or more or an integer of 2 or more representing the number of terminals.

In the example of FIG. 32C, since "the number of slots that can transmit the sector-sweep reference signal when the terminal transmits the sector-sweep reference signal (the number of terminals that can transmit the sector-sweep reference signal)" is 4, as illustrated in FIG. 32C, frame labeled 3200_3 of transmission panel antenna 3 in data-symbol including frame group 3003 includes modulation signals (slots) addressed to four terminals, such as first-terminal-addressed modulation signal (first-terminal-addressed slot) 3201_31, second-terminal-addressed modulation signal (second-terminal-addressed slot) 3201_32, third-terminal-addressed modulation signal (third-terminal-addressed slot) 3201_33, and fourth-terminal-addressed modulation signal (fourth-terminal-addressed slot) 3201_34. Incidentally, for example, in a case where "the number of slots that can transmit the sector-sweep reference signal when the terminal transmits the sector-sweep reference signal (the number of terminals that can transmit the sector-sweep reference signal)" is $\Omega$, frame labeled 3200_3 of transmission panel antenna 3 in data-symbol including frame group 3003 may be configured to include modulation signal (slot) groups addressed to $\Omega$ terminals. Provided that, $\Omega$ is an integer of 1 or more or an integer of 2 or more representing the number of terminals.

In the example of FIG. 32D, since "the number of slots that can transmit the sector-sweep reference signal when the terminal transmits the sector-sweep reference signal (the number of terminals that can transmit the sector-sweep reference signal)" is 4, as illustrated in FIG. 32D, frame labeled 3200_4 of transmission panel antenna 4 in data-symbol including frame group 3003 includes modulation signals (slots) addressed to four terminals, such as first-terminal-addressed modulation signal (first-terminal-addressed slot) 3201_41, second-terminal-addressed modulation signal (second-terminal-addressed slot) 3201_42, third-terminal-addressed modulation signal (third-terminal-addressed slot) 3201_43, and fourth-terminal-addressed modulation signal (fourth-terminal-addressed slot) 3201_44. Incidentally, for example, in a case where "the number of slots that can transmit the sector-sweep reference signal when the terminal transmits the sector-sweep reference signal (the number of terminals that can transmit the sector-sweep reference signal)" is $\Omega$, frame labeled 3200_4 of transmission panel antenna 4 in data-symbol including frame group 3003 may be configured to include modulation signal (slot) groups addressed to $\Omega$ terminals. Provided that, $\Omega$ is an integer of 1 or more or an integer of 2 or more representing the number of terminals.

Figure 33:
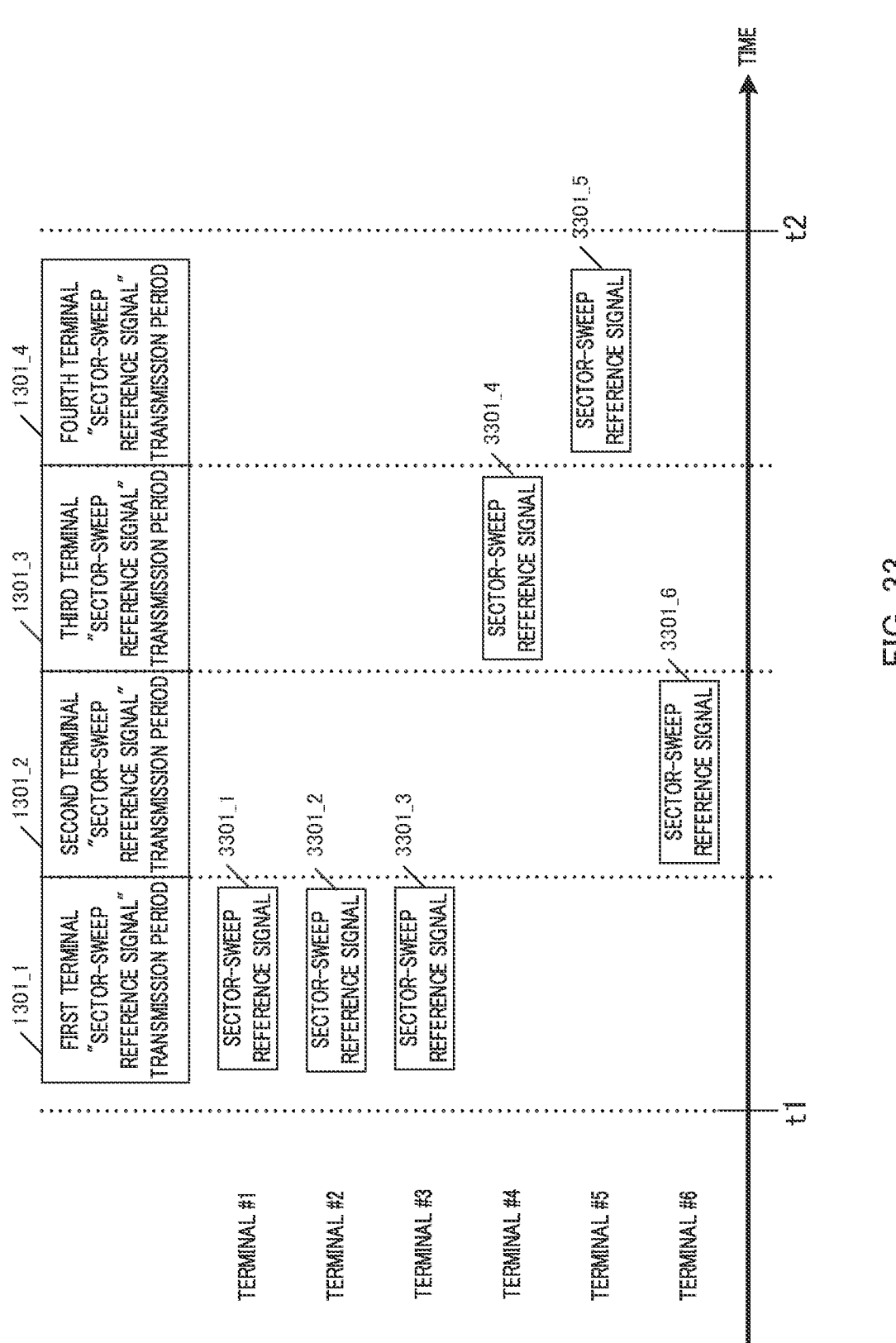
FIG. 33 illustrates an example related to occupation by terminals for transmission periods for "sector-sweep reference signal" for terminals according to Embodiment 3.

FIG. 33 illustrates an example related to the occupation by the terminals for transmission periods for "sector-sweep reference signal" for the terminals according to the present embodiment. Note that, FIG. 33 illustrates an example related to the occupation by the terminals for the time periods illustrated in FIG. 13 for first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4.

For example, as illustrated in FIG. 33, it is assumed that: terminal #1 labeled 902_1 transmits sector-sweep reference signal 3301_1 to first terminal "sector-sweep reference signal" transmission period labeled 1301_1; terminal #2 labeled 902_2 transmits sector-sweep reference signal 3301_2 to first terminal "sector-sweep reference signal"

transmission period labeled 1301_1; terminal #3 labeled 902_3 transmits sector-sweep reference signal 3301_3 to first terminal "sector-sweep reference signal" transmission period labeled 1301_1; terminal #4 labeled 902_4 transmits sector-sweep reference signal 3301_4 to third terminal "sector-sweep reference signal" transmission period labeled 1301_3; terminal #5 labeled 902_5 transmits sector-sweep reference signal 3301_5 to fourth terminal "sector-sweep reference signal" transmission period labeled 1301_4; and terminal #6 labeled 902_6 transmits sector-sweep reference signal 3301_6.

Note that, as to the information to be transmitted by sector-sweep reference signal 3301_1 transmitted by terminal #1 labeled 902_1, the same description as that in Embodiment 1, Embodiment 2, and/or the like is applied.

As to the information to be transmitted by sector-sweep reference signal 3301_2 transmitted by terminal #2 labeled 902_2, the same description as that in Embodiment 1, Embodiment 2, and/or the like is applied.

As to the information to be transmitted by sector-sweep reference signal 3301_3 transmitted by terminal #3 labeled 902_3, the same description as that in Embodiment 1, Embodiment 2, and/or the like is applied.

As to the information to be transmitted by sector-sweep reference signal 3301_1 transmitted by terminal #4 labeled 2902_4, the same description as that in Embodiment 1. Embodiment 2, and/or the like is applied.

As to the information to be transmitted by sector-sweep reference signal 3301_5 transmitted by terminal #5 labeled 2902_5, the same description as that in Embodiment 1, Embodiment 2, and/or the like is applied.

As to the information to be transmitted by sector-sweep reference signal 3301_6 transmitted by terminal #6 labeled 2902_6, the same description as that in Embodiment 1, Embodiment 2, and/or the like is applied.

A description will be given with reference to FIGS. 34A to 34D of the time period from t2 to t3 when the time period from t1 to t2 is as the example illustrated in FIG. 33.

Figure 34A:
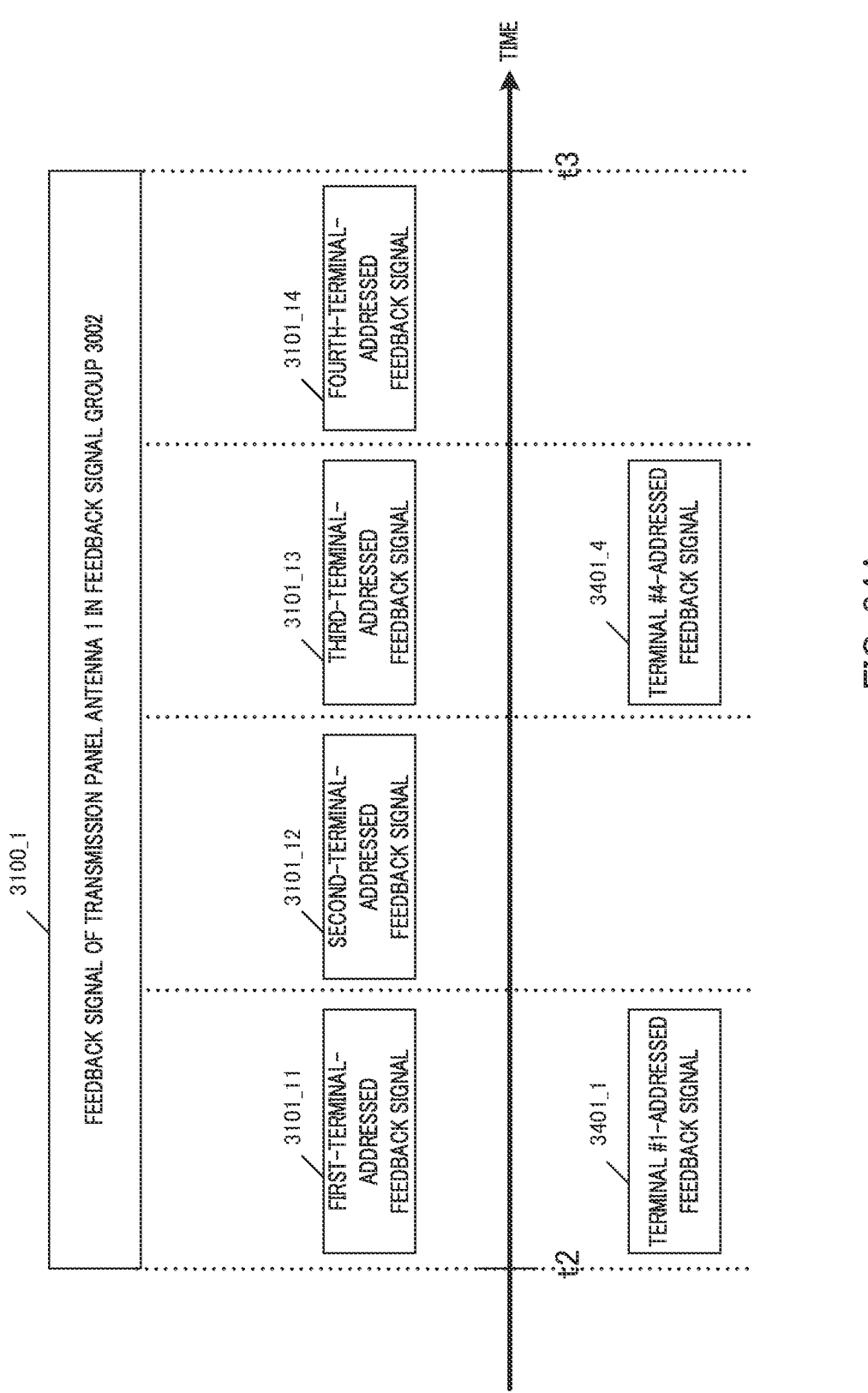
FIG. 34A illustrates another configuration example of a feedback signal group present in a time period from t2 to t3 according to Embodiment 3.

In this case, as illustrated in FIG. 34A, base station #1 labeled 901_1 transmits "terminal #1-addressed feedback signal labeled 3401_1" as "first-terminal-addressed feedback signal labeled 3101_11" in "feedback signal labeled 3100_1 of transmission panel antenna 1 in feedback signal group 3002."

Then, as illustrated in FIG. 34A, base station #1 labeled 901_1 transmits "terminal #4-addressed feedback signal labeled 3401_4" as "third-terminal-addressed feedback signal labeled 3101_13" in "feedback signal labeled 3100_1 of transmission panel antenna 1 in feedback signal group 3002."

Figure 34B:
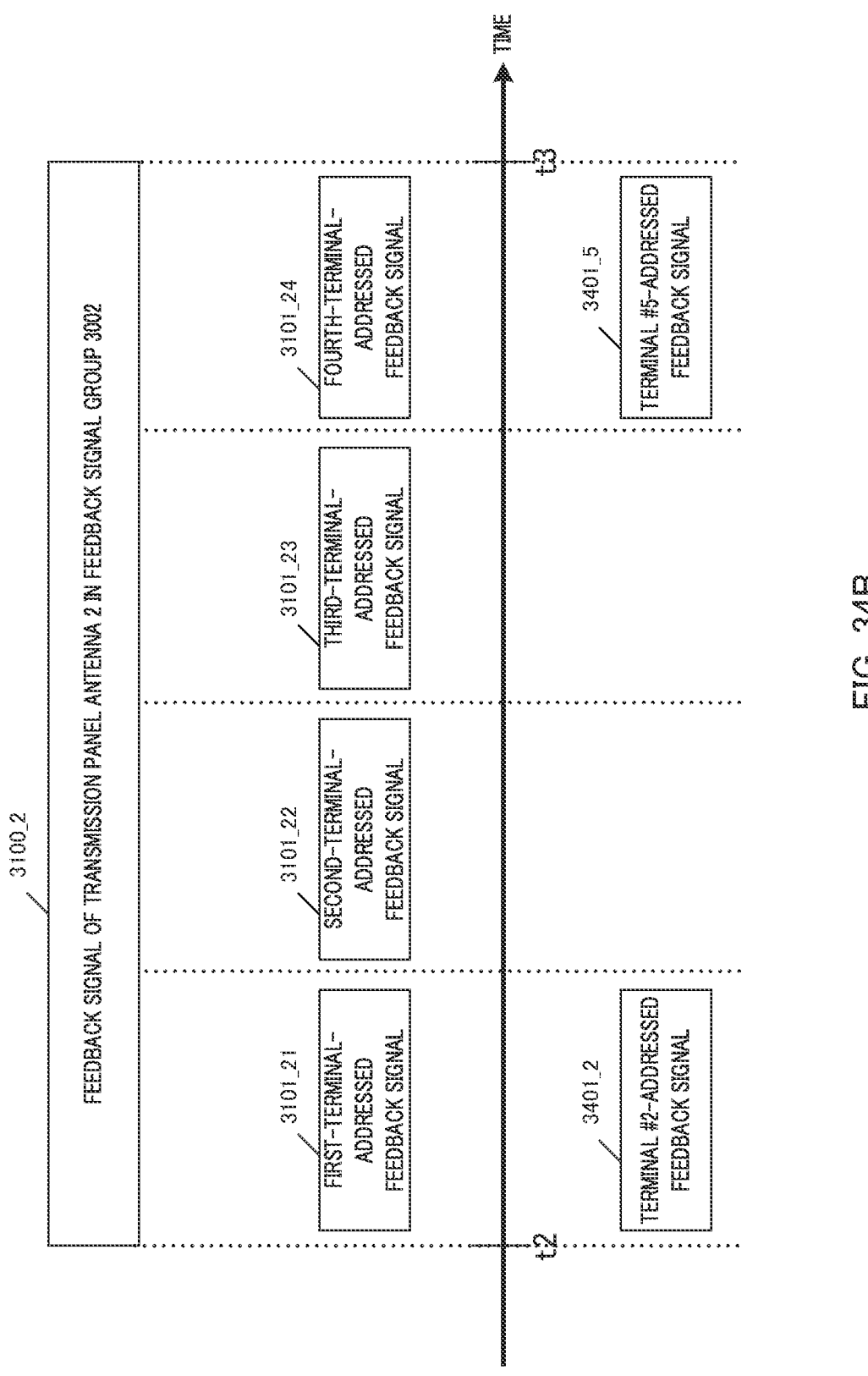
FIG. 34B illustrates the other configuration example of the feedback signal group present in the time period from t2 to t3 according to Embodiment 3.

Moreover, as illustrated in FIG. 34B, base station #1 labeled 901_1 transmits "terminal #2-addressed feedback signal labeled 3401_2" as "first-terminal-addressed feedback signal labeled 3101_21" in "feedback signal labeled 3100_2 of transmission panel antenna 2 in feedback signal group 3002."

Furthermore, as illustrated in FIG. 34B, base station #1 labeled 901_1 transmits "terminal #5-addressed feedback signal labeled 3401_5" as "fourth-terminal-addressed feedback signal labeled 3101_24" in "feedback signal labeled 3100_2 of transmission panel antenna 2 in feedback signal group 3002."

Figure 34C:
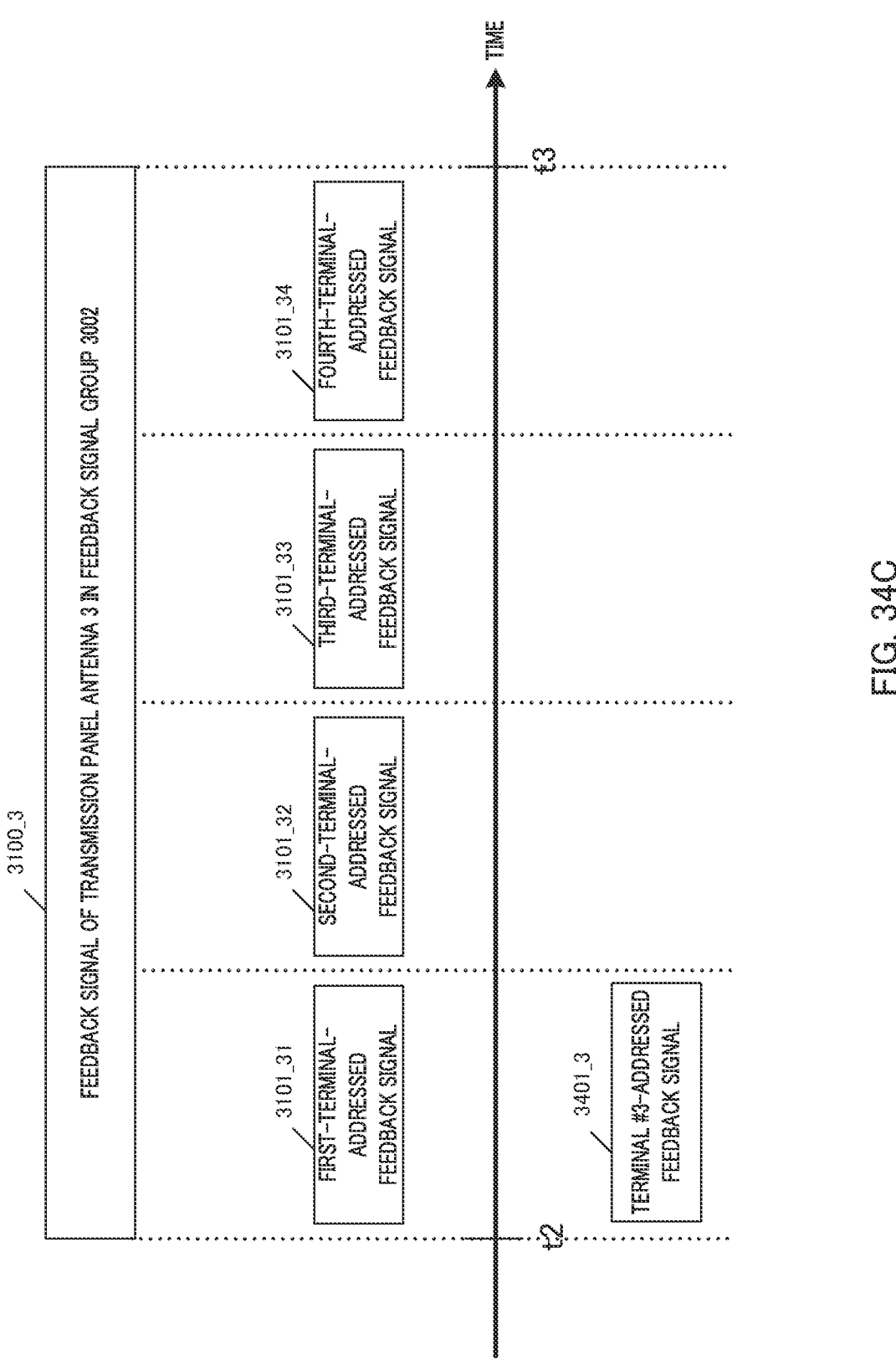
FIG. 34C illustrates the other configuration example of the feedback signal group present in the time period from t2 to t3 according to Embodiment 3.

As illustrated in FIG. 34C, base station #1 labeled 901_1 transmits "terminal #3-addressed feedback signal labeled 3401_3" as "first-terminal-addressed feedback signal labeled 3101_31" in "feedback signal labeled 3100_3 of transmission panel antenna 3 in feedback signal group 3002."

Figure 34D:
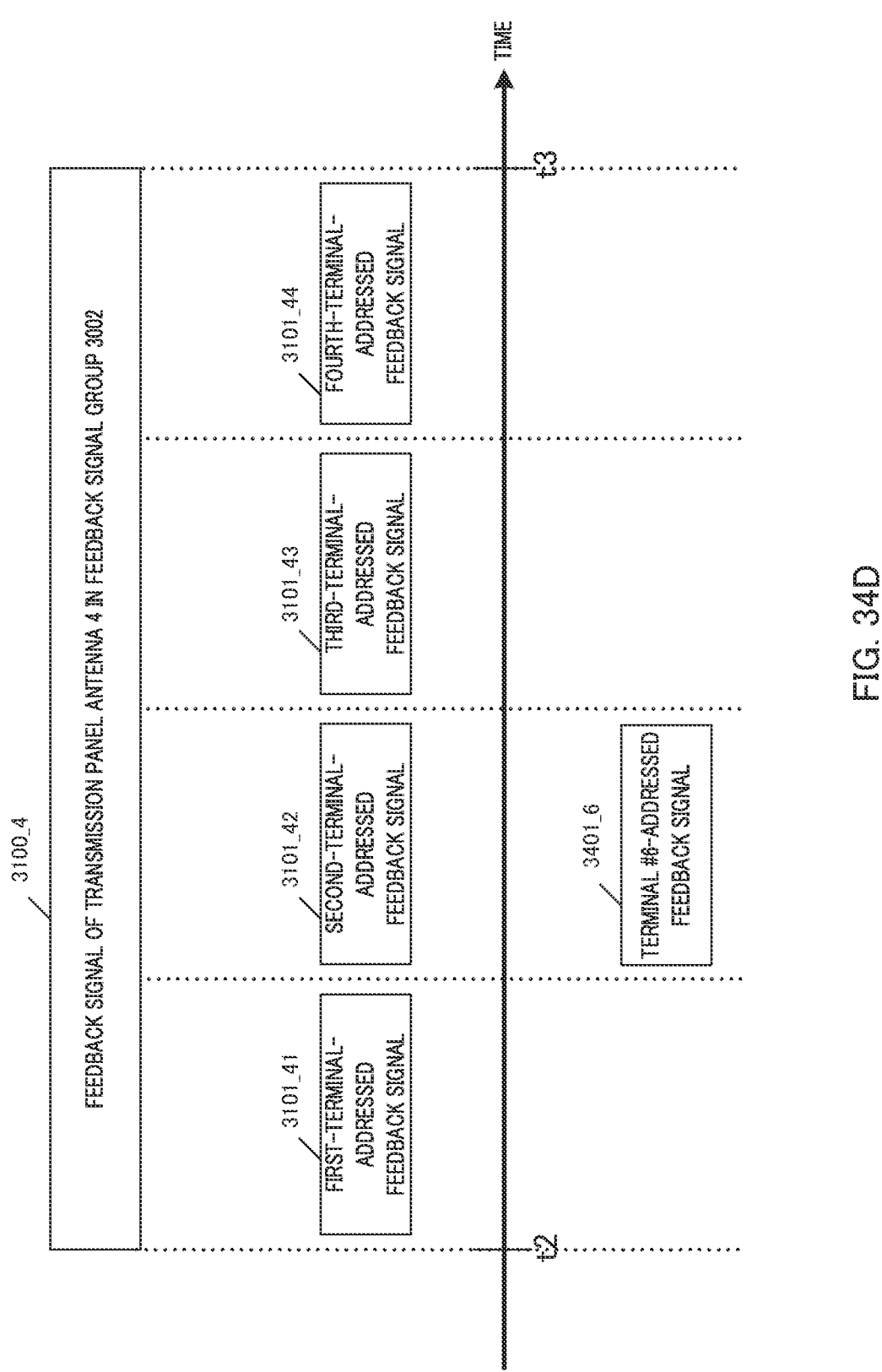
FIG. 34D illustrates the other configuration example of the feedback signal group present in the time period from t2 to t3 according to Embodiment 3.

As illustrated in FIG. 34D, base station #1 labeled 901_1 transmits "terminal #6-addressed feedback signal labeled 3401_6" as "second-terminal-addressed feedback signal labeled 3101_42" in "feedback signal labeled 3100_4 of transmission panel antenna 4 in feedback signal group 3002."

At this time, "terminal #1-addressed feedback signal labeled 3401_1" of FIG. 34A includes, for example, information indicating that terminal #1 labeled 902_1 can perform communication (with base station #1 labeled 901_1), using transmission panel antenna 1 labeled 106_1.

In addition. "terminal #4-addressed feedback signal labeled 3401_4" of FIG. 34A includes, for example, information indicating that terminal #4 labeled 2902_4 can perform communication (with base station #1 labeled 901_1), using transmission panel antenna 1 labeled 106_1.

"Terminal #2-addressed feedback signal labeled 3401_2" of FIG. 34B includes, for example, information indicating that terminal #2 labeled 902_2 can perform communication (with base station #1 labeled 901_1), using transmission panel antenna 2 labeled 106_2.

In addition, "terminal #5-addressed feedback signal labeled 3401_5" of FIG. 34B includes, for example, information indicating that terminal #5 labeled 2902_5 can perform communication (with base station #1 labeled 901_1), using transmission panel antenna 2 labeled 106_2.

"Terminal #3-addressed feedback signal labeled 3401_3" of FIG. 34C includes, for example, information indicating that terminal #3 labeled 902_3 can perform communication (with base station #1 labeled 901_1), using transmission panel antenna 3 labeled 106_3.

"Terminal #6-addressed feedback signal labeled 3401_6" of FIG. 34D includes, for example, information indicating that terminal #6 labeled 2902_6 can perform communication (with base station #1 labeled 901_1), using transmission panel antenna 4 labeled 106_4.

Further, the feedback signal addressed to each terminal may include other information. As to the example thereof, the same description as that in Embodiment 1, Embodiment 2, and/or the like is applied.

Incidentally, base station #1 labeled 901_1 selects the transmission panel antenna (selects transmission panel antenna 1 as in FIG. 34A), configures a beamforming parameter, and transmits terminal #1-addressed feedback signal 3401_1, based on sector-sweep reference signal 3301_1 of FIG. 33 transmitted by terminal #1 labeled 902_1.

Base station #1 labeled 901_1 selects the transmission panel antenna (selects transmission panel antenna 2 as in FIG. 34B), configures a beamforming parameter, and transmits terminal #2-addressed feedback signal 3401_2, based on sector-sweep reference signal 3301_2 of FIG. 33 transmitted by terminal #2 labeled 902_2.

Base station #1 labeled 901_1 selects the transmission panel antenna (selects transmission panel antenna 3 as in FIG. 34C), configures a beamforming parameter, and transmits terminal #3-addressed feedback signal 3401_3, based on sector-sweep reference signal 3301_3 of FIG. 33 transmitted by terminal #3 labeled 902_3.

Base station #1 labeled 901_1 selects the transmission panel antenna (selects transmission panel antenna 1 as in FIG. 34A), configures a beamforming parameter, and transmits terminal #4-addressed feedback signal 3401_4, based on sector-sweep reference signal 3301_4 of FIG. 33 transmitted by terminal #4 labeled 2902_4.

Base station #1 labeled 901_1 selects the transmission panel antenna (selects transmission panel antenna 2 as in FIG. 34B), configures a beamforming parameter, and transmits terminal #5-addressed feedback signal 3401_5, based on sector-sweep reference signal 3301_5 of FIG. 33 transmitted by terminal #5 labeled 2902_5.

Base station #1 labeled 901_1 selects the transmission panel antenna (selects transmission panel antenna 4 as in FIG. 34D), configures a beamforming parameter, and transmits terminal #6-addressed feedback signal 3401_6 based on sector-sweep reference signal 3301_6 of FIG. 33 transmitted by terminal #6 labeled 2902_6.

Next, a description will be given with reference to FIGS. 35A to 35D of the time period from t4 to t5 when the time period from t2 to t3 is as the example illustrated in FIGS. 34A to 34D.

Figure 35A:
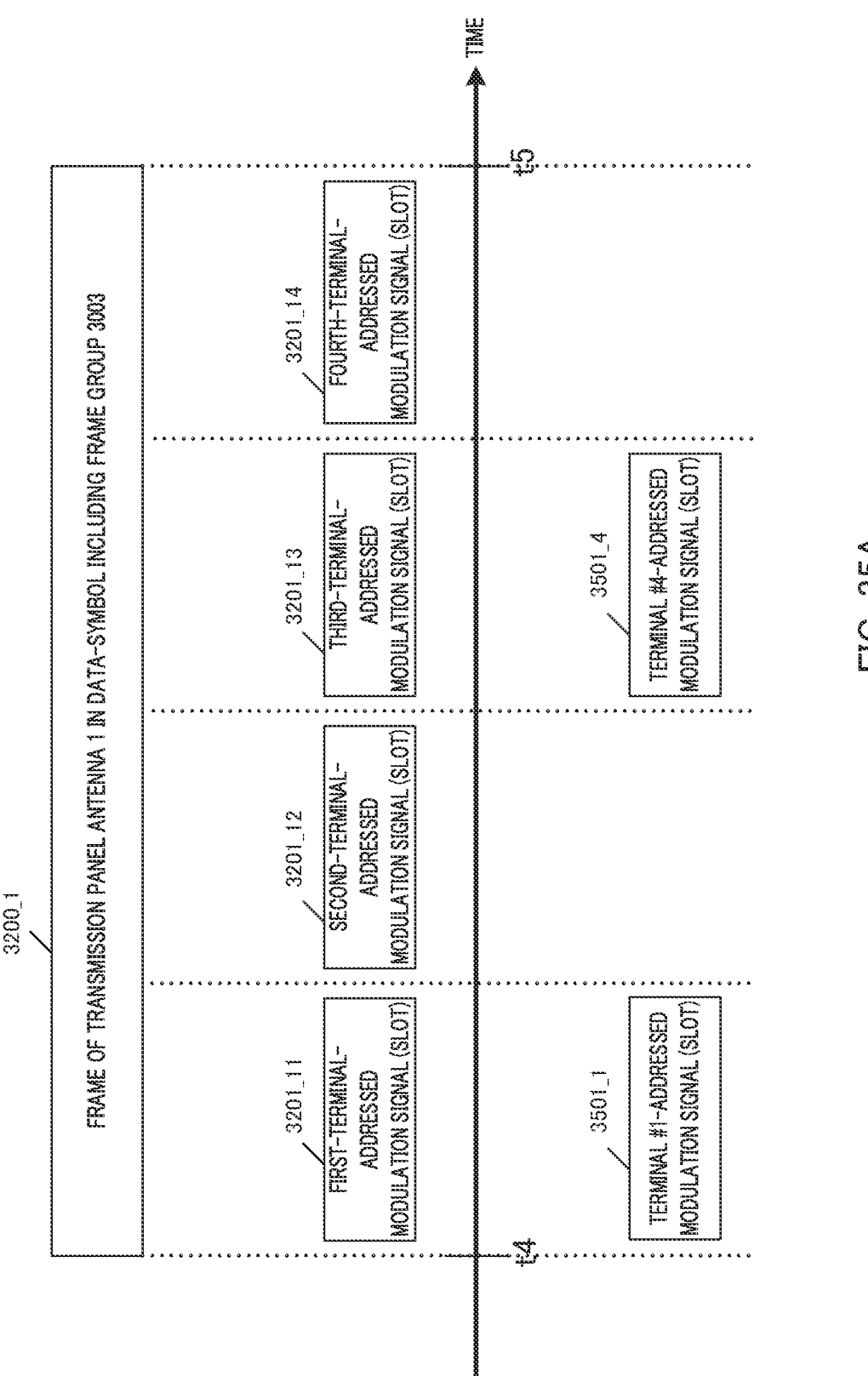
FIG. 35A illustrates another configuration example of a data-symbol including frame groups present in a time period from t4 to t5 according to Embodiment 3.

For example, as illustrated in FIG. 35A, base station #1 labeled 901_1 transmits "terminal #1-addressed modulation signal (slot) labeled 3501_1" as "first-terminal-addressed modulation signal (slot) labeled 3201_11" in "frame labeled 3200_1 of transmission panel antenna 1 in data-symbol including frame group 3003." Incidentally, "terminal #1-addressed modulation signal (slot) labeled 3501_1" includes data addressed to terminal #1 labeled 902_1. In addition, "terminal #1-addressed modulation signal (slot) labeled 3501_1" is transmitted using transmission panel antenna 1. The method for configuring the transmission method of "terminal #1-addressed modulation signal (slot) labeled 3501_1" is as described in Embodiment 1, Embodiment 2, and the like. For example, as described in Embodiment 2, a plurality of modulation signals (slots) may be assigned to one terminal.

In addition, as illustrated in FIG. 35A, base station #1 labeled 901_1 transmits "terminal #4-addressed modulation signal (slot) labeled 3501_4" as "third-terminal-addressed modulation signal (slot) labeled 3201_13" in "frame labeled 3200_1 of transmission panel antenna 1 in data-symbol including frame group 3003." Incidentally, "terminal #4-addressed modulation signal (slot) labeled 3501_4" includes data addressed to terminal #4 labeled 2902_4. In addition, "terminal #4-addressed modulation signal (slot) labeled 3501_4" is transmitted using transmission panel antenna 1. The method for configuring the transmission method of "terminal #4-addressed modulation signal (slot) labeled 3501_4" is as described in Embodiment 1, Embodiment 2, and the like. For example, as described in Embodiment 2, a plurality of modulation signals (slots) may be assigned to one terminal.

Figure 35B:
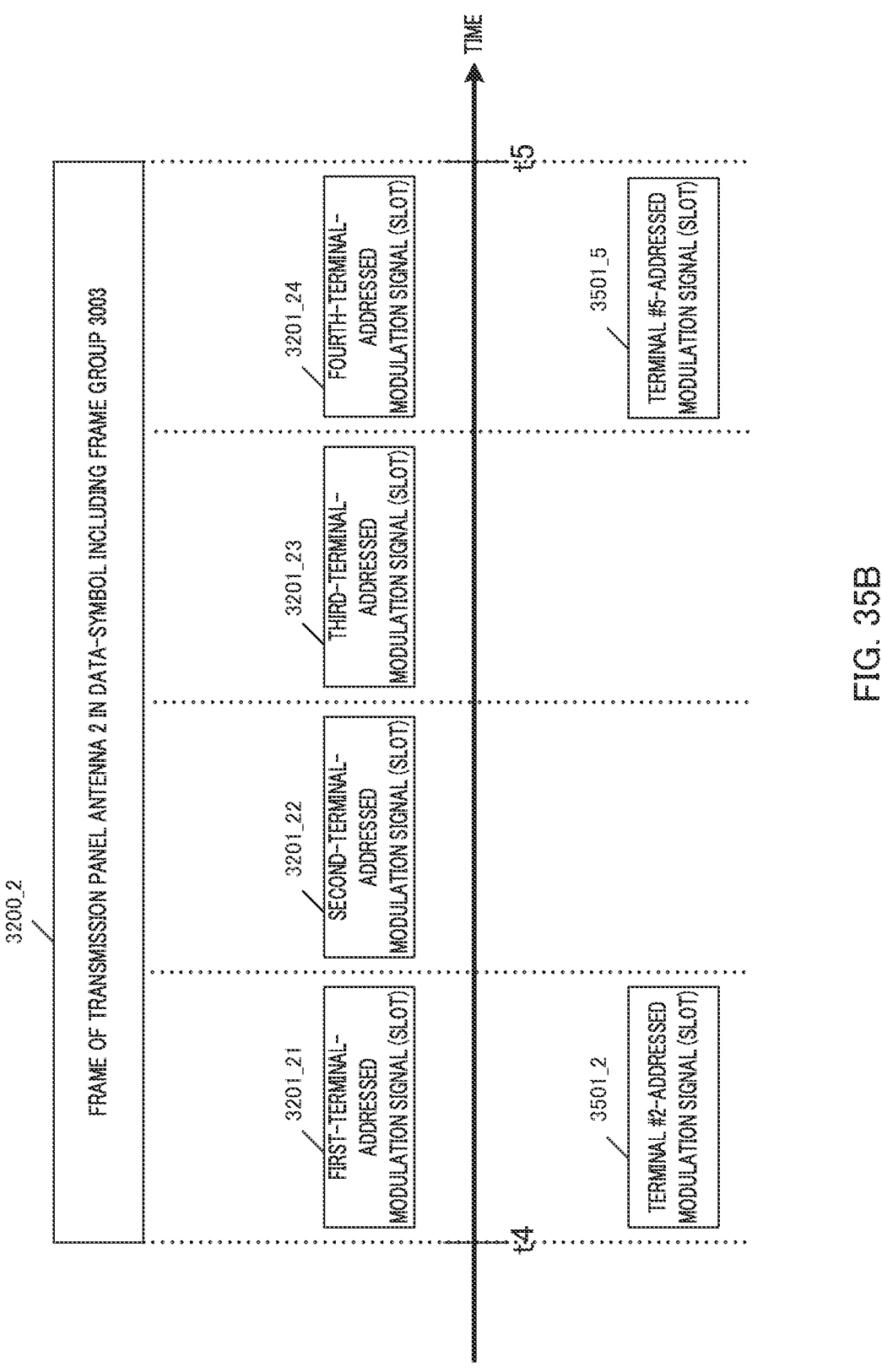
FIG. 35B illustrates the other configuration example of the data-symbol including frame groups present in the time period from t4 to t5 according to Embodiment 3.

As illustrated in FIG. 35B, base station #1 labeled 901_1 transmits "terminal #2-addressed modulation signal (slot) labeled 3501_2" as "first-terminal-addressed modulation signal (slot) labeled 3201_21" in "frame labeled 3200_2 of transmission panel antenna 2 in data-symbol including frame group 3003." Incidentally, "terminal #2-addressed modulation signal (slot) labeled 3501_2" includes data addressed to terminal #2 labeled 902_2. In addition, "terminal #2-addressed modulation signal (slot) labeled 3501_2" is transmitted using transmission panel antenna 2. The method for configuring the transmission method of "terminal #2-addressed modulation signal (slot) labeled 3501_2" is as described in Embodiment 1, Embodiment 2, and the like. For example, as described in Embodiment 2, a plurality of modulation signals (slots) may be assigned to one terminal.

In addition, as illustrated in FIG. 35B, base station #1 labeled 901_1 transmits "terminal #5-addressed modulation signal (slot) labeled 3501_5" as "fourth-terminal-addressed modulation signal (slot) labeled 3201_24" in "frame labeled 3200_2 of transmission panel antenna 2 in data-symbol including frame group 3003." Incidentally, "terminal #5-addressed modulation signal (slot) labeled 3501_5" includes data addressed to terminal #5 labeled 2902_5. In addition, "terminal #5-addressed modulation signal (slot) labeled 3501_5" is transmitted using transmission panel antenna 2. The method for configuring the transmission method of "terminal #5-addressed modulation signal (slot) labeled 3501_5" is as described in Embodiment 1, Embodiment 2, and the like. For example, as described in Embodiment 2, a plurality of modulation signals (slots) may be assigned to one terminal.

Figure 35C:
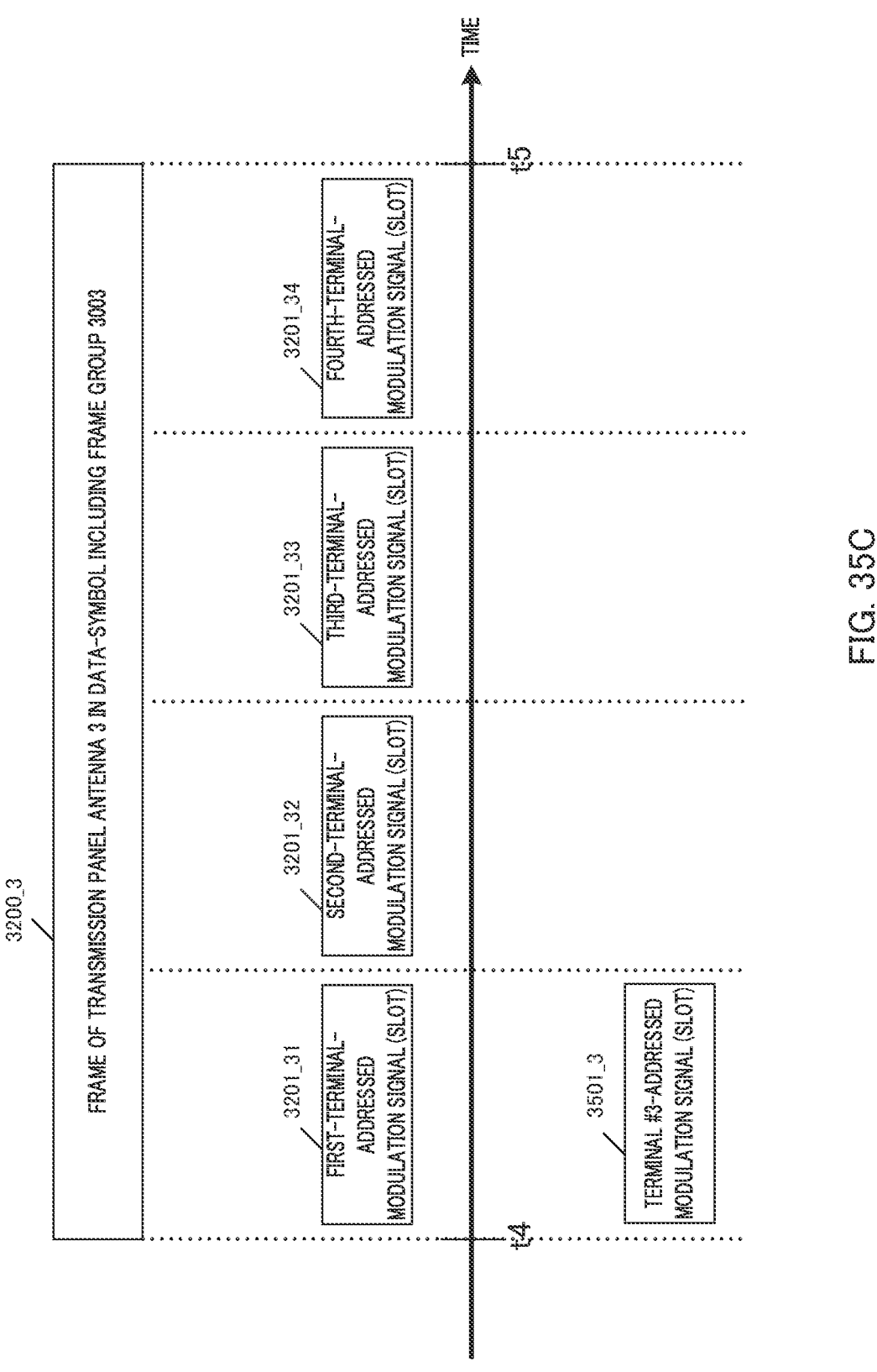
FIG. 35C illustrates the other configuration example of the data-symbol including frame groups present in the time period from t4 to t15 according to Embodiment 3.

As illustrated in FIG. 35C, base station #1 labeled 901_1 transmits "terminal #3-addressed modulation signal (slot) labeled 3501_3" as "first-terminal-addressed modulation signal (slot) labeled 3201_31" in "frame labeled 3200_3 of transmission panel antenna 3 in data-symbol including frame group 3003." Incidentally, "terminal #3-addressed modulation signal (slot) labeled 3501_3" includes data addressed to terminal #3 labeled 902_3. In addition, "terminal #3-addressed modulation signal (slot) labeled 3501_3" is transmitted using transmission panel antenna 3. The method for configuring the transmission method of "terminal #3-addressed modulation signal (slot) labeled 3501_3" is as described in Embodiment 1, Embodiment 2, and the like. For example, as described in Embodiment 2, a plurality of modulation signals (slots) may be assigned to one terminal.

Figure 35D:
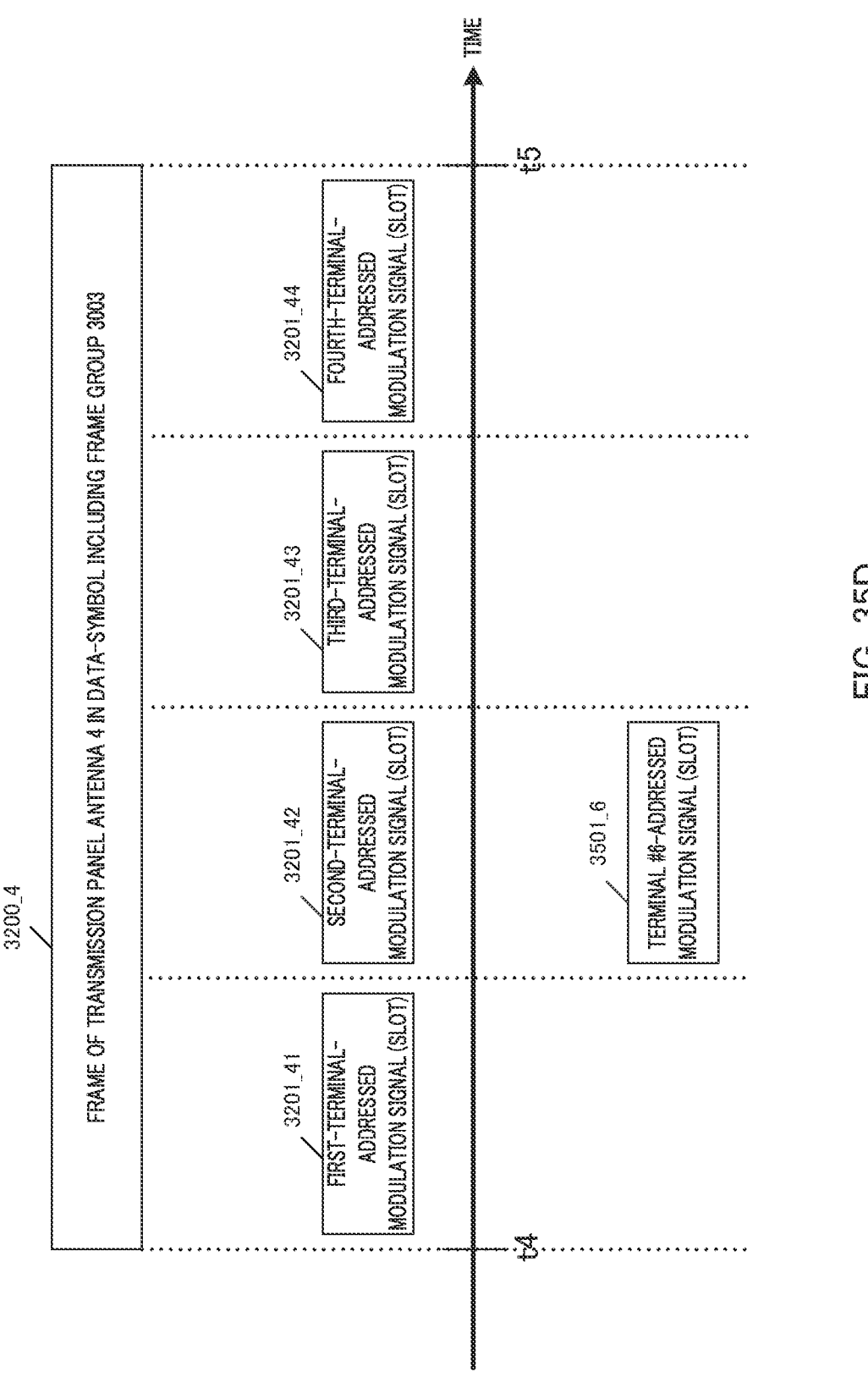
FIG. 35D illustrates the other configuration example of the data-symbol including frame groups present in the time period from t4 to t5 according to Embodiment 3.

In addition, as illustrated in FIG. 35D, base station #1 labeled 901_1 transmits "terminal #6-addressed modulation signal (slot) labeled 3501_6" as "second-terminal-addressed modulation signal (slot) labeled 3201_42" in "frame labeled 3200_4 of transmission panel antenna 4 in data-symbol including frame group 3003." Incidentally, "terminal #6-addressed modulation signal (slot) labeled 3501_6" includes data addressed to terminal #6 labeled 2902_6. In addition, "terminal #6-addressed modulation signal (slot) labeled 3501_6" is transmitted using transmission panel antenna 4. The method for configuring the transmission method of "terminal #6-addressed modulation signal (slot) labeled 3501_6" is as described in Embodiment 1, Embodiment 2, and the like. For example, as described in Embodiment 2, a plurality of modulation signals (slots) may be assigned to one terminal.

Incidentally, "terminal #1-addressed modulation signal (slot) labeled 3501_1" of FIG. 35A may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

Moreover, "terminal #4-addressed modulation signal (slot) labeled 3501_4" of FIG. 35A may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

"Terminal #2-addressed modulation signal (slot) labeled 3501_2" of FIG. 35B may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

In addition, "terminal #5-addressed modulation signal (slot) labeled 3501_5" of FIG. 35B may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

"Terminal #3-addressed modulation signal (slot) labeled 3501_3" of FIG. 35C may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

"Terminal #6-addressed modulation signal (slot) labeled 3501_6" of FIG. 35D may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

As described above, base station #1 labeled 901_1 assigns a symbol for a terminal serving as a destination to a modulation signal to be transmitted for each transmission panel antenna, that is, the modulation signal is assigned for each transmission panel antenna; thus, it is possible to obtain an effect of improving data transmission efficiency in the system. In addition, the terminal transmits the sector-sweep reference signal so as to reduce the occurrence number of collisions, and thereby, an effect can be obtained in which a communication capacity in the system configured of the base station and the terminal is improved.

Next, a description will be given of a communication situation in an exemplary communication state illustrated in FIG. 29. The communication situation in the exemplary communication state illustrated in FIG. 29 may be the same as in FIGS. 26 and 27. Hereinafter, an example of a communication situation will be described with reference to FIGS. 26 and 27.

FIG. 26 illustrates an example of a situation where base station #1 labeled 901_1 and "terminal #1 labeled 902_1, terminal #2 labeled 902_2, terminal #3 labeled 902_3, terminal #4 labeled 2902_4, terminal #5 labeled 2902_5, and terminal #6 labeled 2902_6" communicate with each other in FIG. 29. FIG. 26 illustrates in (A) an example of a transmission situation of the modulation signal of base station #1 labeled 901_1, and FIG. 26 illustrates in (B) an example of a transmission situation of the modulation signal of "terminal #1 labeled 902_1, terminal #2 labeled 902_2, terminal #3 labeled 902_3, terminal #4 labeled 2902_4, terminal #5 labeled 2902_5, and terminal #6 labeled 2902_6." Incidentally, in FIG. 26, horizontal axes represent time in (A) and (B). Note that, in FIG. 26, the components that operate in the same manner as in FIG. 18 are denoted by the same reference numerals.

First, base station #1 labeled 901_1 transmits sector-sweep reference signal 1801_1. Note that, this point has already been described with reference to FIG. 30, and a description thereof will be thus omitted.

Then, terminals such as "terminal #1 labeled 902_1, terminal #2 labeled 902_2, terminal #3 labeled 902_3, terminal #4 labeled 2902_4 terminal #5 labeled 2902_5, and terminal #6 labeled 2902_6" transmit sector-sweep reference signal 1851_1. Note that, this point has already been described with reference to, for example. FIGS. 13 and 14, and a description thereof will be thus omitted.

Base station #1 labeled 901_1 transmits feedback signal group 2602_1. Note that, this point has already been described with reference to FIGS. 31A, 31B, 31C, and 31D, and a description thereof will be thus omitted.

Then, base station #1 labeled 901_1 transmits "data-symbol including frame group 2603_1." Note that, this point has already been described with reference to FIGS. 32A, 32B, 32C, and 32D, and a description thereof will be thus omitted (Thus, "data-symbol including frame group 2603_1" is considered to be a frame for downlink, for example).

The terminals such as "terminal #1 labeled 902_1, terminal #2 labeled 902_2, terminal #3 labeled 902_3, terminal #4 labeled 2902_4 terminal #5 labeled 2902_5, and terminal #6 labeled 2902_6" transmit "data-symbol including frame group 2652_1." Note that, a configuration of the frame will be described later with reference to FIG. 36 (Thus, "data-symbol including frame group 2652_1" is considered to be a frame for uplink, for example).

Next, base station #1 labeled 901_1 transmits "data-symbol including frame group 2603_2." A configuration method of "data-symbol including frame group 2603_2" is as described with reference to FIGS. 32A, 32B, 32C, and 32D.

The terminals such as "terminal #1 labeled 902_1, terminal #2 labeled 902_2, terminal #3 labeled 902_3, terminal #4 labeled 2902_4, terminal #5 labeled 2902_5, and terminal #6 labeled 2902_6" transmit "data-symbol including frame group 2652_2." Note that, a configuration of the frame will be described later with reference to FIG. 36.

FIG. 27 illustrates an example of the transmission situation in the modulation signal of base station #1 labeled 901_1 and the transmission situation of the modulation signal in the terminals such as "terminal #1 labeled 902_1, terminal #2 labeled 902_2, terminal #3 labeled 902_3, terminal #4 labeled 2902_4, terminal #5 labeled 2902_5, and terminal #6 labeled 2902_6" after FIG. 26. Note that, in FIG. 27, the components that operate in the same manner as in FIG. 18 are denoted by the same reference numerals.

FIG. 27 illustrates in (A) an example of the transmission situation of the modulation signal in base station #1 labeled 901_1, and illustrates a temporal continuation of the transmission situation of the modulation signal in base station #1 labeled 901_1 in (A) of FIG. 26.

FIG. 27 illustrates in (B) an example of the transmission situation of the modulation signal in "terminal #1 labeled 902_1, terminal #2 labeled 902_2, terminal #3 labeled 902_3, terminal #4 labeled 2902_4, terminal #5 labeled 2902_5, and terminal #6 labeled 2902_6," and illustrates a temporal continuation of the transmission situation of the modulation signal in "terminal #1 labeled 902_1, terminal #2 labeled 902_2, terminal #3 labeled 902_3, terminal #4 labeled 2902_4, terminal #5 labeled 2902_5, and terminal #6 labeled 2902_6" in (B) of FIG. 26.

Incidentally, in FIG. 27, horizontal axes represent time in (A) and (B).

After FIG. 26 in (A) and (B), base station #1 labeled 901_1 transmits "data-symbol including frame group 2603_3." A configuration method of "data-symbol including frame group 2603_2" is as described with reference to FIGS. 32A, 32B, 32C, and 32D.

The terminals such as "terminal #1 labeled 902_1, terminal #2 labeled 902_2, terminal #3 labeled 902_3, terminal #4 labeled 2902_4, terminal #5 labeled 2902_5, and terminal #6 labeled 2902_6" transmit "data-symbol including frame group 2652_3." Note that, a configuration of the frame will be described later with reference to FIG. 36.

Next, base station #1 labeled 901_1 transmits sector-sweep reference signal 1801_2. Note that, this point has already been described with reference to FIG. 30, and a description thereof will be thus omitted.

Then, terminals such as "terminal #1 labeled 902_1, terminal #2 labeled 902_2, terminal #3 labeled 902_3, terminal #4 labeled 2902_4 terminal #5 labeled 2902_5, and terminal #6 labeled 2902_6" transmit sector-sweep reference signal 1851_2. Note that, this point has already been described with reference to, for example. FIGS. 13 and 14, and a description thereof will be thus omitted.

Base station #1 labeled 901_1 transmits feedback signal group 2602_2. Note that, this point has already been described with reference to FIGS. 31A, 31B, 31C, and 31D, and a description thereof will be thus omitted.

Then, base station #1 labeled 901_1 transmits "data-symbol including frame group 2603_4." Note that, this point has already been described with reference to FIGS. 32A, 32B, 32C, and 32D, and a description thereof will be thus omitted.

The terminals such as "terminal #1 labeled 902_1, terminal #2 labeled 902_2, terminal #3 labeled 902_3, terminal #4 labeled 2902_4 terminal #5 labeled 2902_5, and terminal #6 labeled 2902_6" transmit "data-symbol including frame group 2652_4." Note that, a configuration of the frame will be described later with reference to FIG. 36.

Thus, base station #1 labeled 901_1 and the terminals may transmit the sector-sweep reference signal before the "transmission of the "data-symbol including frame group" by base station #1 labeled 901_1 and/or the transmission of the "data-symbol including frame group" by terminals such as "terminal #1 labeled 902_1, terminal #2 labeled 902_2, terminal #3 labeled 902_3, terminal #4 labeled 2902_4, terminal #5 labeled 2902_5, and terminal #6 labeled 2902_6."" Base station #1 labeled 901_1 and the terminals may again transmit the sector-sweep reference signal after the "transmission of the "data-symbol including frame group" by base station #1 labeled 901_1 and/or the transmission of the "data-symbol including frame group" by terminals such as "terminal #1 labeled 902_1, terminal #2 labeled 902_2, terminal #3 labeled 902_3, terminal #4 labeled 2902_4, terminal #5 labeled 2902_5, and terminal #6 labeled 2902_6."" Thus, base station #1 labeled 901_1 and the terminals perform selection of the transmission panel antenna to be used, perform configuration of transmission beamforming, and thereby can obtain the effect of achieving high data reception quality.

Next, with reference to FIG. 36, a description will be given of a configuration example of "data-symbol including frame group 2652_*i*" transmitted by the terminals such as "terminal #1 labeled 902_1, terminal #2 labeled 902_2, terminal #3 labeled 902_3, terminal #4 labeled 2902_4, terminal #5 labeled 2902_5, and terminal #6 labeled 2902_6." Incidentally, for example, i is an integer of 1 or more, and in FIG. 36, a horizontal axis represents time.

Figure 36:
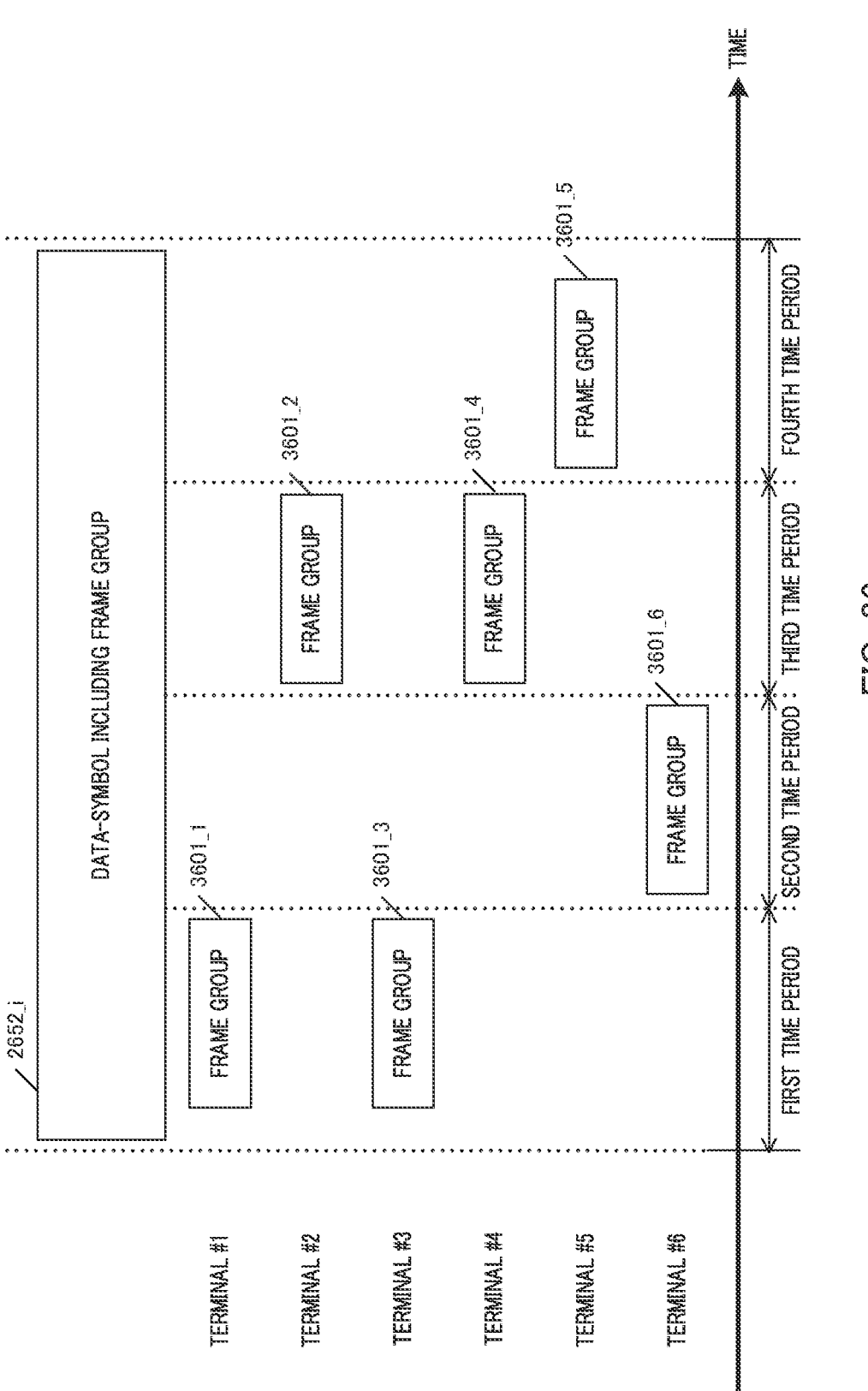
FIG. 36 illustrates a configuration example of a data-symbol including frame groups transmitted by a terminal according to Embodiment 3.

As illustrated in FIG. 36, "data-symbol including frame group 2652_*i*" is assumed to be composed of the first time period, the second time period, the third time period, and the fourth time period.

Then, for example, terminal #1 labeled 902_1 transmits (data-symbol including) frame group 3601_1, using the first time period. Terminal #2 labeled 902_2 transmits (data-symbol including) frame group 3601_2, using the third time period. Terminal #3 labeled 902_3 transmits (data-symbol including) frame group 3601_3, using the first time period. Terminal #4 labeled 2902_4 transmits (data-symbol including) frame group 3601_4, using the third time period. Terminal #5 labeled 2902_5 transmits (data-symbol including) frame group 3601_5, using the fourth time period. Terminal #6 labeled 2902_6 transmits (data-symbol including) frame group 3601_6, using the second time period.

In FIG. 36, for example, frame group 3601_1 transmitted by terminal #1 and frame 3601_3 transmitted by terminal #3 are present in the first time period, but in a case where a "panel antenna used by base station labeled 901_1 for communicating with terminal #1" and a "panel antenna used by base station labeled 901_1 for communicating with terminal #3" are different from each other, frame group 3601_1 and frame 3601_3 can reduce interference with each other. Moreover, frame group 3601_2 transmitted by terminal #2 and frame 3601_4 transmitted by terminal #4 are present in the third time period, but in a case where a "panel antenna used by base station labeled 901_1 for communicating with terminal #2" and a "panel antenna used by base station labeled 901_1 for communicating with terminal #4" are different from each other, frame group 3601_2 and frame 3601_4 can reduce interference with each other.

Further, in FIG. 36, each terminal may transmit a modulation signal (slot), using a plurality of time periods and may transmit a plurality of modulation signals (slots) in a certain time period. This point is as described in Embodiment 1, Embodiment 2, and/or the like.

As described above, "data-symbol including frame group 2652_*i*" transmitted by the terminals such as "terminal #1 labeled 902_1 and terminal #2 labeled 902_2" perform, for example, time division; each terminal transmits a frame group; and base station #1 labeled 901_1 receives the frame group transmitted by the terminal; thus, interference can be suppressed, and high data reception quality can be obtained. In addition, in base station #1 labeled 901_1, depending on a usage method of the panel antenna, it is possible to provide a situation with small mutual interference even when a plurality of terminals transmits modulation signals (slots) at the same time.

Note that, frame groups 3601_1, 3601_2, 3601_3, 3601_4, 3601_5, and 3601_6 of FIG. 36 may include, for example, a "reference signal such as DMRS, PTRS, or SRS," a pilot symbol, a pilot signal, a preamble, a symbol including control information, or the like in addition to the data symbol.

Although in FIG. 36 a description has been given with a case in which the frame group transmitted by the terminal is time-divided or spatial-divided using MU-MIMO, the frame transmitted by the terminal may be frequency-divided.

Figure 37A:
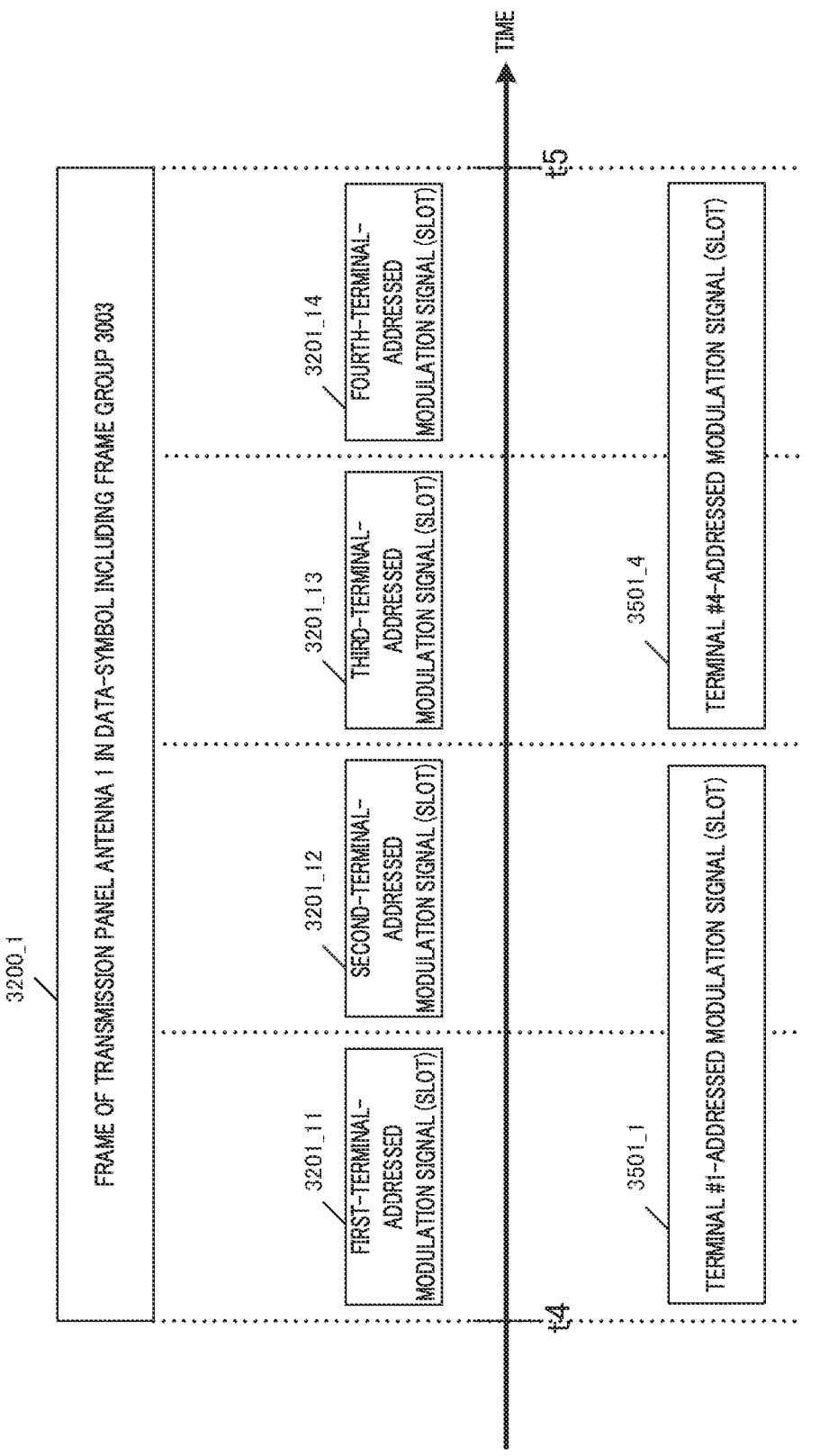
FIG. 37A illustrates a variation of a data-symbol including frame groups present in the time period from t4 to t5 according to Embodiment 3.
Figure 37B:
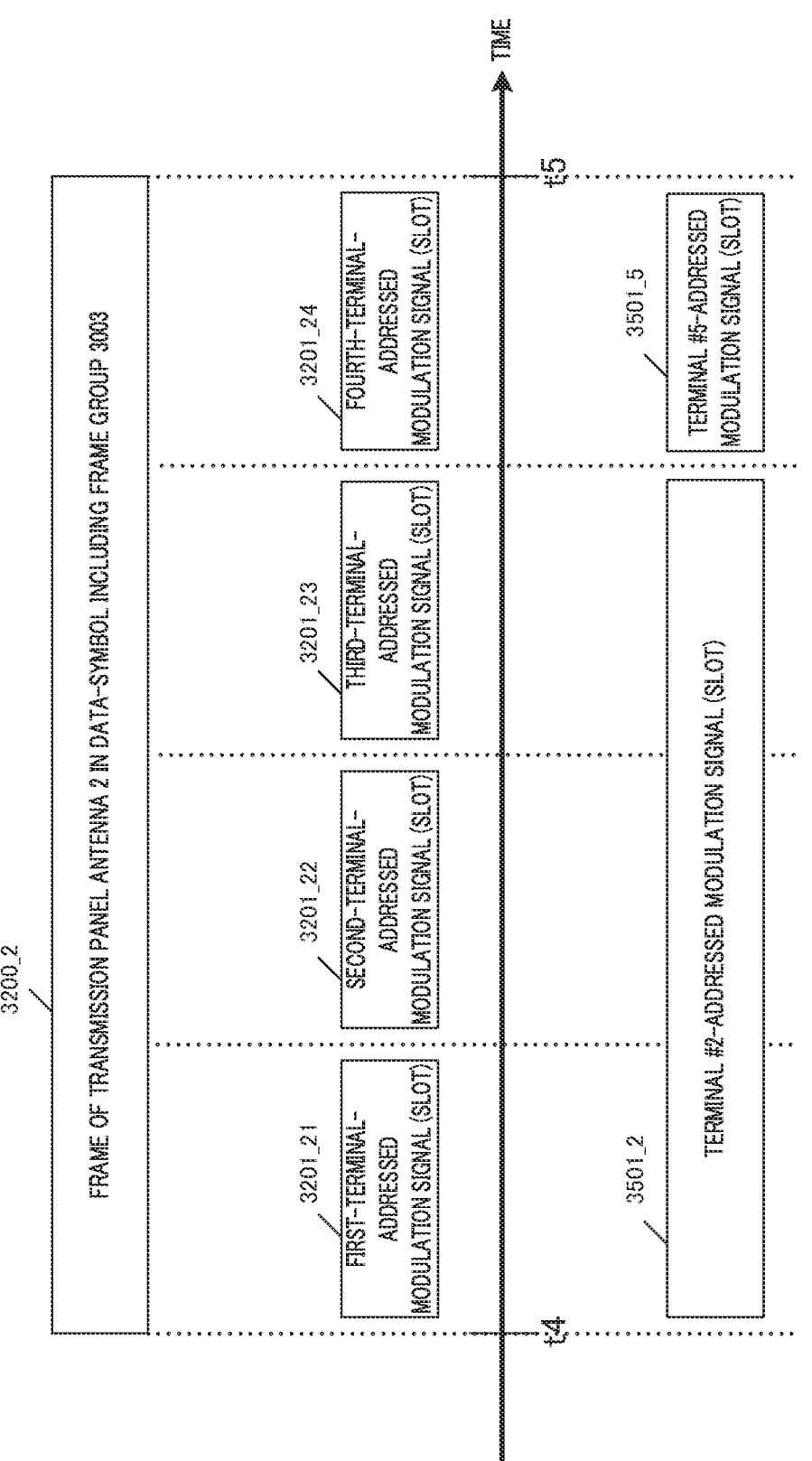
FIG. 37B illustrates the variation of the data-symbol including frame groups present in the time period from t4 to t5 according to Embodiment 3.
Figure 37C:
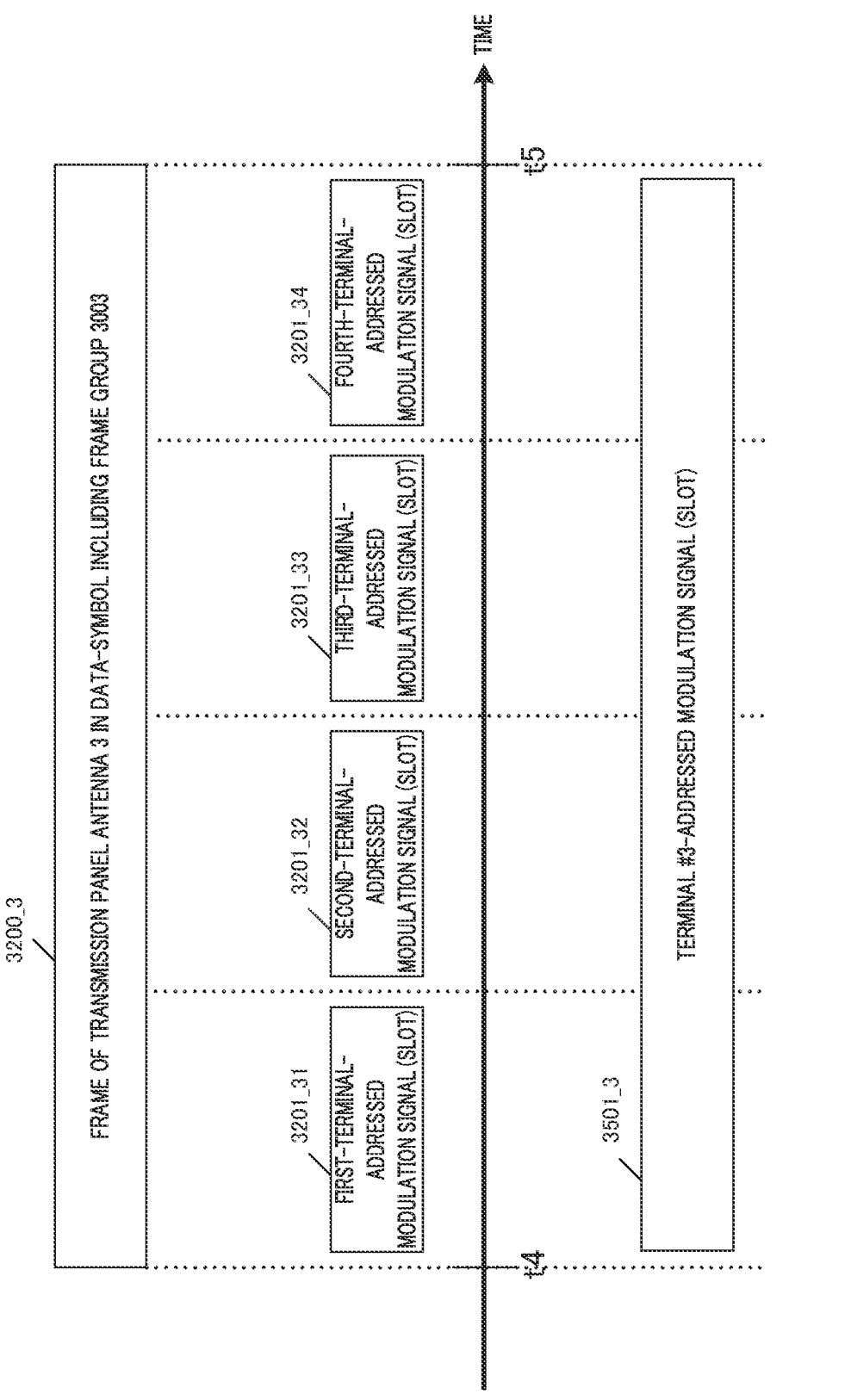
FIG. 37C illustrates the variation of the data-symbol including frame groups present in the time period from t4 to t5 according to Embodiment 3.
Figure 37D:
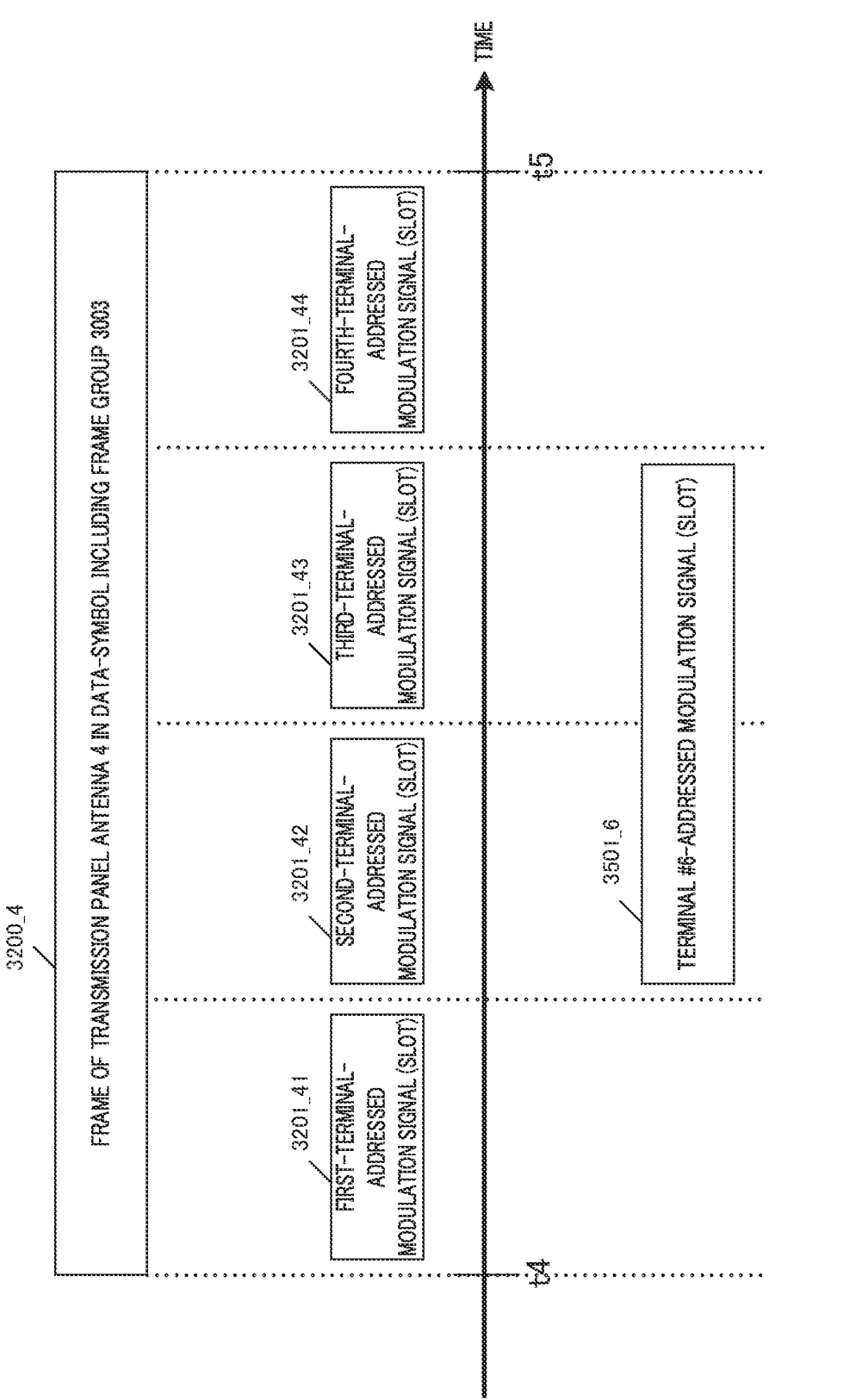
FIG. 37D illustrates the variation of the data-symbol including frame groups present in a time period from t4 to t5 according to Embodiment 3.

FIG. 37A is a variation of FIG. 35A, and in FIG. 37A, the components that operate in the same manner as in FIG. 35A are denoted by the same reference numerals. FIG. 37B is a variation of FIG. 35B, and in FIG. 37B, the components that operate in the same manner as in FIG. 35B are denoted by the same reference numerals. FIG. 37C is a variation of FIG. 35C, and in FIG. 37C, the components that operate in the same manner as in FIG. 35C are denoted by the same reference numerals. FIG. 37D is a variation of FIG. 35D, and in FIG. 37D, the components that operate in the same manner as in FIG. 35D are denoted by the same reference numerals.

FIG. 37A is different from FIG. 35A in that terminal #1-addressed modulation signal (slot) 3501_1 is composed of one slot in FIG. 35A whereas terminal #1-addressed modulation signal (slot) 3501_1 is composed of two slots in FIG. 37A. Consequently, an empty slot not allocated is present in FIG. 35A whereas an empty slot is effectively utilized in FIG. 37A, and thus, the data transmission efficiency is improved. The same applies to FIGS. 37B, 37C, and 37D in that the empty slot is effectively utilized. Accordingly, the usage of the slots is not limited to those of FIGS. 35A, 35B, 35C, 35D, 37A, 37B, 37C, and 37D.

Further, focusing on the second slot of each of FIGS. 37A, 37B, 37C, and 37D, terminal #1-addressed modulation signal (slot) 3501_1 is present in FIG. 37A, terminal #2-addressed modulation signal (slot) labeled 3501_2 is present in FIG. 37B, terminal #3-addressed modulation signal (slot) 3501_3 is present in FIG. 37C, and terminal #6-addressed modulation signal (slot) 3501_6 is present in FIG. 37D. In the manner described above, a modulation signal (slot) with a different destination for each panel antenna may be present in a certain time period, for example, the second slot of each of FIGS. 37A, 37B, 37C, and 37D. In this case, the four panel antennae may use the same frequency (the same frequency band), or may not use the same frequency (the same frequency band).

Note that, when using the same frequency (same frequency band), transmission by MU-MIMO can be considered. For example, in a case where a directivity is different in each panel antenna, an effect can be obtained of reducing interference with each other even when MU-MIMO is used (note that, the related transmission method has been also described in Embodiment 2).

When base station #1 labeled 901_1 transmits the modulation signal for each panel antenna, the modulation signal transmitted by panel antenna 1 and modulation signal transmitted by panel antenna 2 may be present in the same time period, and the frequency (frequency band) of the modulation signal transmitted by panel antenna 1 and the frequency (frequency band) of the modulation signal transmitted by panel antenna 2 may be the same or may be partly common to each other, for example.

For example, when a modulation signal is transmitted from each panel antenna, the following cases of 3-1, 3-2, and 3-3 are conceivable.

Case 3-1:

When base station #1 labeled 901_1 includes a plurality of panel antennae and transmits a modulation signal from each panel antenna, a set of modulation signals having the same or partly common frequency (frequency band) may be present in a certain time period.

Alternatively, the frequency (frequency band) of the modulation signal transmitted from panel antenna 1 and the frequency (frequency band) of the modulation signal transmitted from panel antenna 2, by base station #1 labeled 901_1, may be different from each other.

Case 3-2:

When base station #1 labeled 901_1 includes a plurality of panel antennae and transmits a modulation signal from each panel antenna, a set of modulation signals having different frequencies (frequency band) may be present in a certain time period.

Moreover, the frequency (frequency band) of the modulation signal transmitted from panel antenna 1 and the frequency (frequency band) of the modulation signal transmitted from panel antenna 2, by base station #1 labeled 901_1, may be the same, and these two modulation signals may be time-division multiplexed.

Case 3-3:

When base station #1 labeled 901_1 includes a plurality of panel antennae and transmits a modulation signal from each panel antenna, a set of modulation signals having the same frequency (frequency band) and being time-division multiplexed may be present.

For example, in a case where base station #1 labeled 901_1 has the configuration of FIG. 1A, 1B, or 1C, the modulation signal may be generated and transmitted from the panel antenna based on control signal 100 to cause a situation where "Case 3-1 is present" and/or "Case 3-2 is present" and/or "Case 3-3 is present." However, control signal 100 is configured to be output from the third processor, but it is not limited to this configuration. For example, control signal 100 may be output from other inside components, or may be a signal from the outside.

As described in the present embodiment, the terminal transmits the sector-sweep reference signal so as to reduce the occurrence number of collisions, and thereby, an effect can be obtained in which a communication capacity in the system configured of the base station and the terminal is improved. Incidentally, the configurations of the terminal and the base station are not limited to the configuration of FIG. 1A, 1B, or 1C. Moreover, the configurations of the transmission panel antenna and the reception panel antenna are not limited to the configurations of FIGS. 3 and 4, and may be, for example, a configuration of an antenna that can generate one or more, or a plurality of transmission directivities and reception directivities. In addition, signals, frames and the like are present in the respective drawings, but how they are referred to is not limited to these, the functions of the signals itself to be transmitted is important.

Embodiment 4

In the present embodiment, a description will be given of a configuration examples of a modulation signal, a frame, a frame group, and the like, which may be applied to Embodiments 1, 2, 3, and Embodiment 5 described later. Hereinafter, a description may be given with reference to the drawings illustrated in Embodiments 1, 2, and 3. In this case, a part of the description of the drawings illustrated in Embodiments 1, 2, and 3 may be omitted.

For example, in the present embodiment, a description will be given of configuration examples of a modulation signal, a frame, a frame group, and the like in a case where "the base station and the terminal communicate as illustrated in FIGS. 18 and 19," or where "the base station and the terminal communicate as illustrated in FIGS. 26 and 27."

For example, in Embodiment 1, a description has been given in which the base station and the terminal perform selection of the panel antenna by using sector-sweep reference signal 1801_1, sector-sweep reference signal 1851_1, and feedback signal 1802_1, and perform selection of the next panel antenna by using sector-sweep reference signal 1801_2, sector-sweep reference signal 1851_2, and feedback signal 1802_2 when "the base station and the terminal perform communication as illustrated in FIGS. 18 and 19."

Further, in Embodiment 2 and Embodiment 3, a description has been given in which the base station and the terminal perform selection of the panel antenna by using sector-sweep reference signal 1801_1, sector-sweep reference signal 1851_1, and feedback signal group 2602_1, and perform selection of the next panel antenna by using sector-sweep reference signal 1801_2, sector-sweep reference signal 1851_2, and feedback signal group 2602_2 when "the base station and the terminal perform communication as illustrated in FIGS. 26 and 27."

In the following, a description will be given of a case where a parameter configuration for beamforming is changed in "data-symbol including frames 1803_1, 1803_2, 1803_3, 1803_4, and the like as well as data-symbol including frames 1852_1, 1852_2, 1852_3, 1852_4, and the like in FIGS. 18 and 19," and "data-symbol including frame groups 2603_1, 2603_2, 2603_3, 2603_4, and the like as well as data-symbol including frame groups 2652_1, 2652_2, 2652_3, 2652_4, and the like in FIG. 26." Note that, it is assumed that the panel antenna is not changed in these frames and frame groups.

Figure 38:
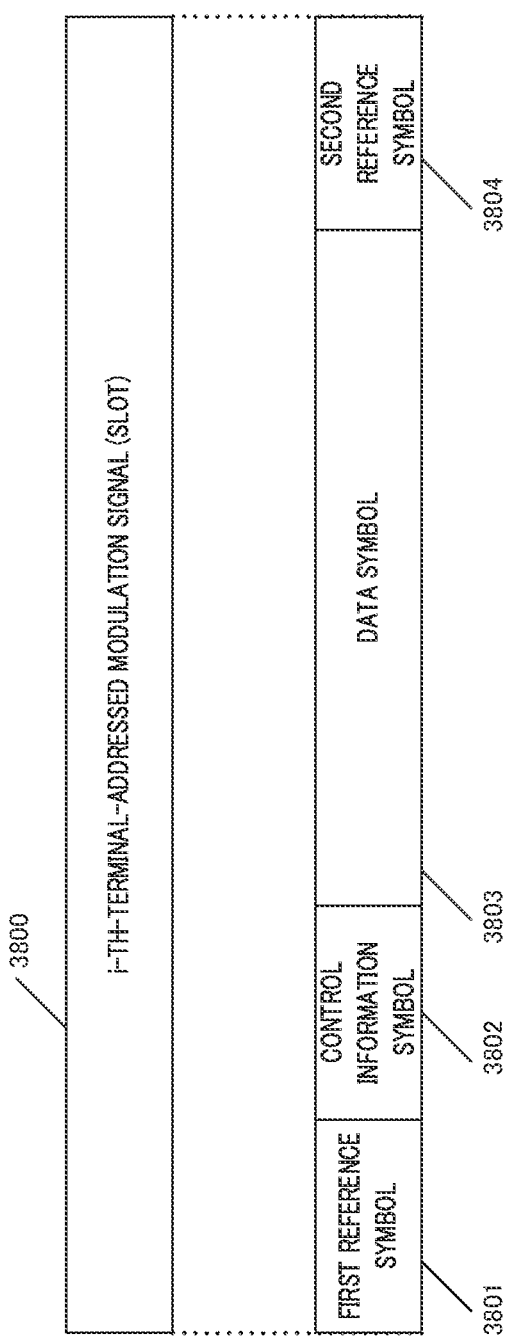
FIG. 38 illustrates the first configuration example of a "modulation-signal (slot) addressed to the i-th terminal" according to Embodiment 4.

FIG. 38 illustrates a configuration example of "i-th-terminal-addressed modulation signal (slot)" 3800 transmitted by the base stations in FIGS. 17, 25, 32A, 32B, 32C, 32D, 35A, 35B, 35C, 35D, 37A, 37C, and 37D. Incidentally, i is assumed to be an integer of 1 or more.

As illustrated in FIG. 38, "i-th-terminal addressed modulation signal (slot)" 3800 is assumed to be composed of, for example, first reference symbol (first reference signal) 3801, control information symbol 3802, data symbol 3803, and second reference symbol (second reference signal) 3804.

It is assumed that first reference symbol 3801 is a symbol for demodulating data symbol 3803, and is, for example, a symbol for performing channel estimation, frequency offset estimation, estimation of phase distortion (phase noise), signal detection, and the like. First reference symbol 3801 may be, for example, a DMRS.

Control information symbol 3802 is assumed to include information on at least data symbol 3803. Control information symbol 3802 is assumed to include, for example, information on the transmission method used for transmitting data symbol 3803, information on the modulation system, information on the error correction encoding scheme and the like.

At this time, control information symbol 3802 may include information on the beamforming parameter used by the base station (the parameter may be a parameter to be used in the future). Control information symbol 3802 may also include information on whether or not the base station has changed the beamforming parameter.

Data symbol 3803 is a symbol for transmitting data.

Second reference symbol 3804 is a symbol for estimation by the terminal of the state of the modulation signal transmitted by the base station. The terminal uses this symbol to estimate the preferred parameter of beamforming by the base station and the preferred parameter of beamforming by the terminal. Incidentally, the information estimated here may be fed back to the base station (For example, the information estimated here may be included in control information symbol 3902 of FIGS. 39A and 39B described later). Incidentally, second reference symbol 3804 may change a directivity for each symbol or each plurality of symbols.

Figure 39A:
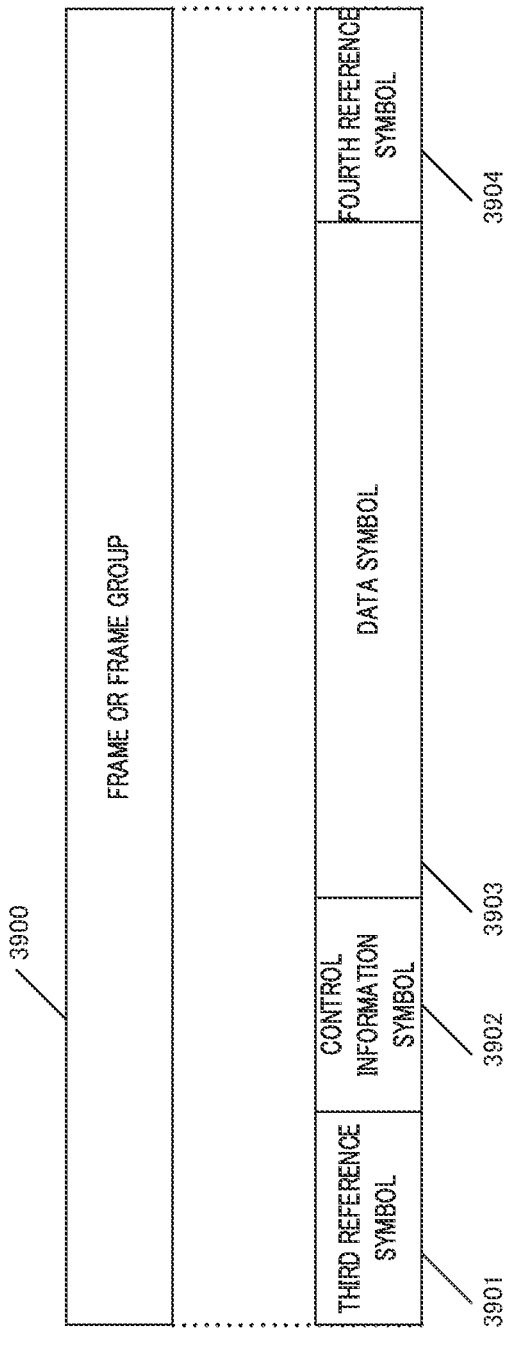
FIG. 39A illustrates the first configuration example of a "frame or frame group" according to Embodiment 4.

FIG. 39A illustrates a configuration example of "frame or frame group" 3900 transmitted by the terminals in FIGS. 20, 28, and 36.

As illustrated in FIG. 39A, "frame or frame group" 3900, for example, is assumed to be composed of, for example, third reference symbol (third reference signal) 3901, control information symbol 3902, data symbol 3903, and fourth reference symbol (second reference signal) 3904.

It is assumed that third reference symbol 3901 is a symbol for demodulating data symbol 3903, and is, for example, a symbol for performing channel estimation, frequency offset estimation, estimation of phase distortion (phase noise), signal detection, and the like. Third reference symbol 3901 may be, for example, a DMRS.

Control information symbol 3902_is assumed to include information on at least data symbol 3903. Control information symbol 3802_is assumed to include, for example, information on the transmission method used for transmitting data symbol 3903, information on the modulation system, information on the error correction encoding scheme and the like.

At this time, control information symbol 3902 may include information on the beamforming parameter used by the terminal (the parameter may be a parameter to be used in the future). Control information symbol 3902 may also include information on whether or not the terminal has changed the beamforming parameter.

Data symbol 3903 is a symbol for transmitting data.

Fourth reference symbol 3904 is a symbol for estimation by the base station of the state of the modulation signal transmitted by the terminal. The base station uses this symbol to estimate the preferred parameter of beamforming by the terminal and the preferred parameter of beamforming by the base station. Incidentally, the information estimated here may be fed back to the terminal (For example, the information estimated here may be included in control information symbol 3802 of FIG. 38). Incidentally, fourth reference symbol 3904 may change a directivity for each symbol or each of multiple symbols.

Figure 39B:
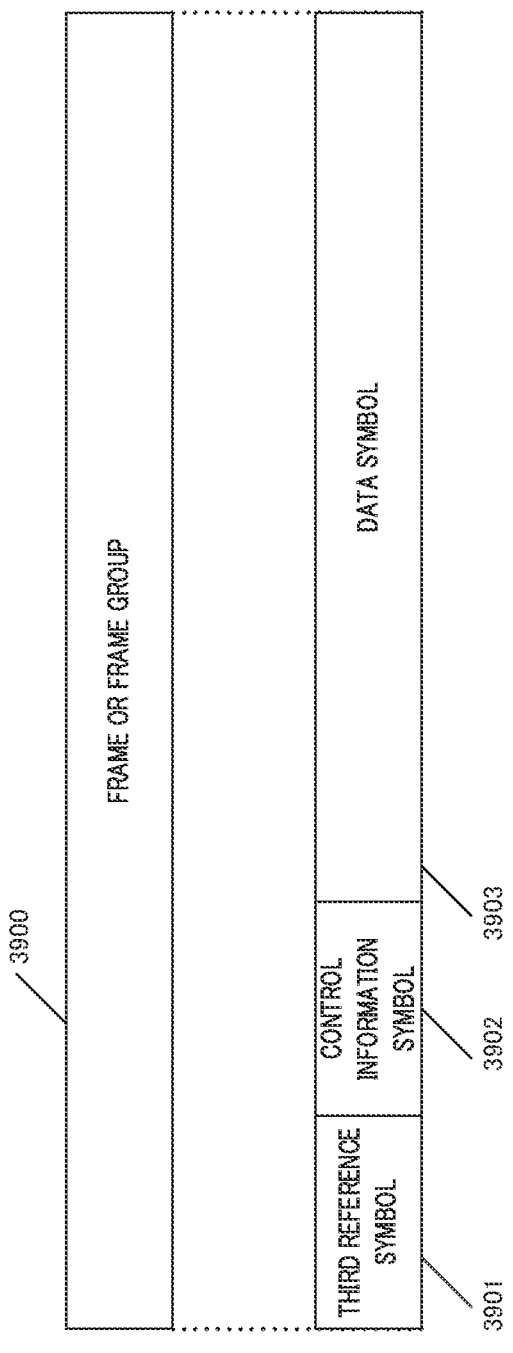
FIG. 39B illustrates the second configuration example of a "frame or frame group" according to Embodiment 4.

FIG. 39B illustrates a configuration different from that of FIG. 39A of "frame or frame group" 3900 transmitted by the terminals in FIGS. 20, 28, and 36.

FIG. 39B is different from FIG. 39A in that fourth reference symbol 3904 is not present. In this case, the base station and the terminal do not perform the operation using fourth reference symbol 3904 described above.

As described above, the parameter change is performed for one or more times of directivity control after the antenna selection in the base station and the terminal, that is, the frequency of parameter update for the directivity control is increased as compared with the frequency of the antenna selection. As a result, reception quality of data can be improved, and thereby an effect can be obtained of improving data transmission efficiency in the system.

Incidentally, the configurations of FIGS. 38, 39A, and 39B are merely exemplary, and the configuration methods are not limited to these. For example, other symbols may be included in FIGS. 38, 39A, and 39B, and the other symbols may be included in each symbol. Further, the order of arrangement of the symbols is not limited to the examples of FIGS. 38, 39A, and 39B.

Moreover, in a case where "the base station and the terminal communicate as illustrated in FIGS. 18 and 19," or where "the base station and the terminal communicate as illustrated in FIGS. 26 and 27," the frequency of the modulation signal transmitted by the base station and the frequency transmitted by the terminal may be the same, may be partly common to, or may be different from each other. However, it is not limited to the example of this description. Further, a timing at which the base station transmits the modulation signal and a timing at which the terminal transmits the modulation signal are not limited to "the examples of FIGS. 18 and 19 (Time Division Multiplexing (TDM); and Time Division Duplex (TDD))," and "the examples of FIGS. 26 and 27 (TDM, TDD)." For example, the method that is not "TDM, TDD" may, be used.

Embodiment 5

In the present embodiment, a description will be given of a variation of Embodiment 3. Hereinafter, a description may be given with reference to the drawings illustrated in any one of Embodiments 1, 2, 3, or 4. In this case, a part of the description of the drawings illustrated in any one of Embodiments 1, 2, 3, or 4 may be omitted.

Figure 40:
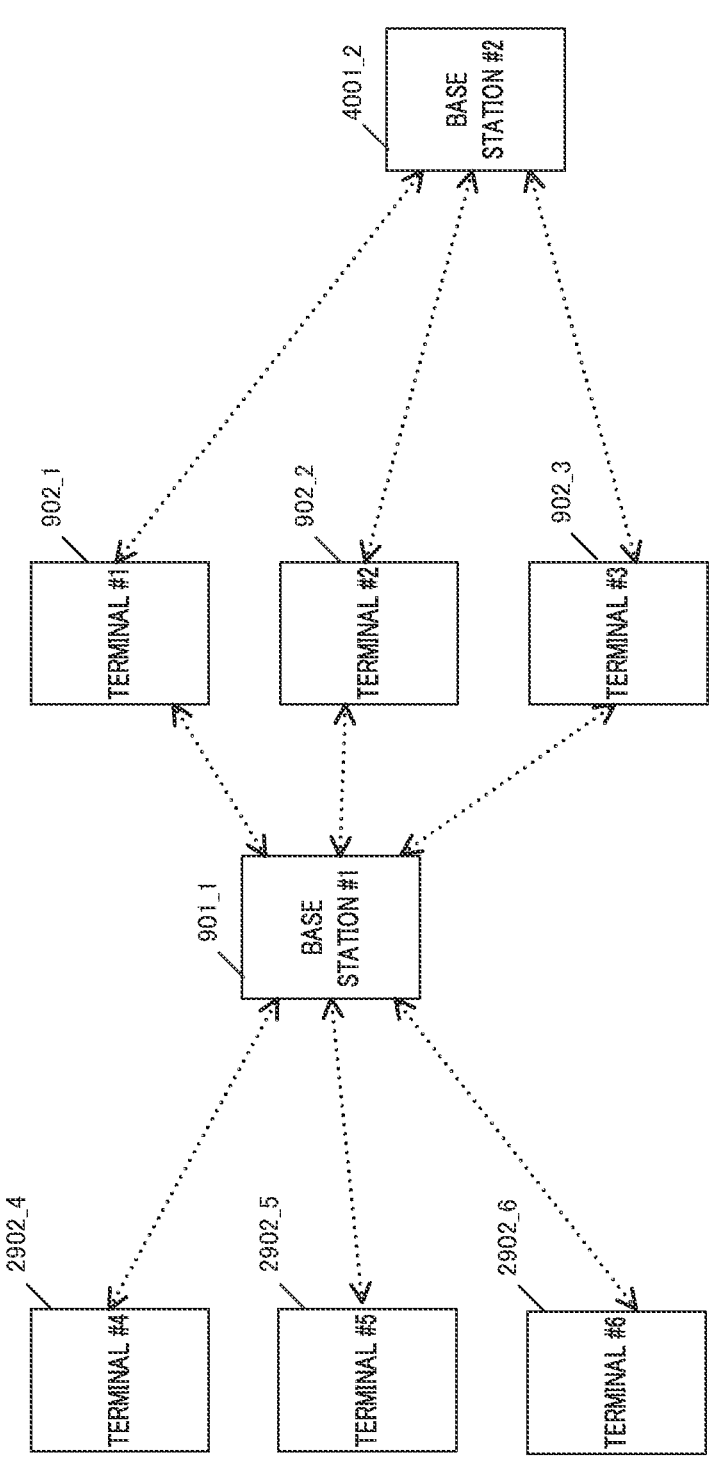
FIG. 40 illustrates an example of a communication state according to Embodiment 5.

FIG. 40 illustrates an example of a communication state in the present embodiment. In FIG. 40, the components that operate in the same manner as in FIGS. 9 and 29 are denoted by the same reference numerals.

In FIG. 40, it is assumed that base station #1 labeled 901_1 communicates with "terminal #1 labeled 902_1, terminal #2 labeled 902_2, terminal #3 labeled 902_3, terminal #4 labeled 2902_4, terminal #5 labeled 2902_5, and terminal #6 labeled 2902_6." This point has been as described in Embodiment 3, and the communication procedure, the communication method, and the like has been also described in Embodiment 3; thus, descriptions thereof will be omitted.

In FIG. 40, base station #2 labeled 4001_2 is additionally present, and base station #2 labeled 4001_2 communicates with "terminal #1 labeled 902_1, terminal #2 labeled 902_2, and terminal #3 labeled 902_3." Hereinafter, the operation of this point will be described in detail.

Base station #2 labeled 4001_2 may have the same configuration as base station #1 labeled 901_1. For example, base station #2 labeled 4001_2 may include four transmission panel antennae of transmission panel antenna 1 labeled 106_1, transmission panel antenna 2 labeled 106_2, transmission panel antenna labeled of 106_3, transmission panel antenna 4 labeled 106_4. Base station #2 labeled 4001_2 may be configured to include "one or a plurality of" "transmission antennae or transmission panel antennae."

FIG. 30 illustrates an example of modulation signal 3000 transmitted by base station #2 labeled 4001_2 in FIG. 40. Incidentally, the components that operate in the same manner as in FIG. 10 are denoted by the same reference numerals, and descriptions thereof will be thus omitted.

In the time period from time t0 to time t1, sector-sweep reference signal 1001 is present.

The time period from time t1 to time t2 is a terminal response period.

In the time period from time t2 to time t3, feedback signal group 3002 is present. Feedback signal group 3002 will be described later.

In the time period from time t4 to time t5, data-symbol including frame group 3003 is present. Data-symbol including frame group 3003 will be described later.

FIG. 11 illustrates an example of sector-sweep reference signal 1001 of FIG. 30 transmitted by base station #2 labeled 4001_2 of FIG. 40. Note that, an operation in FIG. 11 has already been described, and a description thereof will be thus omitted.

FIG. 12 illustrates a configuration example of "sector-sweep reference signal 1101_*i* in transmission panel antenna i" of FIG. 11. Note that, an operation in FIG. 12 has already been described, and a description thereof will be thus omitted.

FIG. 13 illustrates an operational example of the time period from time t1 to time t2 that is the terminal response period. Note that, an operation in FIG. 13 has already been described, and a description thereof will be thus omitted.

FIG. 14 illustrates an example related to occupation by the terminals for first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4 illustrated in FIG. 13. Note that, an operation in FIG. 14 has been described in Embodiment 1, Embodiment 2, and/or the like, and a description thereof will be thus omitted.

FIG. 15 illustrates a configuration example of "sector-sweep reference signal 1101_*xi* in transmission panel antenna xi" of FIG. 11. Note that, an operation in FIG. 15 has already been described, and a description thereof will be thus omitted.

FIGS. 31A, 31B, 31C, and 31D illustrate a configuration example of feedback signal group 3002 present in the time period from t2 to t3 in FIG. 30 and transmitted by base station #2 labeled 4001_2. Incidentally, in FIGS. 31A, 31B, 31C, and 31D, horizontal axis represent time. For simplicity of description, it is assumed that base station #2 labeled 4001_2 includes four transmission panel antennae of transmission panel antenna 1 labeled 106_1, transmission panel antenna 2 labeled 106_2, transmission panel antenna 3 labeled 106_3, and transmission panel antenna 4 labeled 106_4.

Further, FIG. 31A is related to a feedback signal of transmission panel antenna 1 labeled 106_1 in feedback signal group 3002. FIG. 31B is related to a feedback signal of transmission panel antenna 2 labeled 106_2 in feedback signal group 3002. FIG. 31C is related to a feedback signal of transmission panel antenna 3 labeled 106_3 in feedback signal group 3002. FIG. 31D is related to a feedback signal of transmission panel antenna 4 labeled 106_4 in feedback signal group 3002.

In the example of FIG. 31A, since "the number of slots that can transmit the sector-sweep reference signal when the terminal transmits the sector-sweep reference signal (the number of terminals that can transmit the sector-sweep reference signal)" is 4, as illustrated in FIG. 31A, feedback signal labeled 3100_1 of transmission panel antenna 1 in feedback signal group 3002 includes feedback signal groups addressed to four terminals, such as first-terminal-addressed feedback signal group 3101_11, second-terminal-addressed feedback signal group 3101_12, third-terminal-addressed feedback signal group 3101_13, and fourth-terminal-addressed feedback signal group 3101_14. Incidentally, for example, in a case where "the number of slots that can transmit the sector-sweep reference signal when the terminal transmits the sector-sweep reference signal (the number of terminals that can transmit the sector-sweep reference signal)" is a $\Omega$, feedback signal labeled 3100_1 of transmission panel antenna 1 in feedback signal group 3002 may be configured to include feedback signal groups addressed to $\Omega$ terminals. Provided that, $\Omega$ is an integer of 1 or more or an integer of 2 or more representing the number of terminals.

A description has been given with the term "feedback signal group," This is because the feedback signal for transmission panel antenna 1 labeled 106_1 can be present, the feedback signal for transmission panel antenna 2 labeled 106_2 can be present, the feedback signal for transmission panel antenna 3 labeled 106_3 can be present, and the feedback signal for transmission panel antenna 4 labeled 106_4 can be present.

In the example of FIG. 31B, since "the number of slots that can transmit the sector-sweep reference signal when the terminal transmits the sector-sweep reference signal (the number of terminals that can transmit the sector-sweep reference signal)" is 4, as illustrated in FIG. 31B, feedback signal labeled 3100_2 of transmission panel antenna 2 in feedback signal group 3002 includes feedback signal groups addressed to four terminals, such as first-terminal-addressed feedback signal group 3101_21, second-terminal-addressed feedback signal group 3101_22, third-terminal-addressed feedback signal group 3101_23, and fourth-terminal-addressed feedback signal group 3101_24. Incidentally, for example, in a case where "the number of slots that can transmit the sector-sweep reference signal when the terminal transmits the sector-sweep reference signal (the number of terminals that can transmit the sector-sweep reference signal)" is $\Omega$, feedback signal labeled 3100_2 of transmission panel antenna 2 in feedback signal group 3002 may be configured to include feedback signal groups addressed to $\Omega$ terminals. Provided that, $\Omega$ is an integer of 1 or more or an integer of 2 or more representing the number of terminals.

In the example of FIG. 31C, since "the number of slots that can transmit the sector-sweep reference signal when the terminal transmits the sector-sweep reference signal (the number of terminals that can transmit the sector-sweep reference signal)" is 4, as illustrated in FIG. 31C, feedback signal labeled 3100_3 of transmission panel antenna 3 in feedback signal group 3002 includes feedback signal groups addressed to four terminals, such as first-terminal-addressed feedback signal group 3101_31, second-terminal-addressed feedback signal group 3101_32, third-terminal-addressed feedback signal group 3101_33, and fourth-terminal-addressed feedback signal group 3101_34. Incidentally, for example, in a case where "the number of slots that can transmit the sector-sweep reference signal when the terminal transmits the sector-sweep reference signal (the number of terminals that can transmit the sector-sweep reference signal)" is $\Omega$, feedback signal labeled 3100_3 of transmission panel antenna 3 in feedback signal group 3002 may be configured to include feedback signal groups addressed to $\Omega$ terminals. Provided that, $\Omega$ is an integer of 1 or more or an integer of 2 or more representing the number of terminals.

In the example of FIG. 31D, since "the number of slots that can transmit the sector-sweep reference signal when the terminal transmits the sector-sweep reference signal (the number of terminals that can transmit the sector-sweep reference signal)" is 4, as illustrated in FIG. 31D, feedback signal labeled 3100_4 of transmission panel antenna 4 in feedback signal group 3002 includes feedback signal groups addressed to four terminals, such as first-terminal-addressed feedback signal group 3101_41, second-terminal-addressed feedback signal group 3101_42, third-terminal-addressed feedback signal group 3101_43, and fourth-terminal-addressed feedback signal group 3101_44. Incidentally, for example, in a case where "the number of slots that can transmit the sector-sweep reference signal when the terminal transmits the sector-sweep reference signal (the number of terminals that can transmit the sector-sweep reference signal)" is $\Omega$, feedback signal labeled 3100_4 of transmission panel antenna 4 in feedback signal group 3002 may be configured to include feedback signal groups addressed to $\Omega$ terminals. Provided that, $\Omega$ is an integer of 1 or more or an integer of 2 or more representing the number of terminals.

FIGS. 32A, 32B, 32C, and 32D illustrate a configuration example of data-symbol including frame group 3003 present in the time period from t4 to t5 in FIG. 30 and transmitted by base station #2 labeled 4001_2. Incidentally, in FIGS. 32A, 32B, 32C, and 32D, horizontal axis represent time.

Further, FIG. 32A is related to a feedback signal of transmission panel antenna 1 labeled 106_1 in data-symbol including frame group 3003. FIG. 32B is related to a feedback signal of transmission panel antenna 2 labeled 106_2 in data-symbol including frame group 3003. FIG. 32C is related to a feedback signal of transmission panel antenna 3 labeled 106_3 in data-symbol including frame group 3003. FIG. 32D is related to a feedback signal of transmission panel antenna 4 labeled 106_4 in data-symbol including frame group 3003.

In the example of FIG. 32A, since "the number of slots that can transmit the sector-sweep reference signal when the terminal transmits the sector-sweep reference signal (the number of terminals that can transmit the sector-sweep reference signal)" is 4, as illustrated in FIG. 32A, frame labeled 3200_1 of transmission panel antenna 1 in data-symbol including frame group 3003 includes modulation signals (slots) addressed to four terminals, such as first-terminal-addressed modulation signal (first-terminal-addressed slot) 3201_11, second-terminal-addressed modulation signal (second-terminal-addressed slot) 3201_12, third-terminal-addressed modulation signal (third-terminal-addressed slot) 3201_13, and fourth-terminal-addressed modulation signal (fourth-terminal-addressed slot) 3201_14. Incidentally, for example, in a case where "the number of slots that can transmit the sector-sweep reference signal when the terminal transmits the sector-sweep reference signal (the number of terminals that can transmit the sector-sweep reference signal)" is $\Omega$, frame labeled 3200_1 of transmission panel antenna 1 in data-symbol including frame group 3003 may be configured to include modulation signal (slot) groups addressed to $\Omega$ terminals. Provided that, $\Omega$ is an integer of 1 or more or an integer of 2 or more representing the number of terminals.

A description has been given with the term "data-symbol including frame group," This is because the data-symbol including frame for transmission panel antenna 1 labeled 106_1 can be present, the data-symbol including frame for transmission panel antenna 2 labeled 106_2 can be present, the data-symbol including frame for transmission panel antenna 3 labeled 106_3 can be present, and the data-symbol including frame for transmission panel antenna 4 labeled 106_4 can be present.

In the example of FIG. 32B, since "the number of slots that can transmit the sector-sweep reference signal when the terminal transmits the sector-sweep reference signal (the number of terminals that can transmit the sector-sweep reference signal)" is 4, as illustrated in FIG. 32B, frame labeled 3200_2 of transmission panel antenna 2 in data-symbol including frame group 3003 includes modulation signals (slots) addressed to four terminals, such as first-terminal-addressed modulation signal (first-terminal-addressed slot) 3201_21, second-terminal-addressed modulation signal (second-terminal-addressed slot) 3201_22, third-terminal-addressed modulation signal (third-terminal-addressed slot) 3201_23, and fourth-terminal-addressed modulation signal (fourth-terminal-addressed slot) 3201_24. Incidentally, for example, in a case where "the number of slots that can transmit the sector-sweep reference signal when the terminal transmits the sector-sweep reference signal (the number of terminals that can transmit the sector-sweep reference signal)" is $\Omega$, frame labeled 3200_2 of transmission panel antenna 2 in data-symbol including frame group 3003 may be configured to include modulation signal (slot) groups addressed to $\Omega$ terminals. Provided that, $\Omega$ is an integer of 1 or more or an integer of 2 or more representing the number of terminals.

In the example of FIG. 32C, since "the number of slots that can transmit the sector-sweep reference signal when the terminal transmits the sector-sweep reference signal (the number of terminals that can transmit the sector-sweep reference signal)" is 4, as illustrated in FIG. 32C, frame labeled 3200_3 of transmission panel antenna 3 in data-symbol including frame group 3003 includes modulation signals (slots) addressed to four terminals, such as first-terminal-addressed modulation signal (first-terminal-addressed slot) 3201_31, second-terminal-addressed modulation signal (second-terminal-addressed slot) 3201_32, third-terminal-addressed modulation signal (third-terminal-addressed slot) 3201_33, and fourth-terminal-addressed modulation signal (fourth-terminal-addressed slot) 3201_34. Incidentally, for example, in a case where "the number of slots that can transmit the sector-sweep reference signal when the terminal transmits the sector-sweep reference signal (the number of terminals that can transmit the sector-sweep reference signal)" is $\Omega$, frame labeled 3200_3 of transmission panel antenna 3 in data-symbol including frame group 3003 may be configured to include modulation signal (slot) groups addressed to $\Omega$ terminals. Provided that, $\Omega$ is an integer of 1 or more or an integer of 2 or more representing the number of terminals.

In the example of FIG. 32D, since "the number of slots that can transmit the sector-sweep reference signal when the terminal transmits the sector-sweep reference signal (the number of terminals that can transmit the sector-sweep reference signal)" is 4, as illustrated in FIG. 32D, frame labeled 3200_4 of transmission panel antenna 4 in data-symbol including frame group 3003 includes modulation signals (slots) addressed to four terminals, such as first-terminal-addressed modulation signal (first-terminal-addressed slot) 3201_41, second-terminal-addressed modulation signal (second-terminal-addressed slot) 3201_42, third-terminal-addressed modulation signal (third-terminal-addressed slot) 3201_43, and fourth-terminal-addressed modulation signal (fourth-terminal-addressed slot) 3201_44. Incidentally, for example, in a case where "the number of slots that can transmit the sector-sweep reference signal when the terminal transmits the sector-sweep reference signal (the number of terminals that can transmit the sector-sweep reference signal)" is $\Omega$, frame labeled 3200_4 of transmission panel antenna 4 in data-symbol including frame group 3003 may be configured to include modulation signal (slot) groups addressed to $\Omega$ terminals. Provided that, $\Omega$ is an integer of 1 or more or an integer of 2 or more representing the number of terminals.

Figure 41:
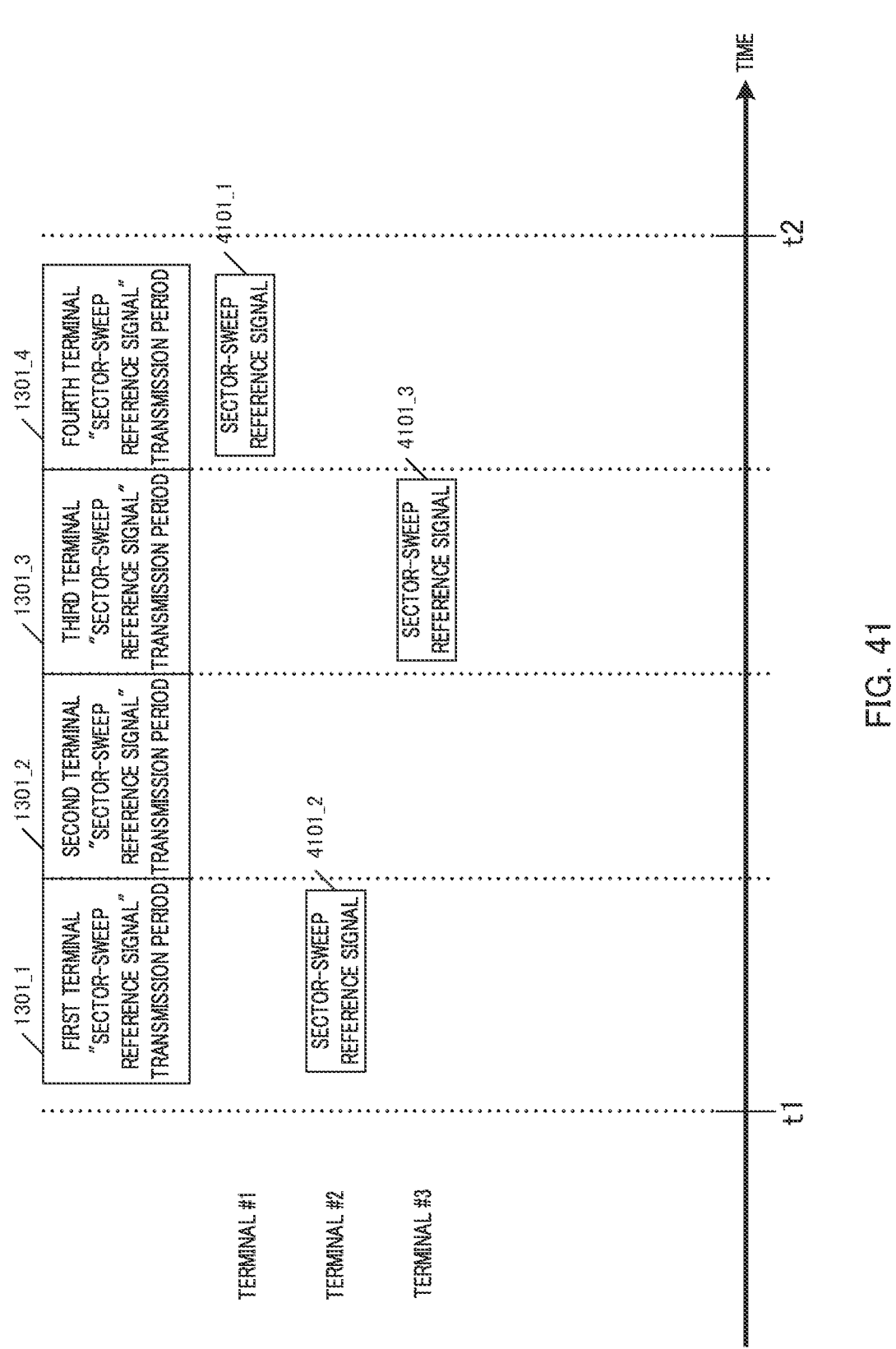
FIG. 41 illustrates an example related to occupation by terminals for transmission periods for "sector-sweep reference signal" for terminals according to Embodiment 5.

FIG. 41 illustrates an example related to occupation by the terminals for transmission periods for "sector-sweep reference signal" to the present embodiment. Note that, FIG. 41 illustrates an example related to the occupation by the terminals for the time periods illustrated in FIG. 13 for first terminal "sector-sweep reference signal" transmission period 1301_1, second terminal "sector-sweep reference signal" transmission period 1301_2, third terminal "sector-sweep reference signal" transmission period 1301_3, and fourth terminal "sector-sweep reference signal" transmission period 1301_4.

For example, as illustrated in FIG. 41, it is assumed that: terminal #1 labeled 902_1 transmits sector-sweep reference signal 4101_1 to fourth terminal "sector-sweep reference signal" transmission period labeled 1301_4; terminal #2 labeled 902_2 transmits sector-sweep reference signal 4101_2 to first terminal "sector-sweep reference signal" transmission period labeled 1301_1; terminal #3 labeled 902_3 transmits sector-sweep reference signal 4101_3 to third terminal "sector-sweep reference signal" transmission period labeled 1301_3.

Note that, as to the information to be transmitted by sector-sweep reference signal 4101_1 transmitted by terminal #1 labeled 902_1, the same description as that in Embodiment 1, Embodiment 2, and/or the like is applied.

As to the information to be transmitted by sector-sweep reference signal 4101_2 transmitted by terminal #2 labeled 902_2, the same description as that in Embodiment 1, Embodiment 2, and/or the like is applied.

As to the information to be transmitted by sector-sweep reference signal 4101_3 transmitted by terminal #3 labeled 902_3, the same description as that in Embodiment 1, Embodiment 2, and/or the like is applied.

A description will be given with reference to FIGS. 42A to 42D of the time period from t2 to t3 when the time period from t1 to t2 is as the example illustrated in FIG. 41.

Figure 42A:
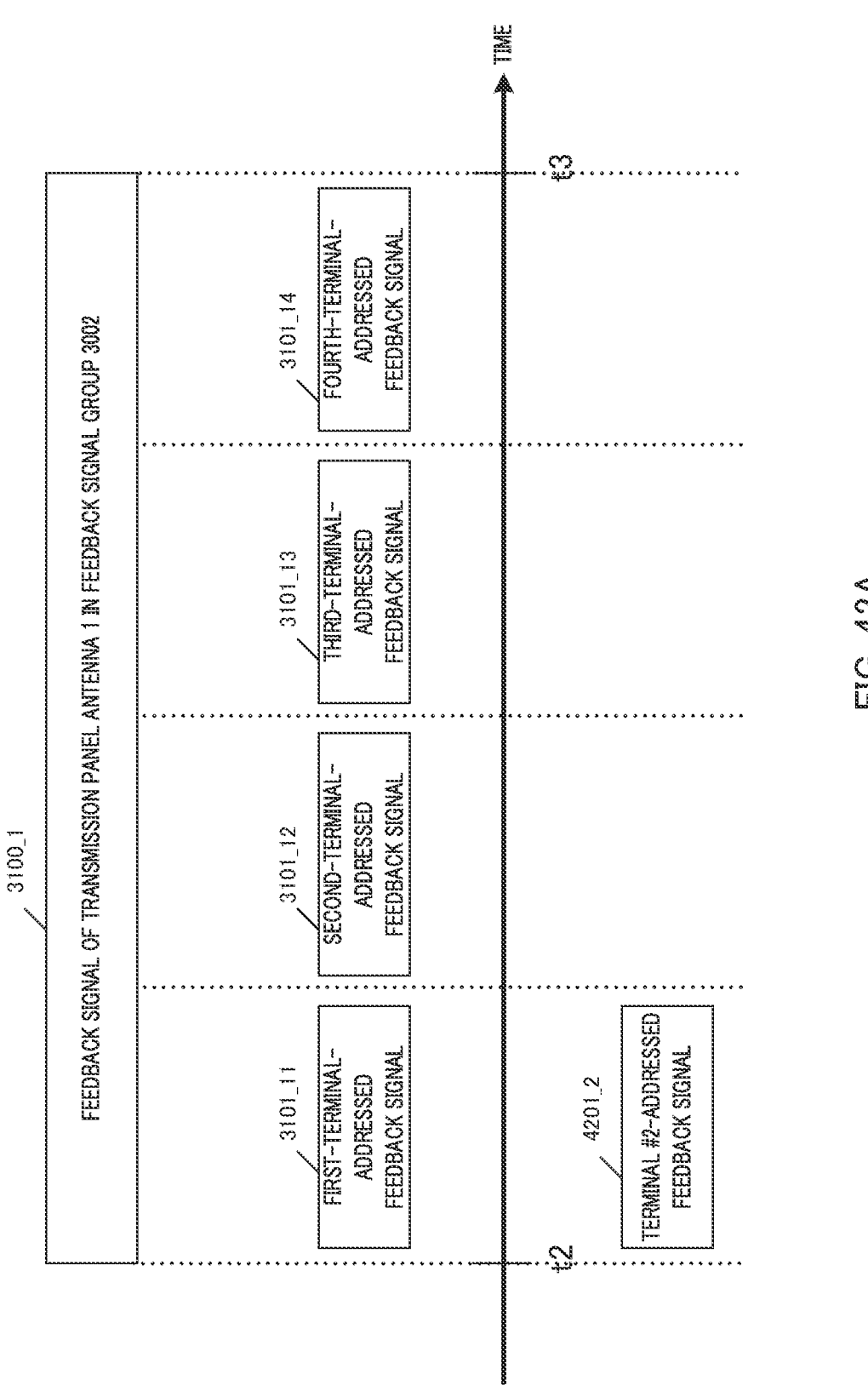
FIG. 42A illustrates a configuration example of a feedback signal group present in a time period from t2 to t3 according to Embodiment 5.

In this case, as illustrated in FIG. 42A, base station #2 labeled 4001_2 transmits "terminal #2-addressed feedback signal labeled 4201_2" as "first-terminal-addressed feedback signal labeled 3101_11" in "feedback signal labeled 3100_1 of transmission panel antenna 1 in feedback signal group 3002."

Figure 42B:
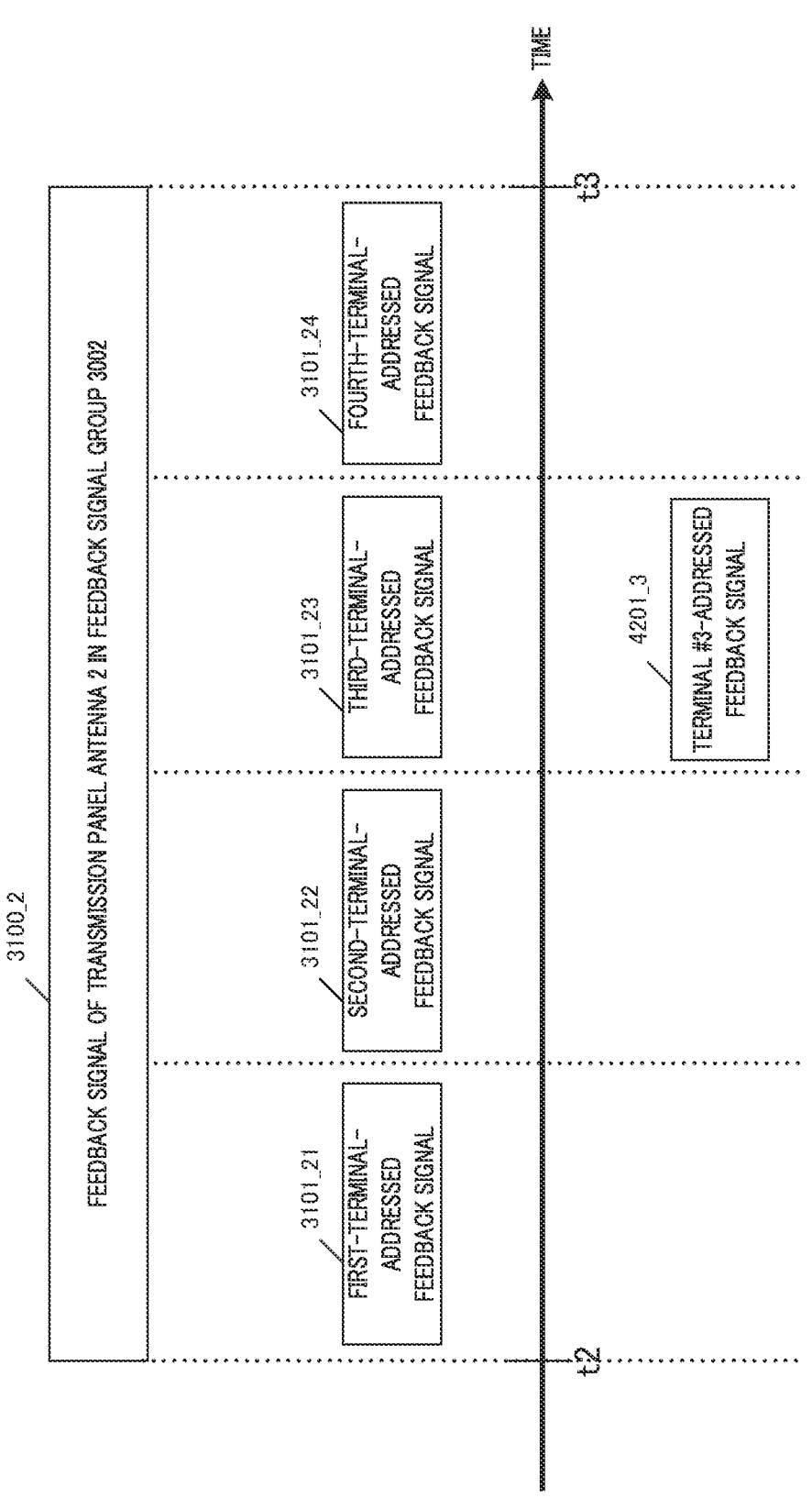
FIG. 42B illustrates the configuration example of the feedback signal group present in the time period from t2 to t3 according to Embodiment 5.

Moreover, as illustrated in FIG. 42B, base station #2 labeled 4001_2 transmits "terminal #3-addressed feedback signal labeled 4201_3" as "third-terminal-addressed feedback signal labeled 3101_23" in "feedback signal labeled 3100_2 of transmission panel antenna 2 in feedback signal group 3002."

Figure 42C:
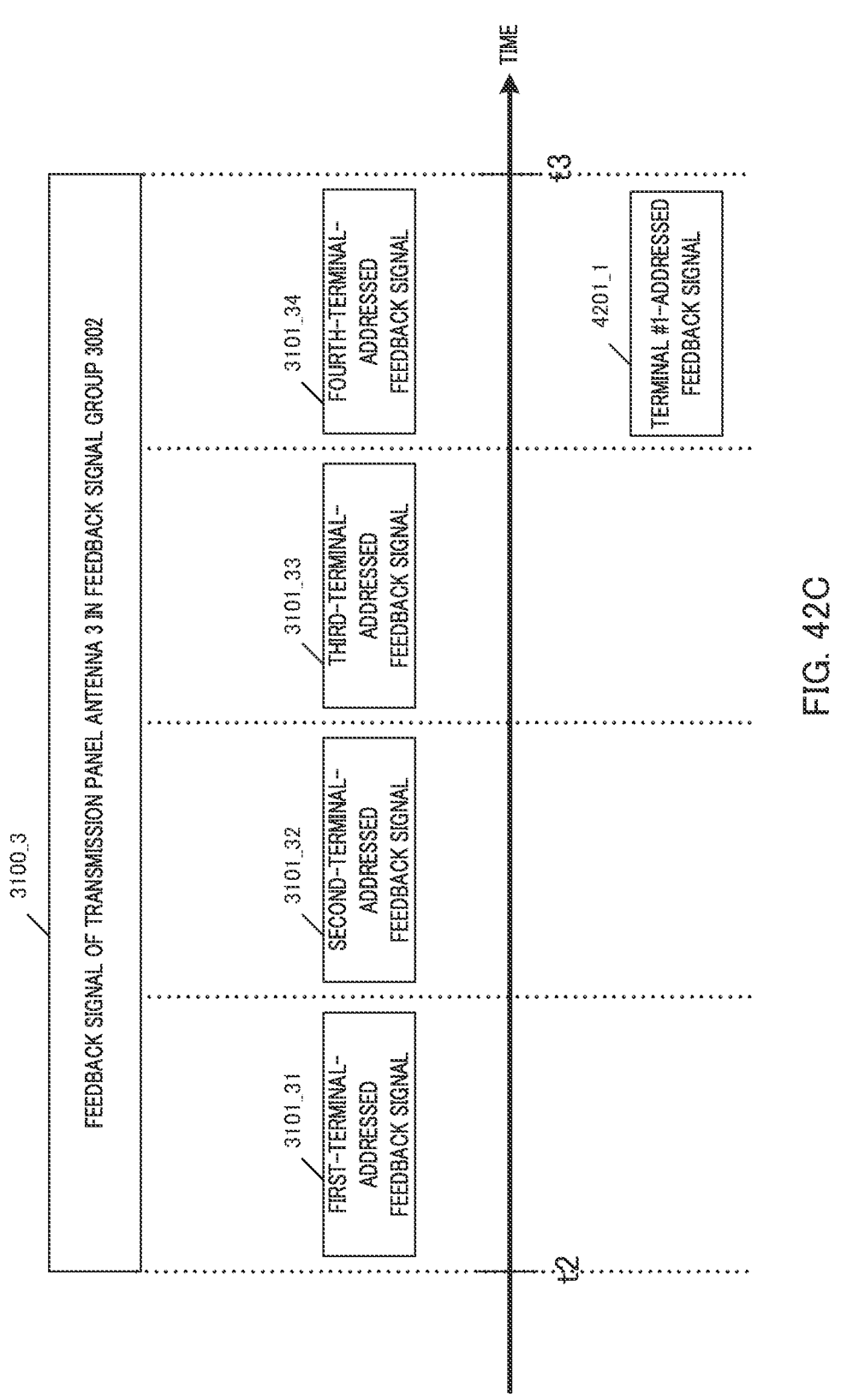
FIG. 42C illustrates the configuration example of the feedback signal group present in the time period from t2 to t3 according to Embodiment 5.

As illustrated in FIG. 42C, base station #2 labeled 4001_2 transmits "terminal #1-addressed feedback signal labeled 4201_1" as "fourth-terminal-addressed feedback signal labeled 3101_34" in "feedback signal labeled 3100_3 of transmission panel antenna 3 in feedback signal group 3002."

Figure 42D:
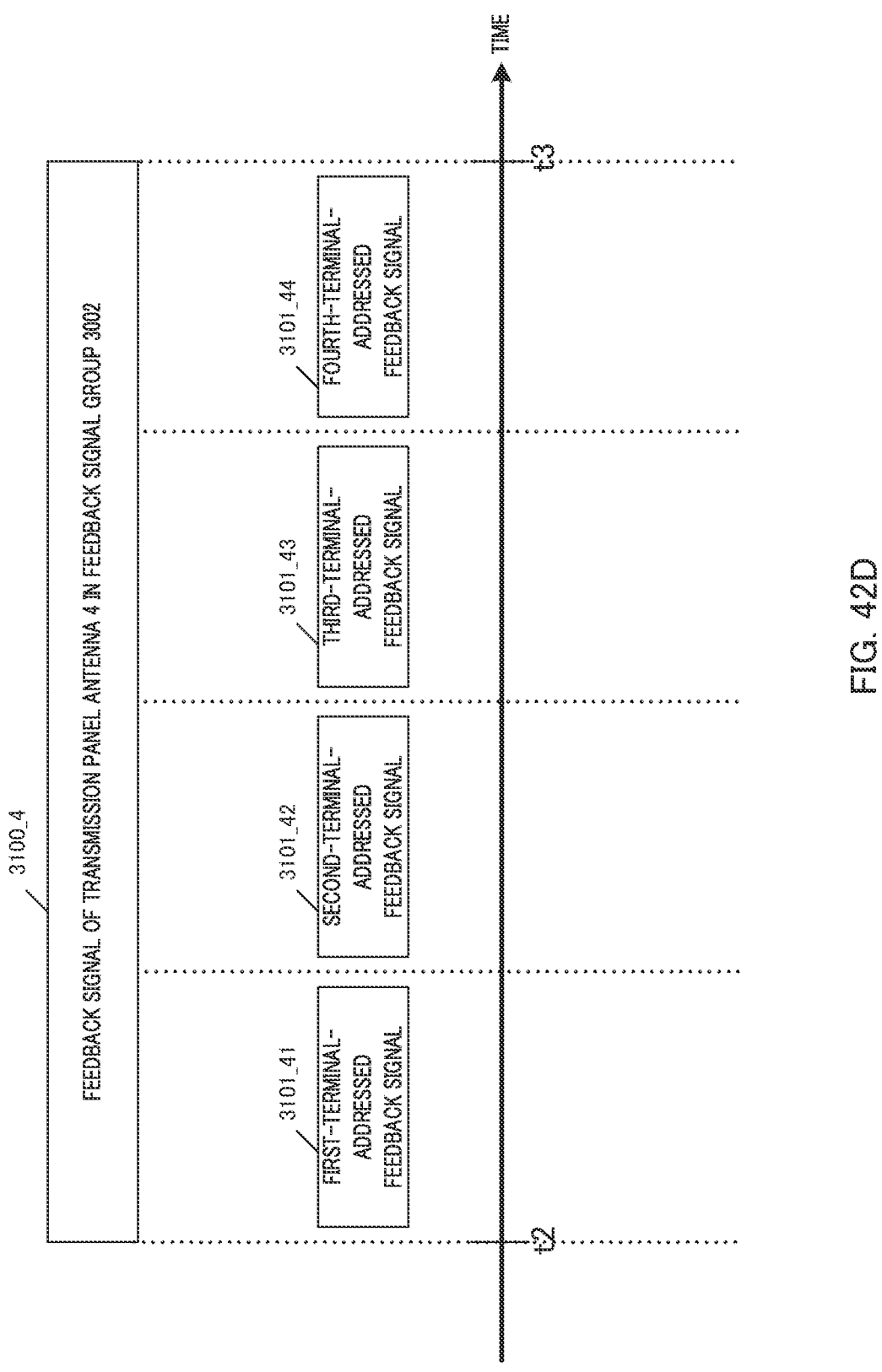
FIG. 42D illustrates the configuration example of the feedback signal group present in the time period from t2 to t3 according to Embodiment 5.

As illustrated in FIG. 42D, base station #2 labeled 4001_2 does not assign to "feedback signal labeled 3100_4 of transmission panel antenna 4 in feedback signal group 3002," and thus, base station #2 labeled 4001_2 does not transmit a signal from panel antenna 4, for example.

At this time, "terminal #2-addressed feedback signal labeled 4201_2" of FIG. 42A includes, for example, information indicating that terminal #2 labeled 902_2 can perform communication (with base station #2 labeled 4001_2), using transmission panel antenna 1 labeled 106_1.

"Terminal #3-addressed feedback signal labeled 4201_3" of FIG. 42B includes, for example, information indicating that terminal #3 labeled 902_3 can perform communication (with base station #2 labeled 4001_2), using transmission panel antenna 2 labeled 106_2.

"Terminal #1-addressed feedback signal labeled 4201_1" of FIG. 42C includes, for example, information indicating that terminal #1 labeled 902_1 can perform communication (with base station #2 labeled 4001_2), using transmission panel antenna 3 labeled 106_3.

Further, the feedback signal addressed to each terminal may include other information. As to the example thereof, the same description as that in Embodiment 1, Embodiment 2, and/or the like is applied.

Incidentally, base station #2 labeled 4001_2 selects the transmission panel antenna (selects transmission panel antenna 3 as in FIG. 42C), configures a beamforming parameter, and transmits terminal #1-addressed feedback signal 4201_1 based on sector-sweep reference signal 4101_1 of FIG. 41 transmitted by terminal #1 labeled 902_1.

Base station #2 labeled 4001_2 selects the transmission panel antenna (selects transmission panel antenna 1 as in FIG. 42A), configures a beamforming parameter, and transmits terminal #2-addressed feedback signal 4201_2 based on sector-sweep reference signal 4101_2 of FIG. 41 transmitted by terminal #2 labeled 902_2.

Base station #2 labeled 4001_2 selects the transmission panel antenna (selects transmission panel antenna 2 as in FIG. 42B), configures a beamforming parameter, and transmits terminal #3-addressed feedback signal 4201_3, based on sector-sweep reference signal 4101_3 of FIG. 41 transmitted by terminal #3 labeled 902_3.

Next, a description will be given with reference to FIGS. 42A to 42D of the time period from t4 to 5 when the time period from t2 to t13 is as the example illustrated in FIGS. 43A to 43D.

Figure 43A:
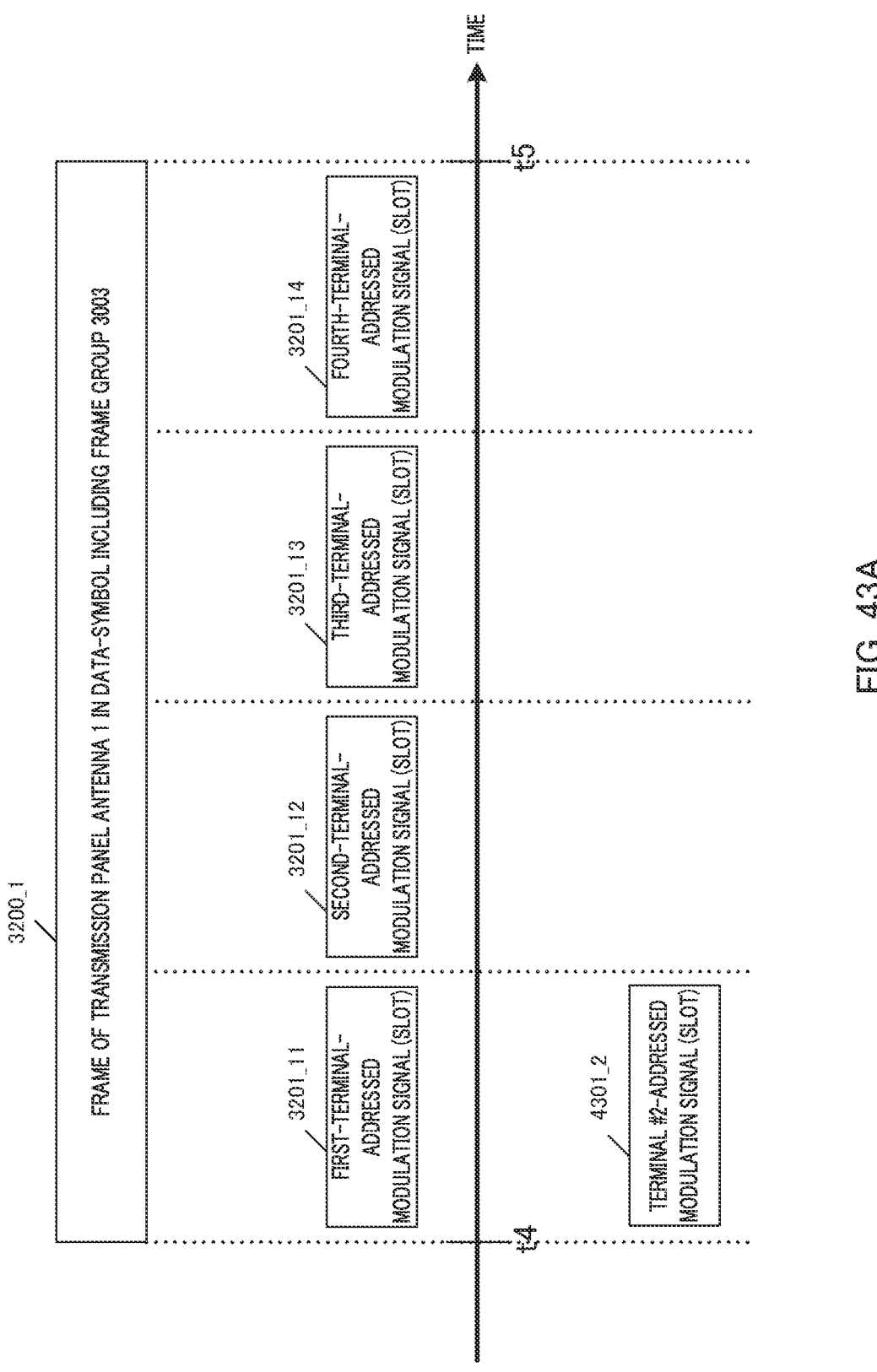
FIG. 43A illustrates a configuration example of a data-symbol including frame groups present in a time period from t4 to 5 according to Embodiment 5.

For example, as illustrated in FIG. 43A, base station #2 labeled 4001_2 transmits "terminal #2-addressed modulation signal (slot) labeled 4301_2" as "first-terminal-addressed modulation signal (slot) labeled 3201_11" in "frame labeled 3200_1 of transmission panel antenna 1 in data-symbol including frame group 3003." Incidentally, "terminal #2-addressed modulation signal (slot) labeled 4301_2" includes data addressed to terminal #2 labeled 902_2. In addition, "terminal #2-addressed modulation signal (slot) labeled 4301_2" is transmitted using transmission panel antenna 1. The method for configuring the transmission method of "terminal #2-addressed modulation signal (slot) labeled 4301_2" is as described in Embodiment 1, Embodiment 2, and the like. For example, as described in Embodiment 2, a plurality of modulation signals (slots) may be assigned to one terminal.

Figure 43B:
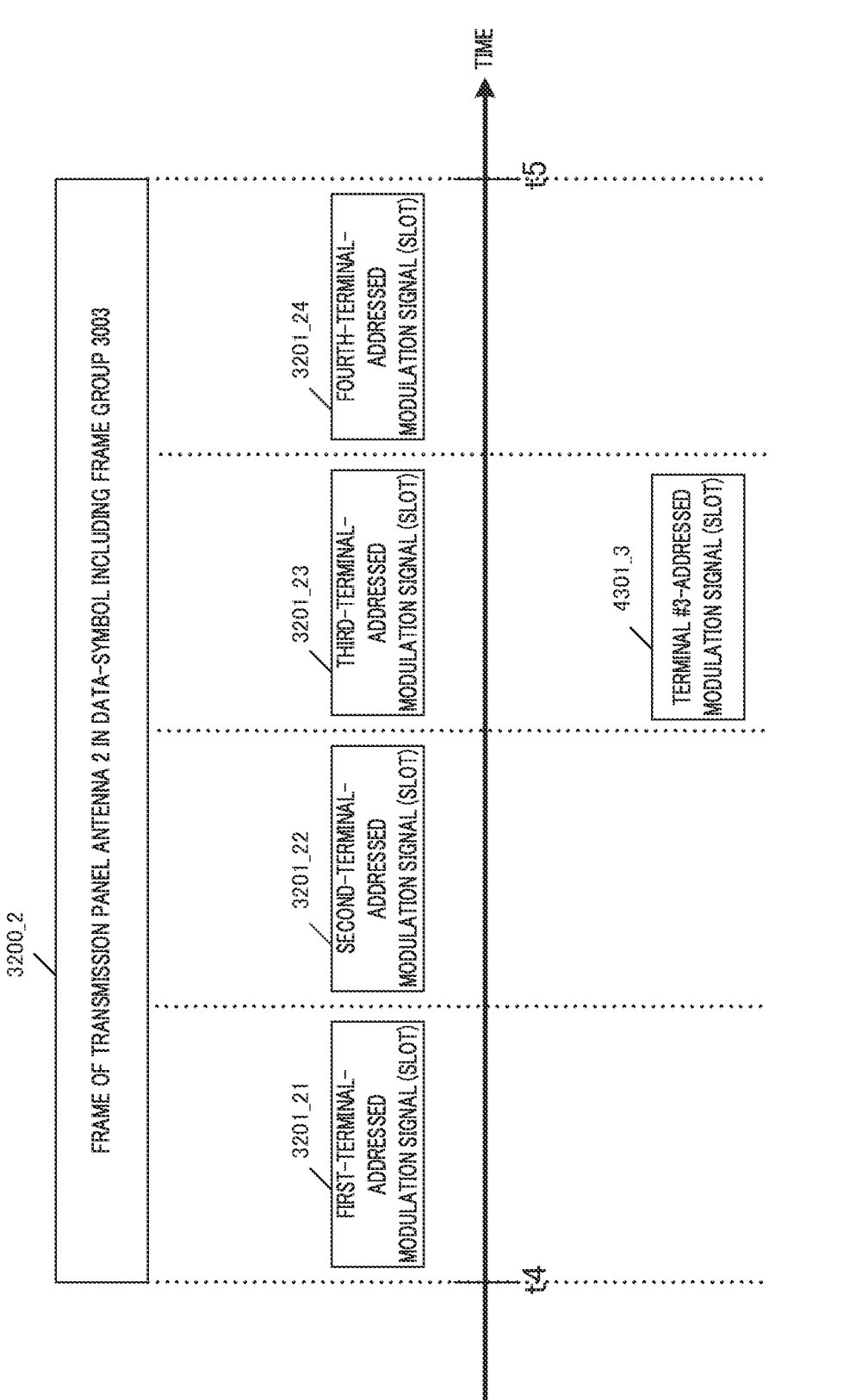
FIG. 43B illustrates the configuration example of the data-symbol including frame groups present in the time period from t4 to t5 according to Embodiment 5.

As illustrated in FIG. 43B, base station #2 labeled 4001_2 transmits "terminal #3-addressed modulation signal (slot) labeled 4301_3" as "third-terminal-addressed modulation signal (slot) labeled 3201_23" in "frame labeled 3200_2 of transmission panel antenna 2 in data-symbol including frame group 3003." Incidentally, "terminal #3-addressed modulation signal (slot) labeled 4301_3" includes data addressed to terminal #3 labeled 902_3. In addition, "terminal #3-addressed modulation signal (slot) labeled 4301_3" is transmitted using transmission panel antenna 2. The method for configuring the transmission method of "terminal #3-addressed modulation signal (slot) labeled 4301_3" is as described in Embodiment 1, Embodiment 2, and the like. For example, as described in Embodiment 2, a plurality of modulation signals (slots) may be assigned to one terminal.

Figure 43C:
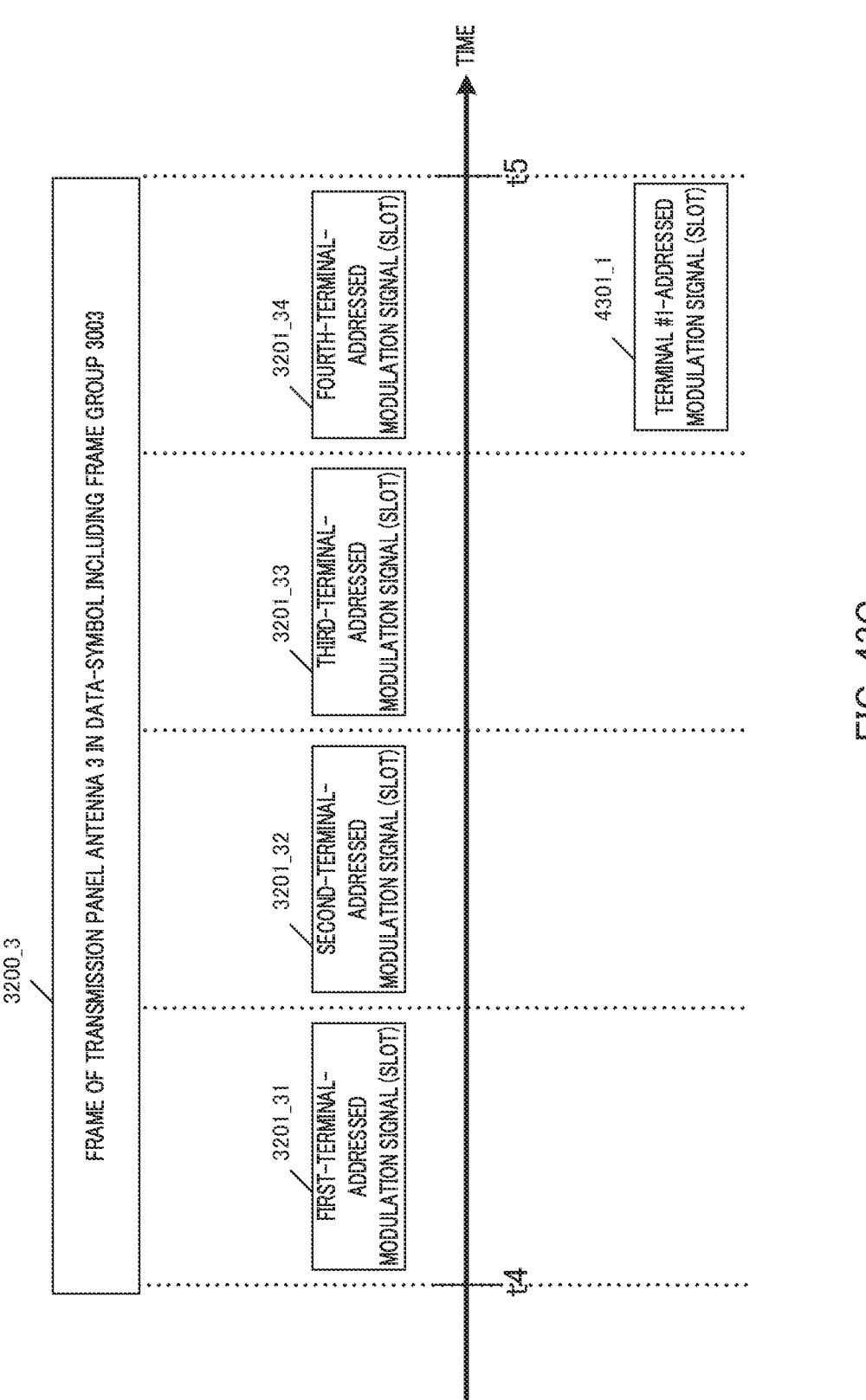
FIG. 43C illustrates the configuration example of the data-symbol including frame groups present in the time period from t4 to t5 according to Embodiment 5.

As illustrated in FIG. 43C, base station #2 labeled 4001_2 transmits "terminal #1-addressed modulation signal (slot) labeled 4301_1" as "fourth-terminal-addressed modulation signal (slot) labeled 3201_34" in "frame labeled 3200_3 of transmission panel antenna 3 in data-symbol including frame group 3003." Incidentally, "terminal #1-addressed modulation signal (slot) labeled 4301_1" includes data addressed to terminal #1 labeled 902_1. In addition, "terminal #1-addressed modulation signal (slot) labeled 4301_1" is transmitted using transmission panel antenna 3. The method for configuring the transmission method of "terminal #1-addressed modulation signal (slot) labeled 4301_1" is as described in Embodiment 1, Embodiment 2, and the like. For example, as described in Embodiment 2, a plurality of modulation signals (slots) may be assigned to one terminal.

Figure 43D:
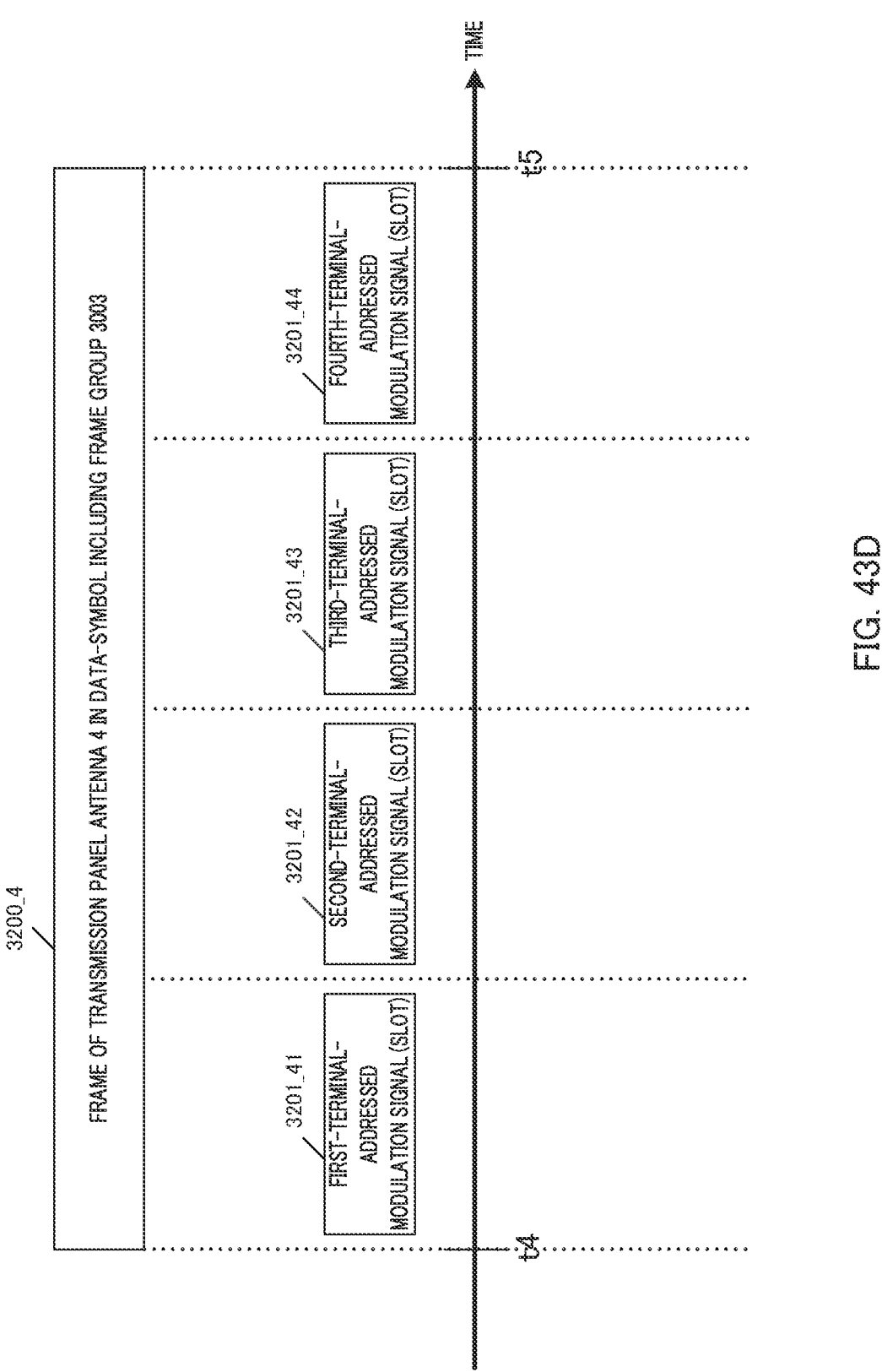
FIG. 43D illustrates the configuration example of the data-symbol including frame groups present in the time period from t4 to t5 according to Embodiment 5.

As illustrated in FIG. 43D, since a modulation signal (slot) is not assigned to "frame labeled 3200_4 of transmission panel antenna 4 in data-symbol including frame group 3003," base station #2 labeled 4001_2 does not transmit the modulation signal (slot).

Incidentally, "terminal #2-addressed modulation signal (slot) labeled 4301_2" of FIG. 43A may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

"Terminal #3-addressed modulation signal (slot) labeled 4301_3" of FIG. 43B may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

"Terminal #1-addressed modulation signal (slot) labeled 4301_1" of FIG. 43C may include, a "reference signal such as DMRS, PTRS, or SRS," a pilot symbol, a pilot signal, a preamble, a symbol including control information, and the like in addition to the data symbol. Incidentally, examples of the symbol including the control information include information on a terminal serving as a destination (ID for identifying the terminal), a transmission method of the modulation signal, information on the modulation system, information on an error correction encoding scheme (e.g., code length, coding rate), information on MCS, and the like.

As described above, base station #2 labeled 4001_1 assigns a symbol for a terminal serving as a destination to a modulation signal to be transmitted for each transmission panel antenna, that is, the modulation signal is assigned for each transmission panel antenna; thus, it is possible to obtain an effect of improving data transmission efficiency in the system. In addition, the terminal transmits the sector-sweep reference signal so as to reduce the occurrence number of collisions, and thereby, an effect can be obtained in which a communication capacity in the system configured of the base station and the terminal is improved.

In addition, terminal #1 labeled 902_1, terminal #2 labeled 902_2, and terminal #3 labeled 902_3 in FIG. 40 can perform the following communication. Hereinafter, panel antennae (transmission panel antennae) that the respective terminals include are identified by using a reference numeral "♭mn." For example, in "♭mn," "m" indicates a panel antenna that terminal #m has, and "n" is a number used for identifying the panel antenna. For example, ♭11 represents panel antenna 1 that terminal #1 has, and ♭12 may represent panel antenna 2 that terminal #1 has. Moreover, for example, ♭21 and ♭23 may represent, respectively, panel antenna 1 that terminal #2 has and panel antenna 3 that terminal #2 has. Furthermore, for example, ♭32 and ♭34 may represent, respectively, panel antenna 4 that terminal #3 has and panel antenna 2 that terminal #3 has. Incidentally, the panel antennae used by the respective terminals described below are merely examples, and the present disclosure is not limited to these.

For example, it is assumed that terminal #1 labeled 902_1 communicates with base station #1 labeled 901_1, using panel antenna 611 that terminal #1 labeled 902_1 includes (At this time, base station #1 labeled 901_1 uses panel antenna 1 of base station #1 labeled 901_1 as illustrated in FIG. 35A).

In addition, it is assumed that terminal #1 labeled 902_1 communicates with base station #2 labeled 4001_2, using panel antenna 612 that terminal #1 labeled 902_1 includes (At this time, base station #2 labeled 4001_2 uses panel antenna 3 of base station #2 labeled 4001_2 as illustrated in FIG. 43C).

In the manner described above, terminal #1 labeled 902_1 can communicate with both of base station #1 labeled 901_1 and base station #2 labeled 4001_2, and thereby an effect can be obtained of improving data transmission efficiency.

For example, it is assumed that terminal #2 labeled 902_2 communicates with base station #1 labeled 901_1, using panel antenna 623 that terminal #2 labeled 902_2 includes (At this time, base station #1 labeled 901_1 uses panel antenna 2 of base station #1 labeled 901_1 as illustrated in FIG. 35B).

In addition, it is assumed that terminal #2 labeled 902_2 communicates with base station #2 labeled 4001_2, using panel antenna 621 that terminal #2 labeled 902_2 includes (At this time, base station #2 labeled 4001_2 uses panel antenna 1 of base station #2 labeled 4001_2 as illustrated in FIG. 43A).

In the manner described above, terminal #2 labeled 902_2 can communicate with both of base station #1 labeled 901_1 and base station #2 labeled 4001_2, and thereby an effect can be obtained of improving data transmission efficiency.

For example, it is assumed that terminal #3 labeled 902_3 communicates with base station #1 labeled 901_1, using panel antenna 632 that terminal #3 labeled 902_3 includes (At this time, base station #1 labeled 901_1 uses panel antenna 3 of base station #1 labeled 901_1 as illustrated in FIG. 35C).

In addition, it is assumed that terminal #3 labeled 902_3 communicates with base station #2 labeled 4001_2, using panel antenna 634 that terminal #3 labeled 902_3 includes (At this time, base station #2 labeled 4001_2 uses panel antenna 3 of base station #2 labeled 4001_2 as illustrated in FIG. 43B).

In the manner described above, terminal #3 labeled 902_3 can communicate with both of base station #1 labeled 901_1 and base station #2 labeled 4001_2, and thereby an effect can be obtained of improving data transmission efficiency.

As described above, when including a plurality of panel antennae, the terminal performs communication with a plurality of base stations by using the plurality of panel antennae, and thereby an effect can be obtained of improving data transmission efficiency. As in Embodiment 2, the terminal may transmit a plurality of modulation signals to one base station by using a plurality of panel antennae, or may receive, using a plurality of panel antennae, a plurality of modulation signals transmitted by the one base station.

Next, a description will be given of a communication situation in an exemplary communication state illustrated in FIG. 40. The communication situation in the exemplary communication state illustrated in FIG. 40 may be the same as in FIGS. 26 and 27. Hereinafter, an example of a communication situation will be described with reference to FIGS. 26 and 27.

FIG. 26 illustrates an example of a situation where base station #2 labeled 4001_2 and "terminal #1 labeled 902_1, terminal #2 labeled 902_2, and terminal #3 labeled 902_3" communicate with each other in FIG. 40. FIG. 26 illustrates in (A) an example of a transmission situation of the modulation signal in base station #2 labeled 4001_2, and FIG. 26 illustrates in (B) an example of a transmission situation of the modulation signal in "terminal #1 labeled 902_1, terminal #2 labeled 902_2, and terminal #3 labeled 902_3." Incidentally, in FIG. 26, horizontal axes represent time in (A) and (B). Note that, in FIG. 26, the components that operate in the same manner as in FIG. 18 are denoted by the same reference numerals.

First, base station #2 labeled 4001_2 transmits sector-sweep reference signal 1801_1. Note that, this point has already been described with reference to FIG. 30, and a description thereof will be thus omitted.

Then, terminals such as "terminal #1 labeled 902_1, terminal #2 labeled 902_2, and terminal #3 labeled 902_3" transmit sector-sweep reference signal 1851_1. Note that, this point has already been described with reference to, for example, FIGS. 13 and 14, and a description thereof will be thus omitted.

Base station #2 labeled 4001_2 transmits feedback signal group 2602_1. Note that, this point has already been described with reference to FIGS. 31A, 31B, 31C, and 31D, and a description thereof will be thus omitted.

Then, base station #2 labeled 4001_2 transmits "data-symbol including frame group 2603_1." Note that, this point has already been described with reference to FIGS. 32A, 32B, 32C, and 32D, and a description thereof will be thus omitted (Thus, "data-symbol including frame group 2603_1" is considered to be a frame for downlink, for example).

The terminals such as "terminal #1 labeled 902_1, terminal #2 labeled 902_2, and terminal #3 labeled 902_3" transmit "data-symbol including frame group 2652_1." Note that, a configuration of the frame will be described later with reference to FIG. 44 (Thus, "data-symbol including frame group 2652_1" is considered to be a frame for uplink, for example).

Next, base station #2 labeled 4001_2 transmits "data-symbol including frame group 2603_2." A configuration method of "data-symbol including frame group 2603_2" is as described with reference to FIGS. 32A, 32B, 32C, and 32D.

The terminals such as "terminal #1 labeled 902_1, terminal #2 labeled 902_2, and terminal #3 labeled 902_3" transmit "data-symbol including frame group 2652_2." Note that, a configuration of the frame will be described later with reference to FIG. 44.

FIG. 27 illustrates an example of the transmission situation of the modulation signal in base station #2 labeled 4001_2 and the transmission situation of the modulation signal in the terminals such as "terminal #1 labeled 902_1, terminal #2 labeled 902_2, and terminal #3 labeled 902_3"

after FIG. 26. Note that, in FIG. 27, the components that operate in the same manner as in FIG. 18 are denoted by the same reference numerals.

FIG. 27 illustrates in (A) an example of the transmission situation of the modulation signal in base station #2 labeled 4001_2, and illustrates a temporal continuation of the transmission situation of the modulation signal in base station #2 labeled 4001_2 in (A) of FIG. 26.

FIG. 27 illustrates in (B) an example of the transmission situation of the modulation signal in "terminal #1 labeled 902_1, terminal #2 labeled 902_2, and terminal #3 labeled 902_3," and illustrates a temporal continuation of the transmission situation of the modulation signal in "terminal #1 labeled 902_1, terminal #2 labeled 902_2, and terminal #3 labeled 902_3" in (B) of FIG. 26.

Incidentally, in FIG. 27, horizontal axes represent time in (A) and (B).

After FIG. 26 in (A) and (B), base station #2 labeled 4001_2 transmits "data-symbol including frame group 2603_3." A configuration method of "data-symbol including frame group 2603_2" is as described with reference to FIGS. 32A, 32B, 32C, and 32D.

The terminals such as "terminal #1 labeled 902_1, terminal #2 labeled 902_2, and terminal #3 labeled 902_3" transmit "data-symbol including frame group 2652_3." Note that, a configuration of the frame will be described later with reference to FIG. 44.

Next, base station #2 labeled 4001_2 transmits sector-sweep reference signal 1801_2. Note that, this point has already been described with reference to FIG. 30, and a description thereof will be thus omitted.

Then, terminals such as "terminal #1 labeled 902_1, terminal #2 labeled 902_2, and terminal #3 labeled 902_3" transmit sector-sweep reference signal 1851_2. Note that, this point has already been described with reference to, for example, FIGS. 13 and 14, and a description thereof will be thus omitted.

Base station #2 labeled 4001_2 transmits feedback signal group 2602_2. Note that, this point has already been described with reference to FIGS. 31A, 31B, 31C, and 31D, and a description thereof will be thus omitted.

Then, base station #2 labeled 4001_2 transmits "data-symbol including frame group 2603_4." Note that, this point has already been described with reference to FIGS. 32A, 32B, 32C, and 32D, and a description thereof will be thus omitted.

The terminals such as "terminal #1 labeled 902_1, terminal #2 labeled 902_2, and terminal #3 labeled 902_3" transmit "data-symbol including frame group 2652_4." Note that, a configuration of the frame will be described later with reference to FIG. 44.

Thus, base station #2 labeled 4001_2 and the terminals may transmit the sector-sweep reference signal before the "transmission of the "data-symbol including frame group"" by base station #2 labeled 4001_2 and/or the transmission of the "data-symbol including frame group" by terminals such as "terminal #1 labeled 902_1, terminal #2 labeled 902_2, and terminal #3 labeled 902_3,"" and base station #2 labeled 4001_2 and the terminals may again transmit the sector-sweep reference signal after the "transmission of the "data-symbol including frame group" by base station #2 labeled 4001_2 and/or the transmission of the "data-symbol including frame group" by terminals such as "terminal #1 labeled 902_1, terminal #2 labeled 902_2, and terminal #3 labeled 902_3."" Base station #2 labeled 4001_2 and the terminals thus perform selection of the transmission panel antenna to be used, perform configuration of transmission beamforming, and thereby can obtain the effect of achieving high data reception quality.

It is needless to say that "terminal #1 labeled 902_1, terminal #2 labeled 902_2, and terminal #3 labeled 902_3" may communicate with base station #1 labeled 901_1 in the same manner.

Further, synchronization need not be attained between communications of terminal #1 labeled 902_1 with two base stations (communication with base station #1 labeled 901_1 and communication with base station #2 labeled 4001_2) (non-coherent or partial-coherent). For example, terminal #1 labeled 902_1 may receive the feedback signal from base station #2 labeled 4001_2 (see FIG. 42C) while transmitting the (data-symbol including) frame group to base station #1 labeled 901_1 (see FIG. 36). As another example, in terminal #1 labeled 902_1, the "type of the symbol transmitted by base station #1 labeled 901_1" and the "type of the symbol transmitted by base station #2 labeled 4001_2" are different from each other. Moreover, in terminal #1 labeled 902_1, the "type of the symbol addressed to base station labeled 901_1" to be transmitted and the "type of the symbol addressed to base station #2 labeled 4001_2" to be transmitted may be different from each other. Further, similarly to terminal #1 labeled 902_1, with respect to terminal #2 labeled 902_2 and terminal #3 labeled 902_3, synchronization need not be attained between communications with two base stations (communication with base station #1 labeled 901_1 and communication with base station #2 labeled 4001_2). In other words, when a terminal communicates with a plurality of base stations, the communication situation between each of the plurality of base stations and the terminal may be independent of each other. However, the communications between the terminal and the two base stations may be synchronized (coherent, or partial-coherent).

Next, with reference to FIG. 44, a description will be given of a configuration example of "data-symbol including frame group 2652_i" transmitted by the terminals such as "terminal #1 labeled 902_1, terminal #2 labeled 902_2, and terminal #3 labeled 902_3." Incidentally, for example, i is an integer of 1 or more, and in FIG. 44, a horizontal axis represents time.

Figure 44:
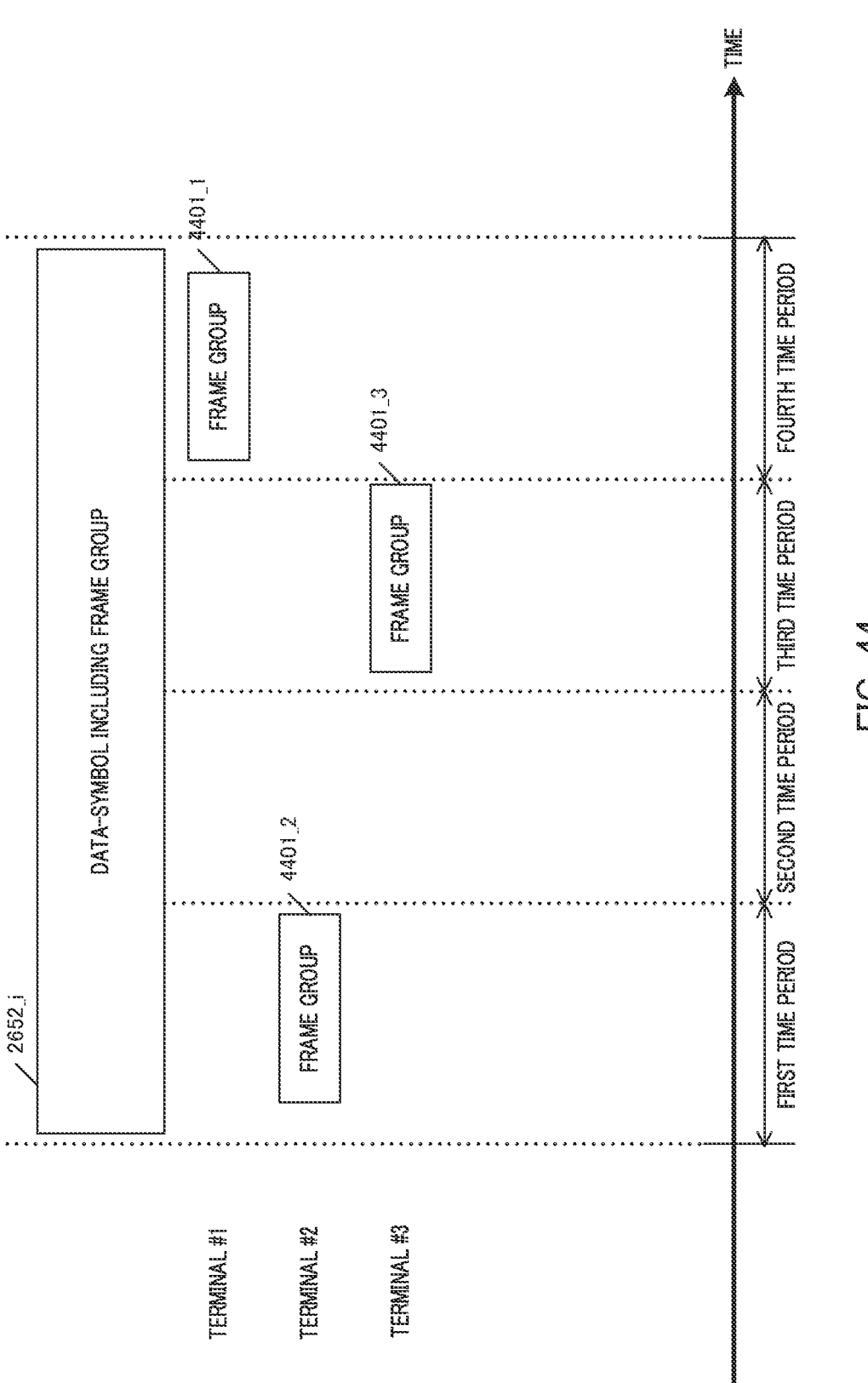
FIG. 44 illustrates a configuration example of a "data-symbol including frame groups" transmitted by a terminal according to Embodiment 5.

As illustrated in FIG. 44, "data-symbol including frame group 2652_i" is assumed to be composed of the first time period, the second time period, the third time period, and the fourth time period.

Then, for example, terminal #1 labeled 902_1 transmits (data-symbol including) frame group 4401_1, using the fourth time period. Terminal #2 labeled 902_2 transmits (data-symbol including) frame group 4401_2, using the first time period. Terminal #3 labeled 902_3 transmits (data-symbol including) frame group 4401_3, using the third time period.

Further, in FIG. 44, each terminal may transmit a modulation signal (slot), using a plurality of time periods and may transmit a plurality of modulation signals (slots) in a certain time period. This point is as described in Embodiment 1, Embodiment 2, and/or the like.

As described above, "data-symbol including frame group 2652_i" transmitted by the terminals such as "terminal #1 labeled 902_1 and terminal #2 labeled 902_2" perform, for example, time division; each terminal transmits a frame group; and base station #2 labeled 4001_2 receives the frame group transmitted by the terminal, thus, interference can be suppressed, and high data reception quality can be obtained. In addition, in base station #2 labeled 4001_2, depending on a usage method the panel antenna, it is possible to provide a situation with small mutual interference even when a plurality of terminals transmits modulation signals (slots) at the same time.

Note that, frame groups 4401_1, 4401_2, and 4401_3 of FIG. 44 may include, for example, a "reference signal such as DMRS, PTRS, or SRS," a pilot symbol, a pilot signal, a preamble, a symbol including control information, or the like in addition to the data symbol.

Although in FIG. 44 a description has been given with a case in which the frame group transmitted by the terminal is time-divided, the frame transmitted by the terminal may be frequency-divided and/or may be spatial-divided using MU-MIMO with the panel antenna.

Figure 45A:
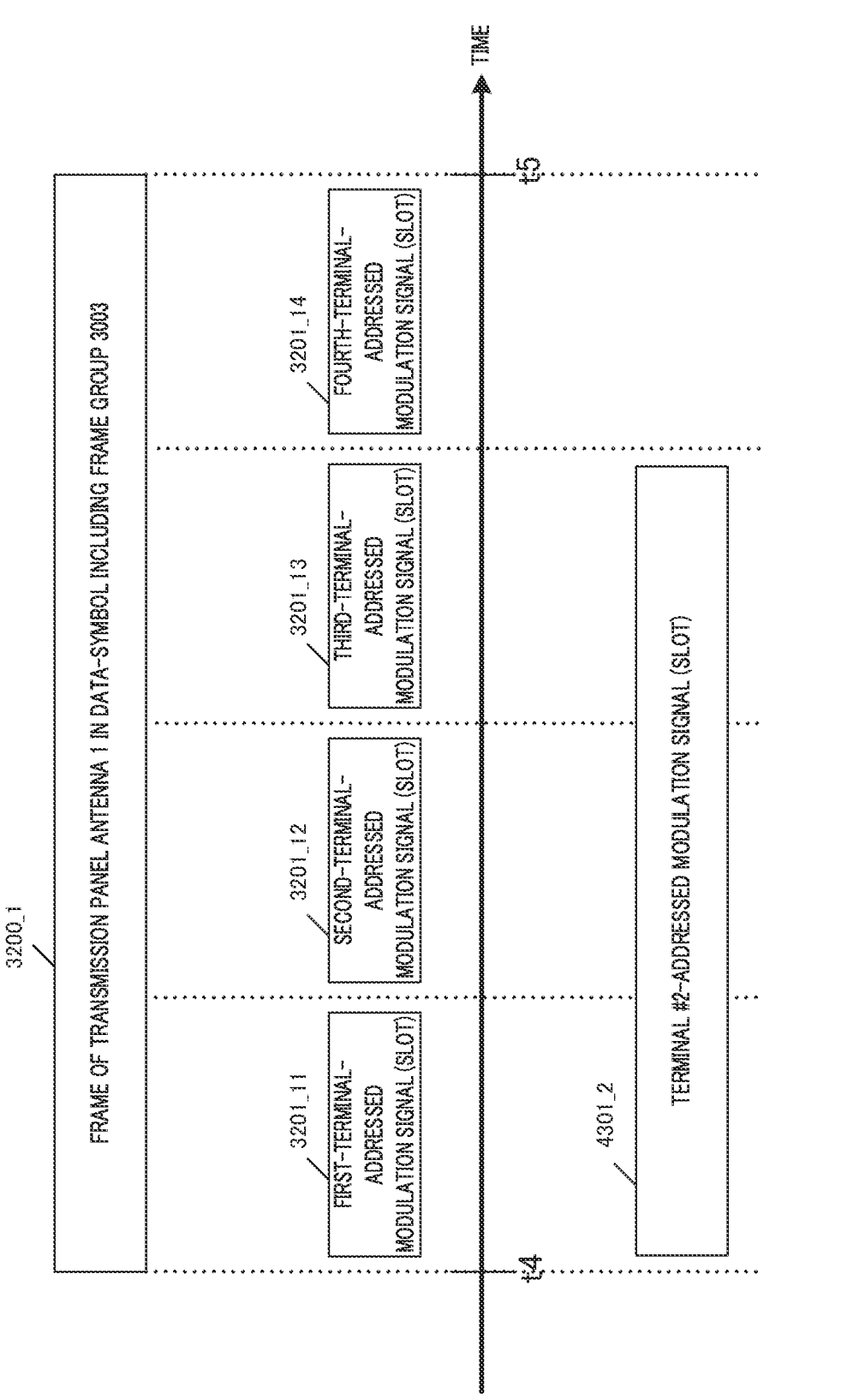
FIG. 45A illustrates a variation of a data-symbol including frame groups present in a time period from t4 to t5 according to Embodiment 5.
Figure 45B:
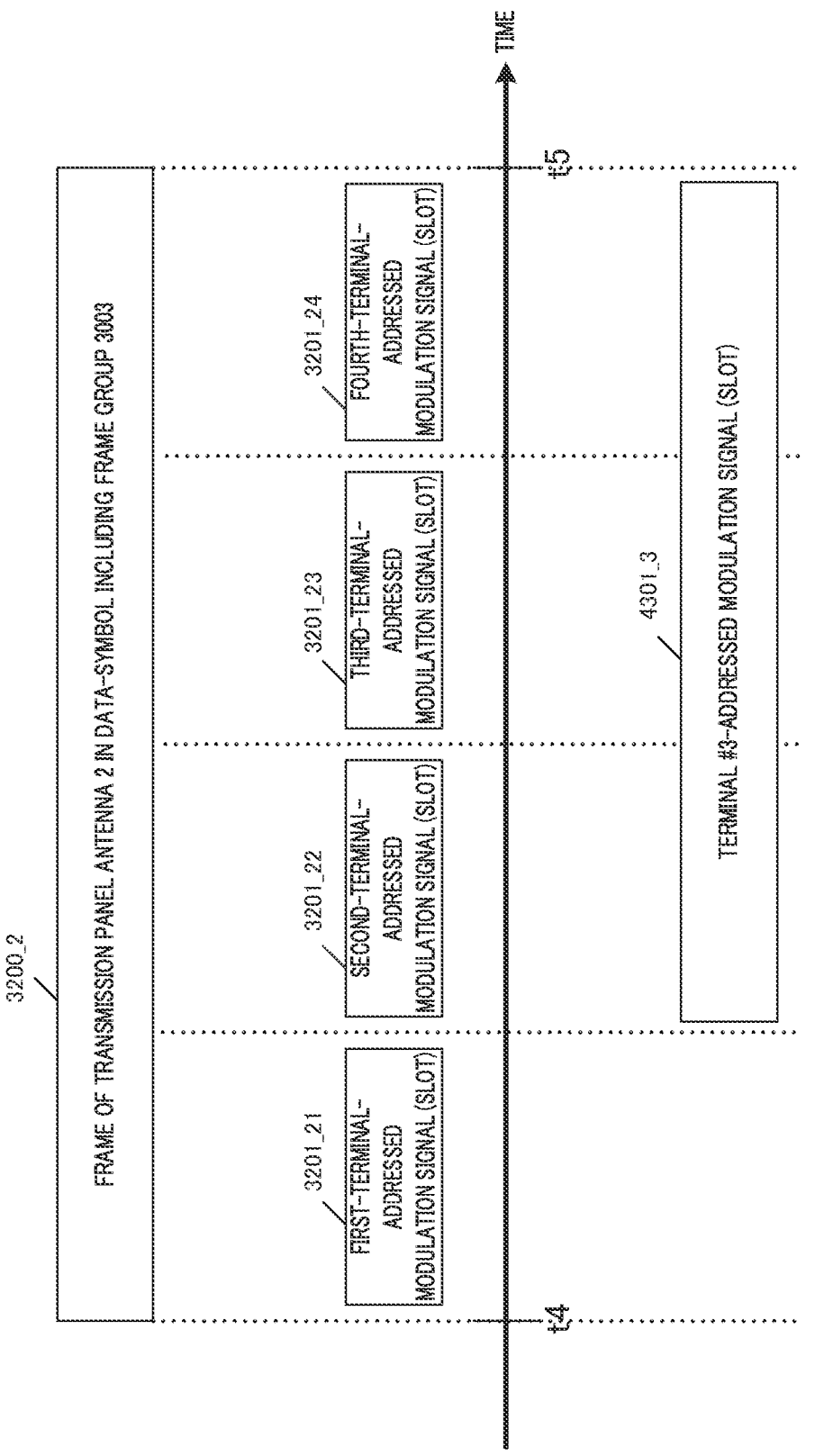
FIG. 45B illustrates the variation of the data-symbol including frame groups present in the time period from t4 to t5 according to Embodiment 5.
Figure 45C:
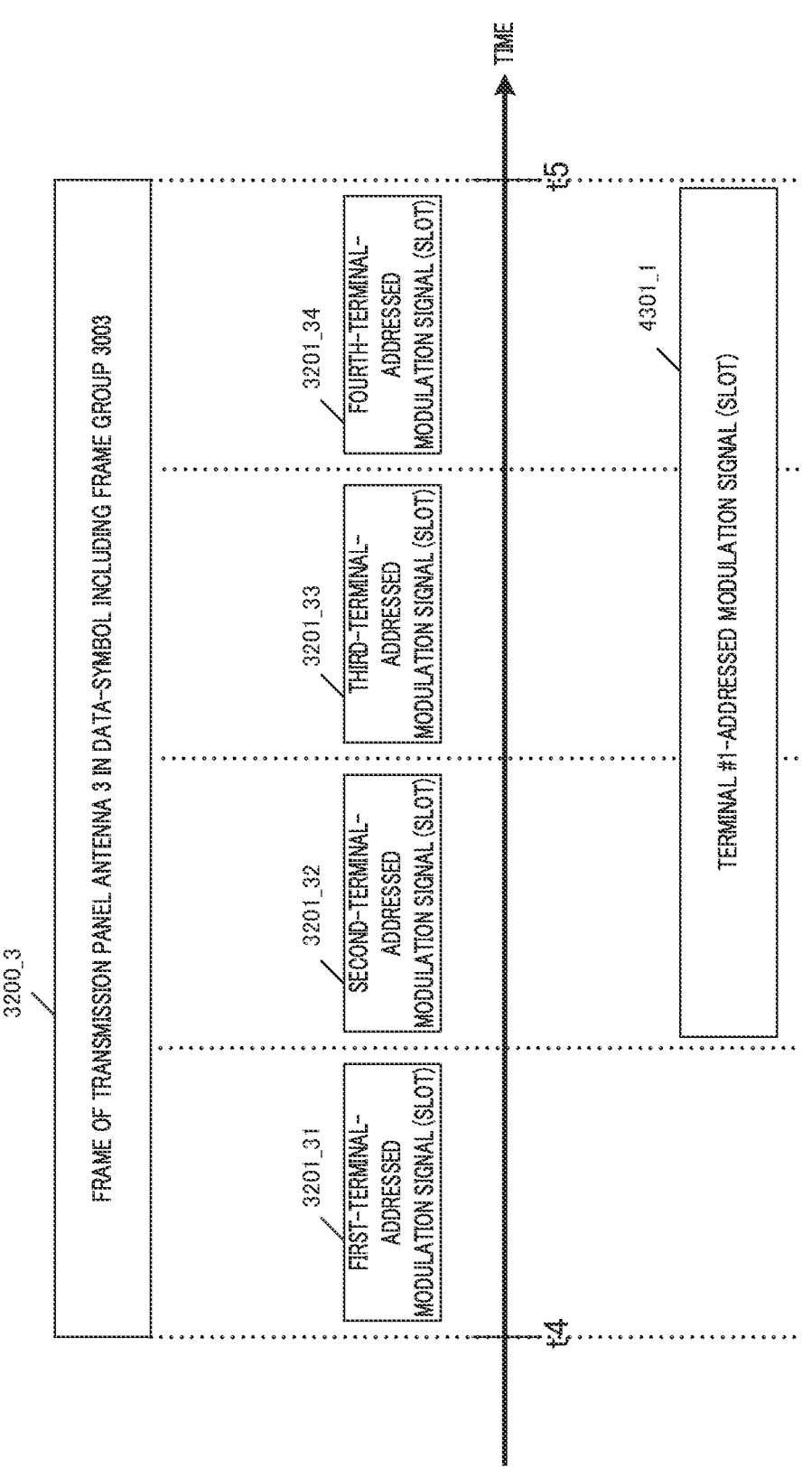
FIG. 45C illustrates the variation of the data-symbol including frame groups present in the time period from t4 to t5 according to Embodiment 5.
Figure 45D:
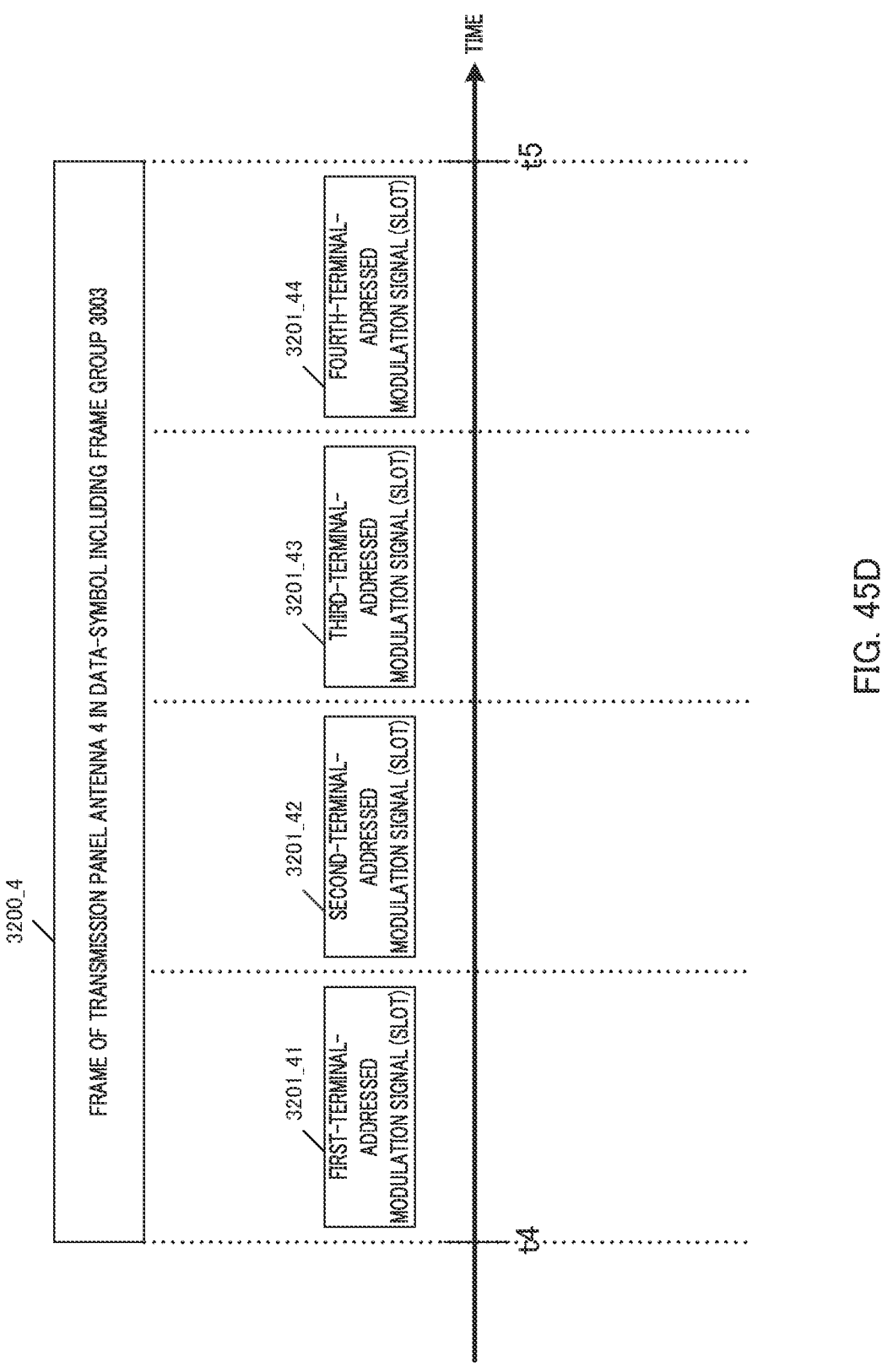
FIG. 45D illustrates the variation of the data-symbol including frame groups present in the time period from t4 to t5 according to Embodiment 5.

FIG. 45A is a variation of FIG. 43A, and in FIG. 45A, the components that operate in the same manner as in FIG. 43A are denoted by the same reference numerals. FIG. 45B is a variation of FIG. 43B, and in FIG. 45B, the components that operate in the same manner as in FIG. 43B are denoted by the same reference numerals. FIG. 45C is a variation of FIG. 43C, and in FIG. 45C, the components that operate in the same manner as in FIG. 43C are denoted by the same reference numerals. FIG. 45D is a variation of FIG. 43D, and in FIG. 45D, the components that operate in the same manner as in FIG. 43D are denoted by the same reference numerals.

FIG. 45A is different from FIG. 43A in that terminal #2-addressed modulation signal (slot) 4301_2 is composed of one slot in FIG. 43A whereas terminal #2-addressed modulation signal (slot) 4301_2 is composed of three slots in FIG. 45A. Consequently, an empty slot not allocated is present in FIG. 43A whereas an empty slot is effectively utilized in FIG. 45A, and thus, the data transmission efficiency is improved. The same applies to FIGS. 45B, 45C, and 45D in that the empty slot is effectively utilized. Accordingly, the usage of the slots is not limited to those of FIGS. 43A, 43B, 43C, 43D, 45A. 45B, 45C, and 45D.

Further, focusing on the second slot of each of FIGS. 45A, 45B, 45C, and 45D, terminal #2-addressed modulation signal (slot) 4301_2 is present in FIG. 45A, terminal #3-addressed modulation signal (slot) 4301_3 is present in FIG. 45B, terminal #1-addressed modulation signal (slot) 4301_1 is present in FIG. 45C. In the manner described above, a modulation signal (slot) with a different destination for each panel antenna may be present in a certain time period, for example, the second slot of each of FIGS. 45A, 45B, 45C, and 45D. In this case, the four panel antennae may use the same frequency (the same frequency band), or may not use the same frequency (the same frequency band).

Note that, when using the same frequency (same frequency band), transmission by MU-MIMO can be considered. For example, in a case where a directivity is different in each panel antenna, an effect can be obtained of reducing interference with each other even when MU-MIMO is used (note that, the related transmission method has been also described in Embodiment 2).

When base station #2 labeled 4001_2 transmits the modulation signal for each panel antenna, the modulation signal transmitted by panel antenna 1 and modulation signal transmitted by panel antenna 2 may be present in the same time period, and the frequency (frequency band) of the modulation signal transmitted by panel antenna 1 and the frequency (frequency band) of the modulation signal transmitted by panel antenna 2 may be the same or may be partly common to each other, for example.

For example, when a modulation signal is transmitted from each panel antenna, the following cases of 5-1, 5-2, and 5-3 are conceivable.

Case 5-1:

When base station #2 labeled 4001_2 includes a plurality of panel antennae and transmits a modulation signal from each panel antenna, a set of modulation signals having the same or partly common frequency (frequency band) may be present in a certain time period.

Alternatively, the frequency (frequency band) of the modulation signal transmitted from panel antenna 1 and the frequency (frequency band) of the modulation signal transmitted from panel antenna 2, by base station #2 labeled 4001_2, may be different from each other.

Case 5-2:

When base station #2 labeled 4001_2 includes a plurality of panel antennae and transmits a modulation signal from each panel antenna, a set of modulation signals having different frequencies (frequency band) may be present in a certain time period.

Moreover, the frequency (frequency band) of the modulation signal transmitted from panel antenna 1 and the frequency (frequency band) of the modulation signal transmitted from panel antenna 2, by base station #2 labeled 4001_2, may be the same, and these two modulation signals may be time-division multiplexed.

Case 5-3:

When base station #2 labeled 4001_2 includes a plurality of panel antennae and transmits a modulation signal from each panel antenna, a set of modulation signals having the same frequency (frequency band) and being time-division multiplexed may be present.

For example, in a case where base station #2 labeled 4001_2 has the configuration of FIG. 1A, 1B, or 1C, the modulation signal may be generated and transmitted from the panel antenna based on control signal 100 to cause a situation where "Case 5-1 is present" and/or "Case 5-2 is present" and/or "Case 5-3 is present." However, control signal 100 is configured to be output from the third processor, but it is not limited to this configuration. For example, control signal 100 may be output from other inside components, or may be a signal from the outside.

Next, a description will be given of a relationship between the modulation signal transmitted to the terminal by base station #1 labeled 901_1 and the modulation signal transmitted to the terminal by base station #2 labeled 4001_2 in FIG. 40.

For example, in FIG. 40, terminal #1 labeled 902_1 receives the modulation signal transmitted by base station #1 labeled 901_1 and the modulation signal transmitted by base station #2 labeled 4001_2. At this time, in a certain time period, the frequency (frequency band) of the modulation signal (addressed to terminal #1 labeled 902_1) transmitted by base station #1 labeled 901 and the frequency (frequency band) of the modulation signal (addressed to terminal #1 labeled 902_1) transmitted by base station #2 labeled 4001_2 may be the same or may be partly common to each other.

For example, when the terminal communicates with a plurality of base stations, the following cases of 5-4, 5-5, and 5-6 are conceivable.

Case 5-4:

When a terminal communicates with a plurality of base stations, in the terminal-addressed modulation signals transmitted by the plurality of base stations, a set of modulation signals having the same or partly common frequency (frequency band) may be present in a certain time period.

Alternatively, terminal #1 labeled 902_1 receives the modulation signal transmitted by base station #1 labeled 901_1 and the modulation signal transmitted by base station

2 labeled 4001_2. At this time, the frequency (frequency band) of the modulation signal (addressed to terminal #1 labeled 902_1) transmitted by base station #1 labeled 901 and the frequency (frequency band) of the modulation signal (addressed to terminal #1 labeled 902_1) transmitted by base station #2 labeled 4001_2 may be different from each other.

Case 5-5:

When a terminal communicates with a plurality of base stations, in the terminal-addressed modulation signals transmitted by the plurality of base stations, a set of modulation signals having different frequencies (frequency band) may be present in a certain time period.

In addition, terminal #1 labeled 902_1 receives the modulation signal transmitted by base station #1 labeled 901_1 and the modulation signal transmitted by base station #2 labeled 4001_2. At this time, the frequency (frequency band) of the modulation signal (addressed to terminal #1 labeled 902_1) transmitted by base station #1 labeled 901 and the frequency (frequency band) of the modulation signal (addressed to terminal #1 labeled 902_1) transmitted by base station #2 labeled 4001_2 may be the same, and these two modulation signals may be time-division multiplexed.

Case 5-6:

When a terminal communicates with a plurality of base stations, in the terminal-addressed modulation signals transmitted by the plurality of base stations, a set of modulation signals having the same frequency (frequency band) and being time-division multiplexed may be present.

For example, in a case where base station #1 labeled 901_1 has the configuration of FIG. 1A, 1B, or 1C and base station #2 labeled 4001_2 has the configuration of FIG. 1A, 1B, or 1C, control may be made (in the following manner) such that "the modulation signal is generated and transmitted based on control signal 100 from the panel antenna in base station #1 labeled 901_1 to cause a situation where "Case 5-1 is present" and/or "Case 5-2 is present" and/or "Case 5-3 is present," and "the modulation signal is generated and transmitted based on control signal 100 from the panel antenna in base station #2 labeled 4001_2 to cause a situation where "Case 5-1 is present" and/or "Case 5-2 is present" and/or "Case 5-3 is present." The control is made to switch as appropriate between the situations described above. However, control signal 100 is configured to be output from the third processor, but it is not limited to this configuration. For example, control signal 100 may be output from other inside components, or may be a signal from the outside.

Incidentally, terminal #1 labeled 902_1 receives the modulation signal transmitted by base station #1 labeled 901_1 and the modulation signal transmitted by base station #2 labeled 4001_2. At this time, the modulation signal (addressed to terminal #1 labeled 902_1) transmitted by base station #2 labeled 4001_2 may include a part or all of the data included in the modulation signal (addressed to terminal #1 labeled 902_1) transmitted by base station #1 labeled 901.

Hence, when communicating with a plurality of base stations, a terminal may obtain certain data from two or more base stations. Thus, it is possible to obtain an effect of improving reception quality of the data.

As described in the present embodiment, the terminal transmits the sector-sweep reference signal so as to reduce the occurrence number of collisions, and thereby, an effect can be obtained in which a communication capacity in the system configured of the base station and the terminal is improved. Incidentally, the configurations of the terminal and the base station are not limited to the configuration of FIG. 1A, 1B, or 1C. Moreover, the configurations of the transmission panel antenna and the reception panel antenna are not limited to the configurations of FIGS. 3 and 4, and may be, for example, a configuration of an antenna that can generate one or more, or a plurality of transmission directivities and reception directivities. In addition, signals, frames and the like are present in the respective drawings, but how they are referred to is not limited to these, the functions of the signals itself to be transmitted is important.

In addition, as in the present embodiment, by using the panel antenna efficiently, and the terminal performing communication with a plurality of base stations, an effect can be obtained of improving transmission efficiency of the data and the reception quality of the data.

Embodiment 6

In the present embodiment, a description will be given of a variation of Embodiments 1 to 5.

FIG. 46A illustrates a configuration example of a communication system according to Embodiment 6. As illustrated in FIG. 46A, it is assumed that base station 4601_0 and terminal #1 labeled 4602_1 perform communication with each other, using the first frequency (band). It is also assumed that base station 4601_0 and terminal #1 labeled 4602_1 perform communication with each other, using the second frequency (band).

For example, the first frequency (band) may be 52.6 GHz or more, and the second frequency (band) may be FR (Frequency Range) 1 and/or FR2. Provided that, FR1 is "frequency from 450 MHz to 6 GHz (both inclusive)" and FR2 is "frequency from 24.25 GHz to 52.6 GHz (both inclusive)." As another example, the first frequency (band) may be higher than the second frequency (band). Furthermore, the first frequency (band) may be FR2, and the second frequency (band) may be FR1.

FIG. 46B illustrates another configuration example of a communication system different from that of FIG. 46A according to Embodiment 6. As illustrated in FIG. 46B, it is assumed that base station #1 labeled 4601_1 performs communication with terminal #1 labeled 4602_1, using the first frequency (band). It is also assumed that base station #2 labeled 4601_2 performs communication with terminal #1 labeled 4602_1, using the second frequency (band). Moreover, it is assumed that base station #1 labeled 4601_1 and base station #2 labeled 4601_2 perform wired and/or radio communication.

Figure 47:
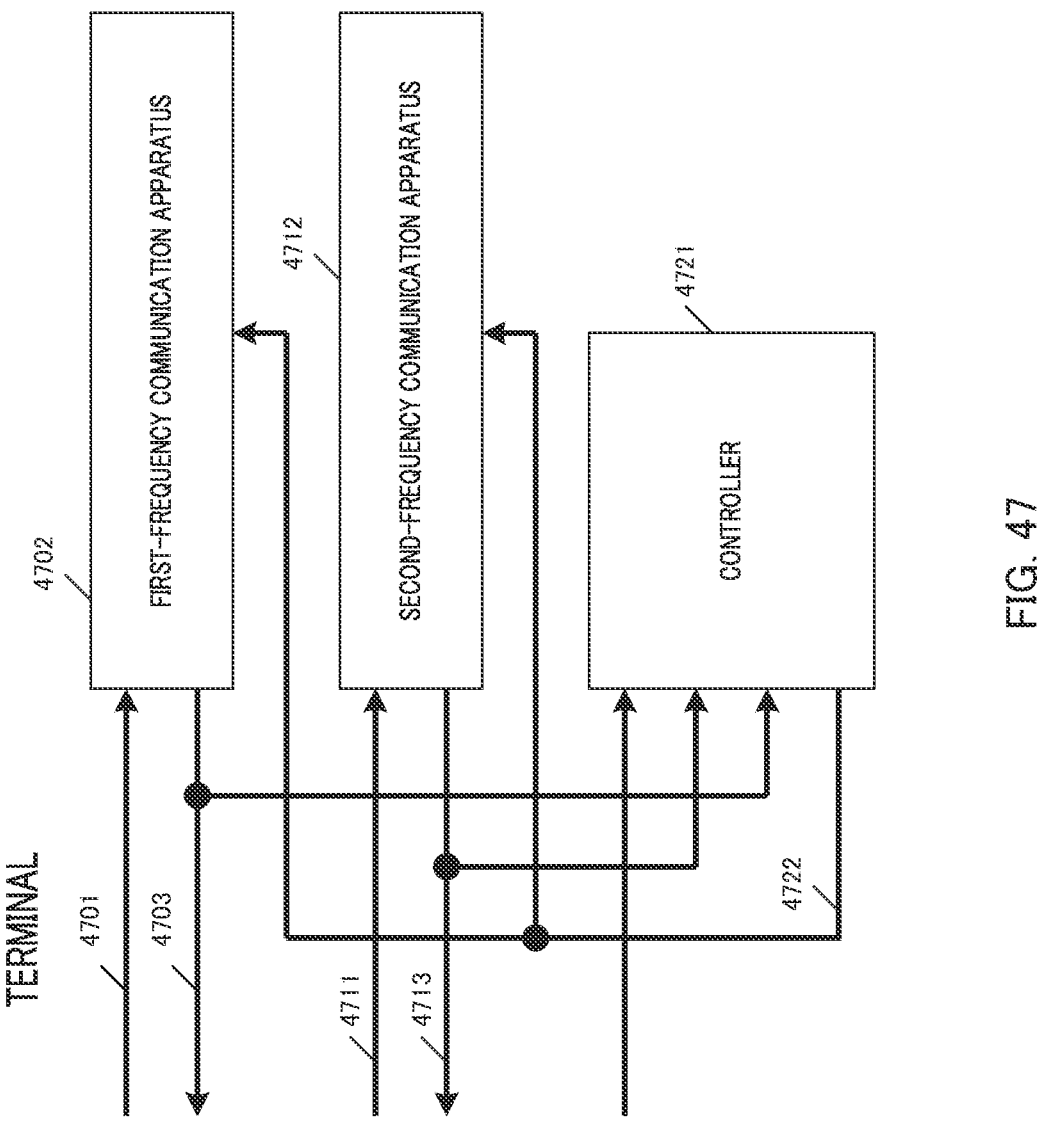
FIG. 47 illustrates a configuration example of a terminal according to Embodiment 6.

FIG. 47 illustrates a configuration example of a terminal according to Embodiment 6. First-frequency communication apparatus (i.e., communication apparatus for first frequency) 4702 is an apparatus that generates and transmits a modulation signal at the first frequency (band). In addition, first-frequency communication apparatus 4702 receives and demodulates the modulation signal at the first frequency (band).

Thus, first-frequency communication apparatus 4702 receives control signal 4722 as input. When control signal 4722 includes information indicating generation of a modulation signal at the first frequency (band), first-frequency communication apparatus 4702 receives data 4701 as input, performs error correction encoding, modulation (mapping based on the modulation system), processing for transmission (e.g., processing for SISO, MIMO, and MISO), frequency converting, processing such as amplification, and thereby generates a modulation signal to transmit as radio wave.

In addition, first-frequency communication apparatus 4702, based on the information of control signal 4722, receives the modulation signal (radio wave) at the first frequency (band) transmitted from a communication counterpart, performs frequency converting, processing for reception, processing such as error correction decoding, and outputs received data 4703.

Note that, the specific configuration of first-frequency communication apparatus 4702 may be, for example, the configuration illustrated in FIG. 1A, 1B, or 1C. An operational example of first-frequency communication apparatus 4702 has been described in, for example, Embodiments 1 to 5.

Second-frequency communication apparatus (communication apparatus for second frequency) 4712 is an apparatus that generates and transmits a modulation signal at the second frequency (band). In addition, second-frequency communication apparatus 4712 receives and demodulates the modulation signal at the second frequency (band).

Thus, second-frequency communication apparatus 4712 receives control signal 4722 as input. When control signal 4722 includes information indicating generation of a modulation signal at the second frequency (band), second-frequency communication apparatus 4712 receives data 4711 as input, performs error correction encoding, modulation (mapping based on the modulation system), processing for transmission (e.g., processing for SISO, MIMO, and MISO), frequency converting, processing such as amplification, and thereby generates a modulation signal to transmit as radio wave.

In addition, second-frequency communication apparatus 4712, based on the information of control signal 4722, receives the modulation signal (radio wave) at the second frequency (band) transmitted from a communication counterpart, performs frequency converting, processing for reception, processing such as error correction decoding, and outputs received data 4713.

Note that, the specific configuration of second-frequency communication apparatus 4712 may be, for example, the configuration illustrated in FIG. 1A, 1B, or 1C. An operational example of second-frequency communication apparatus 4712 has been described in, for example, Embodiments 1 to 5.

Controller 4721 receives received data 4703 and 4713 as input, generates and outputs control signal 4722 including information on: a control signal for transmission at the first frequency (band); a control signal for reception at the first frequency (band); a control signal for transmission at the second frequency (band), and a control signal for reception at the second frequency (band).

Figure 48:
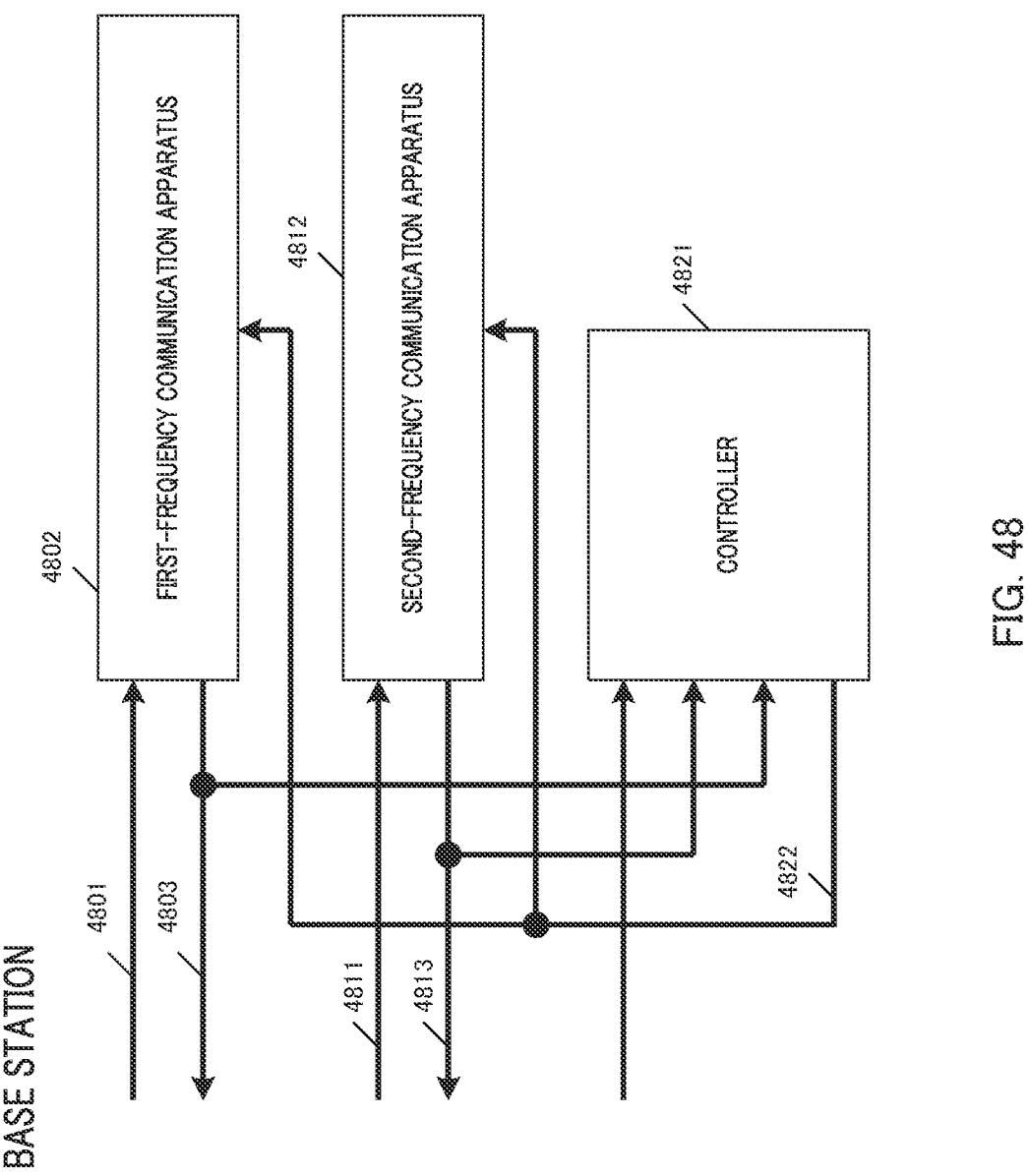
FIG. 48 illustrates a configuration example of a base station according to Embodiment 6.

FIG. 48 illustrates a configuration example of a base station according to Embodiment 6. First-frequency communication apparatus 4802 is an apparatus that generates and transmits a modulation signal at the first frequency (band). In addition, first-frequency communication apparatus 4802 receives and demodulates the modulation signal at the first frequency (band).

Thus, first-frequency communication apparatus 4802 receives control signal 4822 as input. When control signal 4822 includes information indicating generation of a modulation signal at the first frequency (band), first-frequency communication apparatus 4802 receives data 4801 as input, performs error correction encoding, modulation (mapping based on the modulation system), processing for transmission (e.g., processing for SISO, SIMO, MIMO, and MISO), frequency converting, processing such as amplification, and thereby generates a modulation signal to transmit as radio wave.

In addition, first-frequency communication apparatus 4802, based on the information of control signal 4822, receives the modulation signal (radio wave) at the first frequency (band) transmitted from a communication counterpart, performs frequency converting, processing for reception, processing such as error correction decoding, and outputs received data 4803.

Note that, the specific configuration of first-frequency communication apparatus 4802 may be, for example, the configuration illustrated in FIG. 1A, 1B, or 1C. An operational example of first-frequency communication apparatus 4802 has been described in, for example, Embodiments 1 to 5.

Second-frequency communication apparatus 4812 is an apparatus that generates and transmits a modulation signal at the second frequency (band). In addition, second-frequency communication apparatus 4812 receives and demodulates the modulation signal at the second frequency (band).

Thus, second-frequency communication apparatus 4812 receives control signal 4822 as input. When control signal 4822 includes information indicating generation of a modulation signal at the second frequency (band), second-frequency communication apparatus 4812 receives data 4811 as input, performs error correction encoding, modulation (mapping based on the modulation system), processing for transmission (e.g., processing for SISO, SIMO, MIMO, and MISO), frequency converting, processing such as amplification, and thereby generates a modulation signal to transmit as radio wave.

In addition, second-frequency communication apparatus 4812, based on the information of control signal 4822, receives the modulation signal (radio wave) at the second frequency (band) transmitted from a communication counterpart, performs frequency converting, processing for reception, processing such as error correction decoding, and outputs received data 4813.

Controller 4821 receives received data 4803 and 4813 as input, generates and outputs control signal 4822 including information on: a control signal for transmission at the first frequency (band); a control signal for reception at the first frequency (band); a control signal for transmission at the second frequency (band); and a control signal for reception at the second frequency (band).

Incidentally, base station #1 labeled 4601_1 and base station #2 labeled 4601_2 illustrated in FIGS. 46A and 46B may have the configuration of FIG. 48.

Figures 49A, 49B:
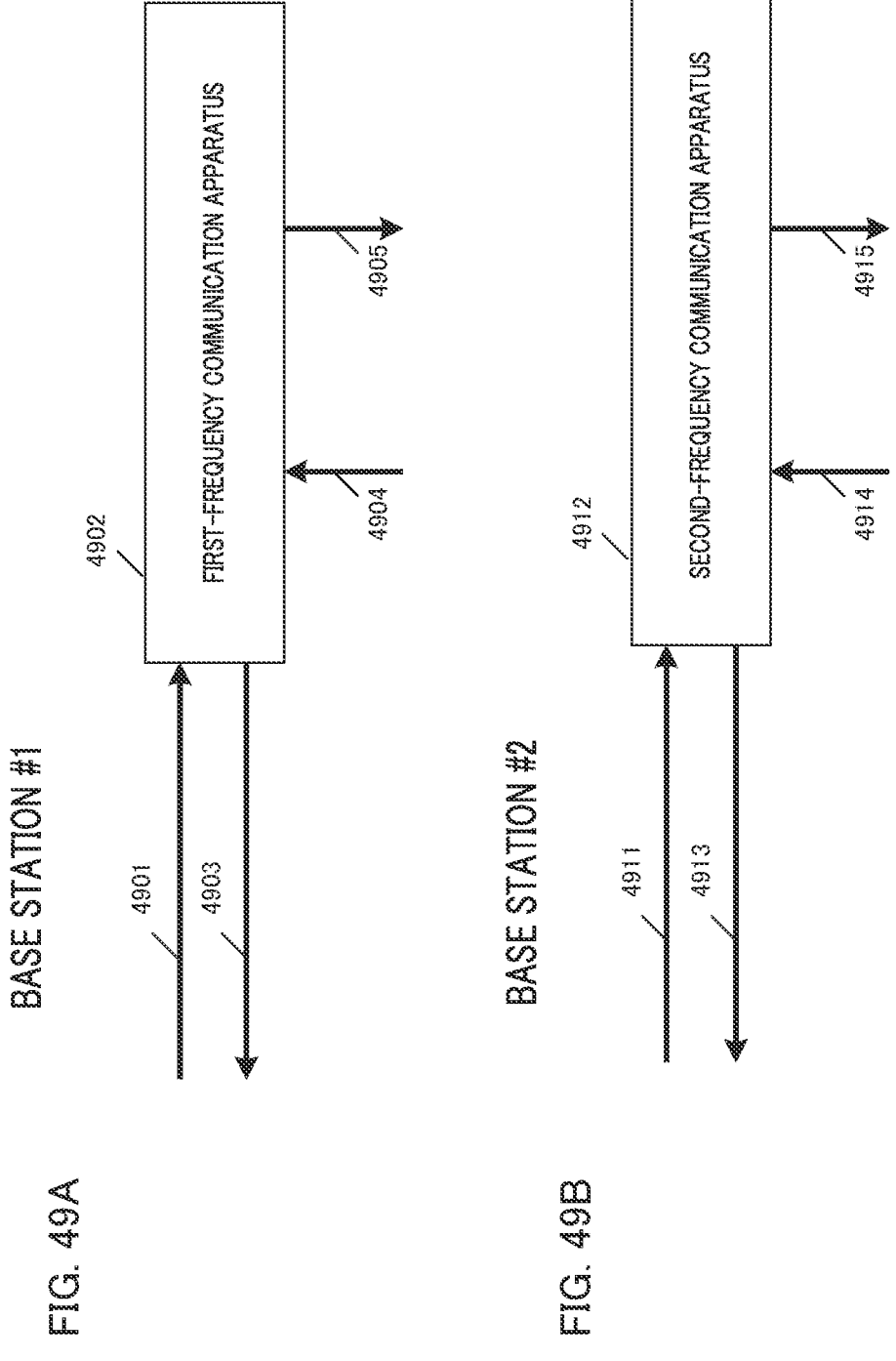
FIG. 49A illustrates a configuration example of another base station according to Embodiment 6.
FIG. 49B illustrates a configuration example of still another base station according to Embodiment 6.

FIG. 49A illustrates a configuration example of base station #1 labeled 4601_1 of FIG. 46B according to Embodiment 6. First-frequency communication apparatus 4902 is an apparatus that generates and transmits a modulation signal at the first frequency (band). In addition, first-frequency communication apparatus 4902 receives and demodulates the modulation signal at the first frequency (band).

Thus, first-frequency communication apparatus 4902 receives first control signal 4904 as input. When generation of a modulation signal at the first frequency (band) is required based on information of first control signal 4904 and the like, first-frequency communication apparatus 4902 receives data 4901 as input, performs error correction encoding, modulation (mapping based on the modulation system), processing for transmission (e.g., processing for SISO, SIMO, MIMO, and MISO), frequency converting, processing such as amplification, and thereby generates a modulation signal to transmit as radio wave.

In addition, first-frequency communication apparatus 4902, based on the information of first control signal 4922 and the like, receives the modulation signal (radio wave) at the first frequency (band) transmitted from a communication counterpart, performs frequency converting, processing for reception, processing such as error correction decoding, and outputs received data 4903.

Note that, first-frequency communication apparatus 4902 may output second control signal 4905. In this case, first control signal 4904 is a signal obtained from base station #2 labeled 4601_2 via a network, and second control signal 4905 is transmitted to base station #2 labeled 4601_2 via the network.

FIG. 49B illustrates a configuration example of base station #2 labeled 4601_2 of FIG. 46B according to Embodiment 6. Second-frequency communication apparatus 4912 is an apparatus that generates and transmits a modulation signal at the second frequency (band). In addition, second-frequency communication apparatus 4912 receives and demodulates the modulation signal at the second frequency (band).

Thus, second-frequency communication apparatus 4912 receives third control signal 4914 as input. When generation of a modulation signal at the second frequency (band) is required based on information of third control signal 4914 and the like, second-frequency communication apparatus 4912 receives data 4911, performs error correction encoding, modulation (mapping based on the modulation system), processing for transmission (e.g., processing for SISO, SIMO, MIMO, and MISO), frequency converting, processing such as amplification, and thereby generates a modulation signal to transmit as radio wave.

In addition, second-frequency communication apparatus 4912, based on the information of third control signal 4914 and the like, receives the modulation signal (radio wave) at the second frequency (band) transmitted from a communication counterpart, performs frequency converting, processing for reception, processing such as error correction decoding, and outputs received data 4913.

Note that, second-frequency communication apparatus 4912 may output fourth control signal 4915. In this case, third control signal 4914 is a signal obtained from base station #1 labeled 4601_1 via a network, and fourth control signal 4915 is transmitted to base station #1 labeled 4601_1 via the network.

FIGS. 50A, 50B, and 50C illustrate examples of transmission situations from time t0 to time t5.

FIG. 50A illustrates an example of a modulation signal transmitted at the first frequency (band) by base station 4601_0 in FIG. 46A or an example of a modulation signal transmitted at the first frequency (band) by base station #1 labeled 4601_1 in FIG. 46B.

In FIG. 50A, the components that operate in the same manner as in FIG. 10 are denoted by the same reference numerals.

FIG. 50B illustrates an example of a modulation signal transmitted at the second frequency (band) by terminal #1 labeled 4602_1 in FIG. 46A and FIG. 46B.

FIG. 50C illustrates an example of a modulation signal transmitted at the second frequency (band) by base station 4601_0 in FIG. 46A or an example of a modulation signal transmitted at the second frequency (band) by base station #2 labeled 4601_2 in FIG. 46B.

An operational example of a communication system illustrated in FIG. 46A will be described.

As in FIG. 50A, base station 4601_0 of FIG. 46A transmits sector-sweep reference signal 1001 in the time period from time t0 to time t1.

Note that, the time period from time t1 to time t2 is a terminal response period.

As in FIG. 50A, base station 4601_0 of FIG. 46A transmits feedback signal 1002 in the time period from time t2 to time t3.

FIG. 11 illustrates an example of sector-sweep reference signal 1001 of FIG. 50A transmitted by base station 4601_0 of FIG. 46A. An operation in FIG. 11 has already been described, and a description thereof will be thus omitted.

FIG. 12 illustrates a configuration example of "sector-sweep reference signal 1101_*i* in transmission panel antenna i" of FIG. 11. The operation in FIG. 12 has already been described, and a description thereof will be thus omitted.

Then, as in FIG. 50B, terminal #1 labeled 4602_1 of FIG. 46A transmits frame T1 labeled 5001_1, using the second frequency (band).

Figure 51:
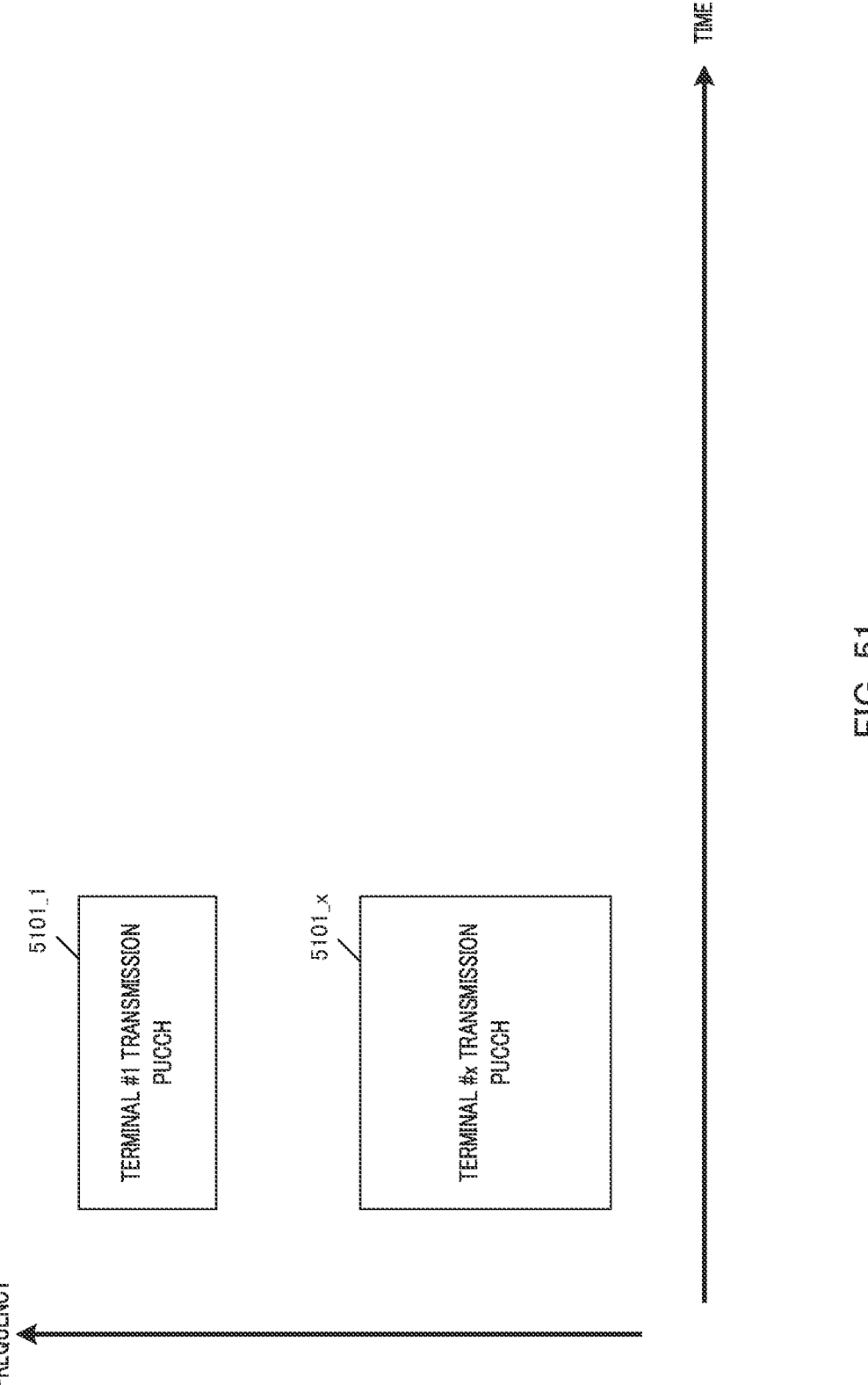
FIG. 51 illustrates an example of PUCCH of the terminal according to Embodiment 6.

At this time, frame T1 labeled 5001_1 may be transmitted using Physical Uplink Control Channel (PUCCH) as illustrated in FIG. 51.

FIG. 51 illustrates an example of PUCCH of the terminal. In FIG. 51, a horizontal axis represents time and a vertical axis represents frequency.

For example, terminal #1 labeled 4602_1 of FIG. 46A transmits frame T1 labeled 5001_1 by using "terminal #1 transmission PUCCH" 5101_1 illustrated in FIG. 51.

Incidentally, "terminal #x transmission PUCCH" 5101_*x* that is transmitted by terminal #x may be present at other frequencies.

Frame T1 labeled 5001_1 may be transmitted by using, instead of PUCCH, Random Access Channel (PACH), Physical Uplink Shared Channel (PUSCH), and the like, but is not limited to these.

Figure 52:
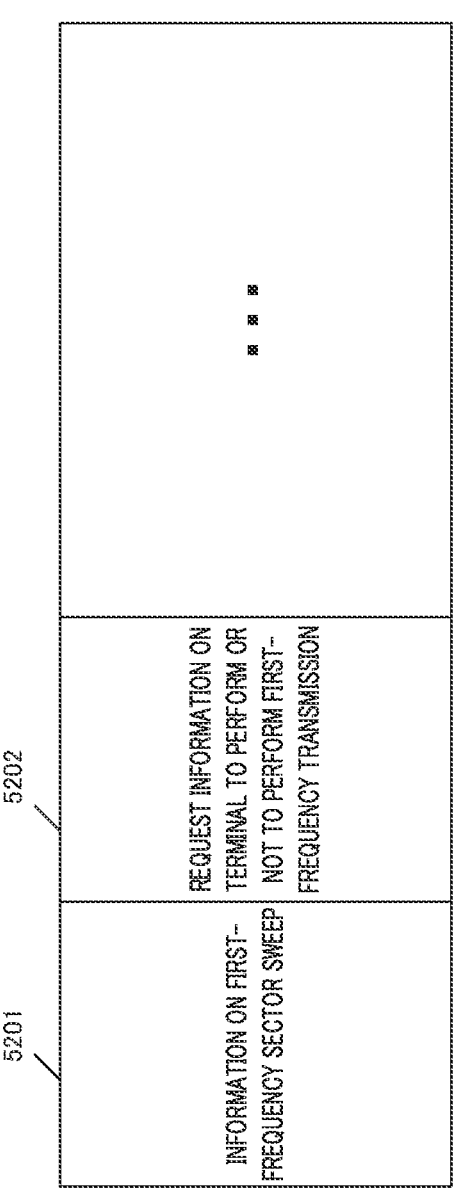
FIG. 52 illustrates a configuration example of a frame according to Embodiment 6.

FIG. 52 illustrates a configuration example of frame T1 labeled 5001_1 transmitted by terminal #1 labeled 4602_1 of FIG. 46A.

For example, it is assumed that frame T1 labeled 5001_1 transmitted by terminal #1 labeled 4602_1 of FIG. 46A includes "information on first-frequency (band) sector sweep" 5201 and "request information on terminal to perform or not to perform first-frequency transmission" 5202.

"information on first-frequency (band) sector sweep" 5201 is assumed to include information on "transmission panel antenna and parameter number" with high reception quality for terminal #1 labeled 4602_1 in sector-sweep reference signal 1001 transmitted by base station 4601_0 of FIG. 46A. This point has been described in Embodiments 1 to 5, and the like.

Note that, this information can be generated by obtaining sector-sweep reference signal 1001 and the "ID of the transmission panel antenna (identification number)" and the "identification number (ID) of the parameter used in beamforming (directivity control)" which are included the sector-sweep reference signal.

It is assumed that "request information on terminal to perform or not to perform first-frequency transmission" 5202 includes information on whether or not terminal #1 labeled 4602_1 of FIG. 46A performs the transmission at the first frequency (band) to base station 4601_0.

Base station 4601_0 of FIG. 46A receives frame T1 labeled 5001_1 transmitted by terminal #1 labeled 4602_1. Accordingly, for example, base station 4601_0 transmits frame B1 labeled 5011_1 in the time period from time t2 to time t3.

Figure 53:
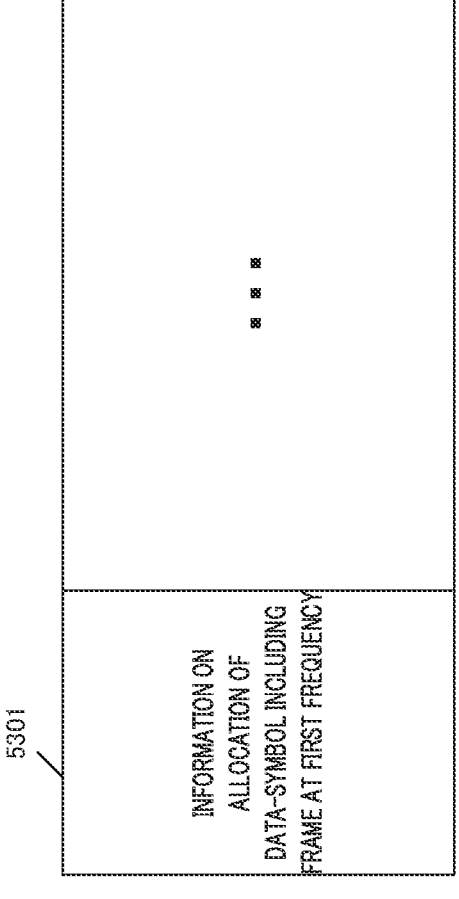
FIG. 53 illustrates another configuration example of a frame according to Embodiment 6.

FIG. 53 illustrates a configuration example of frame B1 labeled 5011_1 transmitted at the second frequency (band) by base station 4601_0 of FIG. 46A.

For example, it is assumed that frame B1 labeled 5011_1 transmitted by base station 4601_0 of FIG. 46A includes "information on allocation of data-symbol including frame at first frequency" 5301.

It is assumed that "information on allocation of data-symbol including frame at first frequency" 5301 includes at least information on a slot with which base station 4601_0 of FIG. 46A transmits a data symbol addressed to terminal #1 labeled 4602_1.

For example, as illustrated in FIG. 17, data-symbol including frame 1003 of FIG. 50A is composed of first-terminal-addressed modulation signal (slot) 1701_1, second-terminal-addressed modulation signal (slot) 1701_2, third-terminal-addressed modulation signal (slot) 1701_3, and fourth-terminal-addressed modulation signal (slot) 1701_4. Base station 4601_0 of FIG. 46A is assumed to transmit a data-symbol including frame to terminal #1 labeled 4602_1 by using, for example, first-terminal-addressed modulation signal (slot) 1701_1 of FIG. 17.

In this case, "information on allocation of data-symbol including frame at first frequency" 5301 of FIG. 53 includes "information indicating that the data-symbol including frame is transmitted using first-terminal-addressed modulation signal (slot) 1701_1."

Thus, by obtaining "information on allocation of data-symbol including frame at first frequency" 5301, terminal #1 labeled 4602_1 of FIG. 46A can know a position of the data-symbol including frame that base station 4601_0 has transmitted to terminal #1 labeled 4602_1. Terminal #1 labeled 4602_1 of FIG. 46A can receive the modulation signal at the first frequency (band) transmitted by base station 4601_0 and thus obtain data included in the data symbol, accordingly.

Note that, a configuration method of the data-symbol including frame of FIG. 50A transmitted by base station 4601_0 is not limited to that in FIG. 17. Another configuration method of the data-symbol including frame of FIG. 50A is, for example, as described in Embodiments 1 to 5.

Further, frame B1 labeled 5011_1 transmitted at the second frequency (band) by base station 4601_0 of FIG. 46A may include not only information on the position of the data symbol but also, for example, information on an error correction encoding method used for generating the data symbol, information on a transmission method used for generating the data symbol, information on a modulation system used for generating the data symbol, and the like.

Thus, as illustrated in FIG. 50A, base station 4601_0 of FIG. 46A, transmits "data-symbol including frame 1003" including a data symbol addressed to terminal #1 labeled 4602_1 of FIG. 46A in the time period from time t4 to time t5.

An operation will be described when "request information on terminal to perform or not to perform first-frequency transmission" 5202 in FIG. 52 indicates "not to perform."

In a case where the reference numeral 5202 indicates "not to perform," terminal #1 labeled 4602_1 of FIG. 46A does not transmit a modulation signal at the first frequency (band).

Thus, when terminal #1 labeled 4602_1 needs to transmit data to base station 4601_0, terminal #1 labeled 4602_1 transmits, for example, a modulation signal at the second frequency (band) or a modulation signal at the third frequency (band).

Incidentally, it is assumed that the third frequency (band) is a frequency (band) different from the first frequency (band); further, the third frequency (band) is a frequency (band) also different from the second frequency (band).

An operation will be described when "request information on terminal to perform or not to perform first-frequency transmission" 5202 in FIG. 52 indicates "to perform."

In a case where the reference numeral 5202 indicates "to perform," terminal #1 labeled 4602_1 of FIG. 46A transmits a modulation signal at the first frequency (band).

Thus, terminal #1 labeled 4602_1 of FIG. 46A needs to transmit a signal for sector sweep. That is, terminal #1 labeled 4602_1 transmits the sector-sweep signal for determining an antenna and a beamforming parameter that are used for transmission by terminal #1, and for determining an antenna and a beamforming parameter that are used for reception by base station 4601_0.

Figure 54:
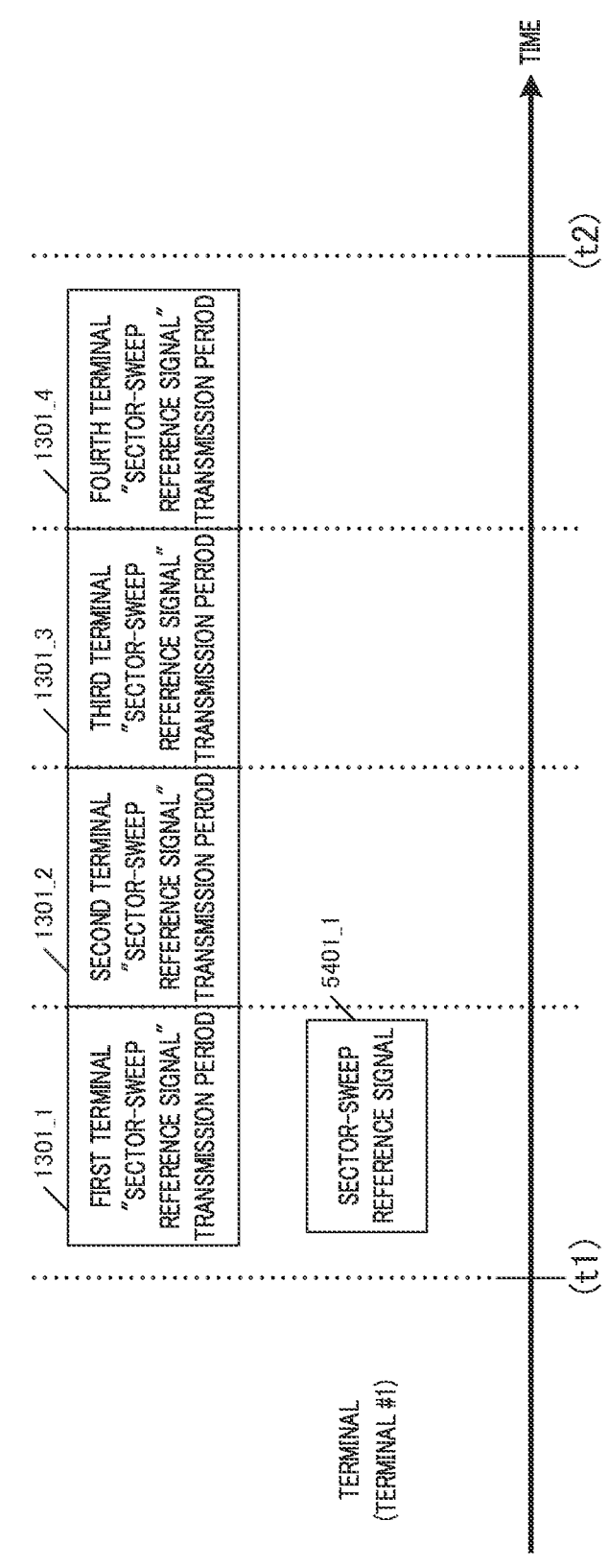
FIG. 54 illustrates an example of a case where the terminal according to Embodiment 6 transmits a sector sweep signal.

FIG. 54 illustrates an example of a case where terminal #1 labeled 4602_1 of FIG. 46A transmits a sector-sweep signal. In FIG. 54, the components that operate in the same manner as in FIG. 13 are denoted by the same reference numerals.

For example, in the time period from time t1 to time t2 in FIGS. 50A, 50B, and 50C, terminal #1 labeled 4602_1 of FIG. 46A transmits a sector-sweep reference signal at the first frequency (band). Since a detailed method has been described in Embodiments 1 to 5; here, a brief description will be given.

As illustrated in FIG. 54, terminal #1 labeled 4602_1 of FIG. 46A transmits sector-sweep reference signal 5401_1 in "first terminal "sector-sweep reference signal" transmission period" 1301_1. Then, base station 4601_0 of FIG. 46A receives sector-sweep reference signal 5401_1 and transmits the modulation signal to terminal #1 labeled 4602_1, and thereby "the antenna and the beamforming parameter that are used for transmission by terminal #1 labeled 4602_1 and the antenna and the beamforming parameter that are used for reception by base station 4601_0." Since details have been described in Embodiments 1 to 5, a description thereof will be thus omitted.

In the above, a description has been given with a case where "in the time period from time t1 to time t2 in FIGS. 50A, 50B, and 50C, terminal #1 labeled 4602_1 of FIG. 46A transmits the sector-sweep reference signal at the first frequency (band)," but a time period to transmit "the sector-sweep reference signal at the first frequency (band) by terminal #1 labeled 4602_1 of FIG. 46A" is not limited to this time period.

For example, terminal #1 labeled 4602_1 of FIG. 46A may transmit the sector-sweep reference signal at the first frequency (band) in a terminal response period in other time period, or may transmit the sector-sweep reference signal in a period to transmit a data symbol.

Terminal #1 labeled 4602_1 of FIG. 46A transmits the data-symbol including frame to base station 4601_0 after transmitting the sector-sweep reference signal.

Figure 55:
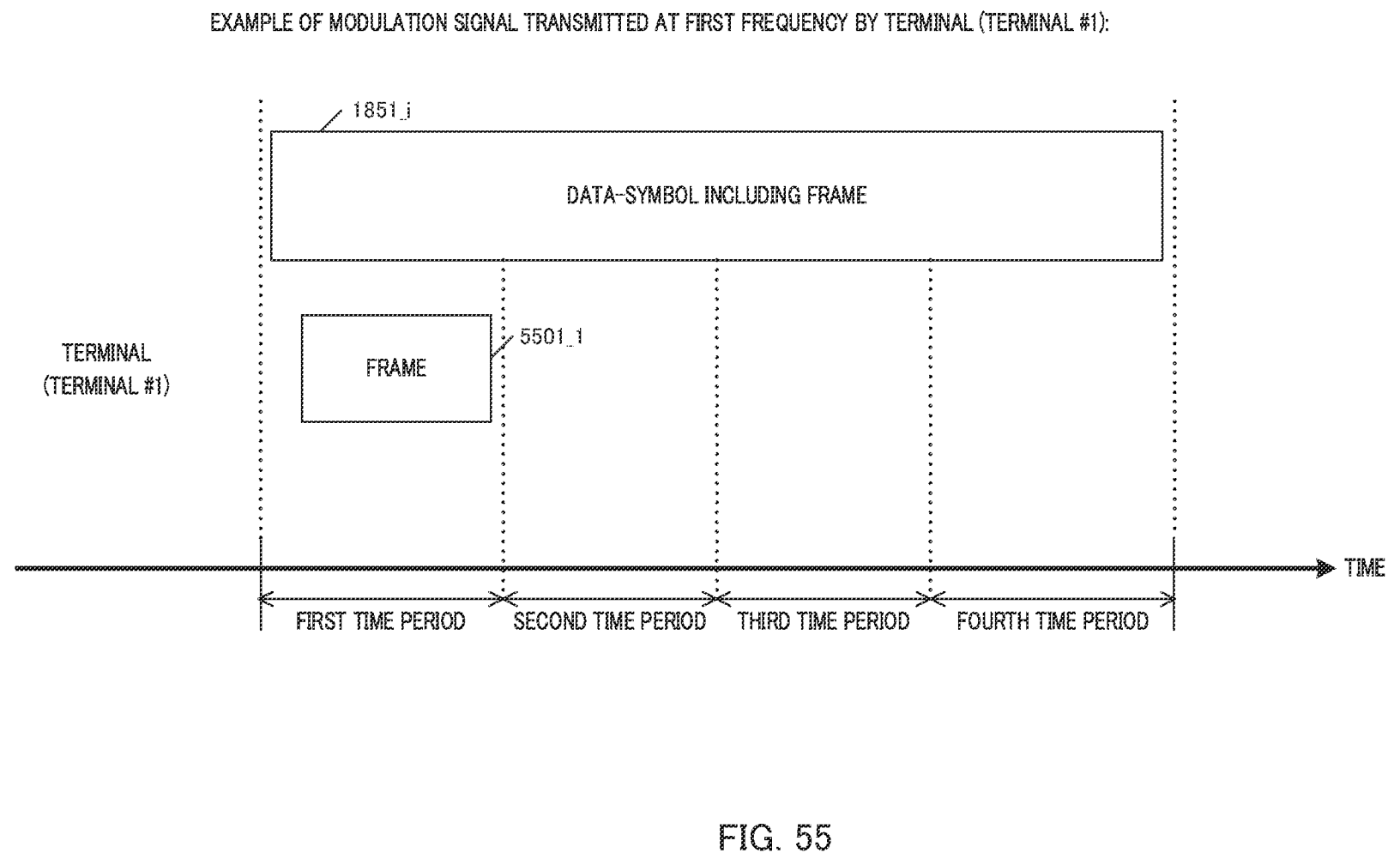

FIG. 55 describes an example of a modulation signal transmitted at the first frequency by terminal #1. In FIG. 55, the components that operate in the same manner as in FIG. 20 are denoted by the same reference numerals.

As illustrated in FIG. 55, terminal #1 labeled 4602_1 of FIG. 46A transmits data-symbol including frame 5501_1 in the first time period in data-symbol including frame 1851_i.

A selection method of the time period to transmit the frame by terminal #1 labeled 4602_1 has been described in Embodiments 1 to 5, and a description thereof will be thus omitted.

In data-symbol including frame 1003 of FIG. 50A transmitted by base station 4601_0 in the above description, base station 4601_0 may use a transmission method in which a plurality of modulation signals is transmitted using a plurality of antennae.

Incidentally, this point has been described in detail in Embodiments 1 to 5, and the like. In addition, in frame T1 labeled 5001_1 of FIG. 50B transmitted by terminal #1 labeled 4602_1, terminal #1 labeled 4602_1 may use the transmission method in which a plurality of modulation signals is transmitted using a plurality of antennae. In frame B1 labeled 5011_1 of FIG. 50C transmitted by base station 4601_0, base station 4601_0 may use the transmission method in which a plurality of modulation signals is transmitted using a plurality of antennae.

Moreover, when transmitting the modulation signal at the second frequency (band), base station 4601_0 may use the transmission method in which a plurality of modulation signals is transmitted using a plurality of antennae.

Furthermore, when transmitting the modulation signal at the first frequency (band), terminal #1 labeled 4602_1 may use the transmission method in which a plurality of modulation signals is transmitted using a plurality of antennae.

An operational example of a communication system illustrated in FIG. 46B will be described.

As in FIG. 50A, base station #1 labeled 4601_1 of FIG. 46B transmits sector-sweep reference signal 1001 in the time period from time t0 to time t1.

Note that, the time period from time t1 to time t2 is a terminal response period.

As in FIG. 50A, base station #1 labeled 4601_1 of FIG. 46B transmits feedback signal 1002 in the time period from time t2 to time t3.

FIG. 11 illustrates an example of sector-sweep reference signal 1001 of FIG. 50A transmitted by base station #1 labeled 4601_1 of FIG. 46B. An operation in FIG. 11 has already been described, and a description thereof will be thus omitted.

FIG. 12 illustrates a configuration example of "sector-sweep reference signal 1101_i in transmission panel antenna i" of FIG. 11. The operation in FIG. 12 has already been described, and a description thereof will be thus omitted.

Then, as in FIG. 50B, terminal #1 labeled 4602_1 of FIG. 46A transmits frame T1 labeled 5001_1, using the second frequency (band).

At this time, frame T1 labeled 5001_1 may be transmitted using PUCCH as illustrated in FIG. 51.

For example, terminal #1 labeled 4602_1 of FIG. 46B transmits "terminal #1 transmission PUCCH" 5101_1 illustrated in FIG. 51 as frame T1 labeled 5001_1.

Incidentally, "terminal #x transmission PUCCH" 5101_x that is transmitted by terminal #x may be present at other frequencies.

Frame T1 labeled 5001_1 may be transmitted by using PACH, PUSCH, and the like instead of PUCCH, but is not limited to these.

FIG. 52 illustrates a configuration example of frame T1 labeled 5001_1 transmitted by terminal #1 labeled 4602_1 of FIG. 46B.

For example, it is assumed that frame T1 labeled 5001_1 transmitted by terminal #1 labeled 4602_1 of FIG. 46B includes "information on first-frequency (band) sector sweep" 5201 and "request information on terminal to perform or not to perform first-frequency transmission" 5202.

"Information on first-frequency (band) sector sweep" 5201 is assumed to include information on "transmission panel antenna and parameter number" with high reception quality for terminal #1 labeled 4602_1 in sector-sweep reference signal 1001 transmitted by base station #1 labeled 4601_1 of FIG. 46B. This point has been described in Embodiments 1 to 5, and the like.

Note that, this information can be generated by obtaining sector-sweep reference signal 1001 and the "ID of the transmission panel antenna (identification number)" and the "identification number (ID) of the parameter used in beamforming (directivity control)" which are included the sector-sweep reference signal.

It is assumed that "request information on terminal to perform or not to perform first-frequency transmission" 5202 includes information on whether or not terminal #1 labeled 4602_1 of FIG. 46B performs the transmission at the first frequency (band) to base station #1 labeled 4601_1.

Base station #2 labeled 4601_2 of FIG. 46B receives frame T1 labeled 5001_1 transmitted by terminal #1 labeled 4602_1. Accordingly, for example, base station #2 labeled 4601_2 transmits frame B1 labeled 5011_1 in the time period from time t2 to time t3.

FIG. 53 illustrates a configuration example of frame B1 labeled 5011_1 transmitted at the second frequency (band) by base station #2 labeled 4601_2 of FIG. 46B.

For example, it is assumed that frame B1 labeled 5011_1 transmitted by base station #2 labeled 4601_2 of FIG. 46B includes "information on allocation of data-symbol including frame at first frequency" 5301.

It is assumed that "information on allocation of data-symbol including frame at first frequency" 5301 includes at least information on a slot with which base station #2 labeled 4601_2 of FIG. 46B transmits a data symbol addressed to terminal #1 labeled 4602_1.

For example, as illustrated in FIG. 17, data-symbol including frame 1003 of FIG. 50A is composed of first-terminal-addressed modulation signal (slot) 1701_1, second-terminal-addressed modulation signal (slot) 1701_2, third-terminal-addressed modulation signal (slot) 1701_3, and fourth-terminal-addressed modulation signal (slot) 1701_4. Base station #1 labeled 4601_1 of FIG. 46B is assumed to transmit a data-symbol including frame to terminal #1 labeled 4602_1 by using, for example, first-terminal-addressed modulation signal (slot) 1701_1 of FIG. 17.

In this case, "information on allocation of data-symbol including frame at first frequency" 5301 of FIG. 53 includes "information indicating that the data-symbol including frame is transmitted using first-terminal-addressed modulation signal (slot) 1701_1."

Thus, by obtaining "information on allocation of data-symbol including frame at first frequency" 5301, it is possible to know a position of the data-symbol including frame that base station #1 labeled 4601_1 has transmitted to terminal #1 labeled 4602_1. Accordingly, terminal #1 labeled 4602_1 of FIG. 46B can receive the modulation signal at the first frequency (band) transmitted by base station #1 labeled 4601_1 and thus obtain data included in the data symbol.

Note that, a configuration method of the data-symbol including frame of FIG. 50A transmitted by base station #1 labeled 4601_1 is not limited to that in FIG. 17. Another configuration method of the data-symbol including frame of FIG. 50A is, for example, as described in Embodiments 1 to 5.

Further, frame B1 labeled 5011_1 transmitted at the second frequency (band) by base station #2 labeled 4601_2 of FIG. 46B may include not only information on the position of the data symbol but also, for example, information on an error correction encoding method used for generating the data symbol, information on a transmission method used for generating the data symbol, information on a modulation system used for generating the data symbol, and the like.

Thus, as illustrated in FIG. 50A, base station #1 labeled 4601_1 of FIG. 46B, transmits "data-symbol including frame 1003" including a data symbol addressed to terminal #1 labeled 4602_1 of FIG. 46B in the time period from time t4 to time t5.

An operation will be described when "request information on terminal to perform or not to perform first-frequency transmission" 5202 in FIG. 52 indicates "not to perform."

In a case where the reference numeral 5202 indicates "not to perform," terminal #1 labeled 4602_1 of FIG. 46B does not transmit a modulation signal at the first frequency (band).

Thus, when terminal #1 labeled 4602_1 needs to transmit data to base station #2 labeled 4601_2, terminal #1 labeled 4602_1 transmits, for example, a modulation signal at the second frequency (band).

Incidentally, terminal #1 labeled 4602_1 may transmits a modulation signal at the third frequency (band) to another base station. At this time, it is assumed that the third frequency (band) is a frequency (band) different from the first frequency (band); further, the third frequency (band) is a frequency (band) also different from the second frequency (band).

An operation will be described when "request information on terminal to perform or not to perform first-frequency transmission" 5202 in FIG. 52 indicates "to perform."

In a case where the reference numeral 5202 indicates "to perform," terminal #1 labeled 4602_1 of FIG. 46B transmits a modulation signal at the first frequency (band).

Thus, terminal #1 labeled 4602_1 of FIG. 46B needs to a transmit signal for sector sweep. That is, terminal #1 labeled 4602_1 transmits the sector-sweep signal for determining an antenna and a beamforming parameter that are used for transmission by terminal #1, and for determining an antenna and a beamforming parameter that are used for reception by base station #1 labeled 4601_1.

FIG. 54 illustrates an example of a case where terminal #1 labeled 4602_1 of FIG. 46B transmits a sector-sweep signal. In FIG. 54, the components that operate in the same manner as in FIG. 13 are denoted by the same reference numerals.

For example, in the time period from time t1 to time t2 in FIGS. 50A, 50B, and 50C, terminal #1 labeled 4602_1 of FIG. 46B transmits a sector-sweep reference signal at the first frequency (band). Since a detailed method has been described in Embodiments 1 to 5; here, a brief description will be given.

As illustrated in FIG. 54, terminal #1 labeled 4602_1 of FIG. 46B transmits sector-sweep reference signal 5401_1 in "first terminal "sector-sweep reference signal" transmission period" 1301_1. Then, base station #1 labeled 4601_1 of FIG. 46B receives sector-sweep reference signal 5401_1 and transmits the modulation signal to terminal #1 labeled 4602_1, and thereby "the antenna and the beamforming parameter that are used for transmission by terminal #1 labeled 4602_1 and the antenna and the beamforming parameter that are used for reception by base station #1 labeled 4601_1." Since details have been described in Embodiments 1 to 5, description thereof will be thus omitted.

In the above, a description has been given with a case where "in the time period from time t1 to time t2 in FIGS. 50A, 50B, and 50C, terminal #1 labeled 4602_1 of FIG. 46B transmits the sector-sweep reference signal at the first frequency (band)," but a time period to transmit "the sector-sweep reference signal at the first frequency (band) by terminal #1 labeled 4602_1 of FIG. 46B" is not limited to this time period.

For example, terminal #1 labeled 4602_1 of FIG. 46B may transmit the sector-sweep reference signal at the first frequency (band) in a terminal response period in other time period, or may transmit the sector-sweep reference signal in a period to transmit a data symbol.

Terminal #1 labeled 4602_1 of FIG. 46B transmits the data-symbol including frame to base station #1 labeled 4601_1 after transmitting the sector-sweep reference signal.

FIG. 55 describes an example of a modulation signal transmitted at the first frequency by terminal #1. In FIG. 55, the components that operate in the same manner as in FIG. 20 are denoted by the same reference numerals.

As illustrated in FIG. 55, terminal #1 labeled 4602_1 of FIG. 46B transmits data-symbol including frame 5501_1 in the first time period in data-symbol including frame 1851_*i*.

A selection method of the time period to transmit the frame by terminal #1 labeled 4602_1 has been described in Embodiments 1 to 5, and a description thereof will be thus omitted.

In the communication system of FIG. 46B, as described above, base station #1 labeled 4601_1 and base station #2 labeled 4601_2 operate in linkage with each other. Accordingly, base station #1 labeled 4601_1 and base station #2 labeled 4601_2 perform communication for exchanging information so as to perform timing control, data sharing, and the like associated with the linkage. The communication at this time may be a wired communication or a wireless communication.

In data-symbol including frame 1003 of FIG. 50A transmitted by base station #1 labeled 4601_1 in the above description, base station #1 labeled 4601_1 may use the transmission method in which a plurality of modulation signals is transmitted using a plurality of antennae. This point has been described in detail in Embodiments 1 to 5 and the like.

Further, in frame T1 labeled 5001_1 of FIG. 50B transmitted by terminal #1 labeled 4602_1, terminal #1 labeled 4602_1 may use the transmission method in which a plurality of modulation signals is transmitted using a plurality of antennae. In frame B1 labeled 5011_1 of FIG. 50C transmitted by base station #2 labeled 4601_2, base station #2 labeled 4601_2 may use the transmission method in which a plurality of modulation signals is transmitted using a plurality of antennae.

Moreover, when transmitting the modulation signal at the second frequency (band), base station #2 labeled 4601_2 may use the transmission method in which a plurality of modulation signals is transmitted using a plurality of antennae. Furthermore, when transmitting the modulation signal at the first frequency (band), terminal #1 labeled 4602_1 may use the transmission method in which a plurality of modulation signals is transmitted using a plurality of antennae.

A description will be given of variations of communication systems illustrated in FIGS. 46A and 46B.

Figure 56B:
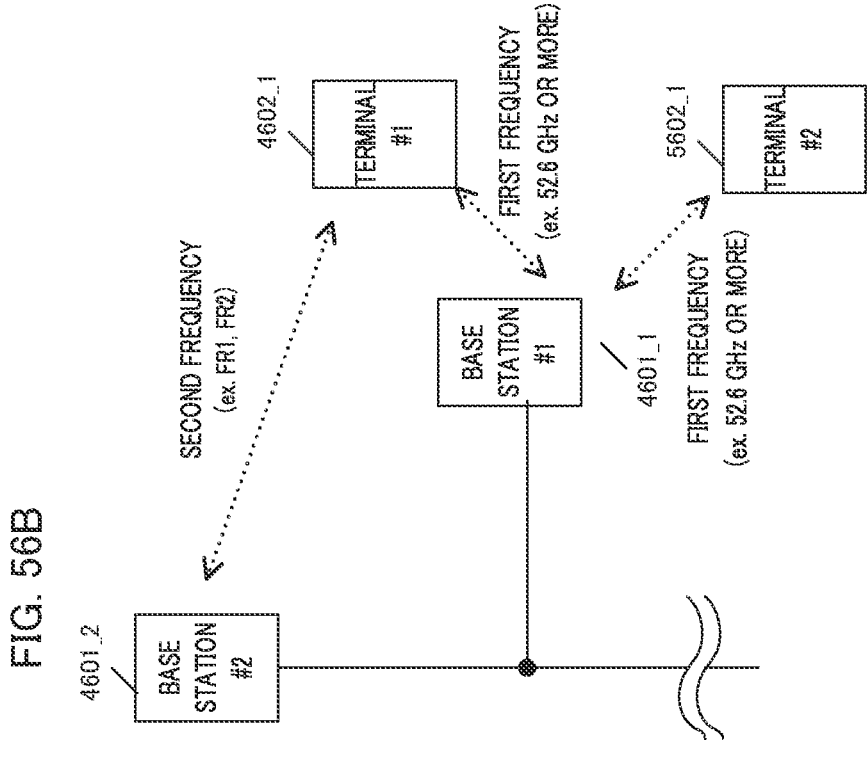
FIG. 56B illustrates another variation of the communication system according to Embodiment 6.
Figure 56A:
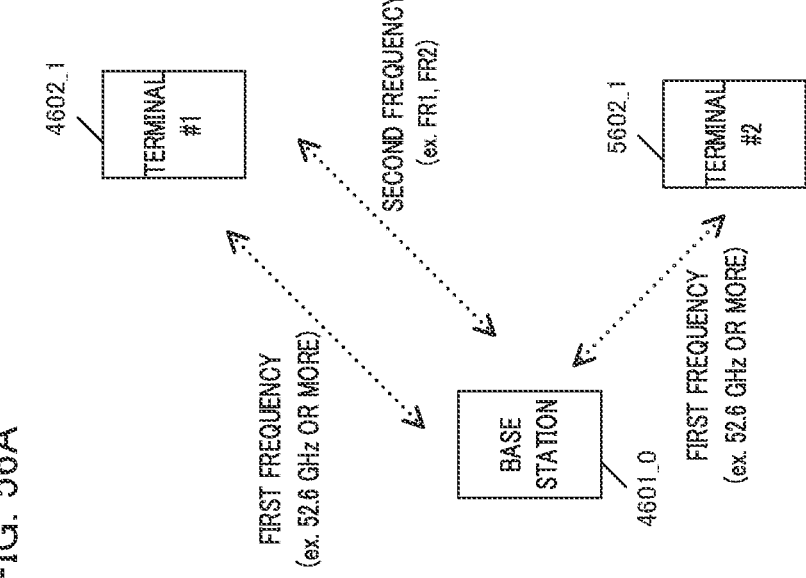
FIG. 56A illustrates a variation of the communication system according to Embodiment 6.

FIG. 56A illustrates a variation of the communication system of FIG. 46A. FIG. 56B illustrates a variation of the communication system of FIG. 46B. In FIGS. 56A and 56B, the components that operate in the same manner as in FIGS. 46A and 46B are denoted by the same reference numerals.

FIG. 56A is different from FIG. 46A in that base station 4601_0 communicates with terminal #2 labeled 5602_1, using the first frequency (band).

Further, FIG. 56B is different from FIG. 46B in that base station #1 labeled 4601_1 communicates with terminal #2 labeled 5602_1, using the first frequency (band).

Figure 57:
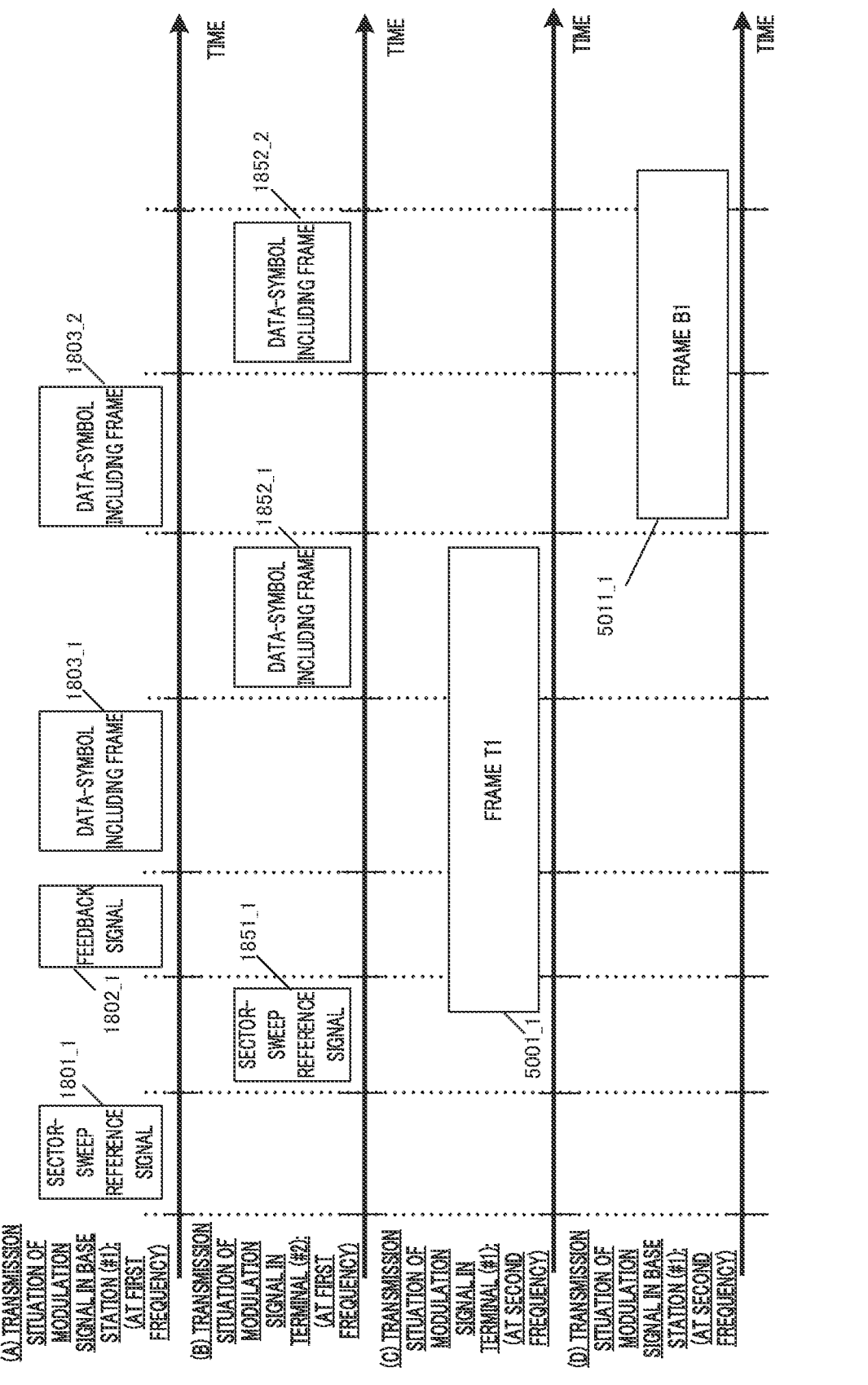
FIG. 57 illustrates an example of a transmission situation according to Embodiment 6.
Figure 58:
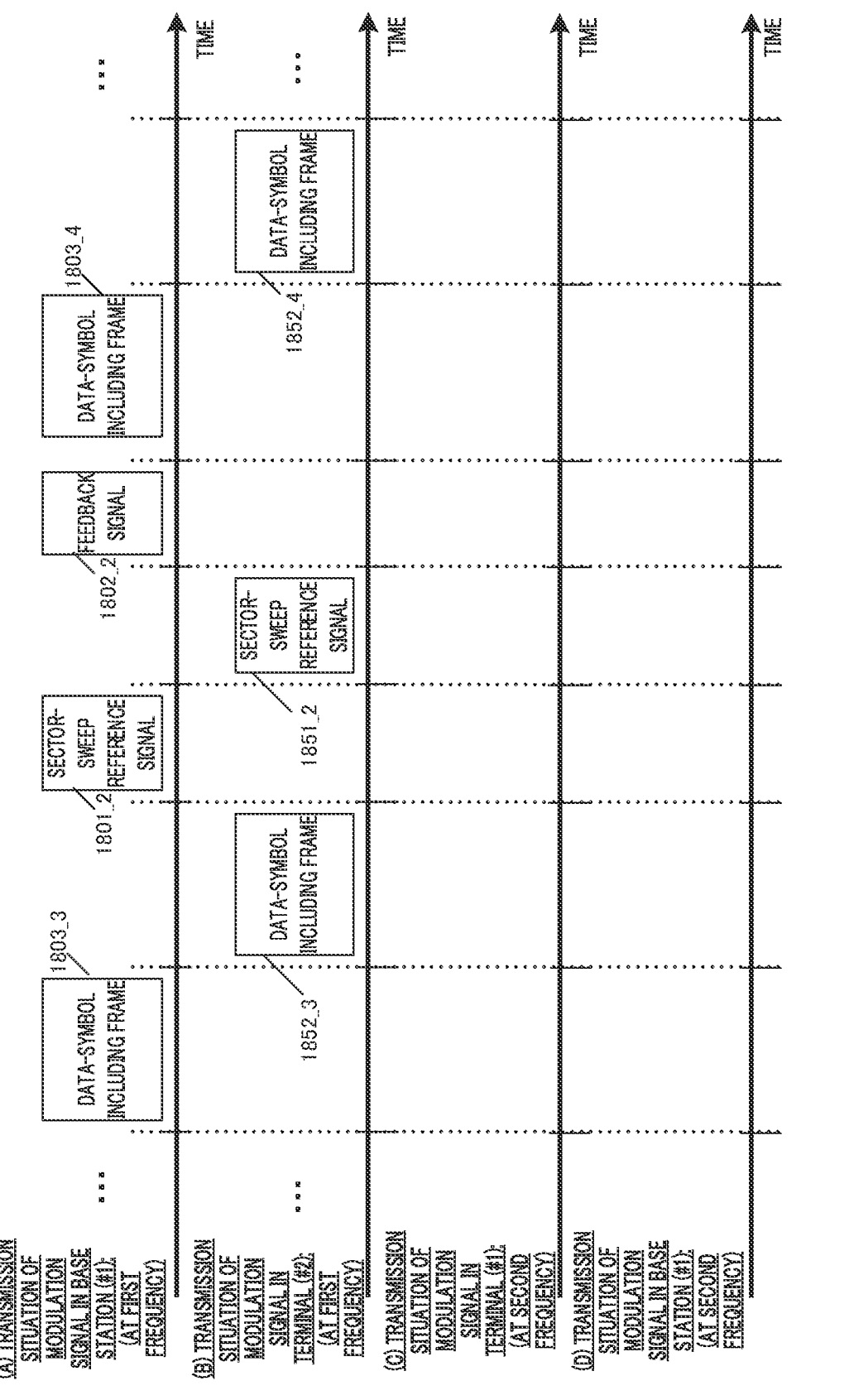
FIG. 58 illustrates still example of a transmission situation according to Embodiment 6.

FIG. 57 illustrates an example of the transmission situation different from those of FIGS. 50A, 50B, and 50C. FIG. 58 illustrates an example of the transmission situation after FIG. 57.

Note that, in FIG. 57, the components that operate in the same manner as in FIG. 18 are denoted by the same reference numerals, and descriptions thereof will be thus omitted. In FIG. 58, the components that operate in the same manner as in FIG. 19 are denoted by the same reference numerals, and descriptions thereof will be thus omitted. Moreover, in FIGS. 57 and 58, the components that operate in the same manner as in FIGS. 50B and 50C are denoted by the same reference numerals, and descriptions thereof will be thus omitted. Incidentally, horizontal axes illustrated in FIGS. 57 and 58 represent time.

FIG. 57 illustrates in (A) an example of the transmission situation of the modulation signal at the first frequency (band) transmitted by base station 4601_0 of FIG. 56A, or an example of the transmission situation of the modulation signal at the first frequency (band) transmitted by base station #1 labeled 4601_1 of FIG. 56B.

FIG. 57 illustrates in (B) an example of the transmission situation of the modulation signal at the first frequency (band) transmitted by terminal #2 labeled 5602_1 of FIGS. 56A and 56B.

FIG. 57 illustrates in (C) an example of the transmission situation of the modulation signal at the first frequency (band) transmitted by terminal #1 labeled 4602_1 of FIGS. 56A and 56B.

FIG. 57 illustrates in (D) an example of the transmission situation of the modulation signal at the second frequency (band) transmitted by base station 4601_0 of FIG. 56A, or an example of the transmission situation of the modulation signal at the second frequency (band) transmitted by base station #2 labeled 4601_2 of FIG. 56B.

FIG. 58 illustrates in (A) an example of the transmission situation of the modulation signal at the first frequency (band) transmitted by base station 4601_0 of FIG. 56A, or an example of the transmission situation of the modulation signal at the first frequency (band) transmitted by base station #1 labeled 4601_1 of FIG. 56B.

FIG. 58 illustrates in (B) an example of the transmission situation of the modulation signal at the first frequency (band) transmitted by terminal #2 labeled 5602_1 of FIGS. 56A and 56B.

FIG. 58 illustrates in (C) an example of the transmission situation of the modulation signal at the first frequency (band) transmitted by terminal #1 labeled 4602_1 of FIGS. 56A and 56B.

FIG. 58 illustrates in (D) an example of the transmission situation of the modulation signal at the second frequency (band) transmitted by base station 4601_0 of FIG. 56A, or an example of the transmission situation of the modulation signal at the second frequency (band) transmitted by base station #2 labeled 4601_2 of FIG. 56B.

Further, FIG. 58 in (A) is a temporal continuation of the transmission situation of the modulation signal transmitted at the first frequency (band) by base station 4601_0 of FIG. 56A, or the transmission situation of the modulation signal transmitted the first frequency (band) by base station #1 labeled 4601_1 of FIG. 56B which are illustrated in (A) of FIG. 57.

FIG. 58 in (B) is a temporal continuation of the transmission situation of the modulation signal transmitted at the first frequency (band) transmitted by terminal #2 labeled 5602_1 of FIGS. 56A and 56B.

An operational example of a communication system illustrated in FIG. 56A will be described.

As illustrated in (A) of FIG. 57, base station 4601_0 of FIG. 56A transmits sector-sweep reference signal 1801_1. Terminal #1 labeled 4602_1 and terminal #2 labeled 5602_1 receive sector-sweep reference signal 1801_1.

Note that, a concrete operation for transmitting sector-sweep reference signal 1801_1 by base station 4601_0 has already been described in Embodiments 1 to 5 and the like, and a description thereof will be thus omitted.

Similarly, concrete operations for receiving sector-sweep reference signal 1801_1 by terminal #1 labeled 4602_1 and terminal #2 labeled 5602_1 have already been described in Embodiments 1 to 5 and the like, and descriptions thereof will be thus omitted.

As illustrated in (B) of FIG. 57, terminal #2 labeled 5602_1 transmits sector-sweep reference signal 1851_1.

Note that, a concrete operation for transmitting sector-sweep reference signal 1851_1 transmitted by terminal #2 labeled 5602_1 has already been described in Embodiments 1 to 5 and the like, and a description thereof will be thus omitted.

Base station 4601_0 of FIG. 56A then transmits data-symbol including frame 1803_1 of FIG. 57 in (A) and data-symbol including frame 1803_3 of FIG. 58 in (A), using the first frequency (band). In data-symbol including frame 1803_1 and data-symbol including frame 1803_3, the symbol addressed to terminal #2 labeled 5602_1 is included.

In addition, base station 4601_0 of FIG. 56A transmits sector-sweep reference signal 1801_1, feedback signal 1802_1, and data-symbol including frame 1803_2, using the first frequency (band).

Terminal #2 labeled 5602_1 of FIG. 56A transmits data-symbol including frames 1852_1 and 1852_2 of FIG. 57 in (B), and data-symbol including frame 1852_3 of FIG. 58 in (B) to base station 4601_0 of FIG. 56A, using the first frequency (band).

Terminal #2 labeled 5602_1 of FIG. 56A then transmits sector-sweep reference signal 1851_2 and data-symbol including frame 1852_4, as illustrated in (B) of FIG. 58.

Operations in (A) and (B) of FIG. 57 and in (A) and (B) of FIG. 58 in the above are as described in Embodiment 1 to 5 and the like.

Incidentally, similar to FIG. 50B, terminal #1 labeled 4602_1 of FIG. 56A transmits frame T1 labeled 5001_1, using the second frequency (band) as illustrated in (C) of FIG. 57.

The data included in frame T1 labeled 5001_1 has already been described, and a description thereof will be thus omitted.

Base station 4601_0 of FIG. 56A receives frame T1 labeled 5001_1 transmitted by terminal #1 labeled 4602_1. Since the reception operation at this time has already been described, a description will be thus omitted. Base station 4601_0 transmits frame B1 labeled 5011_1, using the second frequency (band), accordingly. Since the data included in frame B1 labeled 5011_1 has already been described, a description thereof is thus omitted.

Terminal #1 labeled 4602_1 receives frame B1 labeled 5011_1 transmitted by base station 4601_0. Since the operation at this time has already been described, a description will be thus omitted.

Characteristic points in FIGS. 57 and 58 will be described. In the "data-symbol including frame" transmitted at the first frequency (band) by base station 4601_0, the data-symbol including frame addressed to terminal #1 labeled 4602_1 is at or after the completion of transmission of frame B1 labeled 5011_1.

Thus, for example, "data-symbol including frame 1803_3" and the subsequent "data-symbol including frame" in FIG. 58 may include the data symbol addressed to terminal #1 labeled 4602_1.

As another method, for example, the data-symbol including frame after sector-sweep reference signal 1801_2 of FIG. 58, that is, "data-symbol including frame 1803_4" and the subsequent "data-symbol including frame" may include the data symbol addressed to terminal #1 labeled 4602_1.

A temporal position of frame T1 labeled 5001_1 is not limited to the position illustrated in FIG. 57. Depending on the temporal position of frame T1 labeled 5001_1, a temporal position of frame B1 labeled 5011_1 varies.

In addition, as to the starting point of the "data-symbol including frame" including the data symbol addressed to terminal #1 labeled 4602_1, the temporal position of frame B1 labeled 5011_1 varies. The starting point of the "data-symbol including frame" including data symbol addressed to terminal #1 labeled 4602_1 can be implemented in the same manner as in the above-described example.

As described above, terminal #1 labeled 4602_1 of FIG. 56A may transmit the modulation signal at the first frequency (band). The procedure thereof has already been described.

Base station 4601_0 of FIG. 56A may adopt the transmission method in which a plurality of modulation signals is transmitted at the first frequency (band) using a plurality of antennae. An implementation method is as described in Embodiment 1 to 5 and the like.

In addition, in frame T1 labeled 5001_1 transmitted by terminal #1 labeled 4602_1, terminal #1 labeled 4602_1 may use the transmission method in which a plurality of modulation signals is transmitted using a plurality of antennae. In frame B1 labeled 5011_1 transmitted by base station 4601_0, base station 4601_0 may use the transmission method in which a plurality of modulation signals is transmitted using a plurality of antennae.

Moreover, when transmitting the modulation signal at the second frequency (band), base station 4601_0 may use the transmission method in which a plurality of modulation signals is transmitted using a plurality of antennae.

Furthermore, when transmitting the modulation signal at the first frequency (band), terminal #1 labeled 4602_1 and terminal #2 labeled 5602_1 may use the transmission method in which a plurality of modulation signals is transmitted using a plurality of antennae.

An operational example of a communication system illustrated in FIG. 56B will be described.

As illustrated in (A) of FIG. 57, base station #1 labeled 4601_1 of FIG. 56B transmits sector-sweep reference signal 1801_1. Terminal #1 labeled 4602_1 and terminal #2 labeled 5602_1 receive sector-sweep reference signal 1801_1.

Note that, a concrete operation for transmitting sector-sweep reference signal 1801_1 by base station #1 labeled 4601_1 has already been described in Embodiments 1 to 5 and the like, and a description thereof will be thus omitted.

Similarly, concrete operations for receiving sector-sweep reference signal 1801_1 by terminal #1 labeled 4602_1 and terminal #2 labeled 5602_1 have already been described in Embodiments 1 to 5 and the like, and descriptions thereof will be thus omitted.

As illustrated in (B) of FIG. 57, terminal #2 labeled 5602_1 transmits sector-sweep reference signal 1851_1.

Note that, a concrete operation for transmitting sector-sweep reference signal 1851_1 transmitted by terminal #2 labeled 5602_1 has already been described in Embodiments 1 to 5 and the like, and a description thereof will be thus omitted.

Base station #1 labeled 4601_1 of FIG. 56B then transmits data-symbol including frame 1803_1 of FIG. 57 in (A) and data-symbol including frame 1803_3 of FIG. 58 in (A), using the first frequency (band). In data-symbol including frame 1803_1 and data-symbol including frame 1803_3, the symbol addressed to terminal #2 labeled 5602_1 is included.

In addition, base station #1 labeled 4601_1 of FIG. 56B transmits sector-sweep reference signal 1801_1, feedback signal 1802_1, and data-symbol including frame 1803_2, using the first frequency (band).

Terminal #2 labeled 5602_1 of FIG. 56B transmits data-symbol including frames 1852_1 and 1852_2 of FIG. 57 in (B), and data-symbol including frame 1852_3 of FIG. 58 in (B) to base station #1 labeled 4601_1 of FIG. 56B, using the first frequency (band).

Terminal #2 labeled 5602_1 of FIG. 56B then transmits sector-sweep reference signal 1851_2 and data-symbol including frame 1852_4, as illustrated in (B) of FIG. 58.

Operations in (A) and (B) of FIG. 57 and in (A) and (B) of FIG. 58 in the above are as described in Embodiment 1 to 5 and the like.

Incidentally, similar to FIG. 50B, terminal #1 labeled 4602_1 of FIG. 56B transmits frame T1 labeled 5001_1, using the second frequency (band) as illustrated in (C) of FIG. 57.

The data included in frame T1 labeled 5001_1 has already been described, and a description thereof will be thus omitted.

Base station #2 labeled 4601_2 of FIG. 56B receives frame T1 labeled 5001_1 transmitted by terminal #1 labeled 4602_1. Since the reception operation at this time has already been described, a description will be thus omitted. Base station #2 labeled 4601_2 transmits frame B1 labeled 5011_1, using the second frequency (band), accordingly. Since the data included in frame B1 labeled 5011_1 has already been described, a description thereof is thus omitted.

Terminal #1 labeled 4602_1 receives frame B1 labeled 5011_1 transmitted by base station #2 labeled 4601_2. Since the operation at this time has already been described, a description will be thus omitted.

Characteristic points in FIGS. 57 and 58 will be described.

In the "data-symbol including frame" transmitted at the first frequency (band) by base station #1 labeled 4601_1, the data-symbol including frame addressed to terminal #1 labeled 4602_1 is at or after the completion of transmission of frame B1 labeled 5011_1.

Thus, for example, "data-symbol including frame 1803_3" and the subsequent "data-symbol including frame" in FIG. 58 may include the data symbol addressed to terminal #1 labeled 4602_1.

As another method, for example, the data-symbol including frame after sector-sweep reference signal 1801_2 of FIG. 58, that is, "data-symbol including frame 1803_4" and the subsequent "data-symbol including frame" may include the data symbol addressed to terminal #1 labeled 4602_1.

A temporal position of frame T1 labeled 5001_1 is not limited to the position illustrated in FIG. 57. Depending on the temporal position of frame T1 labeled 5001_1, a temporal position of frame B1 labeled 5011_1 varies.

In addition, as to the starting point of the "data-symbol including frame" including the data symbol addressed to terminal #1 labeled 4602_1, the temporal position of frame B1 labeled 5011_1 varies. The starting point of the "data-symbol including frame" including data symbol addressed to terminal #1 labeled 4602_1 can be implemented in the same manner as in the above-described example.

As described above, terminal #1 labeled 4602_1 of FIG. 56A may transmit the modulation signal at the first frequency (band). The procedure thereof has already been described.

Note that, in the communication system of FIG. 56B, as described above, base station #1 labeled 4601_1 and base station #2 labeled 4601_2 operate in linkage with each other. Accordingly, base station #1 labeled 4601_1 and base station #2 labeled 4601_2 perform communication for exchanging information so as to perform timing control, data sharing, and the like associated with the linkage. The communication at this time may be a wired communication or a wireless communication.

Base station #1 labeled 4601_1 of FIG. 56B may adopt the transmission method in which a plurality of modulation signals is transmitted at the first frequency (band) using a plurality of antennae. The implementation method is as described in Embodiment 1 to 5 and the like.

In addition, in frame T1 labeled 5001_1 transmitted by terminal #1 labeled 4602_1, terminal #1 labeled 4602_1 may use the transmission method in which a plurality of modulation signals is transmitted using a plurality of antennae. In frame B1 labeled 5011_1 transmitted by base station #2 labeled 4601_2, base station #2 labeled 4601_2 may use the transmission method in which a plurality of modulation signals is transmitted using a plurality of antennae.

Moreover, when transmitting the modulation signal at the second frequency (band), base station #2 labeled 4601_2 may use the transmission method in which a plurality of modulation signals is transmitted using a plurality of antennae. Furthermore, when transmitting the modulation signal at the first frequency (band), terminal #1 labeled 4602_1 and terminal #2 labeled 5602_1 may use the transmission method in which a plurality of modulation signals is transmitted using a plurality of antennae.

As described above, the terminal, using the second frequency (band), transmits the control information for communication implementation at the first frequency (band) (e.g., information on the sector sweep) and thereby achieves the communication at the first frequency (band). Thus, it is possible to obtain an effect of simplifying the transmission of the control information for the communication implementation at the first frequency (band) to the base station.

Note that, this is because the second frequency (band) is lower than the first frequency (band), and the base station can obtain data with high reception quality by performing communication at the second frequency (band). That is, the terminal achieves the communication with the base station at the first frequency (band) and the communication with the base station at the second frequency (band), that is, achieves a Dual connect and/or a Channel aggregation.

Further, the terminal can operate transmission/reception at the first frequency (band) and transmission/reception at the second frequency (band) as necessary, considering the communication amount of data, the quality of data. Thus, an effect can be obtained of performing efficient communication.

Further variations of the communication system will be described.

Figures 56C, 56D:
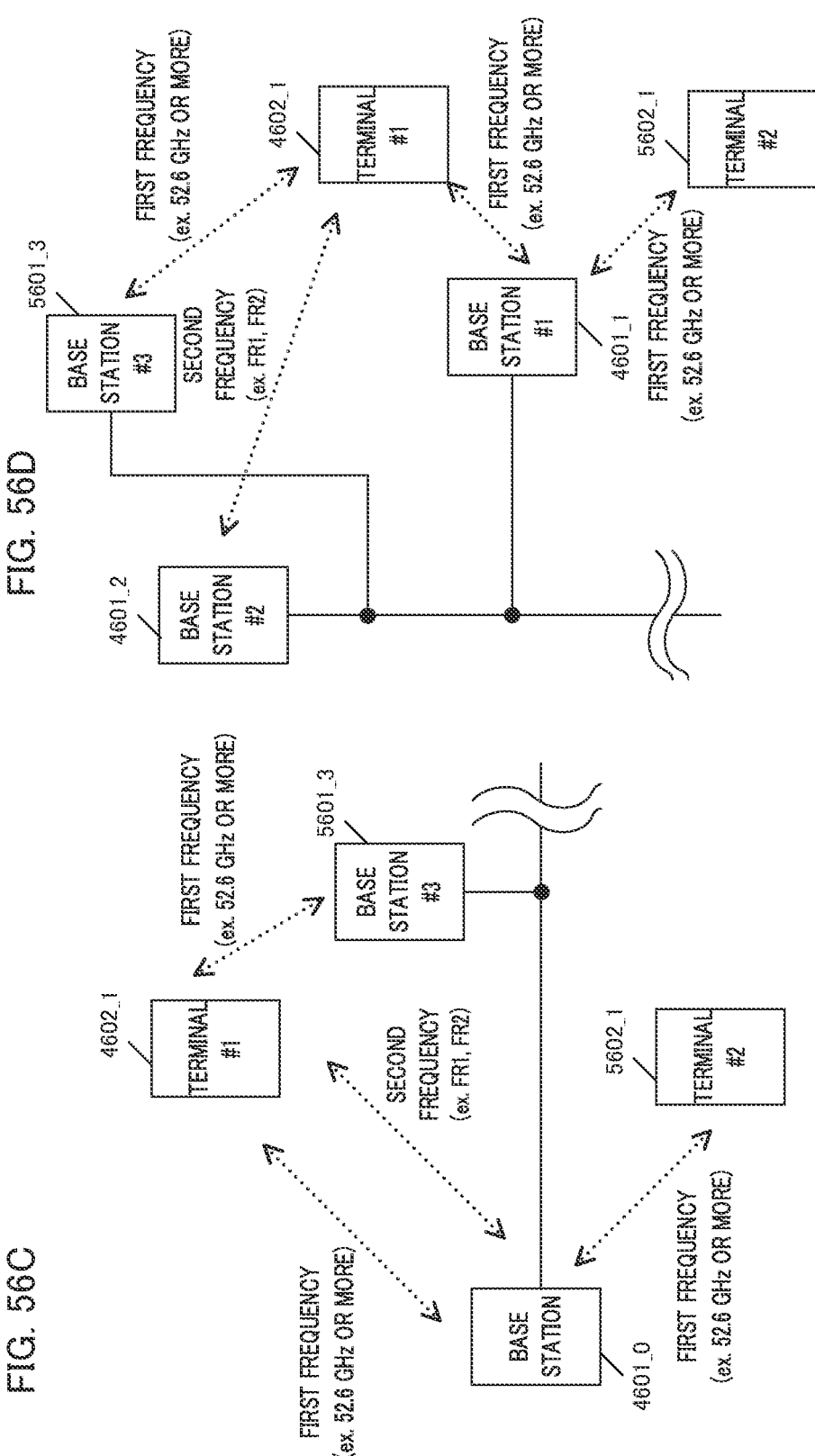
FIG. 56C illustrates still another variation of the communication system according to Embodiment 6.
FIG. 56D illustrates yet another variation of the communication system according to Embodiment 6.

FIG. 56C illustrates a variation of the communication system illustrated in FIG. 56A. In FIG. 56C, the components that operate in the same manner as in FIG. 56A are denoted by the same reference numerals.

The communication system of FIG. 56C is different from the communication system of FIG. 56A in that base station #3 labeled 5601_3 is present. Base station #3 labeled 5601_3 of FIG. 56C performs communication with terminal #1 labeled 4602_1 at the first frequency (band).

In FIG. 56C, for example, base station 4601_0 and base station 5601_3 are assumed to communicate with each other. Note that, a form is also conceivable in which base station 4601_0 and base station 5601_3 do not perform communication with each other.

FIG. 56D illustrates a variation of the communication system illustrated in FIG. 56B. In FIG. 56D, the components that operate in the same manner as in FIG. 56B are denoted by the same reference numerals.

The communication system of FIG. 56D is different from the communication system of FIG. 56B in that base station #3 labeled 5601_3 is present. Base station #3 labeled 5601_3 of FIG. 56D performs communication with terminal #1 labeled 4602_1 at the first frequency (band).

In FIG. 56D, for example, base station #3 labeled 5601_3 and base station #1 labeled 4601_1 are assumed to communicate with each other. In addition, base station #3 labeled 5601_3 and base station #2 labeled 4601_2 are assumed to communicate with each other. Note that, a case is also conceivable in which base station #3 labeled 5601_3 and base station #1 labeled 4601_1 do not perform communication with each other. A case is also conceivable in which base station #3 labeled 5601_3 and base station #2 labeled 4601_2 do not perform communication with each other.

Hereinafter, operational examples of communication systems illustrated in FIGS. 56A, 56B, 56C, and 56D will be described.

Figure 59:
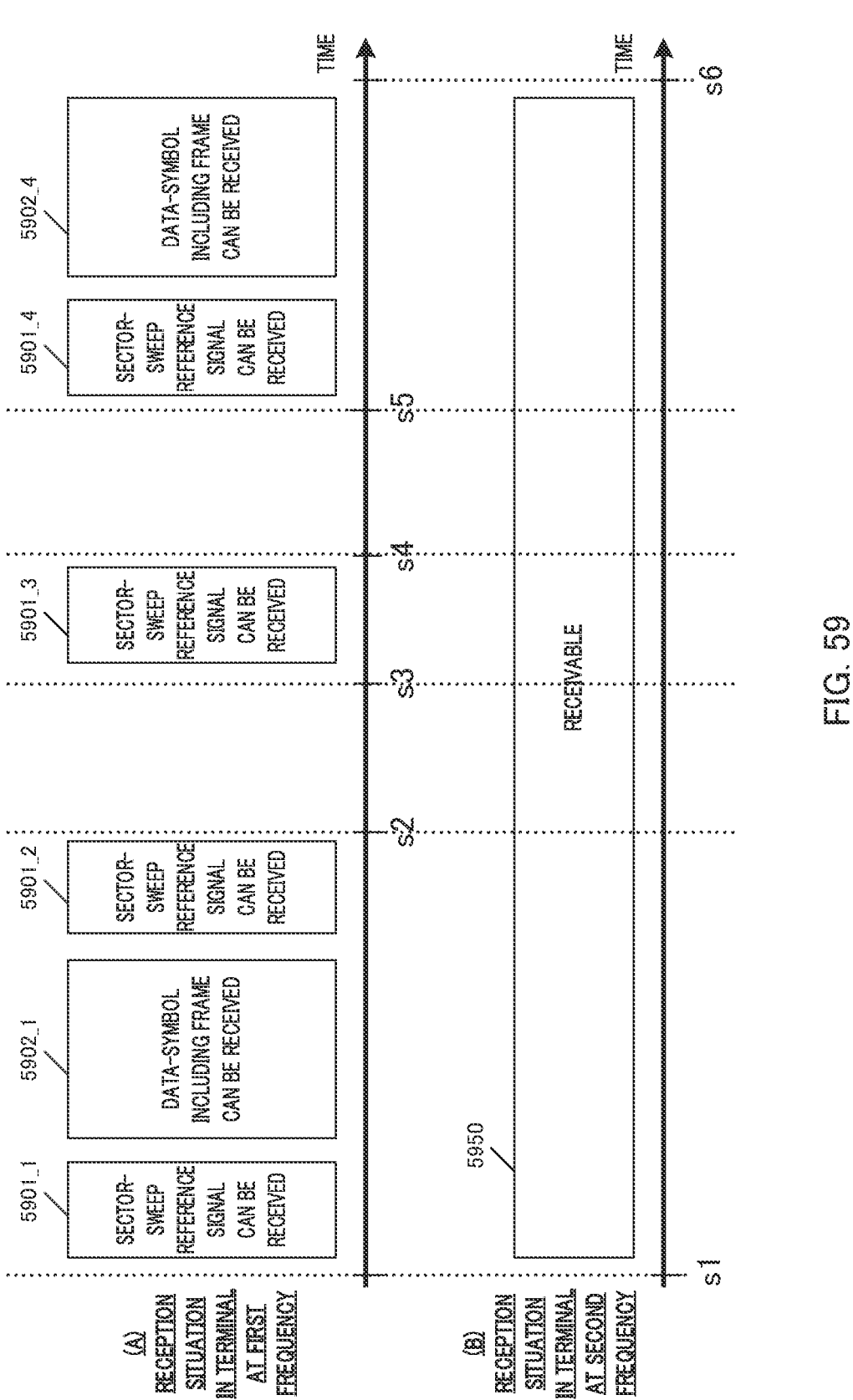
FIG. 59 illustrates an example of a reception situation in time periods from time s1 to time s6 according to Embodiment 6.

FIG. 59 illustrates an example of a reception situation in time periods from time s1 to time s6 in terminal #1 labeled 4602_1 of FIGS. 56A, 56B, 56C, and 56D. Note that, horizontal axes represent time.

FIG. 59 illustrates in (A) an example of a reception situation in time periods from time s1 to time s6 in terminal #1 labeled 4602_1 at the first frequency (band).

FIG. 59 illustrates in (B) an example of a reception situation in time periods from time s1 to time s6 in terminal #1 labeled 4602_1 at the second frequency (band).

An operational example in FIG. 59 of the communication system of FIG. 56A will be described.

In the communication system of FIG. 56A, base station 4601_0 transmits a modulation signal at the first frequency (band) and a modulation signal at the second frequency (band).

Thus, FIG. 59 illustrates in (A) the reception state of the modulation signal in terminal #1 labeled 4602_1 at the first frequency (band) transmitted by base station 4601_0. FIG. 59 illustrates in (B) the reception state of the modulation signal in terminal #1 labeled 4602_1 at the second frequency (band) transmitted by base station 4601_0.

In (A) of FIG. 59, the reference numeral 5901_1 indicates that "terminal #1 labeled 4602_1 can receive a sector-sweep reference signal."

The reference numeral 5902_1 indicates that "terminal #1 labeled 4602_1 can receive a data-symbol including frame."

The reference numeral 5901_2 indicates that "terminal #1 labeled 4602_1 can receive a sector-sweep reference signal."

In the time period from time s2 to time s3, terminal #1 labeled 4602_1 is in a state where it cannot receive (cannot perform demodulation of) the modulation signal at the first frequency (band).

The reference numeral 5901_3 indicates that "terminal #1 labeled 4602_1 can receive a sector-sweep reference signal."

In the time period from time s4 to time s5, terminal #1 labeled 4602_1 is in a state where it cannot receive (cannot perform demodulation of) the modulation signal at the first frequency (band).

The reference numeral 5901_4 indicates that "terminal #1 labeled 4602_1 can receive a sector-sweep reference signal."

The reference numeral 5902_4 indicates that "terminal #1 labeled 4602_1 can receive a data-symbol including frame."

In (B) of FIG. 59, the reference numeral 5900 indicates that "terminal #1 labeled 4602_1 can receive a modulation signal at the second frequency (band)."

Here, terminal #1 labeled 4602_1 is more likely to be in a state where it cannot receive (cannot perform demodulation of) the modulation signal at the first frequency (band) than in a state where it cannot receive (cannot perform demodulation of) the modulation signal at the second frequency (band). This is because that the first frequency (band) is higher than the second frequency (band).

Hence, a mechanism for quickly recovering the communication at the first frequency (band) between base station 4601_0 and terminal #1 labeled 4602_1 is important for achieving a high-speed and stable communication between base station 4601_0 and terminal #1 labeled 4602_1.

In the following, an example of a method for realizing this will be described.

The first frequency (band) and the second frequency (band) have the relationship described above; thus, when Channel Aggregation is performed, it is preferable that the communication at the first frequency (band) between base station 4601_0 and terminal #1 labeled 4602_1 is a communication of Secondary Cell (SCell) and the communication at the second frequency (band) with between base station 4601_0 and terminal #1 labeled 4602_1 is a communication of Primary Cell (PCell).

In addition, when the Dual Connectivity is achieved, it is preferable that a function of base station 4601_0 at the first frequency (band) is a Secondary g Node B (gNB) (SgNB) and a function of base station 4601_0 at the second frequency (band) is a Master g Node B (gNB) (MgNB). Incidentally, a Primary SCell (PSCell) may be present at the first frequency (band).

FIG. 60 illustrates an example of data included in a modulation signal transmitted at the second frequency (band) by terminal #1 labeled 4602_1. In FIG. 60, the components that operate in the same manner as in FIG. 52 are denoted by the same reference numerals.

The modulation signal transmitted at the second frequency (band) by terminal #1 labeled 4602_1 includes, for example, "information on first-frequency (band) sector sweep 5201," "request information on terminal to perform or not to perform first-frequency transmission 5202," "information on state of modulation signal at first frequency (Channel Quality Indicator (CQI) at first frequency) 6001," "information on Rank Indicator (RI) at frequency (band) 6002," and "information on Acknowledgement/Negative Acknowledgement (ACK/NACK) at first frequency (band) 6003."

Incidentally, descriptions of "information on first-frequency (band) sector sweep 5201" and "request information on terminal to perform or not to perform first-frequency transmission 5202" will be omitted because they have already been described.

A description will be given of "information on state of modulation signal at first frequency (CQI at first frequency) 6001."

Base station 4601_0 transmits a modulation signal at the first frequency (band), and this modulation signal includes, for example, a reference signal for the CQI.

Terminal #1 labeled 4602_1 receives the modulation signal at the first frequency (band), and obtains an estimation value of the CQI (hereinafter, may be also referred to as "CQI estimation value") from the reference signal included in the received signal. When obtaining the CQI estimation value, terminal #1 labeled 4602_1 generates a modulation signal at the second frequency (band) including "information on state of modulation signal at first frequency (CQI at first frequency) 6001" and transmits the modulation signal to base station 4601_0.

A description will be given of "information on RI at frequency (band) 6002."

Base station 4601_0 transmits the modulation signal at the first frequency (band), and this modulation signal includes, for example, a reference signal.

Terminal #1 labeled 4602_1 receives the modulation signal at the first frequency (band), and obtains a value of RI (hereinafter, may be also referred to as "RI value") from the reference signal included in the received signal. When obtaining the RI value, terminal #1 labeled 4602_1 generates a modulation signal at the second frequency (band) including "information on RI at frequency (band) 6002" and transmits the modulation signal to base station 4601_0.

A description will be given of "information on ACK/NACK at first frequency (band) 6003."

Base station 4601_0 transmits the modulation signal at the first frequency (band), and this modulation signal includes, for example, a data symbol.

Terminal #1 labeled 4602_1 receives the modulation signal at the first frequency (band) and demodulates data. Terminal #1 labeled 4602_1 performs error checking, then generates ACK information when the correct data is obtained, and generates NACK information when the correct data is not obtained. After that, terminal #1 labeled 4602_1 generates a modulation signal at the second frequency (band) including the ACK or NACK information and transmits the modulation signal to base station 4601_0. At this time, the generated information is "information on ACK/NACK at first frequency (band) 6003."

Hereinafter, effects obtained by the communication methods of FIGS. 59 and 60 will be described.

Terminal #1 labeled 4602_1 transmits "information on state of modulation signal at first frequency (CQI at first frequency) 6001" by using the modulation signal at the second frequency (band). As a result, terminal #1 labeled 4602_1 can easily, with less delay, notify base station 4601_0 that the modulation signal is not demodulated as in the time period from time s2 to time s3 in (A) of FIG. 59, for example.

In addition, terminal #1 labeled 4602_1 transmits "information on RI at first frequency (band) 6002" by using the modulation signal at the second frequency (band). As a result, base station 4601_0 can suitably control the number of modulation signals to be transmitted in data-symbol including frames labeled 5902_1 and 5902_4 of FIG. 59, and thereby can achieve high-speed data transmission.

Moreover, terminal #1 labeled 4602_1 transmits "information on ACK/NACK at first frequency (band) 6003" by using the modulation signal at the second frequency (band). As a result, base station 4601_0 can easily, with less delay, determine whether or not to perform retransmission to data-symbol including frames labeled 5902_1 and 5902_4 of FIG. 59, and thereby can achieve a robust communication.

Incidentally, PUCCH, RACH, and PUSCH may be used for a method of transmitting "information on first-frequency (band) sector sweep 5201," "request information on terminal to perform or not to perform first-frequency transmission 5202," "information on state of modulation signal at first frequency (CQI at first frequency) 6001," "information on RI at first frequency (band) 6002," and "information on ACK/NACK at first frequency (band) 6003," but the method is not limited to these.

Figure 61:
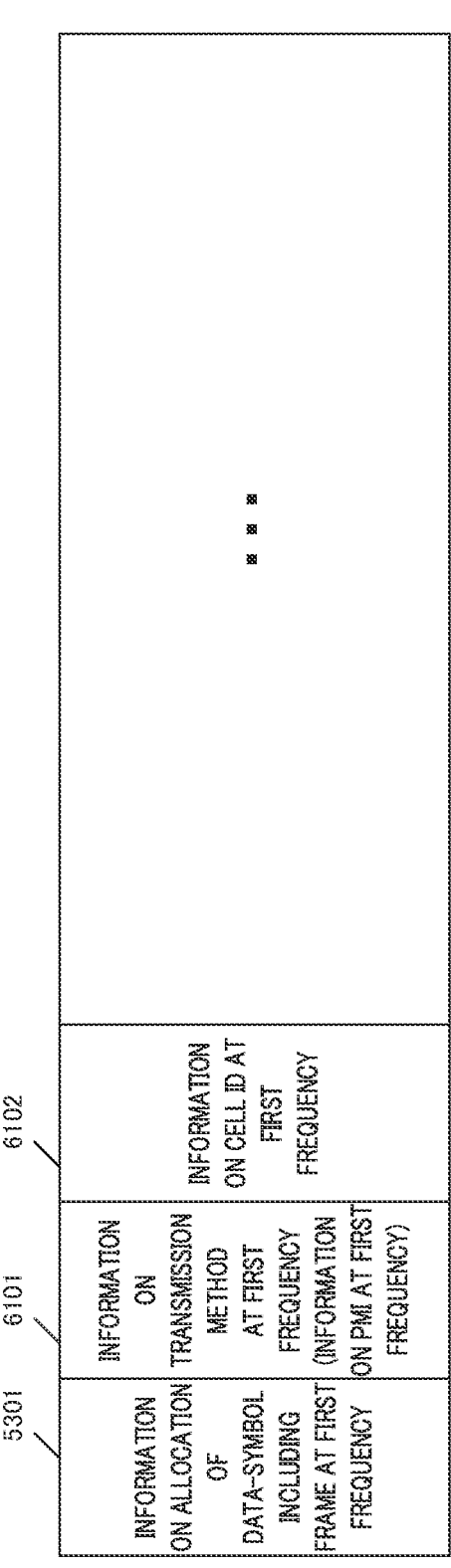
FIG. 61 illustrates another example of data included in a modulation signal transmitted using the second frequency (band) according to Embodiment 6.

FIG. 61 illustrates an example of data included in a modulation signal transmitted by base station 4601_0 by using the second frequency (band). In FIG. 61, the components that operate in the same manner as in FIG. 53 are denoted by the same reference numerals.

The modulation signal transmitted at the second frequency (band) by base station 4601_0 includes, for example, "information on allocation of data-symbol including frame at first frequency (band) 5301," "information on transmission method at first frequency (information on Precoding Matrix Indicator (PMI) at first frequency) 6101," and "information on cell identification (ID) at first frequency 6102."

Incidentally, a description of "information on allocation of data-symbol including frame at first frequency (band) 5301" will be omitted because it has already been described.

A description will be given of "information on transmission method at first frequency (information on PMI at first frequency) 6101."

Base station 4601_0 transmits the modulation signal at the first frequency (band) to terminal #1 labeled 4602_1. At this time, an area to transmit information on the transmission method (PMI) of the modulation signal transmitted by base station 4601_0 becomes "information on transmission method at first frequency (information on PMI at first frequency) 6101."

When a plurality of base stations transmits modulation signals at the first frequency (band) to terminal #1 labeled 4602_1, information on the transmission method (information on the PMI) in each modulation signal may be include in "information on transmission method at first frequency (information on PMI at first frequency) 6101." This point will be described again later.

A description will be given of "information on cell ID at first frequency 6102."

Base station 4601_0 transmits the modulation signal at the first frequency (band) to terminal #1 labeled 4602_1. At this time, an area to transmit information on the cell ID in the modulation signal transmitted by base station 4601_0 becomes "information on cell ID at first frequency 6102."

Note that, when a plurality of base stations transmits modulation signals at the first frequency (band) to terminal #1 labeled 4602_1, information on the cell ID in each modulation signal may be include in "information on cell ID at first frequency 6102." This point will be described again later.

Hereinafter, effects of the communication methods of FIGS. 59 and 61 will be described.

Base station 4601_0 transmits "information on transmission method at first frequency (information on PMI at first frequency) 6101" by using the modulation signal at the second frequency (band). As a result, terminal #1 labeled 4602_1 can easily start a demodulation operation of the modulation signal.

In addition, base station 4601_0 transmits "information on cell ID at first frequency 6102" by using the modulation signal at the second frequency (band). As a result, terminal #1 labeled 4602_1 can easily know the cell in which the communication at the first frequency (band) can be performed.

Incidentally, Physical Downlink Control Channel (PDCCH), Physical Downlink Shared Channel (PDSCH), and the like may be used for a method of transmitting "information on allocation of data-symbol including frame at first frequency (band) 5301," "information on transmission method at first frequency (information on PMI at first frequency) 6101," and "information on cell ID at first frequency 6102," but the method is not limited to these.

An operational example in FIG. 59 of the communication system of FIG. 56B will be described.

In the communication system of FIG. 56B, base station #1 labeled 4601_1 transmits a modulation signal at the first frequency (band), and base station #2 labeled 4601_2 transmits a modulation signal at the second frequency (band).

Thus, FIG. 59 illustrates in (A) the reception state of the modulation signal in terminal #1 labeled 4602_1 at the first frequency (band) transmitted by base station #1 labeled 4601_1. FIG. 59 in (A) illustrates the reception state of the modulation signal in terminal #1 labeled 4602_1 at the second frequency (band) transmitted by base station #2 labeled 4601_2.

In (A) of FIG. 59, the reference numeral 5901_1 indicates that "terminal #1 labeled 4602_1 can receive a sector-sweep reference signal."

The reference numeral 5902_1 indicates that "terminal #1 labeled 4602_1 can receive a data-symbol including frame."

The reference numeral 5901_2 indicates that "terminal #1 labeled 4602_1 can receive a sector-sweep reference signal."

In the time period from time s2 to time s3, terminal #1 labeled 4602_1 is in a state where it cannot receive (cannot perform demodulation of) the modulation signal at the first frequency (band).

The reference numeral 5901_3 indicates that "terminal #1 labeled 4602_1 can receive a sector-sweep reference signal."

In the time period from time s4 to time s5, terminal #1 labeled 4602_1 is in a state where it cannot receive (cannot perform demodulation of) the modulation signal at the first frequency (band).

The reference numeral 5901_4 indicates that "terminal #1 labeled 4602_1 can receive a sector-sweep reference signal."

The reference numeral 5902_4 indicates that "terminal #1 labeled 4602_1 can receive a data-symbol including frame."

In (B) of FIG. 59, the reference numeral 5900 indicates that "terminal #1 labeled 4602_1 can receive a modulation signal at the second frequency (band)."

Here, terminal #1 labeled 4602_1 is more likely to be in a state where it cannot receive (cannot perform demodulation of) the modulation signal at the first frequency (band) than in a state where it cannot receive (cannot perform demodulation of) the modulation signal at the second frequency (band). This is because that the first frequency (band) is higher than the second frequency (band).

Hence, a mechanism for quickly recovering the communication at the first frequency (band) between base station #1 labeled 4601_1 and terminal #1 labeled 4602_1 is important for achieving a high-speed and stable communication between base station #1 labeled 4601_1 and terminal #1 labeled 4602_1.

In the following, an example of a method for realizing this will be described.

The first frequency (band) and the second frequency (band) have the relationship described above, and thus, when Channel Aggregation is performed, it is preferable that the communication at the first frequency (band) between base station #1 labeled 4601_1 and terminal #1 labeled 4602_1 is a communication of SCell and the communication at the second frequency (band) with between base station #2 labeled 4601_2 and terminal #1 labeled 4602_1 is a communication of PCell.

In addition, when the Dual Connectivity is achieved, it is preferable that a function of base station #1 labeled 4601_1 at the first frequency (band) is the SgNB, and a function of base station #2 labeled 4601_2 at the second frequency (band) is the MgNB. Incidentally, the PSCell may be present at the first frequency (band).

FIG. 60 illustrates an example of data included in a modulation signal transmitted at the second frequency (band) by terminal #1 labeled 4602_1. In FIG. 60, the components that operate in the same manner as in FIG. 52 are denoted by the same reference numerals.

The modulation signal transmitted at the second frequency (band) by terminal #1 labeled 4602_1 includes, for example. "information on first-frequency (band) sector sweep 5201," "request information on terminal to perform or not to perform first-frequency transmission 5202," "information on state of modulation signal at first frequency (CQI at first frequency) 6001," "information on RI at frequency (band) 6002," and "information on ACK/NACK at first frequency (band) 6003."

Incidentally, descriptions of "information on first-frequency (band) sector sweep 5201" and "request information on terminal to perform or not to perform first-frequency transmission 5202" will be omitted because they have already been described.

A description will be given of "information on state of modulation signal at first frequency (CQI at first frequency) 6001."

Base station #1 labeled 4601_1 transmits a modulation signal at the first frequency (band), and this modulation signal includes, for example, a reference signal for the CQI.

Terminal #1 labeled 4602_1 receives the modulation signal at the first frequency (band), and obtains an estimation the CQI estimation value from the reference signal included in the received signal. When obtaining the CQI estimation value, terminal #1 labeled 4602_1 generates a modulation signal at the second frequency (band) including, for example, "information on state of modulation signal at first frequency (CQI at first frequency) 6001" including this information and transmits the modulation signal to base station #2 labeled 4601_2. Thereafter, base station #1 labeled 4601_1 obtains the generated information, and base station #1 labeled 4601_1 performs control based on the generated information.

A description will be given of "information on RI at frequency (band) 6002."

Base station #1 labeled 4601_1 transmits the modulation signal at the first frequency (band), and this modulation signal includes, for example, a reference signal.

Terminal #1 labeled 4602_1 receives the modulation signal at the first frequency (band), and obtains the RI value from the reference signal included in the received signal. When obtaining the RI value, terminal #1 labeled 4602_1 generates a modulation signal at the second frequency (band) including "information on RI at frequency (band) 6002" and transmits the modulation signal to base station #2 labeled 4601_2. Thereafter, base station #1 labeled 4601_1 obtains the generated information, and base station #1 labeled 4601_1 performs control based on the generated information.

A description will be given of "information on ACK/ NACK at first frequency (band) 6003."

Base station #1 labeled 4601_1 transmits the modulation signal at the first frequency (band), and this modulation signal includes, for example, a data symbol.

Terminal #1 labeled 4602_1 receives the modulation signal at the first frequency (band) and demodulates data. Terminal #1 labeled 4602_1 performs error checking, then generates ACK information when the correct data is obtained, and generates NACK information when the correct data is not obtained. After that, the terminal #1 labeled 4602_1 generates a modulation signal at the second frequency (band) including the ACK or NACK information, and transmits the modulation signal to base station #2 labeled 4601_2. At this time, the generated information becomes "information on ACK/NACK at first frequency (band) 6003." Thereafter, base station #1 labeled 4601_1 obtains the generated information, and base station #1 labeled 4601_1 performs control based on the generated information.

Hereinafter, effects of the communication methods of FIGS. 59 and 60 will be described.

Terminal #1 labeled 4602_1 transmits "information on state of modulation signal at first frequency (CQI at first frequency) 6001" by using the modulation signal at the second frequency (band). As a result, terminal #1 labeled 4602_1 can easily, with less delay, notify base station #2 labeled 4601_2 that the modulation signal is not demodulated as in the time period from time s2 to time s3 in (A) of FIG. 59, for example.

In addition, terminal #1 labeled 4602_1 transmits "information on RI at first frequency (band) 6002" by using the modulation signal at the second frequency (band). As a result, base station #1 labeled 4601_1 can suitably control the number of modulation signals to be transmitted in data-symbol including frames labeled 5902_1 and 5902_4 of FIG. 59, and thereby can achieve high-speed data transmission.

Moreover, terminal #1 labeled 4602_1 transmits "information on ACK/NACK at first frequency (band) 6003" by using the modulation signal at the second frequency (band). As a result, base station #2 labeled 4601_2 can easily, with less delay, determine whether or not to perform retransmission to data-symbol including frames labeled 5902_1 and 5902_4 of FIG. 59, and thereby can achieve a robust communication.

Incidentally, PUCCH, RACH, and PUSCH may be used for a method of transmitting "information on first-frequency (band) sector sweep 5201," "request information on terminal to perform or not to perform first-frequency transmission 5202," "information on state of modulation signal at first frequency (CQI at first frequency) 6001," "information on RI at first frequency (band) 6002," and "information on ACK/NACK at first frequency (band) 6003," but the method is not limited to these.

FIG. 61 illustrates an example of data included in a modulation signal transmitted by base station #2 labeled 4601_2 using the second frequency (band). In FIG. 61, the components that operate in the same manner as in FIG. 53 are denoted by the same reference numerals.

The modulation signal transmitted at the second frequency (band) by base station #2 labeled 4601_2 includes, for example, "information on allocation of data-symbol including frame at first frequency (band) 5301," "information on transmission method at first frequency (information on PMI at first frequency) 6101," and "information on cell ID at first frequency 6102."

Incidentally, a description of "information on allocation of data-symbol including frame at first frequency (band) 5301" will be omitted because it has already been described.

A description will be given of "information on transmission method at first frequency (information on PMI at first frequency) 6101."

Base station #1 labeled 4601_1 transmits the modulation signal at the first frequency (band) to terminal #1 labeled 4602_1. At this time, an area to transmit information on the transmission method (PMI) of the modulation signal transmitted by base station #1 labeled 4601_1 becomes "information on transmission method at first frequency (information on PMI at first frequency) 6101."

When a plurality of base stations transmits modulation signals at the first frequency (band) to terminal #1 labeled 4602_1, information on the transmission method (information on the PMI) in each modulation signal may be include in "information on transmission method at first frequency (information on PMI at first frequency) 6101." This point will be described again later.

A description will be given of "information on cell ID at first frequency 6102."

Base station #1 labeled 4601_1 transmits the modulation signal at the first frequency (band) to terminal #1 labeled 4602_1. At this time, an area to transmit information on the cell ID of the modulation signal transmitted by base station #1 labeled 4601_1 becomes "information on cell ID at first frequency 6102."

Note that, when a plurality of base stations transmits modulation signals at the first frequency (band) to terminal #1 labeled 4602_1, information on the cell ID in each modulation signal may be include in "information on cell ID at first frequency 6102." This point will be described again later.

Hereinafter, effects of the communication methods of FIGS. 59 and 61 will be described.

Base station #2 labeled 4601_2 transmits "information on transmission method at first frequency (information on PMI at first frequency) 6101" by using the modulation signal at the second frequency (band). As a result, terminal #1 labeled 4602_1 can easily start the demodulation operation of the modulation signal.

In addition, base station #2 labeled 4601_2 transmits "information on cell ID at first frequency 6102" by using the modulation signal at the second frequency (band). As a result, terminal #1 labeled 4602_1 can easily know the cell in which the communication at the first frequency (band) can be performed.

Incidentally, PDCCH, PDSCH, and the like may be used for a method of transmitting "information on allocation of data-symbol including frame at first frequency (band) 5301," "information on transmission method at first frequency (information on PMI at first frequency) 6101," and "information on cell ID at first frequency 6102," but the method is not limited to these.

An operational example of the communication system of FIG. 56C will be described.

In the communication system of FIG. 56C, base station 4601_0 transmits a modulation signal at the first frequency (band) and a modulation signal at the second frequency (band). Base station #3 labeled 5601_3 transmits a modulation signal at the first frequency (band).

Figure 62A:
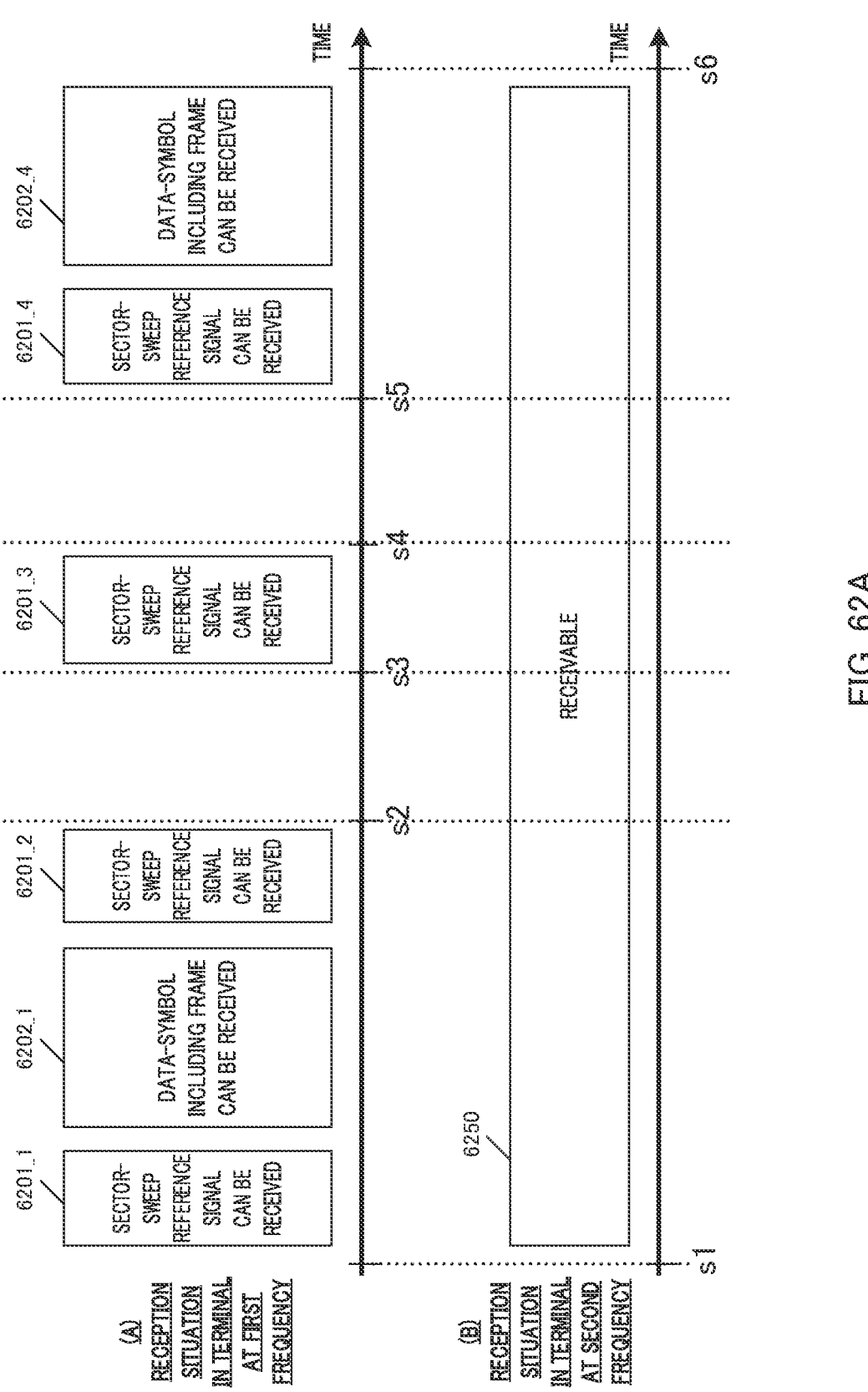
FIG. 62A illustrates another example of a reception situation in time periods from time s1 to time s6 according to Embodiment 6.
Figure 62B:
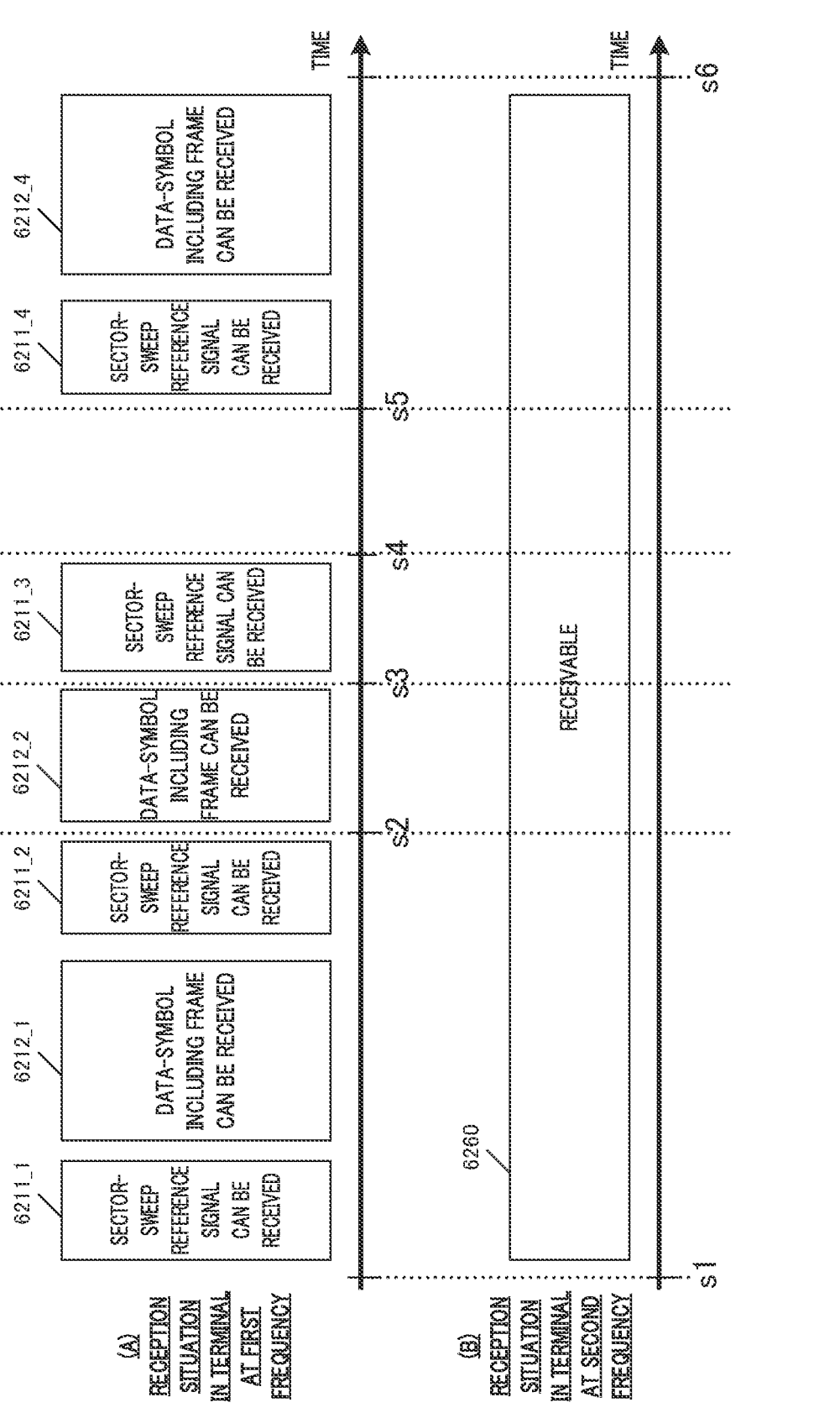
FIG. 62B illustrates yet another example of a reception situation in time periods from time s1 to time s6 according to Embodiment 6.

FIGS. 62A and 62B illustrate examples of reception situations in time periods from time s1 to time s6 in terminal #1 labeled 4602_1 of FIG. 56C. Note that, horizontal axes represent time.

Each of FIG. 62A and FIG. 62B illustrate in (A) an example of the reception situation in time periods from time s1 to time s6 in terminal #1 labeled 4602_1 at the first frequency (band).

Each of FIG. 62A and FIG. 62B illustrate in (B) an example of the reception situation in time periods from time s1 to time s6 in terminal #1 labeled 4602_1 at the second frequency (band).

First, an operational example in FIG. 62A of the communication system of FIG. 56C will be described.

FIG. 62A illustrates in (A) the reception state of the modulation signal in terminal #1 labeled 4602_1 at the first frequency (band) transmitted by base station 4601_0. FIG. 62A illustrates in (B) the reception state of the modulation signal in terminal #1 labeled 4602_1 at the second frequency (band) transmitted by base station 4601_0.

In (A) of FIG. 62A, the reference numeral 6201_1 indicates that "terminal #1 labeled 4602_1 can receive a sector-sweep reference signal."

The reference numeral 6202_1 indicates that "terminal #1 labeled 4602_1 can receive a data-symbol including frame."

The reference numeral 6201_2 indicates that "terminal #1 labeled 4602_1 can receive a sector-sweep reference signal."

In the time period from time s2 to time s3, terminal #1 labeled 4602_1 is in a state where it cannot receive (cannot perform demodulation of) the modulation signal transmitted at the first frequency (band) by base station 4601_0.

The reference numeral 6201_3 indicates that "terminal #1 labeled 4602_1 can receive a sector-sweep reference signal."

In the time period from time s4 to time s5, terminal #1 labeled 4602_1 is in a state where it cannot receive (cannot perform demodulation of) the modulation signal transmitted at the first frequency (band) by base station 4601_0.

The reference numeral 6201_4 indicates that "terminal #1 labeled 4602_1 can receive a sector-sweep reference signal."

The reference numeral 6202_4 indicates that "terminal #1 labeled 4602_1 can receive a data-symbol including frame."

In (B) of FIG. 62A, the reference numeral 6250 indicates that "terminal #1 labeled 4602_1 can receive a modulation signal at the second frequency (band)."

Here, terminal #1 labeled 4602_1 is more likely to be in a state where it cannot receive (cannot perform demodulation of) the modulation signal at the first frequency (band) than in a state where it cannot receive (cannot perform demodulation of) the modulation signal at the second frequency (band). This is because that the first frequency (band) is higher than the second frequency (band).

Next, an operational example in FIG. 62B of the communication system of FIG. 56C will be described.

FIG. 62B illustrates in (A) the reception state of the modulation signal in terminal #1 labeled 4602_1 at the first frequency (band) transmitted by base station #3 labeled 5601_3. FIG. 62B illustrates in (B) the reception state of the modulation signal in terminal #1 labeled 4602_1 at the second frequency (band) transmitted by base station 4601_0.

In (A) of FIG. 62B, the reference numeral 6211_1 indicates that "terminal #1 labeled 4602_1 can receive a sector-sweep reference signal."

The reference numeral 6212_1 indicates that "terminal #1 labeled 4602_1 can receive a data-symbol including frame."

The reference numeral 6211_2 indicates that "terminal #1 labeled 4602_1 can receive a sector-sweep reference signal."

The reference numeral 6212_2 indicates that "terminal #1 labeled 4602_1 can receive a data-symbol including frame."

The reference numeral 6211_3 indicates that "terminal #1 labeled 4602_1 can receive a sector-sweep reference signal."

In the time period from time s4 to time s5, terminal #1 labeled 4602_1 is in a state where it cannot receive (cannot perform demodulation of) the modulation signal transmitted at the first frequency (band) by base station #3 labeled 5601_3.

The reference numeral 6211_4 indicates that "terminal #1 labeled 4602_1 can receive a sector-sweep reference signal."

The reference numeral 6212_4 indicates that "terminal #1 labeled 4602_1 can receive a data-symbol including frame."

In (B) of FIG. 62B, the reference numeral 6260 indicates that "terminal #1 labeled 4602_1 can receive a modulation signal at the second frequency (band)."

Here, terminal #1 labeled 4602_1 is more likely to be in a state where it cannot receive (cannot perform demodulation of) the modulation signal at the first frequency (band) than in a state where it cannot receive (cannot perform demodulation of) the modulation signal at the second frequency (band). This is because that the first frequency (band) is higher than the second frequency (band).

Hence, a mechanism for quickly recovering the communication at the first frequency (band) between base station 4601_0 and terminal #1 labeled 4602_1 is important for achieving a high-speed and stable communication between base station 4601_0 and terminal #1 labeled 4602_1. In addition, a mechanism for quickly recovering the communication at the first frequency (band) between base station #3 labeled 5601_3 and terminal #1 labeled 4602_1 is important for achieving a high-speed and stable communication between base station #3 labeled 5601_3 and terminal #1 labeled 4602_1.

In the following, an example of a method for realizing this will be described.

The first frequency (band) and the second frequency (band) have the relationship described above, and thus, when Channel Aggregation is performed, it is preferable that the communication at the first frequency (band) between base station 4601_0 and terminal #1 labeled 4602_1 is a communication of SCell and the communication at the second frequency (band) with between base station 4601_0 and terminal #1 labeled 4602_1 is a communication of PCell.

In addition, when the Dual Connectivity is achieved, it is preferable that a function of base station 4601_0 at the first frequency (band) is the SgNB, and a function of base station 4601_0 at the second frequency (band) is the MgNB. Incidentally, the PSCell may be present at the first frequency (band).

The first frequency (band) and the second frequency (band) have the relationship described above, and thus, when Channel Aggregation is performed, it is preferable that the communication at the first frequency (band) between base station #3 labeled 5601_3 and terminal #1 labeled 4602_1 is a communication of SCell and the communication at the second frequency (band) with between base station 4601_0 and terminal #1 labeled 4602_1 is a communication of PCell.

In addition, when the Dual Connectivity is achieved, it is preferable that a function of base station #3 labeled 5601_3 at the first frequency (band) is the SgNB, and a function of base station 4601_0 at the second frequency (band) is the MgNB. Incidentally, the PSCell may be present at the first frequency (band).

FIG. 60 illustrates an example of data included in a modulation signal transmitted at the second frequency (band) by terminal #1 labeled 4602_1. In FIG. 60, the components that operate in the same manner as in FIG. 52 are denoted by the same reference numerals.

The modulation signal transmitted at the second frequency (band) by terminal #1 labeled 4602_1 includes, for example, "information on first-frequency (band) sector sweep 5201," "request information on terminal to perform or not to perform first-frequency transmission 5202," "information on state of modulation signal at first frequency (CQI at first frequency) 6001," "information on RI at frequency (band) 6002," and "information on ACK/NACK at first frequency (band) 6003."

Incidentally, descriptions of "information on first-frequency (band) sector sweep 5201" and "request information on terminal to perform or not to perform first-frequency transmission 5202" will be omitted because they have already been described.

"Information on first-frequency (band) sector sweep 5201" may include information addressed to base station 4601_0 and information addressed to base station #3 labeled 5601_3. "Request information on terminal to perform or not to perform first-frequency transmission 5202" may include information addressed to base station 4601_0 and information addressed to base station #3 labeled 5601_3.

A description will be given of "information on state of modulation signal at first frequency (CQI at first frequency) 6001."

Base station 4601_0 transmits a modulation signal at the first frequency (band), and this modulation signal includes, for example, a reference signal for the CQI.

Terminal #1 labeled 4602_1 receives the modulation signal at the first frequency (band), and obtains an estimation value of the CQI (hereinafter, may be also referred to as "CQI estimation value") from the reference signal included in the received signal. When obtaining the CQI estimation value, terminal #1 labeled 4602_1 generates a modulation signal at the second frequency (band) including "information on state of modulation signal at first frequency (CQI at first frequency) 6001" and transmits the modulation signal to base station 4601_0.

Meanwhile, base station #3 labeled 5601_3 transmits a modulation signal at the first frequency (band), it is assumed that the modulation signal includes a reference signal for the CQI.

Terminal #1 labeled 4602_1 receives the modulation signal at the first frequency (band), and obtains the CQI estimation value from the reference signal included in the received signal. When obtaining the CQI estimation value, terminal #1 labeled 4602_1 generates a modulation signal at the second frequency (band) including "information on state of modulation signal at first frequency (CQI at first frequency) 6001" and transmits the modulation signal to base station 4601_0. Thereafter, base station #3 labeled 4601_3 obtains the generated information, and base station #3 labeled 4601_3 performs control based on the generated information.

Thus, "information on state of modulation signal at first frequency (CQI at first frequency) 6001" may include a plurality of pieces of information.

A description will be given of "information on RI at frequency (band) 6002."

Base station 4601_0 transmits the modulation signal at the first frequency (band), and this modulation signal includes, for example, a reference signal.

Terminal #1 labeled 4602_1 receives the modulation signal at the first frequency (band), and obtains a value of RI (hereinafter, may be also referred to as "RI value") from the reference signal included in the received signal. When obtaining the RI value, terminal #1 labeled 4602_1 generates a modulation signal at the second frequency (band) including "information on RI at frequency (band) 6002" and transmits the modulation signal to base station 4601_0.

Base station #3 labeled 5601_3 transmits the modulation signal at the first frequency (band), and this modulation signal includes, for example, a reference signal.

Terminal #1 labeled 4602_1 receives the modulation signal at the first frequency (band), and obtains the RI value from the reference signal included in the received signal. When obtaining the RI value, terminal #1 labeled 4602_1 generates a modulation signal at the second frequency (band) including "information on RI at frequency (band) 6002" and transmits the modulation signal to base station 4601_0. Thereafter, base station #3 labeled 4601_3 obtains the generated information, and base station #3 labeled 4601_3 performs control based on the generated information.

Thus, "information on RI at frequency (band) 6002" may include a plurality of pieces of information.

A description will be given of "information on ACK/NACK at first frequency (band) 6003."

Base station 4601_0 transmits the modulation signal at the first frequency (band), and this modulation signal includes, for example, a data symbol.

Terminal #1 labeled 4602_1 receives the modulation signal at the first frequency (band) and demodulates data. Terminal #1 labeled 4602_1 performs error checking, then generates ACK information when the correct data is obtained, and generates NACK information when the correct data is not obtained. After that, terminal #1 labeled 4602_1 generates a modulation signal at the second frequency (band) including the ACK or NACK information and transmits the modulation signal to base station 4601_0. At this time, the generated information is "information on ACK/NACK at first frequency (band) 6003."

Base station #3 labeled 5601_3 transmits the modulation signal at the first frequency (band), and this modulation signal includes, for example, a data symbol.

Terminal #1 labeled 4602_1 receives the modulation signal at the first frequency (band) and demodulates data. Terminal #1 labeled 4602_1 performs error checking, then generates ACK information when the correct data is obtained, and generates NACK information when the correct data is not obtained. After that, terminal #1 labeled 4602_1 generates a modulation signal at the second frequency (band) including the ACK or NACK information and transmits the modulation signal to base station 4601_0. At this time, the generated information is "information on ACK/NACK at first frequency (band) 6003." Thereafter, base station #3 labeled 4601_3 obtains the generated information, and base station #3 labeled 4601_3 performs control based on the generated information.

Thus, "information on ACK/NACK at first frequency (band) 6003" may include a plurality of pieces of information.

Hereinafter, effects of the communication methods of FIGS. 62A, 62B, and 60 will be described.

Terminal #1 labeled 4602_1 transmits "information on state of modulation signal at first frequency (CQI at first frequency) 6001" by using the modulation signal at the second frequency (band). As a result, terminal #1 labeled 4602_1 can easily, with less delay, notify base station 4601_0 that the modulation signal is not demodulated as in the time period from time s2 to time s3 in (A) of FIG. 62A.

In addition, terminal #1 labeled 4602_1 transmits "information on state of modulation signal at first frequency (CQI at first frequency) 6001" by using the modulation signal at the second frequency (band). As a result, terminal #1 labeled 4602_1 can easily, with less delay, notify base station 4601_0 that the modulation signal is not demodulated as in the time period from time s4 to time s5 in (A) of FIG. 62B.

Moreover, terminal #1 labeled 4602_1 transmits "information on RI at first frequency (band) 6002" by using the modulation signal at the second frequency (band). As a result, base station 4601_0 and base station #3 labeled 5601_3 can suitably control the number of modulation signals to be transmitted in data-symbol including frames labeled 6202_1 and 6202_4 of FIG. 62A, and thereby can achieve high-speed data transmission.

Furthermore, terminal #1 labeled 4602_1 transmits "information on RI at first frequency (band) 6002" by using the modulation signal at the second frequency (band). As a result, base station 4601_0 and base station #3 labeled 5601_3 can suitably control the number of modulation signals to be transmitted in data-symbol including frames labeled 6212_1, 6212_2, and 6212_4 of FIG. 62B, and thereby can achieve high-speed data transmission.

Further, terminal #1 labeled 4602_1 transmits "information on ACK/NACK at first frequency (band) 6003" by using the modulation signal at the second frequency (band). As a result, base station 4601_0 can easily, with less delay, determine whether or not to perform retransmission to data-symbol including frames labeled 6202_1 and 6202_4 of FIG. 62A, and thereby can achieve a robust communication.

Further, terminal #1 labeled 4602_1 transmits "information on ACK/NACK at first frequency (band) 6003" by using the modulation signal at the second frequency (band). As a result, base station 4601_0 can easily, with less delay, determine whether or not to perform retransmission to data-symbol including frames labeled 6212_1, 6212_2, and 6212_4 of FIG. 62B, and thereby can achieve a robust communication.

Incidentally, PUCCH, RACH, and PUSCH may be used for a method of transmitting "information on first-frequency (band) sector sweep 5201," "request information on terminal to perform or not to perform first-frequency transmission 5202," "information on state of modulation signal at first frequency (CQI at first frequency) 6001," "information on RI at first frequency (band) 6002," and "information on ACK/NACK at first frequency (band) 6003," but the method is not limited to these.

FIG. 61 illustrates an example of data included in a modulation signal transmitted by base station 4601_0 by using the second frequency (band). In FIG. 61, the components that operate in the same manner as in FIG. 53 are denoted by the same reference numerals.

The modulation signal transmitted at the second frequency (band) by base station 4601_0 includes, for example, "information on allocation of data-symbol including frame at first frequency (band) 5301," "information on transmission method at first frequency (information on PMI at first frequency) 6101," and "information on cell ID at first frequency 6102."

Incidentally, a description of "information on allocation of data-symbol including frame at first frequency (band) 5301" will be omitted because it has already been described.

A description will be given of "information on transmission method at first frequency (information on PMI at first frequency) 6101."

Base station 4601_0 transmits the modulation signal at the first frequency (band) to terminal #1 labeled 4602_1. At this time, an area to transmit information on the transmission method (PMI) of the modulation signal transmitted by base station 4601_0 becomes "information on transmission method at first frequency (information on PMI at first frequency) 6101."

Further, base station #3 labeled 5601_3 transmits the modulation signal at the first frequency (band) to terminal #1 labeled 4602_1. At this time, an area to transmit information on the transmission method (PMI) of the modulation signal transmitted by base station #3 labeled 5601_3 becomes "information on transmission method at first frequency (information on PMI at first frequency) 6101."

Thus, "information on transmission method at first frequency (information on PMI at first frequency) 6101" may include a plurality of pieces of information.

A description will be given of "information on cell ID at first frequency 6102."

Base station 4601_0 transmits the modulation signal at the first frequency (band) to terminal #1 labeled 4602_1. At this time, an area to transmit information on the cell ID in the modulation signal transmitted by base station 4601_0 becomes "information on cell ID at first frequency 6102."

Further, base station #3 labeled 5601_3 transmits the modulation signal at the first frequency (band) to terminal #1 labeled 4602_1. At this time, an area to transmit information on the cell ID in the modulation signal transmitted by base station #3 labeled 5601_3 becomes "information on cell ID at first frequency 6102."

Thus, "information on cell ID at first frequency 6102" information on transmission method at first frequency (information on PMI at first frequency) 6101 may include a plurality of pieces of information.

Hereinafter, effects of the communication methods of FIGS. 62A, 62B, and 61 will be described.

Base station 4601_0 transmits "information on transmission method at first frequency (information on PMI at first frequency) 6101" by using the modulation signal at the second frequency (band). As a result, terminal #1 labeled 4602_1 can easily start a demodulation operation of the modulation signal.

In addition, base station 4601_0 transmits "information on cell ID at first frequency 6102" by using the modulation signal at the second frequency (band). As a result, terminal #1 labeled 4602_1 can easily know the cell in which the communication at the first frequency (band) can be performed.

Incidentally, PDCCH, PDSCH, and the like may be used for a method of transmitting "information on allocation of data-symbol including frame at first frequency (band) 5301," "information on transmission method at first frequency (information on PMI at first frequency) 6101," and "information on cell ID at first frequency 6102," but the method is not limited to these.

An operational example of the communication system of FIG. 56D will be described.

In the communication system of FIG. 56D, base station #1 labeled 4601_1 transmits a modulation signal at the first frequency (band); base station #2 labeled 4601_2 transmits a modulation signal at the second frequency (band); and base station #3 labeled 5601_3 transmits a modulation signal at the first frequency (band).

First, an operational example in FIG. 62A of the communication system in (D) of FIG. 57 will be described.

FIG. 62A illustrates in (A) the reception state of the modulation signal in terminal #1 labeled 4602_1 at the first frequency (band) transmitted by base station #1 labeled 4601_1. FIG. 62A illustrates in (B) the reception state of the modulation signal in terminal #1 labeled 4602_1 at the second frequency (band) transmitted by base station #2 labeled 4601_2.

In (A) of FIG. 62A, the reference numeral 6201_1 indicates that "terminal #1 labeled 4602_1 can receive a sector-sweep reference signal."

The reference numeral 6202_1 indicates that "terminal #1 labeled 4602_1 can receive a data-symbol including frame."

The reference numeral 6201_2 indicates that "terminal #1 labeled 4602_1 can receive a sector-sweep reference signal."

In the time period from time s2 to time s3, terminal #1 labeled 4602_1 is in a state where it cannot receive (cannot perform demodulation of) the modulation signal transmitted at the first frequency (band) by base station #1 labeled 4601_1.

The reference numeral 6201_3 indicates that "terminal #1 labeled 4602_1 can receive a sector-sweep reference signal."

In the time period from time s4 to time s5, terminal #1 labeled 4602_1 is in a state where it cannot receive (cannot perform demodulation of) the modulation signal transmitted at the first frequency (band) by base station #1 labeled 4601_1.

The reference numeral 6201_4 indicates that "terminal #1 labeled 4602_1 can receive a sector-sweep reference signal."

The reference numeral 6202_4 indicates that "terminal #1 labeled 4602_1 can receive a data-symbol including frame."

In (B) of FIG. 62A, the reference numeral 6250 indicates that "terminal #1 labeled 4602_1 can receive a modulation signal at the second frequency (band)."

Here, terminal #1 labeled 4602_1 is more likely to be in a state where it cannot receive (cannot perform demodulation of) the modulation signal at the first frequency (band) than in a state where it cannot receive (cannot perform demodulation of) the modulation signal at the second frequency (band). This is because that the first frequency (band) is higher than the second frequency (band).

Next, an operational example in FIG. 62B of the communication system in (D) of FIG. 57 will be described.

FIG. 62B illustrates in (A) the reception state of the modulation signal in terminal #1 labeled 4602_1 at the first frequency (band) transmitted by base station #3 labeled 5601_3. FIG. 62B illustrates in (B) the reception state of the modulation signal in terminal #1 labeled 4602_1 at the second frequency (band) transmitted by base station #2 labeled 4601_2.

In (A) of FIG. 62B, the reference numeral 6211_1 indicates that "terminal #1 labeled 4602_1 can receive a sector-sweep reference signal."

The reference numeral 6212_1 indicates that "terminal #1 labeled 4602_1 can receive a data-symbol including frame."

The reference numeral 6211_2 indicates that "terminal #1 labeled 4602_1 can receive a sector-sweep reference signal."

The reference numeral 6212_2 indicates that "terminal #1 labeled 4602_1 can receive a data-symbol including frame."

The reference numeral 6211_3 indicates that "terminal #1 labeled 4602_1 can receive a sector-sweep reference signal."

In the time period from time s4 to time s5, terminal #1 labeled 4602_1 is in a state where it cannot receive (cannot perform demodulation of) the modulation signal transmitted at the first frequency (band) by base station #3 labeled 5601_3.

The reference numeral 6211_4 indicates that "terminal #1 labeled 4602_1 can receive a sector-sweep reference signal."

The reference numeral 6212_4 indicates that "terminal #1 labeled 4602_1 can receive a data-symbol including frame."

In (B) of FIG. 62B, the reference numeral 6260 indicates that "terminal #1 labeled 4602_1 can receive a modulation signal at the second frequency (band)."

Here, terminal #1 labeled 4602_1 is more likely to be in a state where it cannot receive (cannot perform demodulation of) the modulation signal at the first frequency (band) than in a state where it cannot receive (cannot perform demodulation of) the modulation signal at the second frequency (band). This is because that the first frequency (band) is higher than the second frequency (band).

Hence, a mechanism for quickly recovering the communication at the first frequency (band) between base station #1 labeled 4601_1 and terminal #1 labeled 4602_1 is important for achieving a high-speed and stable communication between base station #1 labeled 4601_1 and terminal #1 labeled 4602_1. In addition, a mechanism for quickly recovering the communication at the first frequency (band) between base station #3 labeled 5601_3 and terminal #1 labeled 4602_1 is important for achieving a high-speed and stable communication between base station #3 labeled 5601_3 and terminal #1 labeled 4602_1.

In the following, an example of a method for realizing this will be described.

The first frequency (band) and the second frequency (band) have the relationship described above, and thus, when Channel Aggregation is performed, it is preferable that the communication at the first frequency (band) between base station #1 labeled 4601_1 and terminal #1 labeled 4602_1 is a communication of SCell and the communication at the second frequency (band) with between base station #2 labeled 4601_2 and terminal #1 labeled 4602_1 is a communication of PCell.

In addition, when the Dual Connectivity is achieved, it is preferable that a function of base station #1 labeled 4601_1 at the first frequency (band) is the SgNB, and a function of base station #2 labeled 4601_2 at the second frequency (band) is the MgNB. Incidentally, the PSCell may be present at the first frequency (band).

The first frequency (band) and the second frequency (band) have the relationship described above, and thus, when Channel Aggregation is performed, it is preferable that the communication at the first frequency (band) between base station #3 labeled 5601_3 and terminal #1 labeled 4602_1 is a communication of SCell and the communication at the second frequency (band) with between base station #2 labeled 4601_2 and terminal #1 labeled 4602_1 is a communication of PCell.

In addition, when the Dual Connectivity is achieved, it is preferable that a function of base station #3 labeled 5601_3 at the first frequency (band) is the SgNB, and a function of base station #2 labeled 4601_2 at the second frequency (band) is the MgNB. Incidentally, the PSCell may be present at the first frequency (band).

FIG. 60 illustrates an example of data included in a modulation signal transmitted at the second frequency (band) by terminal #1 labeled 4602_1. In FIG. 60, the components that operate in the same manner as in FIG. 52 are denoted by the same reference numerals.

The modulation signal transmitted at the second frequency (band) by terminal #1 labeled 4602_1 includes, for example, "information on first-frequency (band) sector sweep 5201," "request information on terminal to perform or not to perform first-frequency transmission 5202," "information on state of modulation signal at first frequency (CQI at first frequency) 6001," "information on RI at frequency (band) 6002," and "information on ACK/NACK at first frequency (band) 6003."

Incidentally, descriptions of "information on first-frequency (band) sector sweep 5201" and "request information on terminal to perform or not to perform first-frequency transmission 5202" will be omitted because they have already been described.

"Information on first-frequency (band) sector sweep 5201" may include information addressed to base station #1 labeled 4601_1 and information addressed to base station #3 labeled 5601_3. "Request information on terminal to perform or not to perform first-frequency transmission 5202" may include information addressed to base station #1 labeled 4601_1 and information addressed to base station #3 labeled 5601_3.

A description will be given of "information on state of modulation signal at first frequency (CQI at first frequency) 6001."

Base station #1 labeled 4601_1 transmits a modulation signal at the first frequency (band), and this modulation signal includes, for example, a reference signal for the CQI.

Terminal #1 labeled 4602_1 receives the modulation signal at the first frequency (band), and obtains the CQI estimation value from the reference signal included in the received signal. When obtaining the CQI estimation value, terminal #1 labeled 4602_1 generates a modulation signal at the second frequency (band) including "information on state of modulation signal at first frequency (CQI at first frequency) 6001" and transmits the modulation signal to base station #2 labeled 4601_2. Thereafter, base station #1 labeled 4601_1 obtains the generated information, and base station #1 labeled 4601_1 performs control based on the generated information.

Meanwhile, base station #3 labeled 5601_3 transmits a modulation signal at the first frequency (band), it is assumed that the modulation signal includes a reference signal for the CQI.

Terminal #1 labeled 4602_1 receives the modulation signal at the first frequency (band), and obtains the CQI estimation value from the reference signal included in the received signal. When obtaining the CQI estimation value, terminal #1 labeled 4602_1 generates a modulation signal at the second frequency (band) including "information on state of modulation signal at first frequency (CQI at first frequency) 6001" and transmits the modulation signal to base station #2 labeled 4601_2. Thereafter, base station #3 labeled 4601_3 obtains the generated information, and base station #3 labeled 4601_3 performs control based on the generated information.

Thus, "information on state of modulation signal at first frequency (CQI at first frequency) 6001" may include a plurality of pieces of information.

A description will be given of "information on RI at frequency (band) 6002."

Base station #1 labeled 4601_1 transmits the modulation signal at the first frequency (band), and this modulation signal includes, for example, a reference signal.

Terminal #1 labeled 4602_1 receives the modulation signal at the first frequency (band), and obtains the RI value from the reference signal included in the received signal. When obtaining the RI value, terminal #1 labeled 4602_1 generates a modulation signal at the second frequency (band) including "information on RI at frequency (band) 6002" and transmits the modulation signal to base station #2 labeled 4601_2. Thereafter, base station #1 labeled 4601_1 obtains the generated information, and base station #1 labeled 4601_1 performs control based on the generated information.

Base station #3 labeled 5601_3 transmits the modulation signal at the first frequency (band), and this modulation signal includes, for example, a reference signal.

Terminal #1 labeled 4602_1 receives the modulation signal at the first frequency (band), and obtains the RI value from the reference signal included in the received signal. When obtaining the RI value, terminal #1 labeled 4602_1 generates a modulation signal at the second frequency (band) including "information on RI at frequency (band) 6002" and transmits the modulation signal to base station #2 labeled 4601_2. Thereafter, base station #3 labeled 4601_3 obtains the generated information, and base station #3 labeled 4601_3 performs control based on the generated information.

Thus, "information on RI at frequency (band) 6002" may include a plurality of pieces of information.

A description will be given of "information on ACK/NACK at first frequency (band) 6003."

Base station #1 labeled 4601_1 transmits the modulation signal at the first frequency (band), and this modulation signal includes, for example, a data symbol.

Terminal #1 labeled 4602_1 receives the modulation signal at the first frequency (band) and demodulates data. Terminal #1 labeled 4602_1 performs error checking, then generates ACK information when the correct data is obtained, and generates NACK information when the correct data is not obtained. After that, the terminal #1 labeled 4602_1 generates a modulation signal at the second frequency (band) including the ACK or NACK information, and transmits the modulation signal to base station #2 labeled 4601_2. At this time, the generated information becomes "information on ACK/NACK at first frequency (band) 6003." Thereafter, base station #1 labeled 4601_1 obtains the generated information, and base station #1 labeled 4601_1 performs control based on the generated information.

Base station #3 labeled 5601_3 transmits the modulation signal at the first frequency (band), and this modulation signal includes, for example, a data symbol.

Terminal #1 labeled 4602_1 receives the modulation signal at the first frequency (band) and demodulates data. Terminal #1 labeled 4602_1 performs error checking, then generates ACK information when the correct data is obtained, and generates NACK information when the correct data is not obtained. After that, the terminal generates a modulation signal at the second frequency (band) including this information, and transmits the modulation signals to base station #2 labeled 4601_2. At this time, the generated information is "information on ACK/NACK at first frequency (band) 6003." Thereafter, base station #3 labeled 4601_3 obtains the generated information, and base station #3 labeled 4601_3 performs control based on the generated information.

Thus, "information on ACK/NACK at first frequency (band) 6003" may include a plurality of pieces of information.

Hereinafter, effects of the communication methods of FIGS. 62A, 62B, and 60 will be described.

Terminal #1 labeled 4602_1 transmits "information on state of modulation signal at first frequency (CQI at first frequency) 6001" by using the modulation signal at the second frequency (band). As a result, terminal #1 labeled 4602_1 can easily, with less delay, notify base station #2 labeled 4601_2 that the modulation signal is not demodulated as in the time period from time s2 to time s3 in (A) of FIG. 62A.

In addition, terminal #1 labeled 4602_1 transmits "information on state of modulation signal at first frequency (CQI at first frequency) 6001" by using the modulation signal at the second frequency (band). As a result, terminal #1 labeled 4602_1 can easily, with less delay, notify base station #2 labeled 4601_2 that the modulation signal is not demodulated as in the time period from time s4 to time s5 in (A) of FIG. 62B.

Moreover, terminal #1 labeled 4602_1 transmits "information on RI at first frequency (band) 6002" by using the modulation signal at the second frequency (band). As a result, base station #1 labeled 4601_1 and base station #3 labeled 5601_3 can suitably control the number of modulation signals to be transmitted in data-symbol including frames labeled 6202_1 and 6202_4 in FIG. 62A, and thereby can achieve high-speed data transmission.

Furthermore, terminal #1 labeled 4602_1 transmits "information on RI at first frequency (band) 6002" by using the modulation signal at the second frequency (band). As a result, base station #1 labeled 4601_1 and base station #3 labeled 5601_3 can suitably control the number of modulation signals to be transmitted in data-symbol including frames labeled 6212_1, 6212_2, and 6212_4 in FIG. 62B, and thereby can achieve high-speed data transmission.

Further, terminal #1 labeled 4602_1 transmits "information on ACK/NACK at first frequency (band) 6003" by using the modulation signal at the second frequency (band). As a result, base station 4601_0 can easily, with less delay, determine whether or not to perform retransmission to data-symbol including frames labeled 6202_1 and 6202_4 of FIG. 62A, and thereby can achieve a robust communication.

Further, terminal #1 labeled 4602_1 transmits "information on ACK/NACK at first frequency (band) 6003" by using the modulation signal at the second frequency (band). As a result, base station 4601_0 can easily, with less delay, determine whether or not to perform retransmission to data-symbol including frames labeled 6212_1, 6212_2, and 6212_4 of FIG. 62B, and thereby can achieve a robust communication.

Incidentally, PUCCH, RACH, and PUSCH may be used for a method of transmitting "information on first-frequency (band) sector sweep 5201," "request information on terminal to perform or not to perform first-frequency transmission 5202," "information on state of modulation signal at first frequency (CQI at first frequency) 6001," "information on RI at first frequency (band) 6002," and "information on ACK/NACK at first frequency (band) 6003," but the method is not limited to these.

FIG. 61 illustrates an example of data included in a modulation signal transmitted by base station #2 labeled 4601_2 using the second frequency (band). In FIG. 61, the components that operate in the same manner as in FIG. 53 are denoted by the same reference numerals.

The modulation signal transmitted at the second frequency (band) by base station #2 labeled 4601_2 includes, for example, "information on allocation of data-symbol including frame at first frequency (band) 5301," "information on transmission method at first frequency (information on PMI at first frequency) 6101," and "information on cell ID at first frequency 6102."

Incidentally, a description of "information on allocation of data-symbol including frame at first frequency (band) 5301" will be omitted because it has already been described.

A description will be given of "information on transmission method at first frequency (information on PMI at first frequency) 6101."

Base station #1 labeled 4601_1 transmits the modulation signal at the first frequency (band) to terminal #1 labeled 4602_1. At this time, an area to transmit information on the transmission method (PMI) of the modulation signal transmitted by base station #1 labeled 4601_1 becomes "information on transmission method at first frequency (information on PMI at first frequency) 6101."

Further, base station #3 labeled 5601_3 transmits the modulation signal at the first frequency (band) to terminal #1 labeled 4602_1. At this time, an area to transmit information on the transmission method (PMI) of the modulation signal transmitted by base station #3 labeled 5601_3 becomes "information on transmission method at first frequency (information on PMI at first frequency) 6101."

Thus, "information on transmission method at first frequency (information on PMI at first frequency) 6101" may include a plurality of pieces of information.

A description will be given of "information on cell ID at first frequency 6102."

Base station #1 labeled 4601_1 transmits the modulation signal at the first frequency (band) to terminal #1 labeled 4602_1. At this time, an area to transmit information on the cell ID of the modulation signal transmitted by base station #1 labeled 4601_1 becomes "information on cell ID at first frequency 6102."

Further, base station #3 labeled 5601_3 transmits the modulation signal at the first frequency (band) to terminal #1 labeled 4602_1. At this time, an area to transmit information on the cell ID in the modulation signal transmitted by base station #3 labeled 5601_3 becomes "information on cell ID at first frequency 6102."

Thus, "information on cell ID at first frequency 6102" information on transmission method at first frequency (information on PMI at first frequency) 6101 may include a plurality of pieces of information.

Hereinafter, effects of the communication methods of FIGS. 62A, 62B, and 61 will be described.

Base station #2 labeled 4601_2 transmits "information on transmission method at first frequency (information on PMI at first frequency) 6101" by using the modulation signal at the second frequency (band). As a result, terminal #1 labeled 4602_1 can easily start the demodulation operation of the modulation signal.

In addition, base station #2 labeled 4601_2 transmits "information on cell ID at first frequency 6102" by using the modulation signal at the second frequency (band). As a result, terminal #1 labeled 4602_1 can easily know the cell in which the communication at the first frequency (band) can be performed.

Incidentally, PDCCH, PDSCH, and the like may be used for a method of transmitting "information on allocation of data-symbol including frame at first frequency (band) 5301," "information on transmission method at first frequency (information on PMI at first frequency) 6101," and "information on cell ID at first frequency 6102," but the method is not limited to these.

In the present embodiment, a description has been given with a case in which the number of terminals that communicates with the base station in FIGS. 46A and 46B is 1, but the number may be 2 or more.

Moreover, a description has been given with a case in which the number of terminals that communicate with the base stations is two in FIGS. 56A, 56B, 56C, and 56D, but the number of terminals may be three or more.

The terminal of FIG. 47 may be configured to include a communication apparatus other than first-frequency communication apparatus 4702 and second-frequency communication apparatus 4712.

In each of the frames of FIGS. 52, 53, 60, and 61, information other than the described information may be included.

The modulation signal transmitted at the second frequency (band) by the terminal of FIG. 60 may include, in addition to the information illustrated in FIG. 60, "information on a base station with which the terminal can communicate at the first frequency (band)." For example, "information on the communicable base station at the first frequency (band)" may be a Cell ID of the communicable base station, the number of communicable base stations, or may be information indicating that no base station is communicable. Obtaining this information allows each base station to perform appropriate control to the terminal, and thereby an improvement in the data transmission speed can be achieved.

In the above, each communication apparatus in the communication system may transmit/receive, using a second frequency (band), a symbol other than the symbol illustrated in the drawings, for example, a data symbol. The transmission/reception timings of the modulation signal including data of the first frequency (band) and the modulation signal including data of the second frequency (band) may overlap or may not overlap. At the second frequency (band), sector sweep may be performed or may not be performed.

Embodiment 7

In Embodiments 1 to 6, a description has been given of a method in which a base station such as base station #1 labeled 901_1 of FIG. 9 transmits a sector-sweep reference signal (e.g., sector-sweep reference signal 1001 of FIG. 10) and a method in which a terminal such as terminal labeled 902_i of FIG. 9 transmits a sector-sweep reference signal. In the present embodiment, a description will be given of variations of "the method in which the base station transmits the sector-sweep reference signal" and "the method in which the terminal transmits the sector-sweep reference signal."

For example, with reference to FIGS. 11, 12, and the like, the method in which the base station transmits the sector-sweep reference signal has been described.

Specifically, the sector-sweep reference signal is generated based on the identification (ID) of the transmission panel antenna and the ID of beamforming (See FIG. 12).

For example, it is assumed that the base station transmits a reference signal for sector sweep by using transmission panel antenna #1. In this case, the base station transmits the following sector-sweep reference signals by using transmission panel antenna #1:

"(Reference) signal subject to processing based on a parameter of ID0 (parameter ID0) of beamforming (directivity control) by using transmission panel antenna #1"

"(Reference) signal subject to processing based on a parameter of ID1 (parameter ID1) of beamforming (directivity control) by using transmission panel antenna #1"

"(Reference) signal subject to processing based on a parameter of ID2 (parameter ID2) of beamforming (directivity control) by using transmission panel antenna #1"

"(Reference) signal subject to processing based on a parameter of ID3 (parameter ID3) of beamforming (directivity control) by using transmission panel antenna #1"

Similarly, it is assumed that the base station transmits a sector-sweep reference signal by using transmission panel antenna #2. In this case, the base station transmits the following sector-sweep reference signals by using transmission panel antenna #2:

"(Reference) signal subject to processing based on a parameter of ID0 (parameter ID0) of beamforming (directivity control) by using transmission panel antenna #2"

"(Reference) signal subject to processing based on a parameter of ID1 (parameter ID1) of beamforming (directivity control) by using transmission panel antenna #2"

"(Reference) signal subject to processing based on a parameter of ID2 (parameter ID2) of beamforming (directivity control) by using transmission panel antenna #2"

"(Reference) signal subject to processing based on a parameter of ID3 (parameter ID3) of beamforming (directivity control) by using transmission panel antenna #2"

That is, the base station uses transmission panel antenna #i to transmit a sector-sweep reference signal. Incidentally, i is assumed to be an integer of 1 or more. In this case, the base station transmits the following sector-sweep reference signals by using transmission panel antenna #i:

"(Reference) signal subject to processing based on a parameter of ID0 (parameter ID0) of beamforming (directivity control) by using transmission panel antenna #i"

"(Reference) signal subject to processing based on a parameter of ID1 (parameter ID1) of beamforming (directivity control) by using transmission panel antenna #i"

"(Reference) signal subject to processing based on a parameter of ID2 (parameter ID2) of beamforming (directivity control) by using transmission panel antenna #i"

"(Reference) signal subject to processing based on a parameter of ID3 (parameter ID3) of beamforming (directivity control) by using transmission panel antenna #i"

In the above, "the ID of the transmission panel antenna of the base station and the ID of beamforming (directivity control)" are described being separate from each other; however, an ID may be assigned without distinguishing between the two, and the base station may generate and transmit the sector-sweep reference signal.

For example, an ID is assigned to "Use of ID0 (parameter ID0) of beamforming (directivity control) by using transmission panel antenna #1," and thereby ID·0 is configured.

An ID is assigned to "Use of ID1 (parameter ID1) of beamforming (directivity control) by using transmission panel antenna #1," and thereby ID·1 is configured.

An ID is assigned to "Use of ID2 (parameter ID2) of beamforming (directivity control) by using transmission panel antenna #1," and thereby ID·2 is configured.

An ID is assigned to "Use of ID3 (parameter ID3) of beamforming (directivity control) by using transmission panel antenna #1," and thereby ID·3 is configured.

An ID is assigned to "Use of ID0 (parameter ID0) of beamforming (directivity control) by using transmission panel antenna #2," and thereby ID·4 is configured.

An ID is assigned to "Use of ID1 (parameter ID1) of beamforming (directivity control) by using transmission panel antenna #2," and thereby ID*5 is configured.

An ID is assigned to "Use of ID2 (parameter ID2) of beamforming (directivity control) by using transmission panel antenna #2," and thereby ID*6 is configured.

An ID is assigned to "Use of ID3 (parameter ID3) of beamforming (directivity control) by using transmission panel antenna #2," and thereby ID*7 is configured.

An ID is assigned to "Use of ID0 (parameter ID0) of beamforming (directivity control) by using transmission panel antenna #3," and thereby ID*8 is configured.

An ID is assigned to "Use of ID1 (parameter ID1) of beamforming (directivity control) by using transmission panel antenna #3," and thereby ID*9 is configured.

An ID is assigned to "Use of ID2 (parameter ID2) of beamforming (directivity control) by using transmission panel antenna #3," and thereby ID*10 is configured.

An ID is assigned to "Use of ID3 (parameter ID3) of beamforming (directivity control) by using transmission panel antenna #3," and thereby ID*11 is configured.

Then, the base station transmits the following as the sector-sweep reference signals:

"(Reference) signal subject to processing based on ID*0,"
"(Reference) signal subject to processing based on ID*1,"
"(Reference) signal subject to processing based on ID*2,"
"(Reference) signal subject to processing based on ID*3,"
"(Reference) signal subject to processing based on ID*4,"
"(Reference) signal subject to processing based on ID*5,"
"(Reference) signal subject to processing based on ID*6,"
"(Reference) signal subject to processing based on ID*7,"
"(Reference) signal subject to processing based on ID*8,"
"(Reference) signal subject to processing based on ID*9,"
"(Reference) signal subject to processing based on ID*10,"
"(Reference) signal subject to processing based on ID*11," and so forth.

Incidentally, the transmission order of the signals may be in the order described above, or may be different from this order.

At this time, "(reference) signal subject to processing based on ID*k" transmitted by the base station includes information on ID*k. Note that, k is assumed to be an integer of 0 or more. Incidentally, "(reference) signal subject to processing based on ID*k" to be transmitted by the base station may include other information, and a description thereof will be omitted because the example has been described in other embodiments (information on the transmission panel antenna may be included).

The terminal then receives the sector-sweep reference signal transmitted by the base station, and transmits a sector-sweep reference signal including the information on "ID*3" in a case where the above ID has high reception quality, for example, "ID*3" has the high reception quality. Incidentally, the sector-sweep reference signal to be transmitted by the terminal may include other information, and the example thereof is as described in other embodiments. Further, the transmission method of the sector-sweep reference signal to be transmitted by the terminal is as described in other embodiments and will be also described later in the present embodiment.

The transmission panel antenna of the base station (see FIGS. 1A, 1B, and 1C) may include the configuration of FIG. 3, and may be composed of one antenna or a plurality of antennae.

On the basis of the above, the base station may generate and transmit sector-sweep reference signal 1001 of, for example, FIG. 10, as follows.

Figure 63:
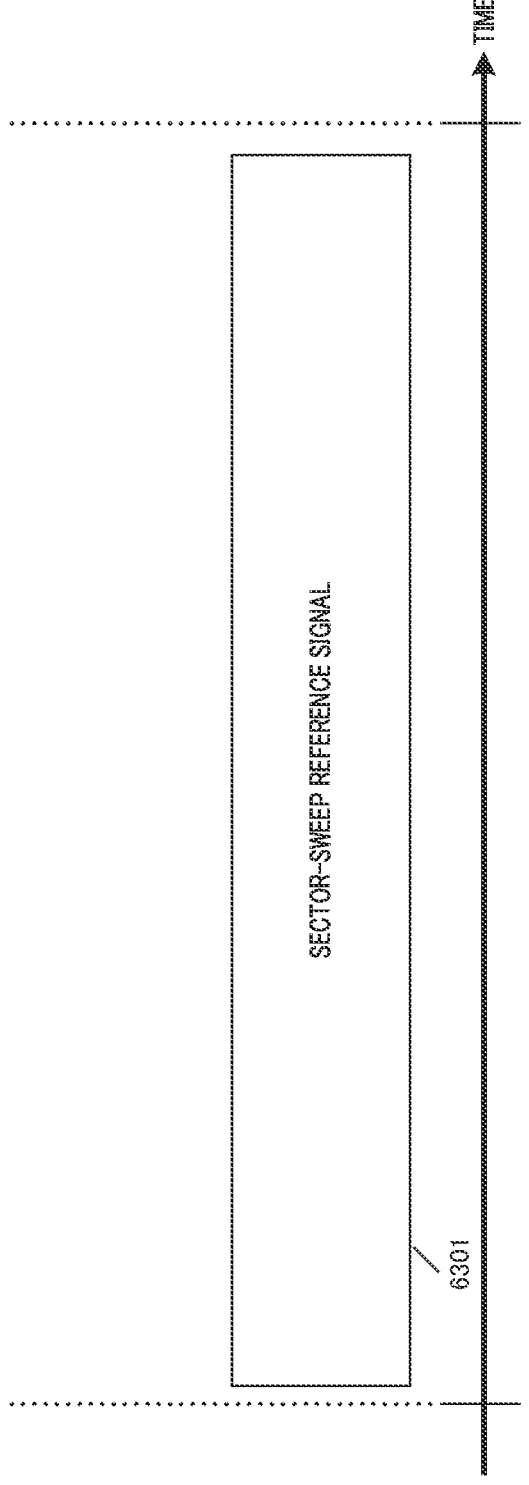
FIG. 63 illustrates an example of a sector-sweep reference signal transmitted by a base station according to Embodiment 7.

FIG. 63 illustrates a configuration example of sector-sweep reference signal 1001 transmitted by the base station and described with reference to, for example, FIG. 10. In FIG. 63, a horizontal axis represents time. As illustrated in FIG. 63, sector-sweep reference signal 6301 is present.

Figure 64:
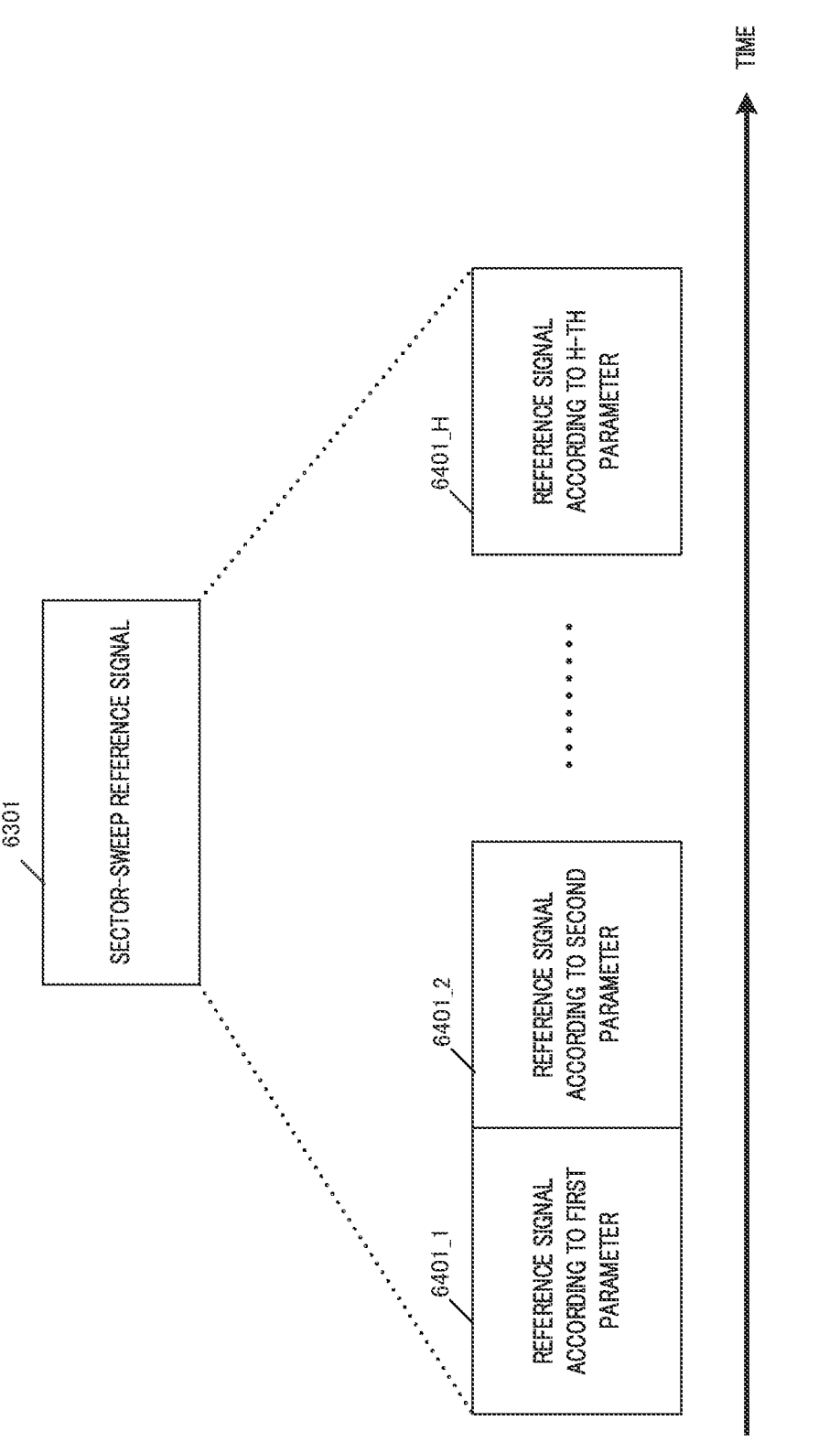
FIG. 64 illustrates a configuration example of the sector-sweep reference signal according to Embodiment 7.

FIG. 64 illustrates a configuration example of sector-sweep reference signal 6301 of FIG. 63. It is assumed that sector-sweep reference signal 6301 is composed of "reference signal 6401_1 according to first parameter," "reference signal 6401_2 according to second parameter," . . . , "reference signal 6401_H according to H-th parameter." Incidentally, H is assumed to be an integer of 1 or more or an integer of 2 or more.

In a case where the base station has, for example, the configuration of FIG. 1A, 1B, or 1C, it is assumed that "reference signal 6401_i according to i-th parameter" is transmitted by using one or more transmission panel antennae from transmission panel antenna 1 labeled 106_1 to transmission panel antenna M labeled 106_M. Incidentally, i is an integer from 1 to H (both inclusive).

Further, for example, in a case where the base station has the configuration of FIG. 1A or 1B, "reference signal 6401_i according to i-th parameter" is subject to signal processing (beamforming (directivity control)) by the i-th parameter in first processor 104, and first processor 104 generates "reference signal 6401_i according to i-th parameter" to be transmitted using one or more transmission panel antennae from transmission panel antenna 1 labeled 106_1 to transmission panel antenna labeled 106_M.

In addition, it is assumed that "reference signal 6401_i according to i-th parameter" includes, for example, the following information:

Information on the i-th parameter, for example, beamforming (directivity control) Identification number (ID) (here, it corresponds to, for example, i); and The number of slots that can transmit the sector-sweep reference signal when the terminal transmits the sector-sweep reference signal (the number of terminals that can transmit the sector-sweep reference signal).

In addition, other information may be included, for example, "reference signal 6401_i according to i-th parameter" may include information similar to the information included in "reference-signal 1201_k according to k-th parameter in transmission panel antenna i" of FIG. 12.

Thus, in the present specification, with respect to the operation related to "reference signal according to k-th parameter in transmission panel antenna i 1201_k" of FIG. 12, the same operation can be performed with replacement to "reference signal 1201_k according to k-th parameter in transmission panel antenna i" of FIG. 12 and application of "reference signal 6401_i according to i-th parameter."

Meanwhile "reference signal 6401_i according to i-th parameter" may include information on the antenna used for transmitting "reference signal 6401_i according to i-th parameter" (e.g., the ID of the transmission panel antenna, the information on the sector antenna, and the antenna port number).

Next, a description will be given of a variation of the sector-sweep reference signal transmitted by the terminal.

For example, with reference to FIGS. 13, 14, 15, and the like, the method in which the terminal transmits the sector-sweep reference signal has been described.

Specifically, the sector-sweep reference signal is generated based on based on the identification (ID) of the transmission panel antenna and the ID of beamforming (See FIG. 15).

For example, it is assumed that the terminal transmits a reference signal for sector sweep by using transmission panel antenna #1. In this case, the terminal transmits the following sector-sweep reference signals by using transmission panel antenna #1:

"(Reference) signal subject to processing based on a parameter of ID0 (parameter ID0) of beamforming (directivity control) by using transmission panel antenna #1"

"(Reference) signal subject to processing based on a parameter of ID1 (parameter ID1) of beamforming (directivity control) by using transmission panel antenna #1"

"(Reference) signal subject to processing based on a parameter of ID2 (parameter ID2) of beamforming (directivity control) by using transmission panel antenna #1"

"(Reference) signal subject to processing based on a parameter of ID3 (parameter ID3) of beamforming (directivity control) by using transmission panel antenna #1"

Similarly, it is assumed that the terminal transmits a sector-sweep reference signal by using transmission panel antenna #2. In this case, the terminal transmits the following sector-sweep reference signals by using transmission panel antenna #2:

"(Reference) signal subject to processing based on a parameter of ID0 (parameter ID)) of beamforming (directivity control) by using transmission panel antenna #2"

"(Reference) signal subject to processing based on a parameter of ID1 (parameter ID1) of beamforming (directivity control) by using transmission panel antenna #2"

"(Reference) signal subject to processing based on a parameter of ID2 (parameter ID2) of beamforming (directivity control) by using transmission panel antenna #2"

"(Reference) signal subject to processing based on a parameter of ID3 (parameter ID3) of beamforming (directivity control) by using transmission panel antenna #2"

That is, the terminal uses transmission panel antenna #i to transmit a sector-sweep reference signal. Incidentally, i is assumed to be an integer of 1 or more. In this case, the terminal transmits the following sector-sweep reference signals by using transmission panel antenna #i:

"(Reference) signal subject to processing based on a parameter of ID0 (parameter ID)) of beamforming (directivity control) by using transmission panel antenna #i"

"(Reference) signal subject to processing based on a parameter of ID1 (parameter ID1) of beamforming (directivity control) by using transmission panel antenna #i"

"(Reference) signal subject to processing based on a parameter of ID2 (parameter ID2) of beamforming (directivity control) by using transmission panel antenna #i"

"(Reference) signal subject to processing based on a parameter of ID3 (parameter ID3) of beamforming (directivity control) by using transmission panel antenna #i"

In the above, "the ID of the transmission panel antenna of the terminal and the ID of beamforming (directivity control)" are described being separate from each other; however, an ID may be assigned without distinguishing between the two, and the terminal may generate and transmit the sector-sweep reference signal.

For example, an ID is assigned to "Use of ID0 (parameter ID0) of beamforming (directivity control) by using transmission panel antenna #1," and thereby ID$*$0 is configured.

An ID is assigned to "Use of ID1 (parameter ID1) of beamforming (directivity control) by using transmission panel antenna #1," and thereby ID$*$1 is configured.

An ID is assigned to "Use of ID2 (parameter ID2) of beamforming (directivity control) by using transmission panel antenna #1," and thereby ID$*$2 is configured.

An ID is assigned to "Use of ID3 (parameter ID3) of beamforming (directivity control) by using transmission panel antenna #1," and thereby ID$*$3 is configured.

An ID is assigned to "Use of ID0 (parameter ID0) of beamforming (directivity control) by using transmission panel antenna #2," and thereby ID$*$4 is configured.

An ID is assigned to "Use of ID1 (parameter ID1) of beamforming (directivity control) by using transmission panel antenna #2," and thereby ID$*$5 is configured.

An ID is assigned to "Use of ID2 (parameter ID2) of beamforming (directivity control) by using transmission panel antenna #2," and thereby ID$*$6 is configured.

An ID is assigned to "Use of ID3 (parameter ID3) of beamforming (directivity control) by using transmission panel antenna #2," and thereby ID$*$7 is configured.

An ID is assigned to "Use of ID0 (parameter ID0) of beamforming (directivity control) by using transmission panel antenna #3," and thereby ID$*$8 is configured.

An ID is assigned to "Use of ID1 (parameter ID1) of beamforming (directivity control) by using transmission panel antenna #3," and thereby ID$*$9 is configured.

An ID is assigned to "Use of ID2 (parameter ID2) of beamforming (directivity control) by using transmission panel antenna #3," and thereby ID$*$10 is configured.

An ID is assigned to "Use of ID3 (parameter ID3) of beamforming (directivity control) by using transmission panel antenna #3," and thereby ID$*$11 is configured.

Then, the terminal transmits the following as the sector-sweep reference signals:

"(Reference) signal subject to processing based on ID$*$0,"

"(Reference) signal subject to processing based on ID$*$1,"

"(Reference) signal subject to processing based on ID$*$2,"

"(Reference) signal subject to processing based on ID$*$3,"

"(Reference) signal subject to processing based on ID$*$4,"

"(Reference) signal subject to processing based on ID$*$5,"

"(Reference) signal subject to processing based on ID$*$6,"

"(Reference) signal subject to processing based on ID$*$7,"

"(Reference) signal subject to processing based on ID$*$8,"

"(Reference) signal subject to processing based on ID$*$9,"

"(Reference) signal subject to processing based on ID$*$10,"

"(Reference) signal subject to processing based on ID$*$1,"
and so forth.

Incidentally, the transmission order of the signals may be in the order described above, or may be different from this order.

At this time, "(reference) signal subject to processing based on ID$*$k" transmitted by the terminal includes information on ID$*$k. Note that, k is assumed to be an integer of 0 or more. Incidentally, "(reference) signal subject to processing based on ID$*$k" to be transmitted by the base station may include other information, and a description thereof will be omitted because the example has been described in other embodiments (information on the transmission panel antenna may be included).

The base station then receives the sector-sweep reference signal transmitted by the terminal, and transmits a feedback signal including the information on "ID♭3" in a case where the above ID has high reception quality, for example, "ID♭3" has the high reception quality.

Incidentally, the feedback signal to be transmitted by the base station may include other information, and the example thereof is as described in other embodiments. Further, the transmission method of the feedback signal to be transmitted by the base station is as described in other embodiments and will be also described later in the present embodiment.

The transmission panel antenna of the terminal (see FIGS. 1A, 1B, and 1C) may include the configuration of FIG. 3, and may be composed of one antenna or a plurality of antennae.

On the basis of the above, the terminal may generate and transmit the sector-sweep reference signal for a terminal of, for example, FIG. 13, as follows.

FIG. 14 is an arrangement example of the sector-sweep reference signal transmitted by the terminal, and a description thereof will be omitted because it has already been described.

Figure 65:
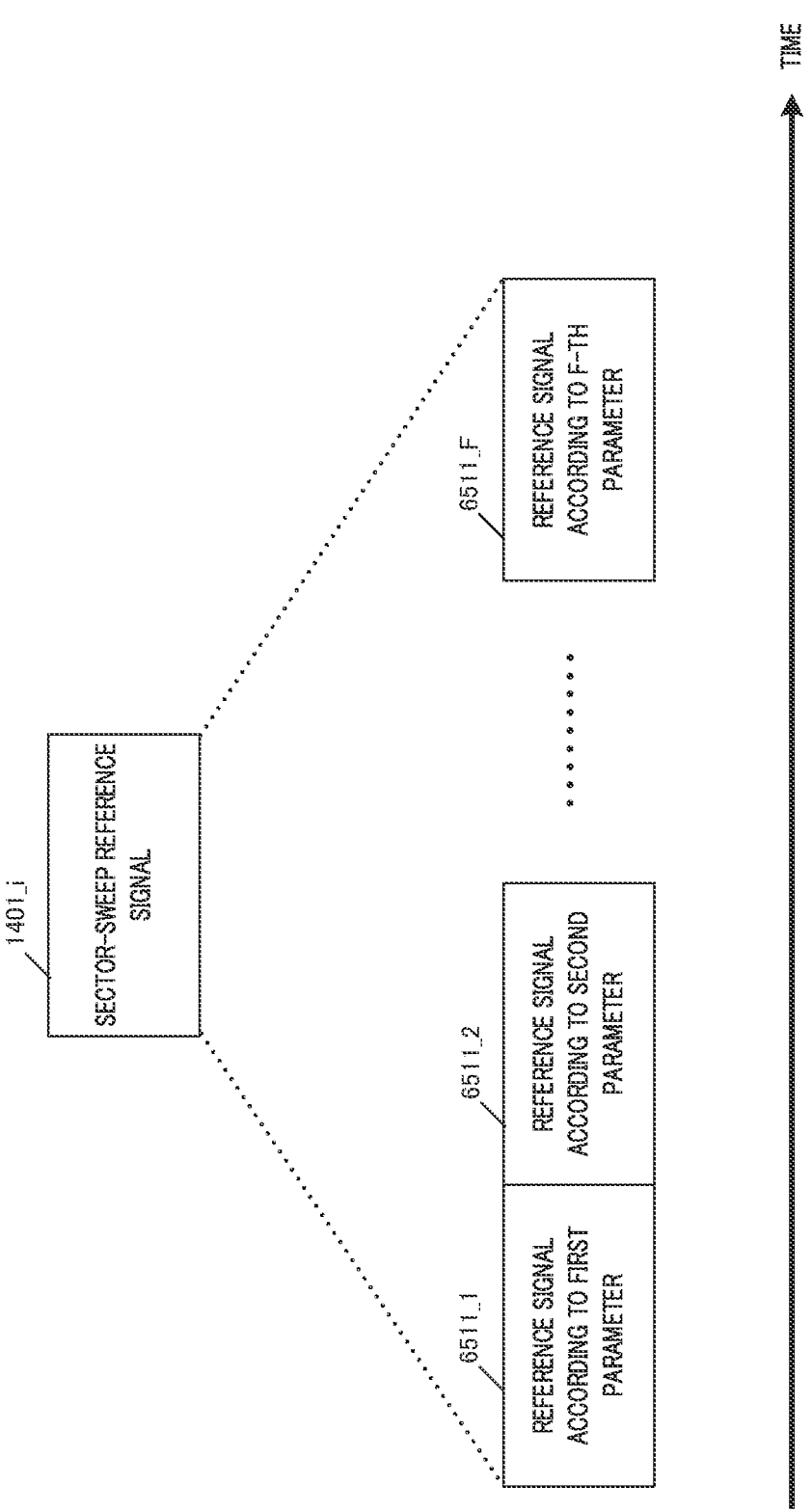
FIG. 65 illustrates another configuration example of the sector-sweep reference signal according to Embodiment 7.

FIG. 65 illustrates a configuration example of sector-sweep reference signal 1401_i of FIG. 14. It is assumed that sector-sweep reference signal 1401_i is composed of "reference signal 6511_1 according to first parameter," "reference signal 6511_2 according to second parameter," . . . , and "reference signal 6511_F according to F-th parameter." Incidentally, F is assumed to be an integer of 1 or more or an integer of 2 or more.

In a case where terminal #i has, for example, the configuration of FIG. 1A, 1B, or 1C, it is assumed that "sector-sweep reference signal 1401_i" is transmitted by using one or more transmission panel antennae from transmission panel antenna 1 labeled 106_1 to transmission panel antenna M labeled 106_M.

Further, for example, in a case where the terminal has the configuration of FIG. 1A or 1B, "reference signal 6511_k according to k-th parameter" is subject to signal processing (beamforming (directivity control)) by the k-th parameter in first processor 104, and first processor 104 generates "reference signal 6511_k according to k-th parameter" to be transmitted by using one or more transmission panel antennae from transmission panel antenna 1 labeled 106_1 to transmission panel antenna labeled 106_M. Note that, k is assumed to be an integer from 1 to F (both inclusive).

In addition, it is assumed that "reference signal 6511_k according to k-th parameter" includes, for example, the following information:

Information on the k-th parameter, for example, beamforming (directivity control) Identification number (ID) (here, it corresponds to, for example, i); and Information to be fed back to the base station. For example, information on a frequency (band) with high reception quality, information on a parameter for beamforming (directivity control) with high reception quality, and information on an antenna with high reception quality, which the terminal estimates after receiving the sector-sweep reference signal transmitted by the base station.

With respect to the information included in "reference signal 6511_k according to k-th parameter" is the same as described in other embodiments including the above information.

Thus, in the present specification, with respect to the operation related to "reference signal 1501_a according to a-th parameter in transmission panel antenna xi of FIG. 15," the same operation can be performed with replacement to "reference signal 1501_a according to a-th parameter in transmission panel antenna xi of FIG. 15" and application of "reference signal 6511_k according to k-th parameter."

Meanwhile "reference signal 6511_k according to k-th parameter" may include information on the antenna used for transmitting "reference signal 6511_k according to k-th parameter" (e.g., the ID of the transmission panel antenna, the information on the sector antenna, and the antenna port number).

The base station may transmit, to the communication counterpart (terminal), the information on the reception panel antenna and the information on the parameter of the beamforming (directivity control) in reception with respect to the terminal, which are used when the base station receives the modulation signal. Alternatively, similar to the example related to the above-mentioned transmission, the base station may assign an ID without distinguishing the information on the reception panel antenna and beamforming (directivity control) and may transmit information on the ID to the communication counterpart (terminal).

Note that, FIG. 1A, 1B or 1C has been illustrated as a configuration example of the base station, but it is not limited to these configurations; the configuration of the reception panel antenna is not limited to the configuration of FIG. 4, and the reception panel antenna may be composed of one antenna or may be composed of a plurality of antennae.

At this time, beamforming (directivity control) in reception may be performed by using one or more reception panel antennae (one or more reception antennae). After that, the information on the parameter of beamforming (directivity control) used in the reception may be transmitted to the communication counterpart (terminal).

The terminal may transmit, to the communication counterpart (base station), the information on the reception panel antenna and the information on the parameter of the beamforming (directivity control) in reception with respect to the bases station, which are used when the terminal receives the modulation signal. Alternatively, similar to the example related to the above-mentioned transmission, the terminal may assign an ID without distinguishing the information on the reception panel antenna and beamforming (directivity control), and may transmit information on the ID to the communication counterpart (base station).

Note that, FIG. 1A. 1B or 1C has been illustrated as a configuration example of the terminal, but it is not limited to these configurations; the configuration of the reception panel antenna is not limited to the configuration of FIG. 4, and the reception panel antenna may be composed of one antenna or may be composed of a plurality of antennae.

At this time, beamforming (directivity control) in reception may be performed by using one or more reception panel antennae (one or more reception antennae). After that, the information on the parameter of beamforming (directivity control) used in the reception may be transmitted to the communication counterpart (base station).

(Supplement 1)

Some of the embodiments and other contents described in the specification can be obviously combined to be implemented.

In the present specification, the "sector-sweep reference signal transmitted by the base station" illustrated, for example, in FIGS. 10, 11, 12, 18, 19, 23, and the like and described in the embodiments may be included in a "Synchronization Signals (SS) block," a "Physical Broadcast Channel (PBCH) block," or an SS/PBCH block. At this time, it may not be referred to as a "sector-sweep reference signal." Meanwhile, the "feedback signal transmitted by the base station and feedback signal group transmitted by the base station" illustrated, for example, in FIGS. 10, 16, 18, 19, 23, 24, and the like and described in the embodiments may be included in the "SS block," the "PBCH block," or the SS/PBCH block. At this time, it may not be referred to as a "feedback signal or feedback signal group."

It has been indicated that the ID of the transmission panel antenna is included in the sector-sweep reference signal when the base station transmits the sector-sweep reference signal. As "ID of the transmission panel antenna," the information on the ID of the sector antenna and the antenna port number may be also included in the sector-sweep reference signal.

Similarly, it has been indicated that the ID of the transmission panel antenna is included in the sector-sweep reference signal when the terminal transmits the sector-sweep reference signal. As "ID of the transmission panel antenna," the information on the ID of the sector antenna and the antenna port number may be also included in the sector-sweep reference signal.

The configurations of the transmission panel antenna and the reception panel antenna of the communication apparatus in the present invention are not limited to the configurations of FIGS. 3 and 4, and the transmission panel antenna and the reception panel antenna may be composed of one or more antennae and antenna elements, or two or more antennae and antenna elements.

Further, the antennae illustrated in FIGS. 3 and 4 may be composed of one or more antennae and antenna elements, or two or more antennae and antenna elements.

Additionally, the embodiments and other contents are merely examples. For example, although "a modulation system, an error correction encoding scheme (an error correction code, a code length, and a code rate to be used), control information, etc." are exemplified, the same configuration can be used for the implementation even with different "modulation system, error correction encoding scheme (error correction code, code length, and code rate to be used), control information, etc."

In terms of the modulation system, the embodiments and other contents described in the specification can be implemented by using a modulation system other than the modulation system described in the specification. For example, Amplitude Phase Shift Keying (APSK) (e.g., 16 APSK, 64 APSK, 128 APSK, 256 APSK, 1024 APSK, and 4096 APSK), Pulse Amplitude Modulation (PAM) (e.g., 4 PAM, 8 PAM, 16 PAM, 64 PAM, 128 PAM, 256 PAM, 1024 PAM, and 4096 PAM), Phase Shift Keying (PSK)(e.g., BPSK, QPSK, 8 PSK, 16 PSK, 64 PSK, 128 PSK, 256 PSK, 1024 PSK, and 4096 PSK), and Quadrature Amplitude Modulation (QAM) (e.g., 4 QAM, 8 QAM, 16 QAM, 64 QAM, 128 QAM, 256 QAM, 1024 QAM, and 4096 QAM) may be applied, and uniform mapping or non-uniform mapping may be used in each of the modulation systems.

Further, the mapping method of 2, 4, 8, 16, 64, 128, 256, or 1024 of signal points on the I-Q plane (modulation system involving 2, 4, 8, 16, 64, 128, 256, or 1024 of signal points) is not limited to the signal point mapping method of the modulation system described in the specification. Thus, a function of outputting the in-phase component and the orthogonal component based on a plurality of bits serves as a function in the mapper, and performing precoding and phase changing serves as an effective function of the present invention.

Meanwhile, in the present specification, when "∀" and "∃" are present, "∀" represents a universal quantifier, and "∃" represents an existential quantifier.

In addition, in the present specification, when a complex plane is present, for example, the phase such as an argument is expressed in units of "radian."

Using the complex plane, an expression in a polar form is possible as representation by polar coordinates of complex numbers. When a point (a, b) on the complex plane is made to correspond to the complex number z=a+jb (provided that, a and b are both real numbers, and j is an imaginary unit) and this point is expressed as [r, θ] in polar coordinates, the following is satisfied: a=r×cos θ, b=r×sin θ. Provided that, r is an absolute value of z (r=|z|), and θ is the argument. Thus, z=a+jb is expressed as r×e$^{j\theta}$.

$$r=\sqrt{a^2+b^2} \qquad \text{Equation 1}$$

In the present specification, the reception apparatus and the antenna of the terminal may be configured to be separate from each other. For example, the reception apparatus includes an interface for inputting, via a cable, the signal received by the antenna or the signal subjected to frequency conversion with respect to the signal received by the antenna, and the reception apparatus will perform subsequent processing. Moreover, data and information obtained by the reception apparatus is subsequently converted into a video to be displayed on a display (monitor) or sound to be output from a speaker. Furthermore, the data and information obtained by the reception apparatus may be subject to signal processing related to the video and the sound (the signal processing may not be performed) and may be output from, for example, an RCA terminal (video terminal, sound terminal) included in the reception apparatus, a Universal Serial Bus (USB), a High-Definition Multimedia Interface (registered trademark) (HDMI), and a digital terminal.

In the present specification, the transmission apparatus and/or the transmitter may be included in, for example, the following: a broadcasting station; a base station, an access point; a terminal; a mobile phone; a smartphone; a tablet; a server, a personal computer; a television; a home appliance (household electrical machinery equipment); equipment in a factory; communication equipment and broadcasting equipment such as Internet of Things (IoT) equipment; a g Node B (gNB); a repeater; a node; a vehicle; a bicycle; a motorbike; a ship; a satellite; an airplane; a drone; equipment capable of moving; and a robot. At this time, the reception apparatus and/or receiver may be included in, for example, the following; a radio; a terminal; a personal computer; a mobile phone; an access point; communication equipment such as a base station; a smartphone; a tablet; a laptop; a server; a personal computer; a television; a home appliance (household electrical machinery equipment); equipment in a factory; communication equipment and broadcasting equipment such as IoT equipment; a gNB; a repeater; a node; a vehicle; a bicycle; a motorbike; a ship; a satellite; an airplane; a drone; equipment capable of moving; and a robot. Moreover, it is conceivable that the transmission apparatus and the reception apparatus according to the present invention is a device having a communication function and the device can be connected to the apparatus via any interface for the purpose of executing an application such as a television, a radio, a personal computer, and a mobile phone. Furthermore, the communication apparatus and/or the communicator in the present specification may be included in, for example, the following: a broadcasting station; a base station, an access point; a terminal; a mobile phone; a smartphone; a tablet; a server; a PC, a personal computer; a television; a home appliance (household electrical machinery equipment); equipment in a factory; communication equipment and broadcasting equipment such as (IoT equipment; a gNB; a repeater; a node; a vehicle; a bicycle; a motorbike; a ship; a satellite; an airplane; a drone; equipment capable of moving; and a robot.

Further, in the present embodiment, symbols other than data symbols, for example, reference signals (preamble, unique word, post-amble, reference symbol, pilot symbol, pilot signal, etc.), symbols for control information, sector sweeps, and the like may be mapped in a frame in any way. Here, the symbols and sector sweeps are referred to as a "reference signal," a "symbol for control information," and a "sector sweep," but they may be referred to in any way, and the functions thereof are important. For example, sector sweeps may be referred to as, sector sweeps.

The reference signals and/or sector sweeps may be, for example, a known symbol modulated using PSK modulation at the transmitter/receiver (or, by taking synchronization, the receiver may know the symbol transmitted from the transmitter), a signal of non-zero power, a signal of zero power, a signal known at the transmitter/receiver, and the like. The receiver uses these signals to perform frequency synchronization, time synchronization, channel estimation (of each modulation signal) (estimation of Channel State Information (CSI)), detection of a signal, estimation of a reception state, estimation of the transmission state, and the like.

The symbol for control information is a symbol for transmitting information that needs to be transmitted to a communication counterpart (e.g., a modulation system, an error correction encoding method, a code rate of the error correction encoding method, and configuration information in a higher layer that are used for the communication. Modulation and Coding Scheme (MCS), frame configuration, channel information, information on frequency band that is used, information on the number of channels that is used) in order to realize communication other than data (application data, etc.) communication.

It may be necessary to notify transmission apparatus and/or reception apparatus of the transmission methods (e.g., MIMO, SISO, space-time block code, interleaving scheme, and/or MCS), the modulation system, and the error correction encoding scheme. Descriptions thereof may be omitted in some embodiments.

Although the terms such as "precoding," "precoding weight" may be used herein; however, any kind of term is acceptable, and the signal processing itself is important in the present invention.

In either of the transmission panel antenna of the transmission apparatus and the reception panel antenna of the reception apparatus, an antenna illustrated in the drawings may be composed of one antenna or a plurality of antennae.

Further, in the description of the embodiment and the like, the transmission panel antenna and the reception panel antenna are described being separate from each other in some cases, but a configuration of "transmission/reception panel antenna" in which the transmission panel antenna and the reception panel antenna are shared is possible.

Further, the transmission panel antenna, the reception panel antenna, and the transmission/reception panel antenna may be referred to as, for example, an antenna port. How the transmission panel antenna, the reception panel antenna, and the transmission/reception panel antenna are referred to is not limited to these, and a method is conceivable in which the transmission panel antenna is composed of one or more or a plurality of antennae. A method is also conceivable in which the reception panel antenna is composed of one or more or a plurality of antennae. Thus, a method is also conceivable in which the transmission/reception panel antenna is composed of one or more or a plurality of antennae. Further, an apparatus may be configured for each transmission panel antenna, an apparatus may be configured apparatus for each reception panel antenna, and an apparatus may be configured for each transmission/reception panel antenna. That is, it can be thought of as Multiple Transmitter (TX)/Receiver (RX) point (TRP).

The antenna port may be a logical antenna (antenna group) composed of one or a plurality of physical antennae. That is, the antenna port does not necessarily refer to one physical antenna and sometimes refers to an array antenna composed of a plurality of antennae and the like. For example, the number of physical antennae composing the antenna port is not specified, and it may be specified as the smallest unit in which the terminal station can transmit a base signal (reference signal). In addition, the antenna port may also be specified as a unit or minimum unit for multiplying a precoding vector or a weight of the precoding matrix.

In the present specification includes a plurality of methods for generating a modulation signal of a single carrier system, and the present embodiments can be implemented for any of the systems. Examples of the single carrier system include "Discrete Fourier Transform (DFT)-Spread Orthogonal Frequency Division Multiplexing (OFDM)" (DFT-S OFDM), "Trajectory Constrained DFT-Spread OFDM," "Constrained DFT-Spread OFDM" (Constrained DFT-S OFDM), "OFDM based Single Carrier (SC)," "SC-Frequency Division Multiple Access (FDMA)," "Guard interval DFT-Spread OFDM," a time-domain implementation single-carrier system (e.g., SC-QAM), and the like.

Incidentally, in the present specification, for example, a communication apparatus such as the base station and the terminal can operate in the same manner even when each embodiment is implemented with transmission and/or reception of a modulation signal of a system other than the single carrier system, for example, a multi-carrier system such as OFDM, and the similar effects can be obtained. Thus, each embodiment is applicable to any transmission system, and the similar effects can be obtained.

In the present specification, the ID of the transmission panel antenna and the ID of beamforming are described being separate from each other; however, an ID may be assigned without distinguishing between the two.

For example, "ID0 of beamforming by using transmission panel antenna #1" may be referred to as ID#0, "ID1 of beamforming by using transmission panel antenna #1" may be referred to as ID#1, "ID0 of beamforming by using transmission panel antenna #2" may be referred to as ID#2, "ID1 of beamforming by using transmission panel antenna #2" may be referred to as ID#3, and so forth.

Thus, a signal for sector sweep may be generated based on the IDs, and the base station and the terminal may transmit information including the IDs.

It has been indicated above that the waveforms of the modulation signal transmitted by the communication apparatus herein may be any of the single-carrier system or the multi-carrier systems such as OFDM. When using the multi-carrier system such as OFDM, a frame also includes a symbol on the frequency axis.

The functions of the reception apparatus described herein may be implemented by the server providing with an application for processing associated with the reception apparatus, receiver, and by the terminal installing this application. Note that, the application may be provided to the terminal by a communication apparatus that includes the transmission apparatus described herein being connected to a server via a network, or the application may be provided to the terminal by a communication apparatus that has another transmission function being connected to the server via the network.

Similarly, the functions of the transmission apparatus described herein may be obtained by the server providing with an application for processing associated with the transmission apparatus and transmitter, and by the transmission apparatus installing this application. Note that, the application may be provided to the communication apparatus by another communication apparatus connecting to the server via the network.

Note that, the present invention is not limited to the above embodiments, and can be implemented with various modifications. For example, each of the embodiments is described based on performance of communication apparatuses, but the present disclosure is not limited to this, and software can also perform the communication method.

Meanwhile, a program for performing the communication method may be stored in a Read Only Memory (ROM) in advance, for example, and the program may be operated by a Central Processor Unit (CPU).

Further, a program for performing the communication method may be stored in a computer-readable storage medium, and the program stored in the storage medium may be recorded in a Random Access Memory (RAM) of the computer so that the computer operates according to the program.

Each configuration in the embodiments described above can be typically realized by an LSI (Large Scale Integration), which is an integrated circuit. The LSI may be individually formed as chips, or one chip may be formed so as to include a part or all of the configurations in the embodiments described above. Although it is called the LSI here, it may be referred to as an IC (Integrated Circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used.

Note that, at least one of a FPGA and a CPU may be configured to download all or some of software required for implementing the communication methods described in the present disclosure by radio communication or wired communication. Further, at least one of the FPGA and the CPU may be configured to download all or some of software for updating by radio communication or wired communication. Then, the downloaded software may be stored in storage, and at least one of the FPGA and the CPU may be operated based on the stored software to execute the digital signal processing described in the present disclosure.

The device including at least one of the FPGA and the CPU may be connected to a communication modem by radio or wire, and the communication methods described in the present disclosure may be implemented by the device and the communication modem.

For example, a communication apparatus such as the base station, AP, and terminal described in the specification may include at least one of the FPGA and the CPU, and the communication apparatus may include an interface for externally obtaining software for operating at least one of the FPGA and the CPU. Further, the communication apparatus may include storage for storing the externally-obtained software, and the FPGA and/or the CPU may be operated based on the stored software to implement the signal processing described in the present disclosure.

If future integrated circuit technology replaces LSIs as a result of the advancement of semiconductor technology or other derivative technology, the functional blocks could be integrated using the future integrated circuit technology. Biotechnology can also be applied.

The present invention is widely applied to a radio system that transmits different modulation signals from a plurality of antennae, respectively. Further, it can also be applied to a case where MIMO transmission is performed in a wired communication system having a plurality of transmission locations (e.g., Power Line Communication (PLC) system, optical communication system, Digital Subscriber Line: digital subscriber line (DSL) system).

The disclosures of Japanese Patent Applications No. 2019-137745, filed on Jul. 26, 2019, No. 2019-203407, filed on Nov. 8, 2019, and No. 2020-022295, filed on Feb. 13, 2020, including the specifications, drawings and abstracts, are incorporated herein by reference in their entireties.

INDUSTRIAL APPLICABILITY

The present invention can be widely applied to a radio system for transmitting a modulation signal from one or more antennae, and is favorably applied to, for example, a communication system using a single carrier, to a communication system using a multi-carrier transmission system such as an OFDM. Further, the present invention can be also applied to a wired communication system (e.g., Power Line Communication (PLC) system, optical communication system, Digital Subscriber Line: digital subscriber line (DSL) system).

REFERENCE SIGNS LIST

100 Control signal
101_*i* I-th data
102_*i* I-th transmitter
103_*i* I-th modulation signal
104 First processor
105_*j* J-th transmission signal
106_*j* Transmission panel antenna j
151_*i* Reception panel antenna i
152_*i* I-th received signal
153 Second processor
154 J-th-signal-processing subjected signal
155_*j* J-th receiver
156_*j* J-th control data
157_*j* J-th data
158 Third processor
200 Control signal
201 Data
202 Data symbol generator
203 Data-symbol modulation signal
204 Sector-sweep reference signal generator
205 Sector-sweep reference signal
206 Other-signals generator
207 Other-signal
251 Processor
252 Frame-configuration following modulation signal 300 Control signal
301 Transmission signal
302 Distributor
303_1 First transmission signal
303_2 Second transmission signal
303_3 Third transmission signal
303_4 Fourth transmission signal
304_1, 304_2, 304_3, 304_4 Multiplier
305_1 Coefficient-multiplication subjected first transmission signal
305_2 Coefficient-multiplication subjected second transmission signal
305_3 Coefficient-multiplication subjected third transmission signal
305_4 Coefficient-multiplication subjected fourth transmission signal
306_1, 306_2, 306_3, 306_4 Antenna
400 Control signal
401_1, 401_2, 401_3, 401_4 Antenna
402_1 First received signal
402_2 Second received signal
402_3 Third received signal
402_4 Fourth received signal
403_1, 403_2, 403_3, 403_4 Multiplier
404_1 Coefficient-multiplication subjected first received signal
404_2 Coefficient-multiplication subjected second received signal
404_3 Coefficient-multiplication subjected third received signal
404_4 Coefficient-multiplication subjected fourth received signal
405 Coupler/combiner
406 Modulation signal
501 Constellation mapper
502 Tone mapping
503 IFFT
504 CP insertion
505 Tx FE processing
601 Rx FE processing
602 CP Removal
603 FFT
604 Tone demapping
605 FDE
606 DFT
607 Demapper
701 Constellation mapper
702 CP insertion
703 Up-sampling and pulse shaping
704 Tx FE processing
801 Rx FE processing
802 Down-sampling and match filtering
803 TDE
804 CP Removal
805 Demapper
901_1 Base station #1
902_1 Terminal #1
902_2 Terminal #2
902_3 Terminal #3
1000 Modulation signal
1001 Sector-sweep reference signal
1002 Feedback signal
1003 Data-symbol including frame
1101_i Sector-sweep reference signals in transmission panel antenna i
1101_xi Sector-sweep reference signals in transmission panel antenna xi 1201_j Reference signal according to j-th parameter in transmission panel antenna i
1301_1 First terminal "sector-sweep reference signal" transmission period
1301_2 Second terminal "sector-sweep reference signal" transmission period
1301_3 Third terminal "sector-sweep reference signal" transmission period
1301_4 Fourth terminal "sector-sweep reference signal" transmission period
1401_1, 1401_2, 2101_3, 2201_3 Sector-sweep reference signal
1501_j Reference signal according to j-th parameter in transmission panel antenna xi
1601_1 First-terminal-addressed feedback signal
1601_2 Second-terminal-addressed feedback signal
1601_3 Third-terminal-addressed feedback signal
1601_4 Fourth-terminal-addressed feedback signal
1701_1, 3201_11, 3201_21, 3201_31, 3201_41 First-terminal-addressed modulation signal (first-terminal-addressed slot)
1701_2, 3201_12, 3201_22, 3201_32, 3201_42 Second-terminal-addressed modulation signal (second-terminal-addressed slot)
1701_3, 3201_13, 3201_23, 3201_33, 3201_43 Third-terminal-addressed modulation signal (third-terminal-addressed slot)
1701_4, 3201_14, 3201_24, 3201_34, 3201_44 Fourth terminal-addressed modulation signal (fourth-terminal-addressed slot)
1801_1, 1801_2, 3301_1, 3301_2, 3301_3, 3301_4, 3301_5, 3301_6, 4101_1, 4101_2,
4101_3 Sector-sweep reference signal
1802_1, 1802_2 Feedback signal
1803_1, 1803_2, 1803_3, 1803_4 Data-symbol including frame
1851_1, 1851_2 Sector-sweep reference signal
1852_1, 1852_2, 1852_3, 1852_4 Data-symbol including frame
2001_1, 2001_2 Frame
2300, 3000 Modulation signal
2302, 3002 Feedback signal group
2303, 3003 Data-symbol including frame group
2400_1, 3101_11, 3101_21, 3101_31, 3101_41 First-terminal-addressed feedback signal group
2400_2, 3101_12, 3101_22, 3101_32, 3101_42 Second-terminal-addressed feedback signal group
2400_3, 3101_13, 3101_23, 3101_33, 3101_43 Third-terminal-addressed feedback signal group
2400_4, 3101_14, 3101_24, 3101_34, 3101_44 Fourth-terminal-addressed feedback signal group
2401_1 Feedback signal (1) addressed to terminal #1 (Terminal #1-addressed feedback signal (1))
2401_2 Feedback signal (2) addressed to terminal #1 (Terminal #1-addressed feedback signal (2))
2402_1, 3401_2, 4201_2 Terminal #2-addressed feedback signal
2500_1 First-terminal-addressed modulation signal group (first-terminal-addressed slot group)
2500_2 Second-terminal-addressed modulation signal group (second-terminal-addressed slot group)
2500_3 Third-terminal-addressed modulation signal group (third-terminal-addressed slot group)
2500_4 Fourth-terminal-addressed modulation signal group (fourth-terminal-addressed slot group)
2501_1 Modulation signal (slot) (1) addressed to terminal #1 (Terminal #1-addressed modulation signal (slot) (1))

2501_2 Modulation signal (slot) (2) addressed to terminal #1 (Terminal #1-addressed modulation signal (slot) (2))

2502_1, 3501_2, 4301_2 Modulation signal (slot) addressed to terminal #2 (Terminal #2-addressed modulation signal (slot))

2602_1, 2602_2 Feedback signal group

2603_1, 2603_2, 2603_3, 2603_4, 2652_1, 2652_2, 2652_3, 2652_4, 2652__i_ Data-symbol including frame group

2801_1, 2801_2, 3601_1, 3601_2, 3601_3, 3601_4, 3601_5, 3601_6, 4401_1, 4401_2,

4401_3 Frame group

2904_4 Terminal #4

2904_5 Terminal #5

2904_6 Terminal #6

3100_1 Feedback signal of transmission panel antenna 1

3100_2 Feedback signal of transmission panel antenna 2

3100_3 Feedback signal of transmission panel antenna 3

3100_4 Feedback signal of transmission panel antenna 4

3200_1 Frame of transmission panel antenna 1

3200_2 Frame of transmission panel antenna 2

3200_3 Frame of transmission panel antenna 3

3200_4 Frame of transmission panel antenna 4

3401_1, 4201_1 Terminal #1-addressed feedback signal

3401_3, 4201_3 Terminal #3-addressed feedback signal

3401_4 Terminal #4-addressed feedback signal

3401_5 Terminal #5-addressed feedback signal

3401_6 Terminal #5-addressed feedback signal

3501_1, 4301_1 Terminal #1-addressed modulation signal (slot)

3501_3, 4301_3 Terminal #3-addressed modulation signal (slot)

3501_4 Terminal #4-addressed modulation signal (slot)

3501_5 Terminal #5-addressed modulation signal (slot)

3501_6 Terminal #6-addressed modulation signal (slot)

3800 I-th-terminal-addressed modulation signal (slot)

3801 First reference symbol

3802, 3902 Control information symbol

3803, 3903 Data symbol

3804 Second reference symbol

3900 Frame or frame group

3901 Third reference symbol

3904 Fourth reference symbol

4001_2 Base station #2

The invention claimed is:

1. A radio communication apparatus communicating with a first transmitter/receiver point (TRP) and a second TRP, the radio communication apparatus comprising:

circuitry, which, in operation, controls external communication of the radio communication apparatus with the first and second TRPs and selects a selected beam among a plurality of beams used by the first TRP, wherein the radio communication apparatus, first TRP and second TRP are different devices; and a transmitter, which, in operation, transmits, to the first TRP, information relating to the selected beam, information on whether or not a transmission with the first TRP and the second TRP is performed, and other information relating to another beam of the second TRP together in a Random Access Channel (RACH) or a Physical Uplink Shared Channel (PUSCH).

2. The radio communication apparatus according to claim 1, wherein information relating to the plurality of beams is transmitted from the second TRP.

3. The radio communication apparatus according to claim 1, wherein the selected beam is determined based on reference signals transmitted from the first TRP.

4. The radio communication apparatus according to claim 1, wherein the information relating to the selected beam is transmitted in a case where a communication with the first TRP is failed.

5. The radio communication apparatus according to claim 1, wherein the information relating to the selected beam is transmitted by using a Discrete Fourier Transform-Spread Orthogonal Frequency Division Multiplexing (DFT-S OFDM).

6. A radio communication method for communicating with a first transmitter/receiver point (TRP) and a second TRP, comprising:

controlling, by a communication apparatus, external communication with the first and second TRPs, wherein the communication apparatus, first TRP and second TRP are different devices;

selecting, by the communication apparatus, a selected beam among a plurality of beams used by the first TRP; and transmitting, by the communication apparatus to the first TRP, information relating to the selected beam, information on whether or not a transmission with the first TRP and the second TRP is performed, and other information relating to another beam of the second TRP together in a Random Access Channel (RACH) or a Physical Uplink Shared Channel (PUSCH).

7. The radio communication method according to claim 6, wherein information relating to the plurality of beams is transmitted from the second TRP.

8. The radio communication method according to claim 6, wherein the selected beam is determined based on reference signals transmitted from the first TRP.

9. The radio communication method according to claim 6, wherein the information relating to the selected beam is transmitted in a case where a communication with the first TRP is failed.

10. The radio communication method according to claim 6, wherein the information relating to the selected beam is transmitted by using a Discrete Fourier Transform-Spread Orthogonal Frequency Division Multiplexing (DFT-S OFDM).

* * * * *